United States Patent
Yoshino et al.

(10) Patent No.: US 8,538,887 B2
(45) Date of Patent: Sep. 17, 2013

(54) CONTENT DELIVERY SYSTEM AND CONTENT DELIVERY METHOD

(75) Inventors: Kenji Yoshino, Tokyo (JP); Yoshihito Ishibashi, Tokyo (JP); Toru Akishita, Chiba (JP); Taizo Shirai, Tokyo (JP); Makoto Oka, Chiba (JP); Masaharu Yoshimori, Tokyo (JP)

(73) Assignee: Sony Computer Entertainment Inc. (JP)

( * ) Notice: Subject to any disclaimer, the term of this patent is extended or adjusted under 35 U.S.C. 154(b) by 1208 days.

(21) Appl. No.: 09/999,456

(22) Filed: Oct. 31, 2001

(65) Prior Publication Data

US 2002/0099663 A1 Jul. 25, 2002

(30) Foreign Application Priority Data

Nov. 1, 2000 (JP) ................................. 2000-334183

(51) Int. Cl.
*G06F 21/00* (2013.01)
(52) U.S. Cl.
USPC ............... 705/57; 705/50; 705/51; 705/52; 705/53; 705/54; 705/55; 705/56; 705/58; 705/59; 713/176
(58) Field of Classification Search
USPC .................................................. 705/50–59
See application file for complete search history.

(56) References Cited

U.S. PATENT DOCUMENTS

| | | | |
|---|---|---|---|
| 5,235,165 A * | 8/1993 | Sukegawa et al. | 235/380 |
| 5,673,316 A | 9/1997 | Auerbach et al. | |
| 6,012,044 A * | 1/2000 | Maggioncalda et al. | 705/26 |
| 6,226,618 B1 * | 5/2001 | Downs et al. | 705/51 |

FOREIGN PATENT DOCUMENTS

| | | |
|---|---|---|
| JP | 11-191092 | 7/1999 |
| KR | 10-0187876 | 12/1996 |
| WO | WO-00/08909 | 2/2000 |

OTHER PUBLICATIONS

Office Action in corresponding Korean Application No. 10-2002-7008306.

* cited by examiner

*Primary Examiner* — Calvin Loyd Hewitt, II
*Assistant Examiner* — Cristina Owen Sherr
(74) *Attorney, Agent, or Firm* — Lerner, David, Littenberg, Krumholz & Mentlik, LLP

(57) ABSTRACT

In a content delivery system, delivery of content and charging the fee of the content are performed and managed in a highly secure and effective fashion. If a content-purchasing request is transmitted from a user device to a shop server, a charging process is performed. A user device authentication server, which manages content delivery, converts an encrypted content key KpDAS(Kc) encrypted using a public key of the user device authentication server (DAS) into an encrypted content key KpDEV(Kc) encrypted using a public key KpDEV of the user device. If the charging process is successfully completed, the shop server transmits, to the user device, the encrypted content key KpDEV(Kc).

8 Claims, 76 Drawing Sheets

FIG. 3

| SHOP PROCESS NUMBER | DEVICE ID | TRANSACTION ID | CONTENT ID | STATUS |
|---|---|---|---|---|
| 10001 | 1234567890 | 999888777 | 5000 | TRANSMISSION OF KEY 2 HAS BEEN SUCCESSFULLY COMPLETED |
| 10002 | 2345678901 | 666555444 | 4050 | CHARGING PROCESS HAS BEEN SUCCESSFULLY COMPLETED |
| 10003 | 3456789012 | 333222111 | 1000 | RECEPTION OF ENCRYPTED CONTENT KEY TRANSMISSION REQUEST HAS BEEN SUCCESSFULLY COMPLETED |
| 10004 | 4567890123 | 000999888 | 3000 | RECEPTION OF KEY HAS BEEN SUCCESSFULLY COMPLETED |
| 10005 | 5678901234 | 777666555 | 5050 | TRANSMISSION OF KEY 1 HAS BEEN SUCCESSFULLY COMPLETED |
| 10006 | 6789012345 | 444333222 | 2050 | RECEPTION OF PURCHASE REQUEST HAS BEEN SUCCESSFULLY COMPLETED |

PURCHASE MANAGEMENT DATABASE OF THE SHOP SERVER

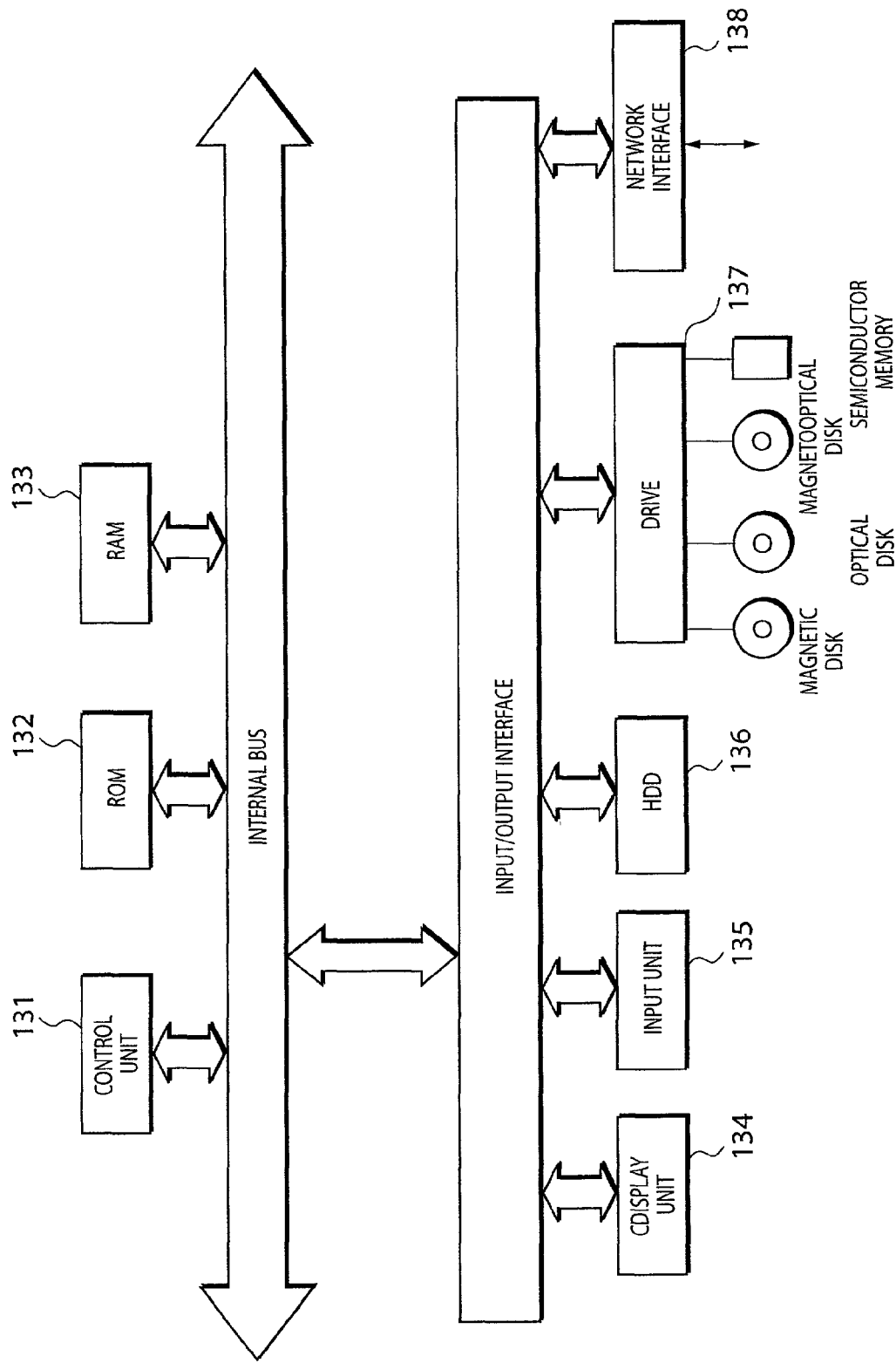

FIG. 6

| DAS PROCESS NUMBER | DEVICE ID | TRANSACTION ID | CONTENT ID | SHOP ID | SHOP PROCESS NUMBER | STATUS |
|---|---|---|---|---|---|---|
| 50001 | 1234567890 | 999888777 | 5000 | 1234 | 10001 | TRANSMISSION OF KEY COMPLETED |
| 50002 | 2345678901 | 666555444 | 4050 | 1234 | 10002 | KEY CONVERSION COMPLETED |

LICENSE MANAGEMENT DATABASE OF THE USER DEVICE AUTHENTICATION SERVER

FIG. 8

DEVICE ID: 1234567890

| TRANSACTION ID | CONTENT ID | SHOP ID | STATUS |
|---|---|---|---|
| 999888777 | 5000 | 1234 | RECEPTION OF KEY 2 COMPLETED |
| 666555444 | 4050 | 9876 | TRANSMISSION PURCHASE REQUEST COMPLETED |

PURCHASE MANAGEMENT DATABASE OF THE USER DEVICE

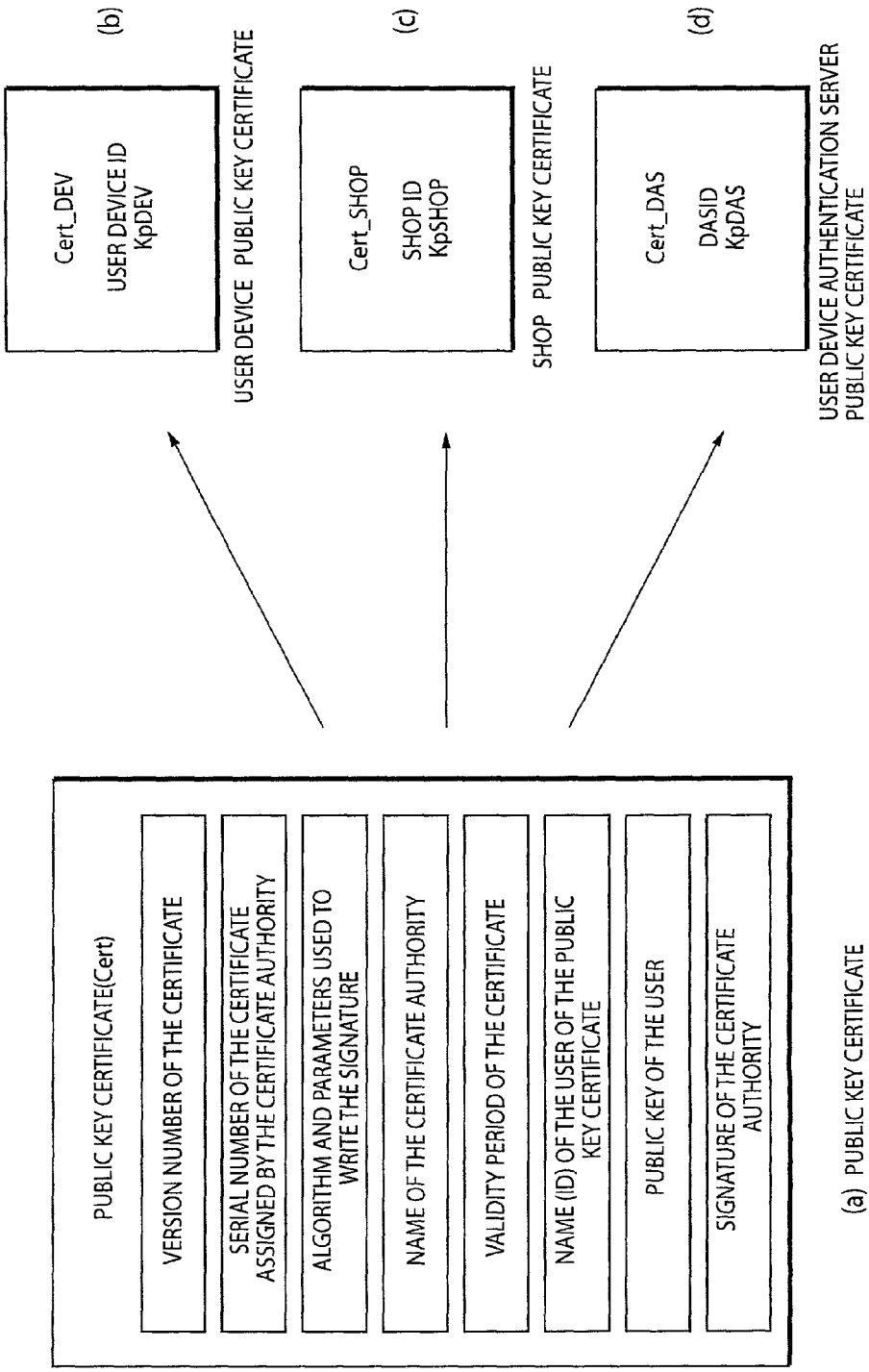

FIG. 10

SIGNATURE GENERATION

S1: SET THE FOLLOWING PARAMETERS
- p: CHARACTERISTIC
- a, b: COEFFICIENTS OF AN ELLIPTIC CURVE OF $y2 = x3 + ax + b$
- G: BASE POINT OF THE ELLIPTIC CURVE
- r: order of G
- M: MESSAGE
- Ks: SECRET KEY
- G, Ks × G: PUBLIC KEYS

S2: CALCULATE $f = Hash(M)$

S3: GENERATE A RANDOM NUMBER u WHERE $0 < u < r$

S4: CALCULATE $V = u \times G = (Xv, Yv)$

S5: CALCULATE $c = Xv \bmod r$

S6: c = 0? — YES → S3

NO ↓

S7: CALCULATE $d = [(f + cKs)/u] \bmod r$

S8: d = 0? — YES → S3

NO ↓

S9: EMPLOY (c, d) AS SIGNATURE

SIGNATURE GENERATION (IEEE P1363 / D13)

FIG. 39

| TICKET-ISSUING PROCESS NUMBER | DEVICE ID | TRANSACTION ID | CONTENT ID | TICKET USER ID | AMOUNT | EXPIRATION DATE | STATUS |
|---|---|---|---|---|---|---|---|
| 10001 | 1234567890 | 999888777 | 5000 | 22231234 | ¥1000 | 00/04/01 | EXCHANGE REPORT HAS BEEN SUCCESSFULLY RECEIVED |
| 10002 | 2345678901 | 666555444 | 4050 | 223345634 | ¥250 | 00/07/31 | ELECTRONIC TICKET HAS BEEN SUCCESSFULLY DELIVERED |
| 10003 | 3456788901 | 321655444 | 4021 | 345645234 | ¥800 | 00/07/31 | PURCHASE REQUEST HAS BEEN SUCCESSFULLY RECEIVED |

TICKET-ISSUING MANAGEMENT DATABASE OF THE TICKET ISSUING SERVER

FIG. 40

| TRANSACTION ID | CONTENT ID | TICKET ISSUER ID | TICKET ISSUING PROCESS NUMBER | TICKET ADDRESSEE ID | STATUS |
|---|---|---|---|---|---|
| 999888777 | 5000 | 1234 | 10001 | 1234567890 | RECEPTION OF KEY 2 HAS BEEN SUCCESSFULLY COMPLETED |
| 666555444 | 4050 | 1534 | 12345 | 2345678901 | RECEPTION OF KEY 1 HAS BEEN SUCCESSFULLY COMPLETED |
| 999888779 | 5010 | 2351 | 15435 | 2233567890 | TRANSMISSION OF AN ELECTRONIC TICKET HAS BEEN SUCCESSFULLY COMPLETED |
| 333555444 | 4320 | 0989 | 10302 | ..... | RECEPTION OF AN ELECTRONIC TICKET HAS BEEN SUCCESSFULLY COMPLETED |
| 2133545445 | 3232 | 3549 | 22543 | ..... | TRANSMISSION OF A PURCHASE REQUEST HAS BEEN SUCCESSFULLY COMPLETED |

PURCHASE MANAGEMENT DATABASE OF THE USER DEVICE

FIG. 41

| DAS PROCESS NUMBER | DEVICE ID | TRANSACTION ID | CONTENT ID | TICKET ISSUER ID | TICKET ISSUING PROCESS NUMBER | STATUS |
|---|---|---|---|---|---|---|
| 50001 | 1234567890 | 999888777 | 5000 | 331234 | 10001 | RECEPTION OF AN EXCHANGE REPORT HAS BEEN SUCCESSFULLY COMPLETED |
| 50002 | 2345678901 | 666555444 | 7050 | 345634 | 10025 | TRANSMISSION OF A TICKET EXCHANGE REQUEST HAS BEEN SUCCESSFULLY COMPLETED |
| 50003 | 345688901 | 321655444 | 8021 | 645234 | 10200 | TRANSMISSION OF A KEY HAS BEEN SUCCESSFULLY COMPLETED |
| 50004 | 5567778902 | 123555444 | 3245 | 321632 | 10325 | CONVERSION OF THE KEY HAS BEEN SUCCESSFULLY COMPLETED |
| 50005 | 5435678445 | 335655321 | 2651 | 764545 | 12300 | RECEPTION OF A KEY HAS BEEN SUCCESSFULLY COMPLETED |

LICENSE MANAGEMENT DATABASE OF THE USER DEVICE AUTHENTICATION SERVER

FIG. 43

| CONTENT DELIVERY SERVER PROCESS NUMBER | CONTENT ID | DEVICE ID | TICKET ISSUER ID | TICKET ISSUING PROCESS NUMBER | STATUS |
|---|---|---|---|---|---|
| 999888777 | 5000 | 1234567890 | 1234 | 12345 | RECEPTION OF AN EXCHANGE REPORT HAS BEEN SUCCESSFULLY COMPLETED |
| 666555444 | 4050 | 3427781534 | 2345 | 23456 | TRANSMISSION OF A TICKET EXCHANGE REQUEST HAS BEEN SUCCESSFULLY COMPLETED |
| 999888779 | 5010 | 2355643551 | 1545 | 22335 | DELIVERY HAS BEEN SUCCESSFULLY COMPLETED |
| 333555444 | 4320 | 4987390989 | 1030 | 32423 | RECEPTION OF AN ELECTRONIC TICKET HAS BEEN SUCCESSFULLY COMPLETED |
| 2133545445 | 3232 | 3542416759 | 2253 | 44323 | RECEPTION OF AN ELECTRONIC TICKET HAS BEEN SUCCESSFULLY COMPLETED |

DELIVERY MANAGEMENT DATABASE OF THE CONTENT DELIVERY SERVER

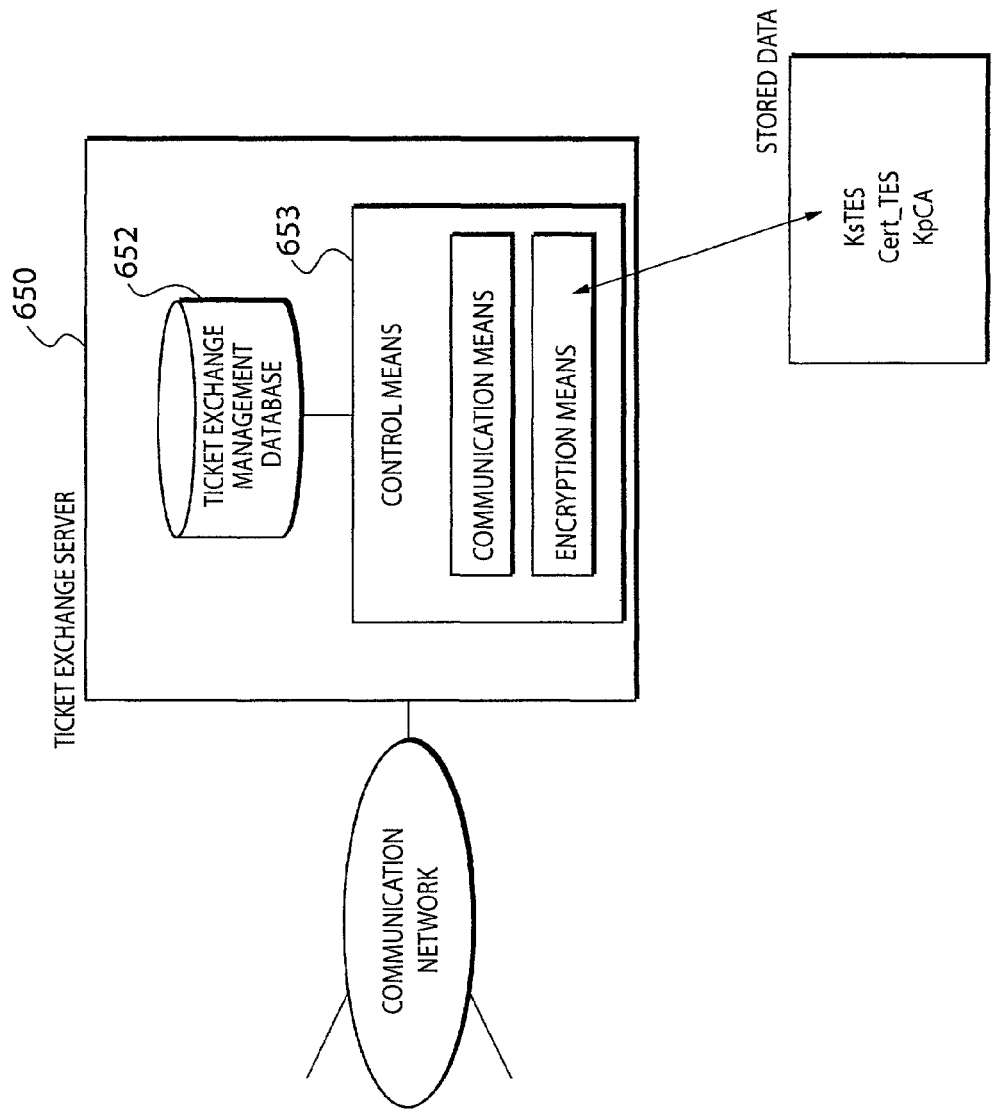

FIG. 45

| TICKET EXCHANGE SERVER PROCESS NUMBER | EXCHANGE REQUESTER ID | TICKET ISSUER ID | TICKET ISSUING PROCESS NUMBER | AMOUNT | DEVICE ID | TRANSACTION ID | STATUS |
|---|---|---|---|---|---|---|---|
| 50001 | 12345 | 1234 | 10023 | ¥1000 | 1234567890 | 999888777 | TRANSMISSION OF AN EXCHANGE REPORT HAS BEEN SUCCESSFULLY COMPLETED |
| 50002 | 23450 | 4455 | 10455 | ¥250 | 2345678901 | 666555444 | EXCHANGE PROCESS IS COMPLETED |
| 50003 | 33201 | 2354 | 10254 | ¥800 | 3456788901 | 3216555444 | RECEPTION OF AN ELECTRONIC TICKET HAS BEEN SUCCESSFULLY COMPLETED |

TICKET EXCHANGE MANAGEMENT DATABASE OF THE TICKET ISSUING SERVER

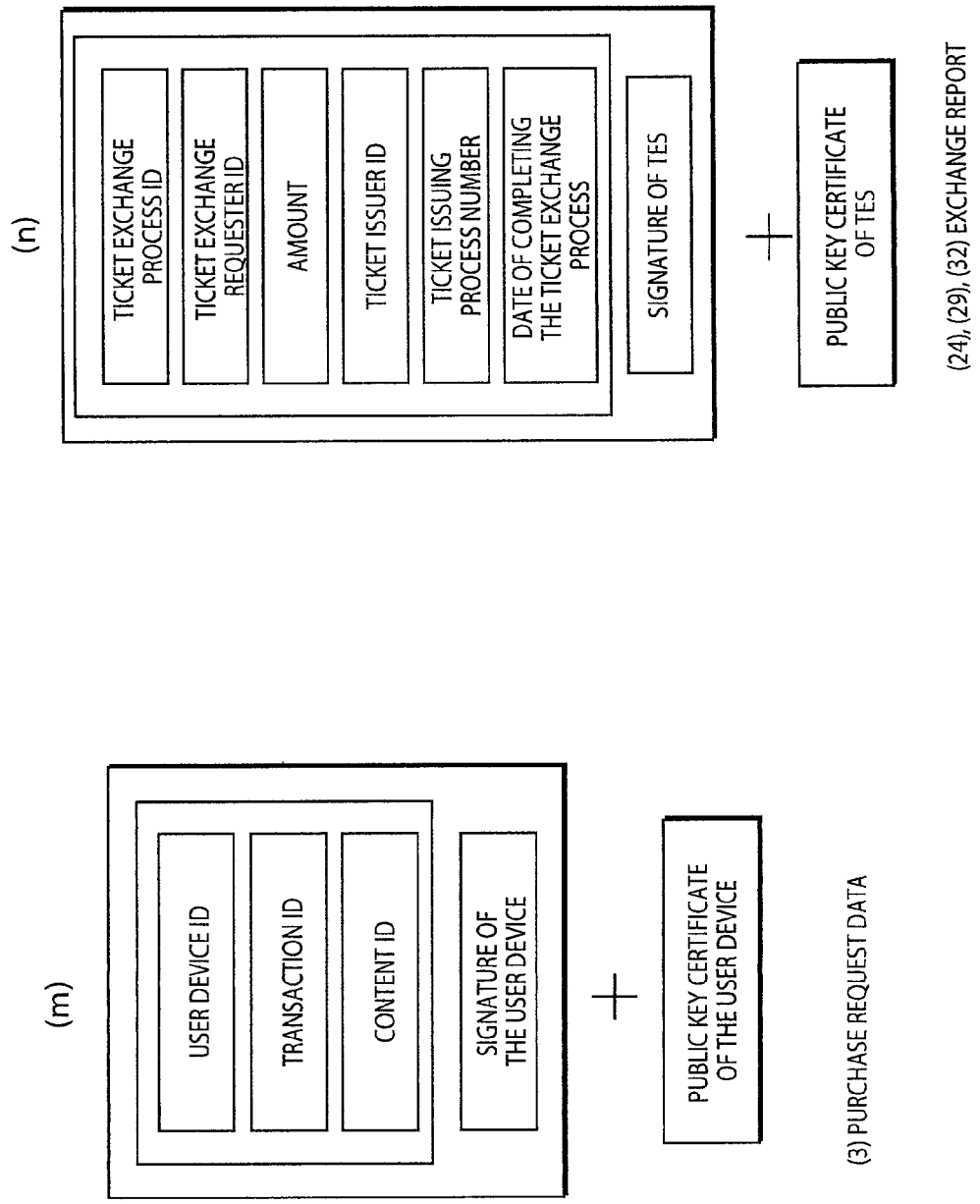

FIG. 47
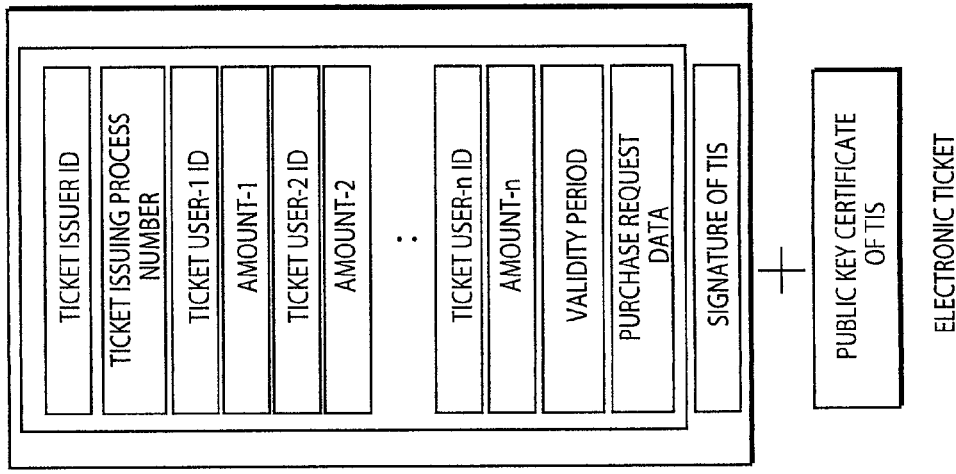
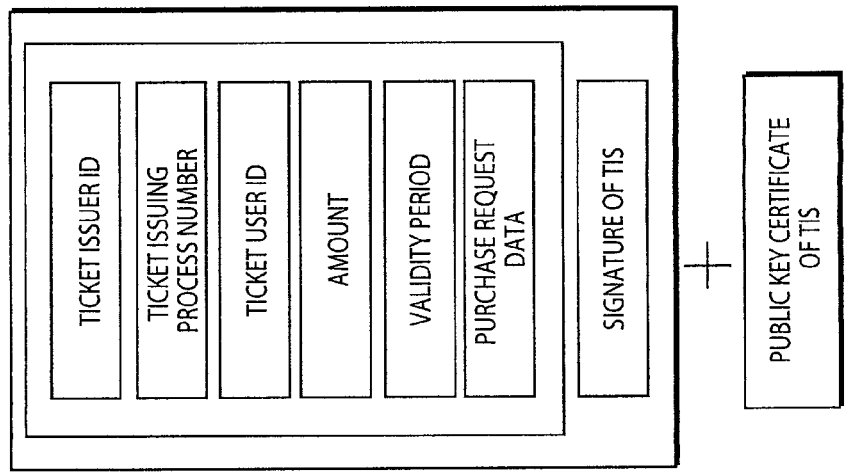

FIG. 59

(B) FORMAT OF SALES DATA

| TRANSACTION ID (TID_DEV) |
| SHOP ID (ID_SHOP) 1 |
| SALES DATE |
| COMMISSION FEE TO BE PAID TO SYSTEM HOLDER |
| AMOUNT TO BE PAID TO CP |
| PURCHASE REQUEST DATA |
| SIGNATURE OF SHOP (Sig.SHOP) |

(A) FORMAT OF PURCHASE REQUEST DATA

| TRANSACTION ID (TID_DEV) |
| CONTENT ID |
| USER DEVICE ID (ID_DEV) |
| SUGGESTED PRICE |
| REQUESTING DATE |
| SIGNATURE OF USER DEVICE (Sig.Dev) |

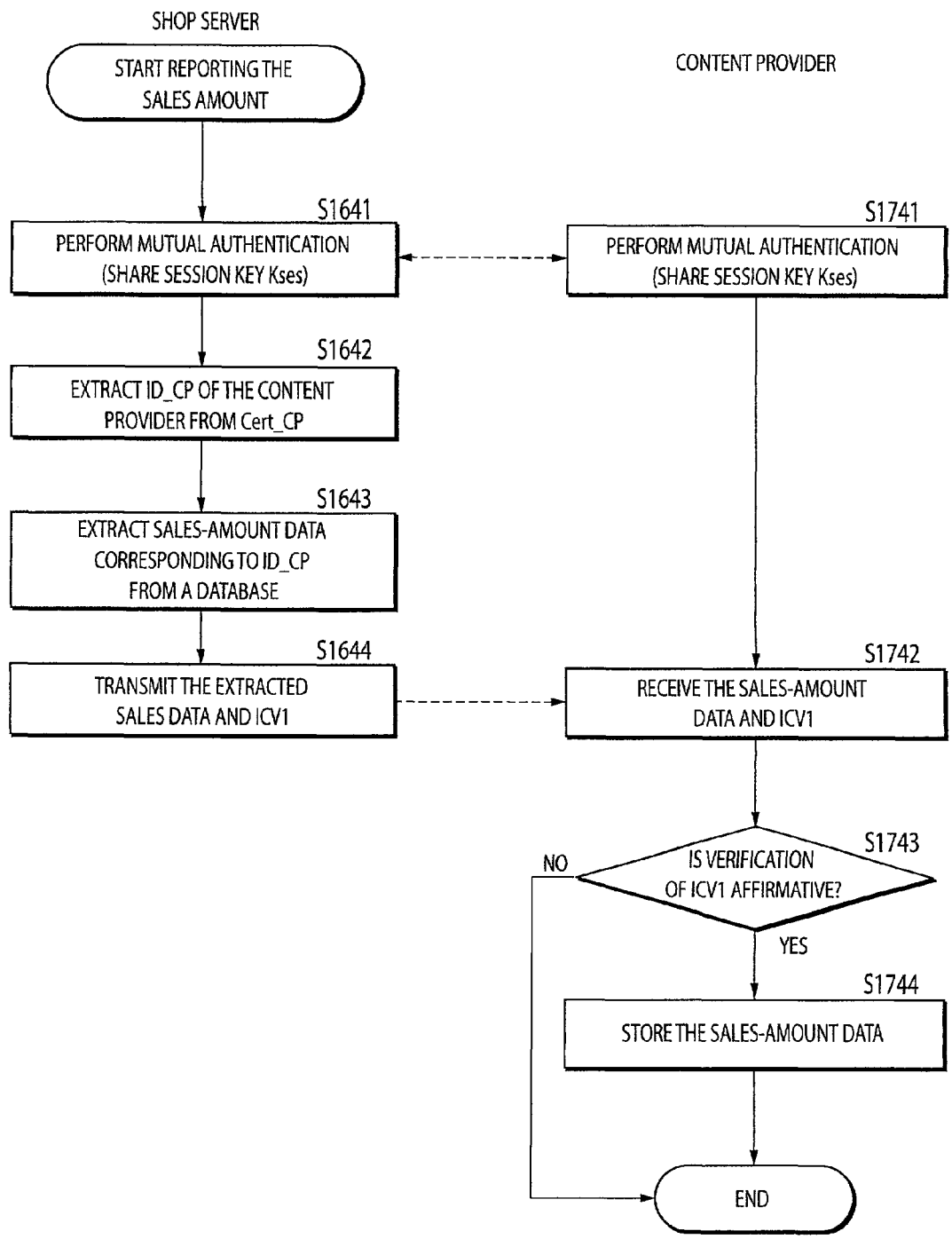

FIG. 66

| ATTRIBUTE CODE (2 BYTES) | ENTITY | FUNCTION |
|---|---|---|
| 0000 | REGISTRATION AUTHORITY (RA) | EXAMINES WHETHER A PUBLIC KEY CERTIFICATE OR ATTRIBUTE CERTIFICATE SHOULD BE ISSUED |
| 0001 | SYSTEM HOLDER (SH) | COLLECTS LICENSE FEES FOR CONTENTS DISTRIBUTED IN THE SYSTEM AND MORE SPECIFICALLY PERFORMS PROCESSES INCLUDING CONVERSION OF KEYS USED TO DECRYPT CONTENTS AND ACQUISITION OF LOG DATA |
| 0002 | CONTENT SELLER (SHOP) | PROVIDES INFORMATION ABOUT CONTENTS TO USERS AND RECEIVE CONTENT FEE |
| 0003 | CONTENT DELIVERY SERVER | DELIVERS A CONTENT TO A USER IN RESPONSE TO A REQUEST FROM A CONTENT SELLER |
| 0004 | USER DEVICE | PURCHASES A CONTENT AND USES IS |
| .. | .. | .. |

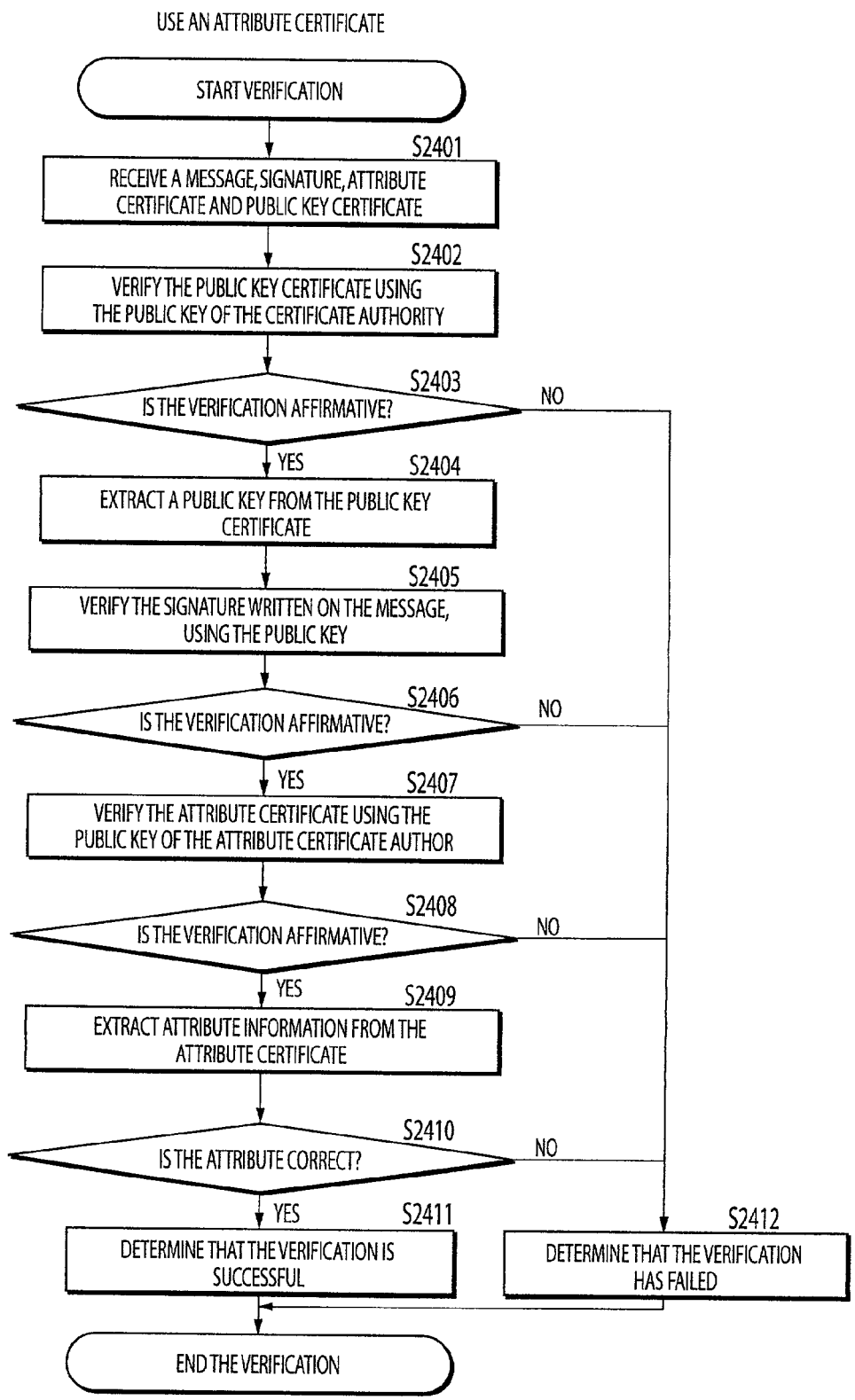

CONTENT DELIVERY SYSTEM AND CONTENT DELIVERY METHOD

BACKGROUND OF THE INVENTION

The present invention relates to a content delivery system and a content delivery method. More particularly, the present invention relates to a content delivery system and a content delivery method, in which a content transaction between an entity which provides a content and an entity which receives the content is performed in an improved manner so as to achieve high security. Herein, the term "system" is used to describe a logical collection of a plurality of devices, and it is not necessarily required that the plurality of devices are disposed in a single location.

It is now very popular to distribute various kind of software data such as a game program, audio data, image data, and a document generation program (hereinafter, such data will be referred to as "content" via a network such as the Internet. It is also popular to perform a commercial transaction and settlement, such as online shopping, bank account settlement, or ticket sales, via a network.

In data communication via a network for such a purpose, data is generally transmitted after confirming that a sender of data and a receiver of data are an authorized sender and receiver to achieve security. One known technique for achieving security in transmission of data is to transmit the data after encrypting the data. Another technique is to write a digital signature on the data.

The encrypted data can be converted into its original form (plaintext) by performing a predetermined decryption process upon the encrypted data. The data encryption and decryption technique in which information is encrypted using an encryption key and decrypted using a decryption key is well known in the art.

Various encryption and decryption techniques using an encryption key and a decryption key are known in the art. One such technique is public key cryptography. In the public key cryptography, a sender and a receiver use different keys, wherein one of the keys is a public key for use by an unspecified user, and the other key is a secret key which is kept secret. For example, a public key is used as a data encryption key, and a secret key is used as a decryption key. Another example is that a secret key is used as an authenticator generation key and a public key is used as an authenticator verification key.

In the pubic key cryptography, unlike the common key cryptography in which a common key is used for both encryption and decryption, a secret key which should be kept secret is held by a specific person. Thus, the public key cryptography has the advantage that the key can be easily managed. However, in the public key cryptography, the data processing speed is low compared with the common key cryptography. Because of the low data processing speed, the public key cryptography is employed mainly in applications such as a digital signature or transmission of a secret key which needs a small data size. A representative example of the public key cryptography is the RSA (Rivest-Shamir-Adelman) cryptosystem. In this technique, a product of two very large prime numbers (for example, 150-digit prime numbers) is used because it is difficult to factorize the product of two very large prime numbers (such as 150-digit prime numbers) into prime numbers.

In the public key cryptography, a large number of unspecified users are allowed to use the same public key, and the validity of a distributed public key is generally certified by a certificate called a public key certificate. For example, a user A creates a public key and a secret key and sends the created public key to a certificate authority to acquire a public key certificate from the certificate authority. The user A opens the public key certificate to the public. An unspecified user acquires the public key from the public key certificate via a predetermined procedure and transmits, to the user A, a document or the like after encrypting it using the public key. Upon reception of the document, the user A decrypts the received document using the secret key. The user A may also attach his/her signature encrypted with the secret key to a document or the like, and unspecified user may verify the signature using the public key extracted from the public key certificate via the predetermined procedure.

In the public key cryptography, a public key certificate is issued by a certificate authority (CA) or an issuer authority (IA), wherein in response to receiving an ID and a public key from an user, the certificate authority issues a certificate after adding information such as an ID of the certificate authority and a validity period and also adding a signature of the certificate authority.

The public key certificate has information about a version number of the certificate, a serial number of the certificate assigned by the issuer authority to a user of the certificate, an algorithm and a parameter used in a digital signature, a name of a certificate authority, a validity period of the certificate, a name (user ID) of the user of the certificate, a public key of the user of the certificate, and a digital signature.

The digital signature is data which is created by generating a hash value by applying a hash function to all data described above except for the digital signature, that is, the version number of the certificate, the serial number of the certificate assigned by the certificate authority to the user of the certificate, the algorithm and the parameter used in the digital signature, the name of the certificate authority, the validity period of the certificate, the name of the user of the certificate, and the public key of the user of the certificate, and then encrypting the resultant hash value using the secret key of the certificate authority.

When a user uses the public key certificate, the user verifies the digital signature of the public key certificate using the public key of the certificate authority the user has, and the user extracts the public key from the public key certificate. Therefore, all users, who want to use the public key certificate, need to have the common public key of the certificate authority.

In a data transmission system based on the public key cryptography using a public key certificate issued by a certificate authority, for example, a content-providing shop transmits a content to a user device after encrypting the content using a public key of the user device. When the user device receives the encrypted data from the content-providing shop, the user device decrypts the encrypted content using a secret key corresponding to the public key of the user device.

However, in many practical content transactions, a content is provided to a user by a content-providing shop which is neither a holder of a license of the content nor a content producer having the copyright of the content. In many cases, the content-providing shop provides the content to the user without confirming that the user is an authorized user. That is, in some cases, a content is provided or sold to an unauthorized user.

In the above-described content transaction system, although a fee for a content is paid from the user device which purchased the content to the content-providing shop which sold the content, it is not ensured that a license fee is paid to a license holder of the content or a content producer having the copyright of the content. In many current systems, a content-providing shop assesses the sales amount and declares it, and a license fee is paid from the shop to a license holder or a content producer having the copyright of a content, on the basis of the sales amount declared by the content-providing shop.

That is, in the conventional content providing system, the license holder or the content producer having the copyright of the content cannot know the actual sales amount and cannot know whether the content is distributed in an adequate fashion.

In view of the problems in the conventional content providing system, it is an object of the present invention to provide a content delivery system and a content delivery method, which allow a license holder or a content producer having the copyright of a content to get accurate information about an actual content transaction performed between a content-providing shop and an user and which allow a content to be distributed while adequately protecting the copyright of the content.

SUMMARY OF THE INVENTION

According to a first aspect of the present invention, there is provided a content delivery system including a user device (DEV) which transmits a content-purchasing request to a shop server; a shop server (SHOP) which receives the content-purchasing request from the user device and which manages an encrypted content encrypted using a content key Kc and also manages an encrypted content key which cannot be decrypted by a key stored in the user device; and a user device authentication server (DAS) for performing a key conversion process so as to convert the encrypted content key into a form which can be decrypted using the key stored in the user device; wherein if a process for charging the fee for the content purchased by the user device has been completed, the user device authentication server converts the encrypted content key into a form which can be decrypted by the key stored in the user device, and the converted encrypted content key is provided by the shop server to the user device.

In this content delivery system according to the invention, preferably, the encrypted content key (which cannot be decrypted by the key stored in the user device) is an encrypted content key KpDAS(Kc) encrypted using a public key KpDAS of the user device authentication server (DAS), and the user device authentication server (DAS) performs the key conversion such that the encrypted content key KpDAS(Kc) can be decrypted using a secret key KsDAS of the user device authentication server (DAS) and then re-encrypted using a public key KpDEV of the user device (DEV) thereby generating the encrypted content key KpDEV(Kc).

In this content delivery system according to the invention, preferably, the user device authentication server receives, from the user device, the encrypted content key which cannot be decrypted by the key stored in the user device, and the user device authentication server transmits, to the shop sever, the encrypted content key converted into the form which can be decrypted using the key stored in the user device, and, if the charging process has been completed, the shop server transmits, to the user device, the encrypted content key converted into the form which can be decrypted by the key stored in the user device.

In the content delivery system according to the invention, preferably, the user device authentication server receives, from the shop server, the encrypted content key which cannot be decrypted by the key stored in the user device, and the user device authentication server transmits, to the shop sever, the encrypted content key converted into the form which can be decrypted using the key stored in the user device, and, if the charging process has been completed, the shop server transmits, to the user device, the encrypted content key converted into the form which can be decrypted by the key stored in the user device.

Preferably, the content delivery system further includes a content delivery server for delivering an encrypted content to the user device, wherein in response to receiving a content-purchasing request from the user device, the shop server transmits a content delivery request to the content delivery server, and wherein, in response to receiving the content delivery request from the shop server, the content delivery server delivers the encrypted content to the user device.

In the content delivery system according to the present invention, preferably, the content-purchasing request data generated by the user device and transmitted to the shop server includes a shop ID identifying a shop to which the request data is transmitted; a transaction ID identifying a content transaction; a content ID identifying a purchase-requested content; and a digital signature of the user device, and wherein the shop server checks whether integrity of data is maintained by verifying the digital signature written in the content-purchasing request data; adds a new entry to a shop managing database on the basis of the content-purchasing request data; sets status information indicating a process status associated with the added entry; and manages a transition of a process sequence associated with the shop on the basis of the status information.

Preferably, in the content delivery system according to the present invention, when the user device authentication server receives a key conversion request from the user device or the shop server, the user device authentication server adds a new entry to a database managed by the user device authentication server, sets status information indicating a process status associated with the added entry, and manages a transition of a process sequence associated with the user device authentication server on the basis of the status information.

According to a second aspect of the present invention, there is provided a user device authentication server which manages delivery of a content sold between a shop server and a user device, wherein in response to receiving a key conversion request from the shop server or the user device, the user device authentication server converts a content key, associated with the content sold between the shop server and the user device, from an encrypted form that cannot be decrypted by a key stored in the user device into an encrypted form that can be decrypted by the key stored in the user device, and wherein the user device authentication server verifies a digital signature of the shop server or a digital signature of the user device written in the key conversion request, and the user device authentication server performs the key conversion, if the verification indicates that the key conversion request is valid.

According to a third aspect of the present invention, there is provided a shop server which provides, to a user device, a content key used to decrypt an encrypted content, wherein the shop server stores a content key used to encrypt the content in such a manner that the content key used to encrypt the content is encrypted into a form which cannot be decrypted by a key stored in the user device, and wherein if the charging process in response to the content-purchasing request issued by the user device has been successfully completed, the shop server transmits, to the user device, the encrypted content key which has been generated via a key conversion process performed by a user device authentication server (DAS), which manages content delivery, such that the encrypted content key in the form which cannot be decrypted by the key stored in the user device is converted into a form which can be decrypted by the key stored in the user device.

In the shop server according to the present invention, preferably, the shop server includes a content delivery server for delivering an encrypted content.

According to a fourth aspect of the present invention, there is provided a content reproducing device which generates a content-purchasing request, transmits it to a shop server, and reproduces a content, wherein the content reproducing device acquires a content key by performing a process including the steps of: receiving, via a shop server, an encrypted content key which has been generated via a key conversion process performed by a user device authentication server (DAS), which manages content delivery, such that an encrypted content key (in a form which cannot be decrypted by a key stored in the content reproducing device) is converted into a form which can be decrypted by the key stored in the content reproducing device; verifying signatures, included in the received encrypted content key data, of the shop server and the user device authentication server (DAS); and, if the verification indicates that the data has not been tampered with, extracting the encrypted content key from the received encrypted content key data, thereby acquiring the content key.

According to a fifth aspect of the present invention, there is provided a content delivery method comprising the steps of: transmitting a content-purchasing request from a user device (DEV) to a shop server (SHOP); receiving, at the shop server (SHOP), the content-purchasing request from the user device; in a user device authentication server (DAS), converting an encrypted content key in a form which cannot be decrypted by a key stored in the user device into an encrypted content key in a form which can be encrypted by the key stored in the user device; and, if the user device has completed a charging process associated with the purchasing of a content, providing, from the shop server to the user device, the encrypted content key converted by the user device authentication server into the form which can be decrypted by the key stored in the user device.

In the content delivery method according to the present invention, preferably, the encrypted content key which cannot be decrypted by the key stored in the user device is an encrypted content key KpDAS(Kc) encrypted using a public key KpDAS of the user device authentication server (DAS), and the user device authentication server (DAS) performs the key conversion such that the encrypted content key KpDAS (Kc) is decrypted using a secret key KsDAS of the user device authentication server (DAS) and then re-encrypted using a public key KpDEV of the user device (DEV) thereby generating the encrypted content key KpDEV(Kc).

In the content delivery method according to the present invention, preferably, the user device authentication server receives, from the user device, the encrypted content key which cannot be decrypted by the key stored in the user device, and the user device authentication server transmits, to the shop sever, the encrypted content key converted into the form which can be decrypted using the key stored in the user device, and if the charging process has been completed, the shop server transmits, to the user device, the encrypted content key converted into the form which can be decrypted by the key stored in the user device.

In the content delivery method according to the present invention, preferably, the user device authentication server receives, from the shop server, the encrypted content key which cannot be decrypted by the key stored in the user device, and the user device authentication server transmits, to the shop sever, the encrypted content key converted into the form which can be decrypted using the key stored in the user device, and if the charging process has been completed, the shop server transmits, to the user device, the encrypted content key converted into the form which can be decrypted by the key stored in the user device.

In the content delivery method according to the present invention, preferably, the content-purchasing request data generated by the user device and transmitted to the shop server includes a shop ID identifying a shop to which the request data is transmitted; a transaction ID identifying a content transaction; a content ID identifying a purchase-requested content; and a digital signature of the user device; wherein the shop server checks whether integrity of data is maintained, by verifying the digital signature written in the content-purchasing request data; adds a new entry to a shop managing database on the basis of the content-purchasing request data; sets status information indicating a process status associated with the added entry; and manages a transition of a process sequence associated with the shop on the basis of the status information.

In the content delivery method according to the present invention, preferably, when the user device authentication server receives a key conversion request from the user device or the shop server, the user device authentication server adds a new entry to a database managed by the user device authentication server, sets status information indicating a process status associated with the added entry, and manages a transition of a process sequence associated with the user device authentication server on the basis of the status information.

According to a sixth aspect of the present invention, there is provided a medium for providing a computer program executable on a computer system to perform a content key delivery process, the computer program comprising the steps of: receiving an encrypted content key, generated by a user device authentication server (DAS), which manages content delivery, into a form capable of being decrypted by a key stored in a user device; performing a charging process on the basis of the content-purchasing request issued by the user device; and if the charging process has been successfully completed, transmitting, to the user device, the encrypted content key in the form capable of being decrypted by the key stored in the user device.

The medium according to the sixth aspect of the invention is a medium which provides a computer program in a computer-readable form to a general-purpose computer system capable of executing various program codes. The medium is not limited to a particular type, but various types of media, for example, a storage medium such as a CD, FD, or MD or a transmission medium such as a network may be employed.

The medium defines a cooperative relationship in structure or function, for realizing a function of a particular computer program on a computer system, between the computer program and the storage medium. That is, by installing a particular computer program onto a computer system via the medium, it becomes possible to achieve a cooperative operation on the computer system thereby achieving functions similar to those achieved by the other aspects of the present invention.

These and other objects and features of the present invention will become more apparent from the following detailed description of embodiments with reference to the accompanying drawings.

BRIEF DESCRIPTION OF THE DRAWINGS

FIG. 3 is a diagram illustrating the data structure of a purchase management database of the shop server in the content delivery system according to the present invention;

FIG. 4 is a diagram illustrating the construction of control means of the shop server in the content delivery system according to the present invention;

FIG. 6 is a diagram illustrating the construction of a license management database of the user device authentication server in the content delivery system according to the present invention;

FIG. 8 is a diagram illustrating the construction of a purchase management database of the user device in the content delivery system according to the present invention;

FIG. 9 is a diagram illustrating a manner of delivering public key certificates in the content delivery system according to the present invention;

FIG. 10 is a diagram illustrating a signature generation process employable in the content delivery system according to the present invention;

FIG. 39 is a diagram illustrating a ticket-issuing management database of the ticket issuing server in the content delivery system according to the present invention;

FIG. 40 is a diagram illustrating a purchase management database of the user device in the content delivery system according to the present invention;

FIG. 41 is a diagram illustrating a license management database of the user device authentication server in the content delivery system according to the present invention;

FIG. 43 is a diagram illustrating a delivery management database of the content delivery server in the content delivery system according to the present invention;

FIG. 44 is a diagram illustrating the construction of a ticket exchange server in the content delivery system according to the present invention;

FIG. 45 is a diagram illustrating a ticket exchange management database of the ticket issuing server in the content delivery system according to the present invention;

FIG. 46 is a diagram illustrating data structures of data transmitted between entities in the content delivery system according to the present invention;

FIG. 47 is a diagram illustrating data structures of data transmitted between entities in the content delivery system according to the present invention;

FIG. 59 is a diagram illustrating an example of a format of purchase request data and an example of a format of sales data, in the content delivery system according to the present invention;

FIG. 65 is a diagram illustrating the process flow between the shop server and the log recording server in the content delivery system according to the present invention;

FIG. 66 is a diagram illustrating attribute information employed in the content delivery system according to the present invention;

FIG. 76 is a diagram illustrating a data verification process including a step of checking an attribute, performed in the content delivery system according to the present invention.

DETAILED DESCRIPTION

The present invention is described in further detail below with reference to preferred embodiments in conjunction with the accompanying drawings.

The following description is organized into the following sections:

1. Management of Delivery of Content by Means of Encrypted Content Key Conversion
   1.1 System Configuration: Basic Content Delivery Model 1
   1.2 Modification of the Basic Content Delivery Model 1
   1.3 Basic Content Delivery Model 2
2. Content Delivery Model Using an Electronic Ticket
3. Management of Delivery of Content Using a Log Recording Server
4. Use of an Attribute Certificate or a Public Key Certificate Including Attribute Data 1. Management of Delivery of Content by Means of Encrypted Content Key Conversion 1.1 System Configuration: Basic Content Delivery Model 1

Figure 1:
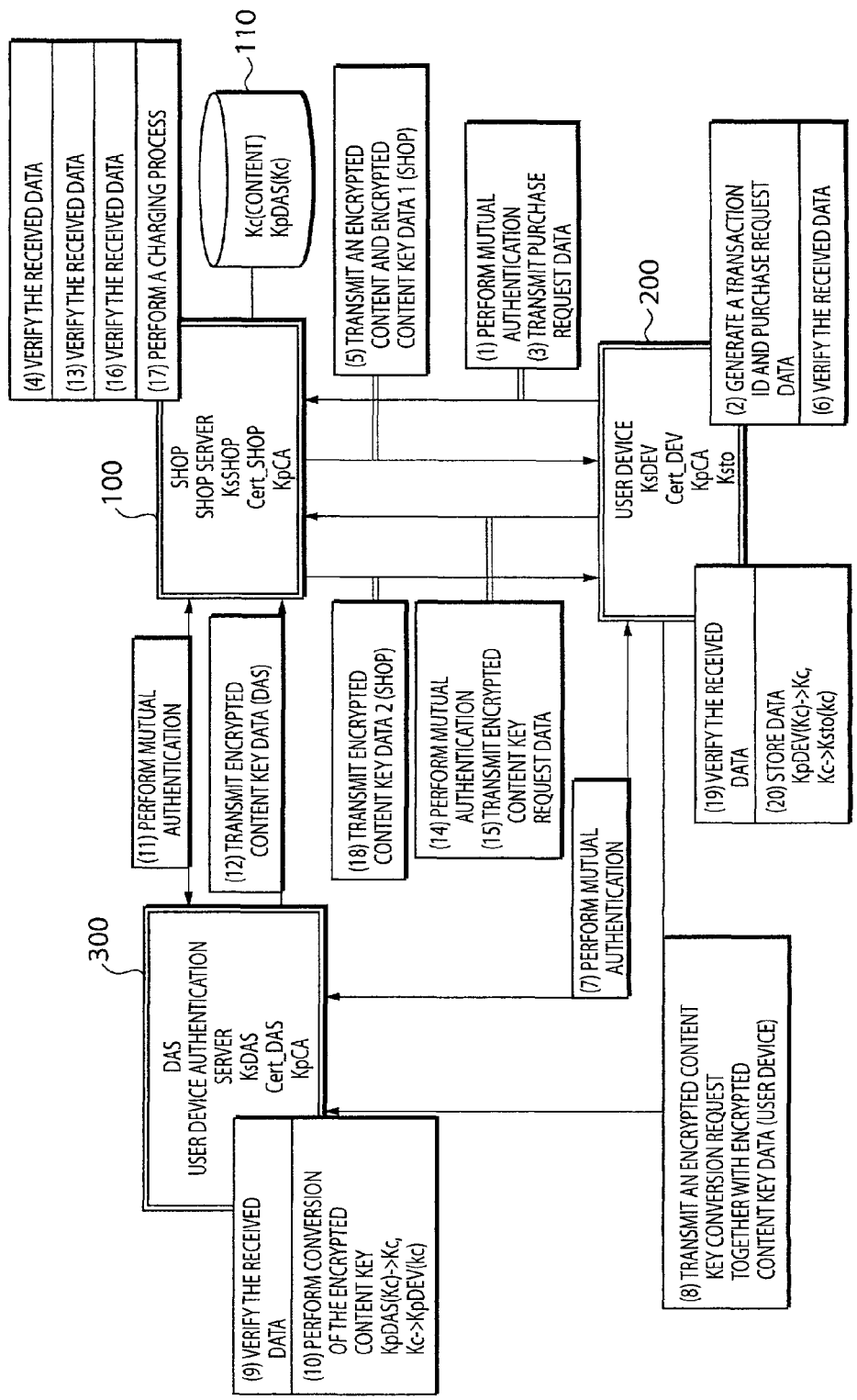
FIG. 1 is a diagram illustrating a content delivery system and a content delivery process according to the present invention.

FIG. 1 is a diagram illustrating a content delivery system and a content delivery method according to an embodiment of the present invention. Herein, the term "system" is used to describe a logical collection of a plurality of devices, and it is not necessarily required that the plurality of devices are disposed in a single location.

In the content delivery system shown in FIG. 1, main parts are a shop server (SHOP) 100 which provides a content to a user device, the user device 200 which receives the content from the shop server 100, and a user device authentication server (DAS) 300 serving as a managing server for properly managing content transactions. Note that although only one shop server 100, one user device 200 and one user device authentication server 300 are shown in FIG. 1, a practical system may include a plurality of those devices. In such a practical system, information is transmitted along various paths depending upon a specific content transaction. That is, FIG. 1 is one illustration of data flows in a content transaction.

Shop Server

Figure 2:
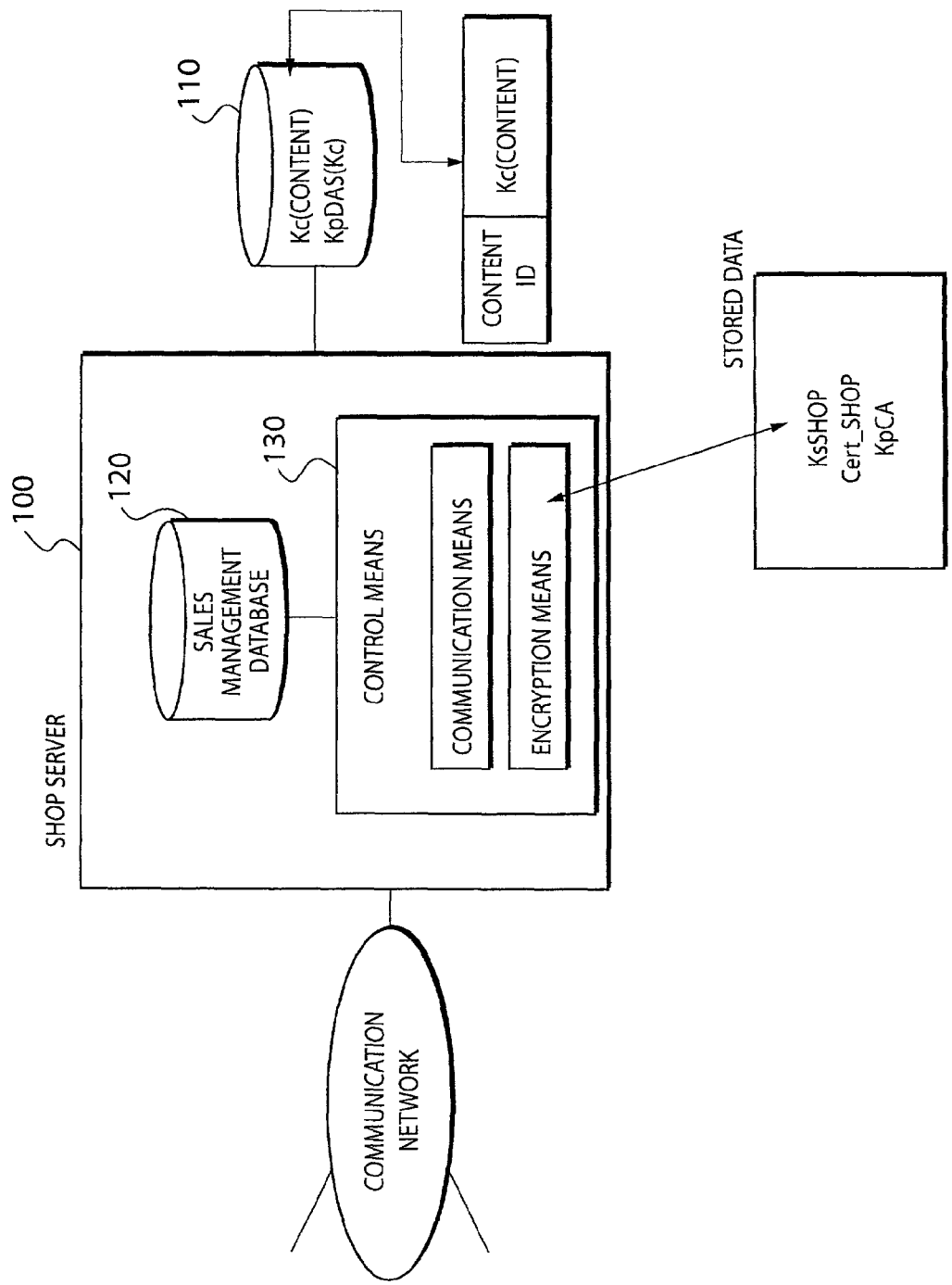
FIG. 2 is a diagram illustrating the construction of a shop server in the content delivery system according to the present invention.

FIG. 2 illustrates the construction of the shop server 100 in the content delivery system shown in FIG. 1. The shop server 100 has a content database 110 in which encrypted content data Kc(Content) are stored. The encrypted content data Kc(Content) is obtained by encrypting a content, to be sold, using a content key and an encryption content key KpDAS (Kc) that is obtained by encrypting the content key Kc using a public key KpDAS of the user device authentication server (DAS). As shown in FIG. 2, each encrypted content data Kc(Content) is assigned a content identifier (ID) so that each encrypted content data Kc(Content) can be identified by the assigned content ID.

The shop server 100 also includes a sales management database 120 for storing content sales management data including, for example, a content ID and an identifier of a user device to that a content indicated by the content ID is sold. The shop server 100 further includes control means 130 for extracting a content, to be provided to a user device, from the content database 110, generating sales data which is to be stored in the sales management database 120 in response to selling a content, communicating with the user device 200 and the user device authentication server 300, and encrypting/decrypting data during the communication process.

FIG. 3 illustrates the data structure of the sales management database 120. The sales management database 120 includes information about a shop processing number, which is a number generated by the shop server to identify a content transaction performed by the shop server, a device ID for identifying a user device that has issued a content-purchasing request, a transaction ID that is generated as an identifier of a content transaction by a user device when the content transaction is performed between the user device and the shop, a content ID identifying the content subjected to the transaction, and status information indicating the status of the shop server concerning the content transaction. The status is updated as the content transaction proceeds, as will be described later.

The control means 130 comprises a computer in which an encryption program and a communication program are stored, as shown in FIG. 2, so that the control means 130 also serves as encryption means and communication means. Key data or the like used in the encryption process by the encryption means of the control means 130 is stored in a secure manner in storage means in the control means. The data such as encryption keys, stored in the shop server 100 for use in the encryption process, include a secret key KsSHOP of the shop server, a public key certificate Cert_SHOP of the shop server, and a public key KpCA of a certificate authority (CA) which issues a public key certificate.

FIG. 4 illustrates an example of the configuration of the control means 130. Referring to FIG. 4, the construction of the control means 130 is described below. A control unit 131 includes a central processing unit (CPU) for executing various processing programs thereby controlling processes performed by various parts of the control means 130 shown in FIG. 4. A ROM (Read Only Memory) 132 stores a program such as an IPL (Initial Program Loader). A RAM (Random Access Memory) 133 includes a memory area for storing programs such as a database managing program, an encryption program, and a communication program, executed by the control unit 131. The RAM also includes a memory area which is used as a work area when the programs are executed.

A display unit 134 includes display means such as a liquid crystal display or a CRT and displays various data, such as user data associated with content to be transmitted, during the execution of the programs under the control of the control unit 131. An input unit 135 includes a keyboard and a pointing device such as a mouse. Various commands and data are input from those input devices to the input unit 135, which in turn transfers the commands and data to the control unit 131. An HDD (Hard Disk Drive) 136 stores various programs such as the database management program, the encryption program, and the communication program and also stores various data.

A driver 137 controls accessing various storage media, for example, a magnetic disk such as a HD (Hard Disk) or a FD (Floppy Disk), an optical disk such as a CD-ROM (Compact Disk ROM), a magnetooptical disk such as a minidisk, or a semiconductor memory such as a ROM or a flash memory. The various storage media such as the magnetic disk is used to store a program or data. A network interface 138 serves as a communication interface for communication (wired or wireless), e.g., a telephone line, to a network such as the Internet.

Using the control means 130 constructed in the above-described manner, the shop server 100 perform various processes such as an encryption process in a content transaction between the shop server 100 and the user device 200, or an authentication process between the shop server 100 and the user device authentication server 300.

User Device Authentication Server

Figure 5:
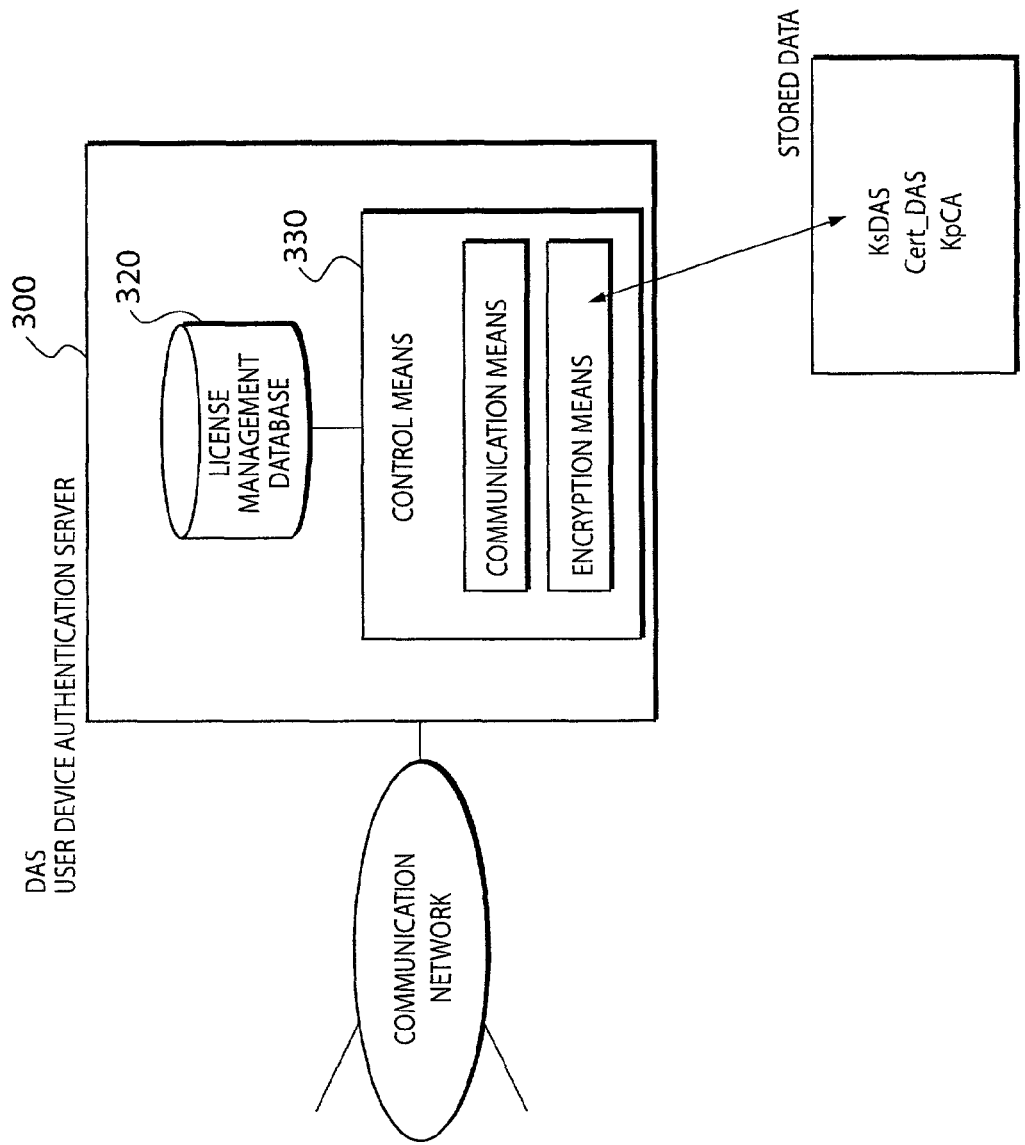
FIG. 5 is a diagram illustrating the construction of a user device authentication server in the content delivery system according to the present invention.

FIG. 5 illustrates the construction of the user device authentication server (DAS) 300. The user device authentication server 300 has a license management database 320. FIG. 6 illustrates the data structure of the license management database 320. The license management database 320 has information about a DAS process number, which is internally generated to identify a process performed by the user device authentication server (DAS) during a content transaction, a device ID for identifying a user device that has issued a content-purchasing request, a transaction ID that is generated as an identifier of a content transaction by the user device when the content transaction is performed, a content ID identifying the content subjected to the transaction, a shop ID identifying a shop server that executes a content transaction, a shop process number issued by a shop to identify a process performed by the shop, and status information indicating the status of the user device authentication server (DAS) concerning the content transaction. The status is updated as the content transaction proceeds, as will be described later.

The user device authentication server (DAS) 300 includes control means 330 for performing communication with the user device 200 or the shop server 100 and for performing encryption/decryption of data in communication. As with the control means of the shop server, the control means 330 also serves as encryption means and communication means. The user device authentication server (DAS) 300 is constructed in a similar manner as described earlier with reference to FIG. 4. Key data or the like used in the encryption process by the encryption means of the control means 330 is stored in a secure manner in storage means in the control means. The data such as encryption keys, stored in the user device authentication server (DAS) 300 for use in the encryption process, include a secret key KsDAS of the user device authentication server (DAS) 300, a public key certificate Cert_DAS of the user device authentication server (DAS) 300, and a public key KpCA of a certificate authority (CA) which issues a public key certificate.

User Device

Figure 7:
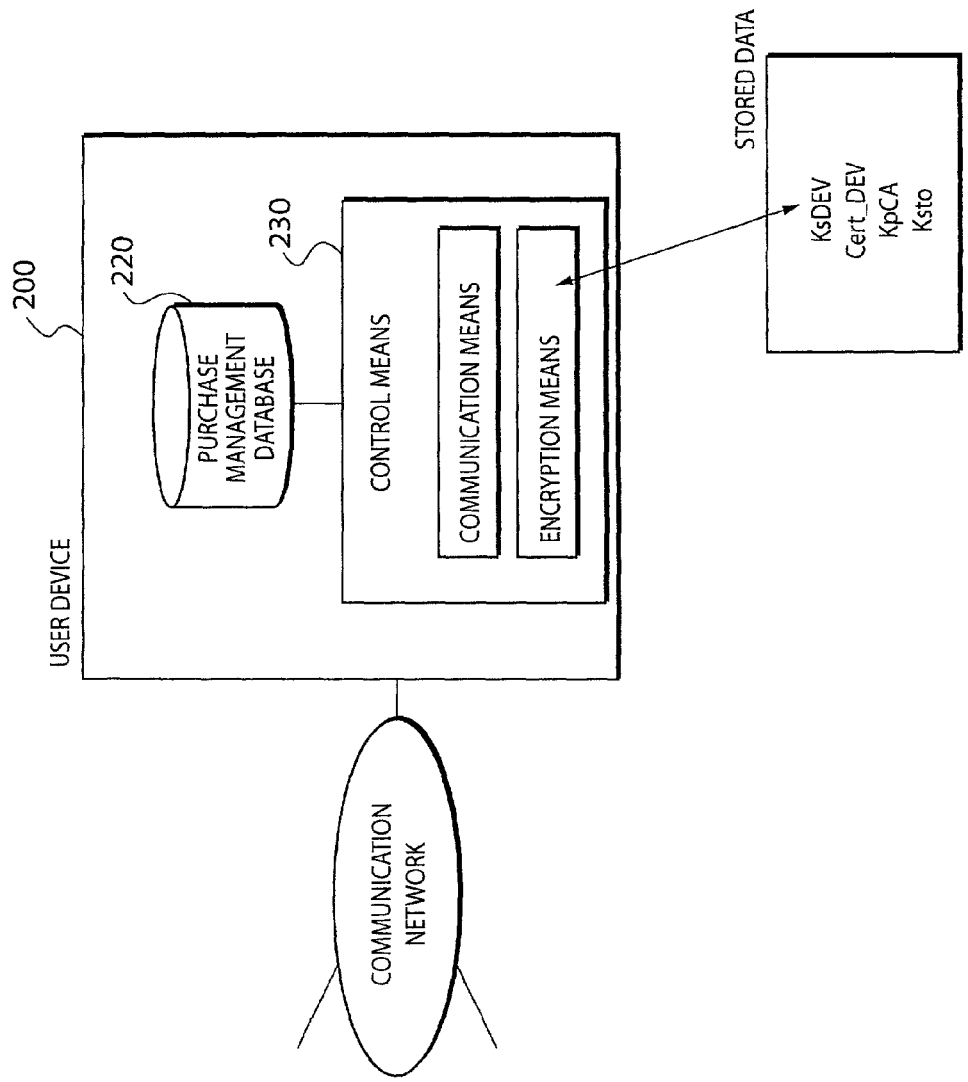
FIG. 7 is a diagram illustrating the construction of a user device in the content delivery system according to the present invention.

FIG. 7 illustrates the construction of the user device 200. The user device 200 purchases content and uses the purchased content. A specific example of the user device is a content reproducing device which reproduces a purchased content. The user device includes a purchase management database 220. FIG. 8 illustrates the data structure of the purchase management database 220. The purchase management database includes a transaction ID that is generated as an identifier of a content transaction by the user device when the content transaction is performed, a content ID identifying the content subjected to the transaction, a shop ID identifying a shop server that executes a content transaction, status information indicating the status of the user device concerning the content transaction, and a device ID identifying the user device. The status is updated as the content transaction proceeds, as will be described later.

The user device 200 includes control means 230 for performing communication with the shop server 100 or the user device authentication server 300 and for performing encryption/decryption of data in communication. As with the control means of the shop server, the control means 230 also serves as encryption means and communication means. The user device 200 is constructed in a similar manner as described earlier with reference to FIG. 4. Key data or the like used in the encryption process by the encryption means of the control means 230 is stored in a secure manner in storage means in the control means. The data such as encryption keys, stored in the user device 200 for use in the encryption process, include a secret key KsDEV of the user device, a public key certificate Cert_DEV of the user device, a public key KpCA of a certificate authority (CA) which issues a public key certificate, and a storage key Ksto used as an encryption key for encrypting a content when the content is stored in storage means such as a hard disk of the user device.

Public Key Certificate

Public key certificates possessed by the shop server (SHOP) 100, the user device (DEVICE) 200, and the user device authentication server (DAS) 300, respectively, are described below with reference to FIG. 9.

The public key certificate refers to a certificate that is issued by a third party called a certificate authority (CA) to indicate that a public key is a valid key possessed by an authorized user, thereby ensuring that data encrypted using the public key can be transmitted in a secure fashion and that mutual authentication between a sender and a receiver can be adequately performed using the public key. FIG. 9 shows a format of a public key certificate comprising a number of fields.

A version number field indicates a version of the certificate format.

A serial number field, stores a serial number assigned by a public key issuer authority (CA) to a public key certificate.

The field "algorithm and parameters used to write the signature" describes a signature algorithm and a parameter used to write a digital algorithm into the public key certificate. Either the elliptic curve cryptography or the RSA can be used as the signature algorithm, wherein in the case where the elliptic curve cryptography is employed, parameters and the key length are described, while the key length is described in the case where the RSA is employed.

In the field "name of the Certificate Authority", the issuer of the public key certificate, that is, the name of the public key certificate authority (CA) is described in the form of a distinguished name.

In the field "validity period of the certificate", a period during which the certificate is valid is described. More specifically, a start date and an expiration date are described in this field.

In the field "name (ID) of a user of the public key certificate", the name of the user to whom the certificate is issued is described. More specifically, for example, the ID of a user device or the ID of a service provider is described.

In the field "public key of the user", information about the key algorithm or the key information itself is described.

The public key certificate further includes a "signature of the certificate authority" field. More specifically, a digital signature is generated using a secret key of the public key certificate authority (CA) and written in this field of the public key certificate. The user of the public key certificate can verify the signature using a public key of the public key certificate authority (CA) to check whether the public key certificate is valid without being tampered with.

A method of generating a digital signature on the basis of the public key cryptography is described below with reference to FIG. 10. In the example shown in FIG. 10, a digital signature is generated in accordance with the standard EC-DSA (Elliptic Curve Digital Signature Algorithm) IEEE P1363/D3. Herein, by way of example, the elliptic curve cryptography (ECC) is employed to encrypt a public key. Note that, in the present invention, the cryptography is not limited to the elliptic curve cryptography (ECC), but another cryptography such as the RSA (Rivest-Shamir-Adleman) cryptography (ANSI X9.31) may also be employed to encrypt public keys.

A digital signal is generated via processing steps shown in FIG. 10 as described below. In step S1, the following parameters are set: a characteristic p; coefficients a and b of an elliptic curve (wherein the elliptic curve is given by $4a^3 + 27b^2 \neq 0 \pmod{p}$); a base point G of the elliptic curve; the order r of G, and a secret key Ks ($0 < Ks < r$). In step S2, a hash value of a message M is calculated such as f=Hash(M).

The hash value is calculated using a hash function as follows. When a message is input to a hash function, the hash function converts the given message into a compressed form having a data length consisting of a predetermined number of bits and outputs the result. The feature of hash functions is that it is difficult to guess the original message (input) from the hash value (output). If one of the bits of data input to a hash function varies, the result is that a large number of bits of the hashed value vary. It is also difficult to identify correct input data from a large number of candidates having the same hash value. Specific examples of hash functions include MD4, MD5, SHA-1, and DES-CBC. When DES-CBC is employed, a final output value MAC (check value ICV) is employed as a hash value.

In the next step S3, a random number u ($0 < u < r$) is generated. In step S4, coordinates V(Xv, Yv) are determined by multiplying the base point by u. Arithmetic operations concerning addition and doubling on an elliptic curve are defined as follows.

When P=(Xa, Ya), Q=(Xb, Yb), R=(Xc, Yc)=P+Q, if P≠Q, addition is performed as follows:

$$Xc = \lambda^2 - Xa - Xb$$

$$Yc = \lambda \times (Xa - Xc) - Ya$$

$$\lambda = (Yb - Ya)/(Xb - Xa)$$

On the other hand if P=Q, doubling is performed as follows:

$$Xc=\lambda^2-2Xa$$

$$Yc=\lambda \times (Xa-Xc)-Ya$$

$$\lambda=(3(Xa)^2+a)/(2Ya)$$

Using the above equations, point G is multiplied by u. (This can be accomplished as follows. G, 2×G, 4×G and so on are first calculated. Then $2^i \times G$ (corresponding to "1"-bits of a binary number obtained by expanding u) is added thereto (where $2^i \times G$ is obtained by doubling G as many times as i, wherein i denotes a bit position counted from the LSB of u). This is a readily understandable calculation method, although the calculation needs a long time.)

In step S5, c=Xv mod r is calculated. In step S6, it is determined whether c=0. If c≠0, the process proceeds to step S7 to calculate d=[(f+cKs)/u] mod r. In step S8, it is determined whether d=0. If d≠0, the process proceeds to step S9 in which c and d are output as digital signal data. For example, if r has a length of 160 bits, the resultant digital signal data has a length of 320 bits.

In the case where it is determined in step S6 that c=0, the process returns to step S3 to generate a new random number. Similarly, if it is determined in step S8 that d=0, the process returns to step S3 to generate a new random number.

Figure 11:
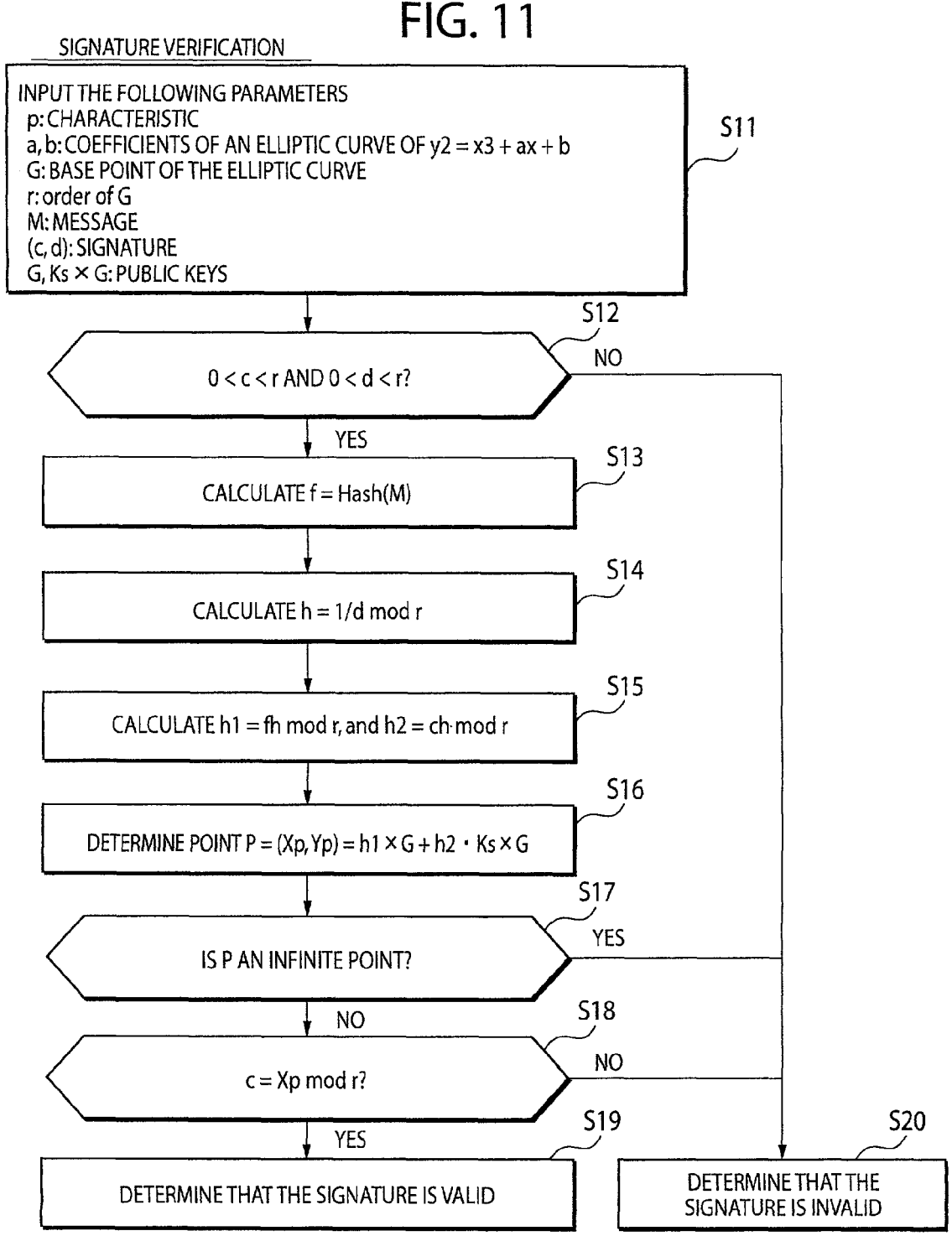
FIG. 11 is a diagram illustrating a signature verification process employable in the content delivery system according to the present invention.

A manner of verifying a digital signature on the basis of public key cryptography is described below with reference to FIG. 11. In step S11, the following parameters are given: a message M; a characteristic p; coefficients a and b of an elliptic curve (wherein the elliptic curve is given by $y^2=x^3+ax+b$); a base point G of the elliptic curve; the order r of G; and public keys G and Ks×G (0<Ks<r). In step S12, it is determined whether the digital signature data c and d satisfy the conditions: 0<r and 0<d<r. If the conditions are satisfied, then the process proceeds to step S13 to calculate the hash value of the message M such as f=Hash(M). Thereafter, in step S14, h=1/d mod r is calculated, and h1=fh mod r and h2=ch mod r are calculated in step S15.

In step S16, point P=(Xp, Yp)=h1×G+h2·Ks×G is calculated using h1 and h2 calculated in the previous step. Because the public keys G and Ks×G are known by one who verifies the digital signature, it is possible to multiply a point on an elliptic curve by a scalar value in a similar manner as in step S4 in FIG. 10. In step 17, point P is an infinite point. If point P is not an infinite point, the process proceeds to step S18. (In practice, determination of whether point P is an infinite point is made in step S16 because if point P is an infinite point, λ, cannot be calculated when the addition of P=(X, Y) and Q=(X, −Y) is calculated, and thus it turns out that P+Q is an infinite point.) In step S18, Xp mod r is calculated and the result is compared with the digital signal data c. If the result is equal to c, then the process proceeds to step S19 in which the digital signal is determined as being valid.

In the case where the digital signature is determined as being valid, it can be concluded that the data has not been tampered with and thus it can be concluded that the digital signature is that generated by one who has the secret key corresponding to the public key.

If it is determined in step S12 that the digital signal data c or d does not satisfy 0<c<r or 0<d<r, the process jumps to step S20. Also in the case where it is determined in step S17 that point P is an infinite point, the process jumps to step S20. When it is determined in step S18 that Xp mod r is not equal to the digital signal data c, the process also jumps to step S20.

In step S20 it is determined that the digital signature is not valid. In this case, it is concluded that the data has been tampered with or the digital signature has been generated by one who does not have the secret key corresponding to the public key.

Thus, if a public key certificate includes a digital signature written in the above-described manner by a certificate authority, a user of the public key certificate can verify the digital signal to check whether the certificate is valid without being tampered with. Referring again to FIG. 9, a public key certificate Cert_DEV of a user device is stored in the user device, wherein the public key certificate Cert_DEV includes, as shown in FIG. 9, a user device ID and a public key KpDEV of the user device. FIG. 9 also shows a public key certificate Cert_SHOP of a shop server stored in the shop server, wherein the public key certificate Cert_SHOP includes a shop ID and a public key KcSHOP of the shop server. Additionally, FIG. 9 shows a public key certificate Cert_DAS of a user device authentication server stored in the user device authentication server, wherein the public key certificate Cert_DAS includes a user device authentication server ID (DASID) and a public key KpDAS of the user device authentication server. As described above, the user device, the shop server, and the user device authentication server have their own public key certificates.

Content Purchasing Process

Referring again to FIG. 1, a process in which a user device purchases a content from a shop server and uses it proceeds in the order of process steps from (1) to (20), as described below. Although in the present embodiment mutual authentication between entities is performed (steps (1), (7), and (11)), the mutual authentication may be skipped depending upon the situation.

(1) Mutual Authentication

When the user device 200 wants to purchase a content from the shop server 100, mutual authentication is first performed between the user device 200 and the shop server 100. In the mutual authentication, it is determined whether the two devices, between which data is to be transmitted, are correct devices. If the mutual authentication is successfully passed, data transmission is started. Preferably, a session key is generated during the mutual authentication, and data is encrypted using the session key as a common key during the following data transmission process.

Figure 12:
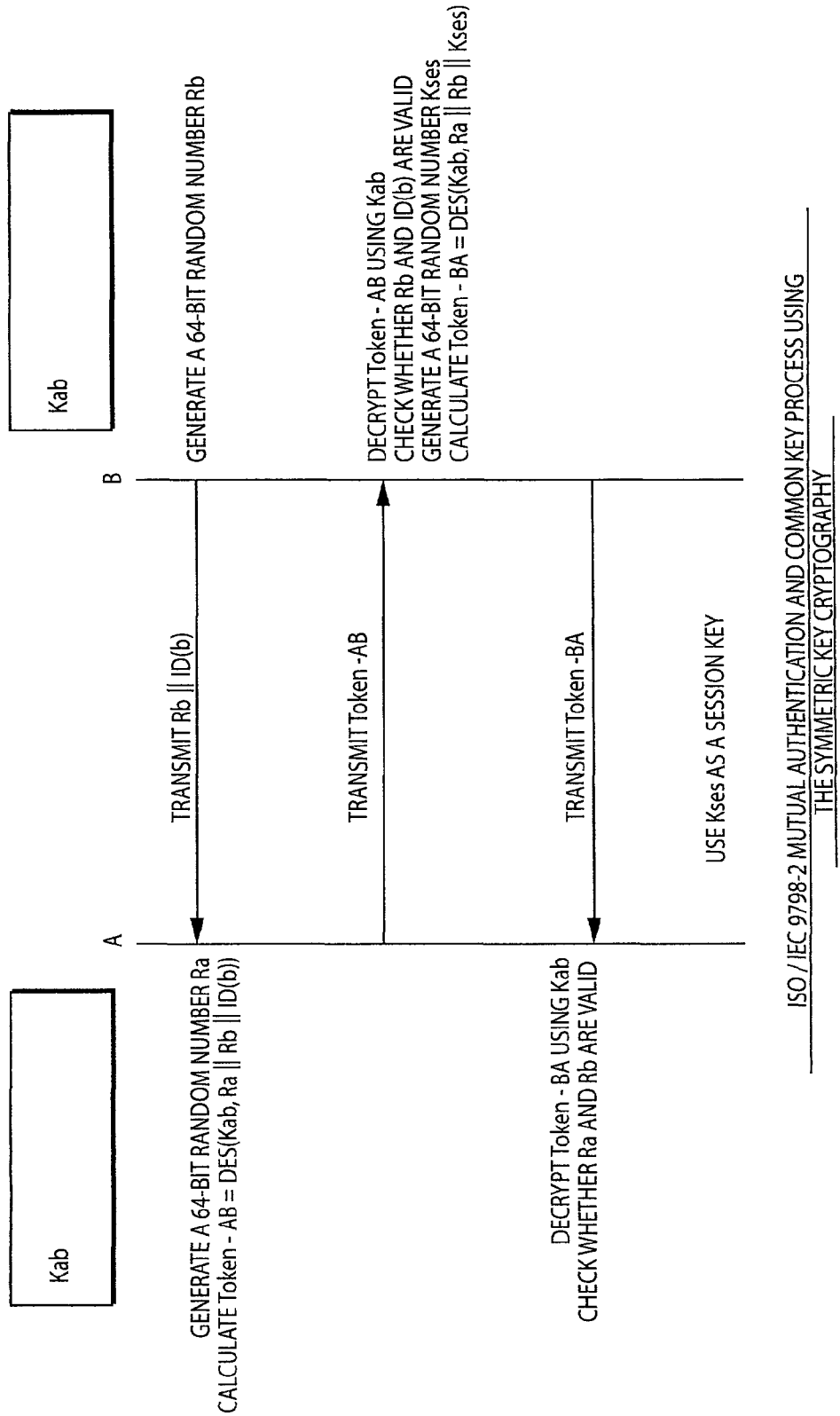
FIG. 12 is a diagram illustrating a mutual authentication process (using symmetric keys) employable in the content delivery system according to the present invention.

A process of mutual authentication based on symmetric key cryptography is described below with reference to FIG. 12. In the process shown in FIG. 12, DES is employed as the symmetric key cryptography, another similar symmetric key cryptography scheme may also be employed.

First, a device B generates a 64-bit random number Rb and transmits Rb, together with an identifier ID(b) of the device B, to a device A. In response to receiving Rb and ID(b), the device A generates a 64-bit random number Ra and encrypts Ra, Rb, and ID(b) in the CBC mode of DES, in the order of Ra, Rb, and ID(b) to provide encrypted data E1, E2, and E3. The resultant encrypted data is returned to the device B.

In response to receiving the encrypted data, the device B decrypts the received data using a key Kab. More specifically, the decryption of the received data is performed as follows. First, the received encrypted data E1 is decrypted using the key Kab to obtain the random value Ra. Thereafter, the received encrypted data E2 is decrypted using the key Kab. Rb is obtained by an exclusive OR calculation between the resultant decrypted data and E1. Finally, the received encrypted data E3 is decrypted using the key Kab, and an exclusive OR between the resultant decrypted data and E2 is calculated to obtain ID(b). Of Ra, Rb, and ID(b) obtained via the above process, Rb and ID(b) are compared with those transmitted from the device B. If they are identical to the original data transmitted from the device B, the device B determines that the device A is an authorized device.

Thereafter, the device B generates a session key Kses which will be used after the authentication (the session key Kses is generated using a random number). Rb, Ra, and Kses are encrypted, in this order, using the key Kab in the CBC mode of DES and transmitted to the device A.

Upon receiving the data, the device A decrypts the received data using the key Kab. The received data can be decrypted in a similar manner to the decryption performed by the device B, and thus it is not described in further detail herein. Thus, Rb, Ra and Kses are obtained, and Rb and Ra are compared with the original data transmitted from the device A. If the verification is successfully passed, the device A determines that the device B is an authorized device. The session key Kses is used to secure the secrecy in communications performed after the mutual authentication has been successfully passed.

In the case where the received data is determined as being invalid in the above-described verification, the mutual authentication fails and the process is terminated.

Figure 13:
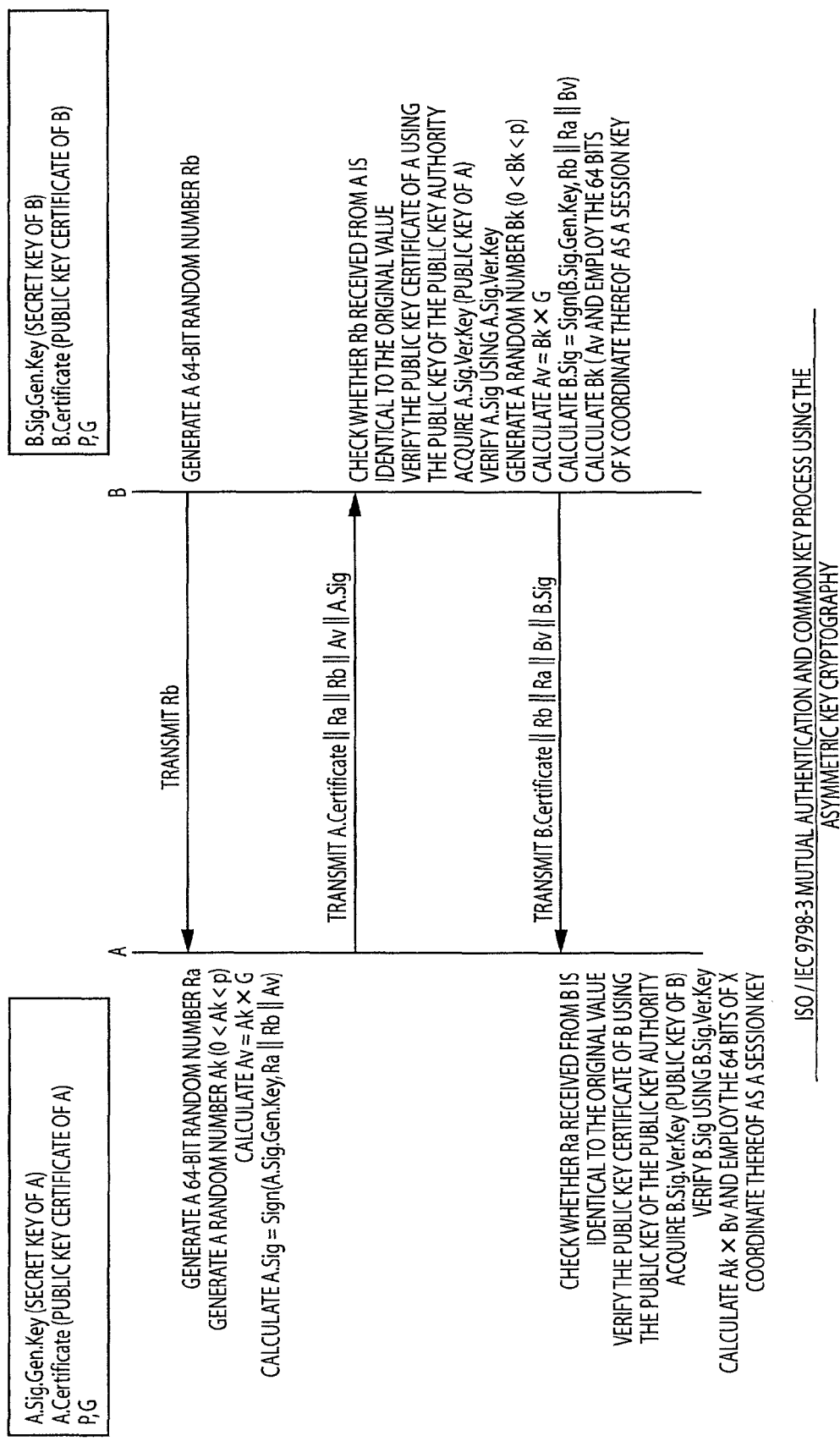
FIG. 13 is a diagram illustrating a mutual authentication process (using asymmetric keys) employable in the content delivery system according to the present invention.

Now, a method of mutual authentication using 160-bit elliptic-curve cryptography, which is one of public key cryptography schemes, is described below with reference to FIG. 13. Although ECC is employed as the public key cryptography scheme in the process shown in FIG. 13, another public key cryptography scheme may also be employed. Furthermore, the key size is not limited to 160 bits. In FIG. 13, first, a device B generates a 64-bit random number Rb and transmits it to a device A. Upon receiving Rb, the device A generates a 64-bit random number Ra and a random number Ak smaller than a characteristic p. Point Av=Ak×G is calculated by multiplying a base point G by Ak. A digital signature A.Sig for Ra, Rb, and Av (X and Y coordinates) is then generated and transmitted together with a public key certificate of the device A to the device B. Herein, Ra and Rb have a length of 64 bits and, the X and Y coordinates of Av have a length of 160 bits, and thus the digital signature is generated for a total length of 448 bits.

When a public key certificate is used, a user verifies a digital signature of the public key certificate using a public key of a public key certificate authority (CA) 410 possessed by the user. If the verification of the digital signature is successfully passed, the public key is extracted from the public key certificate and used. Therefore, it is required that any user of a public key certificate have a common public key of the public key certificate authority (CA). The digital signature can be verified in a similar manner as described above with reference to FIG. 11.

Upon receiving the public key certificate of the device A, RA, Rb, Av, and the digital signature A.Sig, the digital device B verifies whether Rb received from the device A is equal to the original value generated by the device B. If the verification indicates that Rb is equal to the original value, the digital signature written in the public key certificate of the device A is then verified using the public key of the certificate authority, and the public key of the device A is extracted. Thereafter, the digital signature A.Sig is verified using the extracted public key of the device A. If the verification of the digital signature is successfully passed, the device B regards the device A as being an authorized device.

Thereafter, the device B generates a random number Bk smaller than the characteristic p. Thereafter, point Bv=Bk×G is calculated by multiplying the base point G by Bk. A digital signature B.Sig for Rb, Ra, By (X and Y coordinates) is then generated and transmitted together with a public key certificate of the device B to the device A.

Upon receiving the public key certificate of the device B, Rb, Ra, Bv, and the digital signature B.Sig, the digital device A verifies whether Ra received from the device B is equal to the original value generated by the device A. If the verification indicates that Ra is equal to the original value, the digital signature written in the public key certificate of the device B is then verified using the public key of the certificate authority, and the public key of the device B is extracted. Thereafter, the digital signature B.Sig is verified using the extracted public key of the device B. If the verification of the digital signature is successfully passed, the device A regards the device B as being an authorized device.

If the mutual authentication is successfully passed, the device Bk calculates Bk×Av (by multiplying the point Av on the elliptic curve by Bk which is a random number), and the device A calculates Ak×Bv. Lower-order 64 bits of the X coordinates of the resultant points are used as session keys during communication performed thereafter (in the case where 64-bit keys are used as symmetric keys according to the symmetric key cryptography). The session keys may be generated from Y coordinates. Instead of employing lower-order 64 bits, another set of bits may also be employed. In secret communication performed after the mutual authentication, in addition to encryption of data, a digital signature may be added to data.

In the case where the digital signature or the received data is determined as being invalid in the above-described verification, the mutual authentication fails and the process is terminated.

In communications performed after the mutual authentication has been successfully passed, the session key generated during the mutual authentication process is used to decrypt data.

Figure 14:
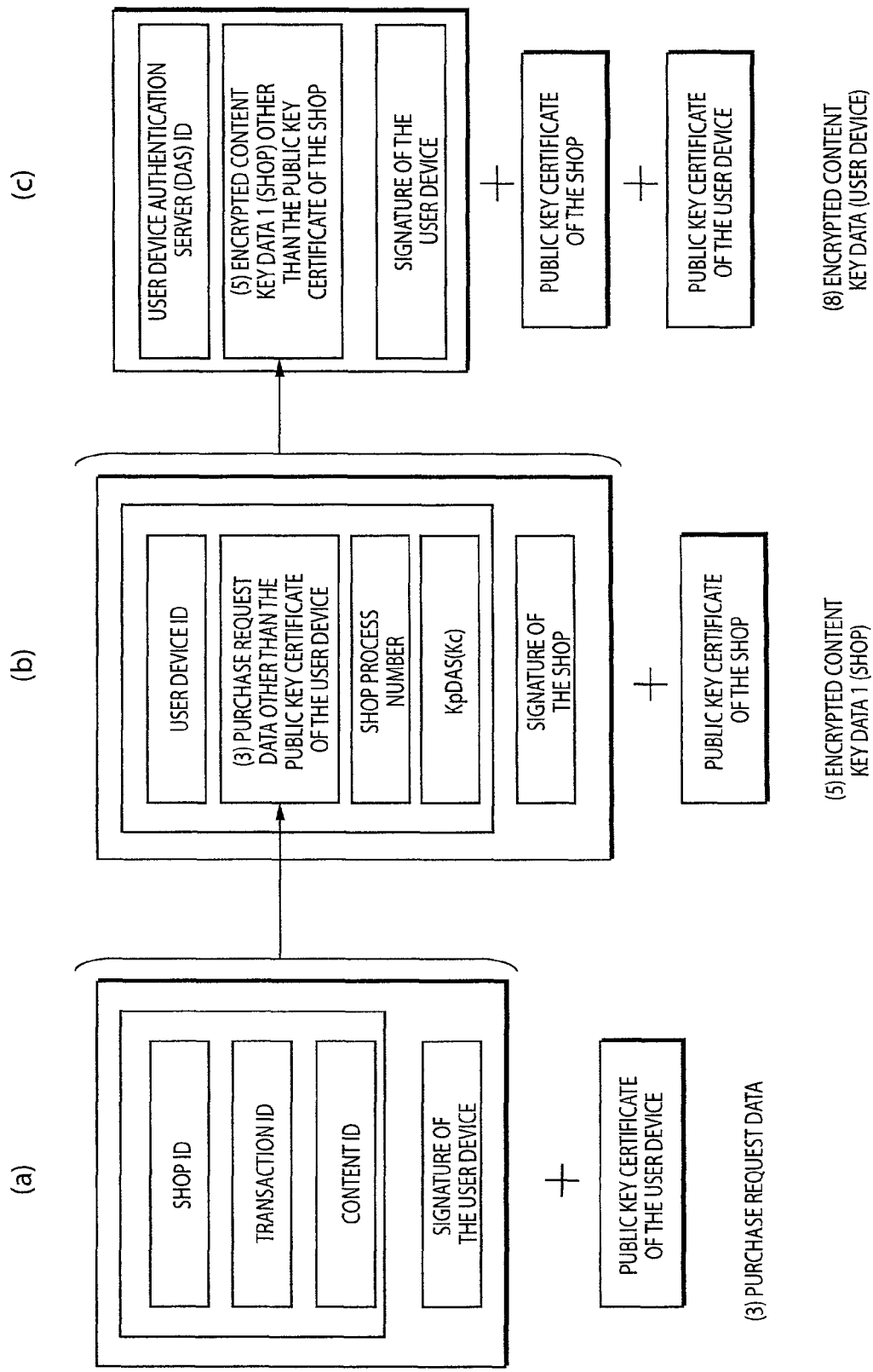
FIG. 14 is a diagram illustrating data structures of data transmitted between entities in the content delivery system according to the present invention.

(2) Generation of Transaction ID and Purchase Request Data, and (3) Transmission of Purchase Request Data If the mutual authentication between the shop server 100 and the user device 200 is successfully passed, the user device 200 generates purchase request data. FIG. 14 illustrates the data structure of the purchase request data. The purchase request data includes a shop ID identifying a shop server 100 to which the content-purchasing request is sent, a transaction ID which is generated as an identifier of a content transaction by the encryption means of the user device 200 on the basis of, for example, a random number, and a content ID indicating the content the user device desires to purchase. Furthermore, a digital signature of the user device for the above data is added to the purchase request data. The purchase request data is transmitted together with the public key certificate of the user device to the shop server 100. Note that, if the public key certificate has been transmitted to the shop during or before the mutual authentication process, it is not required to retransmit the public key certificate.

(4) Verification of Received Data

Figure 15:
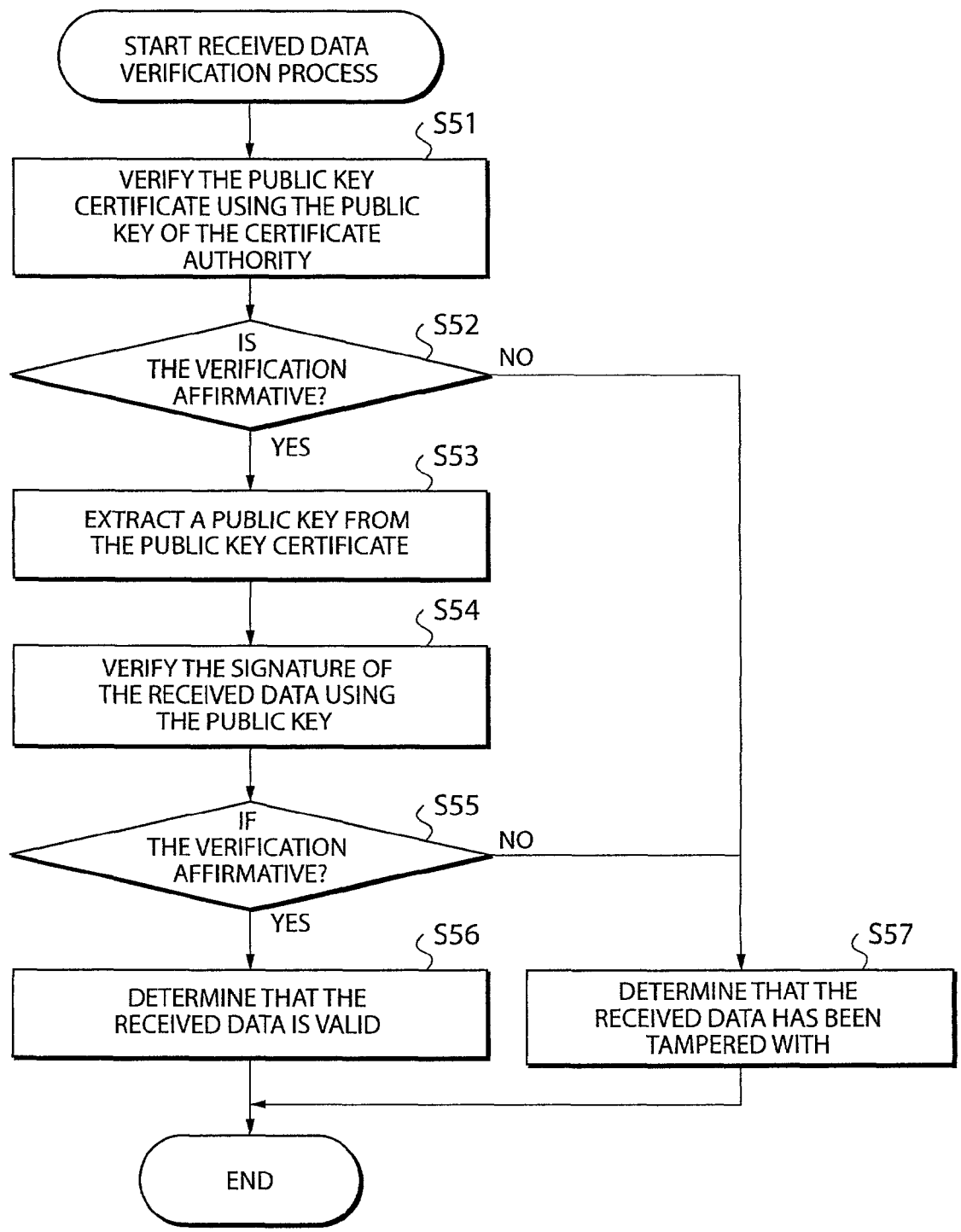
FIG. 15 is a diagram illustrating a signature verification process employable in the content delivery system according to the present invention.

When the shop server 100 receives the purchase request such as that shown in FIG. 14 from the user device 200, the shop server 100 verifies the received data. The verification process is described in detail with reference to FIG. 15. First, the shop server 100 verifies the public key certificate Cert_DEV of the user device, included in the received data (S51). The verification is performed, as described earlier, by verifying the signature of the certificate authority written in the public key certificate, using the public key KpCA of the certificate authority (FIG. 11).

If the verification is successfully passed, that is, if it is determined that the public key certificate is not tampered with (if the answer in step S52 is yes), the process proceeds to step S53. However, if the verification is not passed (if the answer in step S52 is no), it is determined in step S57 that the public key certificate has been tampered with, and the process using the public key certificate is terminated. In step S53, the public key KpDEV of the user device is extracted from the public key certificate. In step S54, the signature of the user device written in the purchase request data is verified on the basis of KpDEV (FIG. 11). If the verification is successfully passed, that is, if it is determined that the purchase request data has not been tampered with (if the answer in step S55 is yes), it is determined in step S56 that the received data is valid purchase request data. However, if the verification is not passed (if the answer in step S55 is no), it is determined in step S57 that the purchase request data has been tampered with, and the process associated with the purchase request data is terminated.

(5) Transmission of Encrypted Content and Encrypted Content Key Data 1 (Shop)

If the verification performed by the shop server 100 indicates that the purchase request data is valid without being tampered with, the shop server 100 transmits, to the user device, the encrypted content and the encrypted content key data 1 (shop) which are stored in the content database 110. That is, the encrypted content Kc(Content) (obtained by encrypting the content using the content key) and the encrypted content key data KpDAS(Kc) (obtained by encrypting the content key Kc using the public key of the user device authentication server (DAS) 300) are transmitted.

FIG. 14 illustrates the data structure of the encrypted content key data 1 (shop). The encrypted content key data 1 (shop) includes a user device ID identifying the user device 200 which has issued the content-purchasing request, purchase request data (the data shown in FIG. 14 other than the public key certificate of the user device), a shop process number generated by the shop server 100 in response to initiating a content transaction, and an encrypted content key data KpDAS(Kc). Furthermore, a digital signature of the shop server 100 for the above data is added to the encrypted content key data 1 (shop). The encrypted content key data 1 (shop) is transmitted together with the public key certificate of the shop server 100 to the user device 200. Note that, if the public key certificate has been transmitted to the user device during or before the mutual authentication process, it is not required to re-transmit the public key certificate.

(6) Verification of Received Data

When the user device 200 receives the encrypted content Kc(Content) and the encrypted content key data 1 (shop) shown in FIG. 14 from the shop server 100, the user device 200 verifies the encrypted content key data 1 (shop). The verification is performed in a similar manner as described above with reference to the processing flow shown in FIG. 15. That is, the user device 200 first verifies the public key certificate of the shop server received from the shop server 100, using the public key KpCA of the certificate authority (CA). Thereafter, the user device 200 verifies the shop signature written in the encrypted content key data 1 (shop) shown in FIG. 14, using the public key KpSHOP of the shop server extracted from the public key certificate.

(7) Mutual Authentication

If the user device 200 has completed the verification of the encrypted content key data 1 (shop), the user device 200 then gets access to the user device authentication server 300. Upon accessing the user device authentication server 300, mutual authentication is performed between the user device and the user device authentication server 300. This mutual authentication is performed in a similar manner to the above-described mutual authentication between the shop server 100 and the user device 200.

(8) Transmission of Encrypted Key Data (User Device) and Encrypted Content Key Conversion Request If the mutual authentication between the user device 200 and the user device authentication server 300 is successfully passed, the user device 200 transmits the encrypted key data (user device) including the encrypted content key KpDAS (Kc) received from the shop server 100 to the user device authentication server 300, and the user device 200 requests the user device authentication server 300 to perform conversion of the encrypted content key.

FIG. 14 illustrates the data structure of the encrypted content key data (user device). The encrypted content key data (user device) includes a user device authentication server (DAS)ID identifying the user device authentication server 300 to which the request for conversion of the encrypted content key is sent, and the encrypted content key data (the data shown in FIG. 14 other than the shop public key certificate) received from the shop server 100. Furthermore, a digital signature of the user device 200 for the above data is added to the encrypted content key data (user device). The encrypted content key data (user device) is transmitted, together with the public key certificate of the shop server 100 and the public key certificate of the user device 200, to the user device authentication server 300. In the case where the user device authentication server 300 already has the certificate of the public key of the user device and the certificate of the public key of the shop server, it is not required to re-transmit these certificates.

(9) Verification of Received Data

When the user device authentication server 300 receives the encrypted content key data (user device) and the encrypted content key conversion request (FIG. 14) from the user device 200, the user device authentication server 300 verifies the encrypted content key conversion request. The verification is performed in a similar manner as described above with reference to the processing flow shown in FIG. 15. That is, the user device 300 first verifies the public key First, the process part A performed between the shop server and the user device (steps (1) to (6) in FIG. 1) is described with reference to FIGS. 23 and 24.

Figure 23:
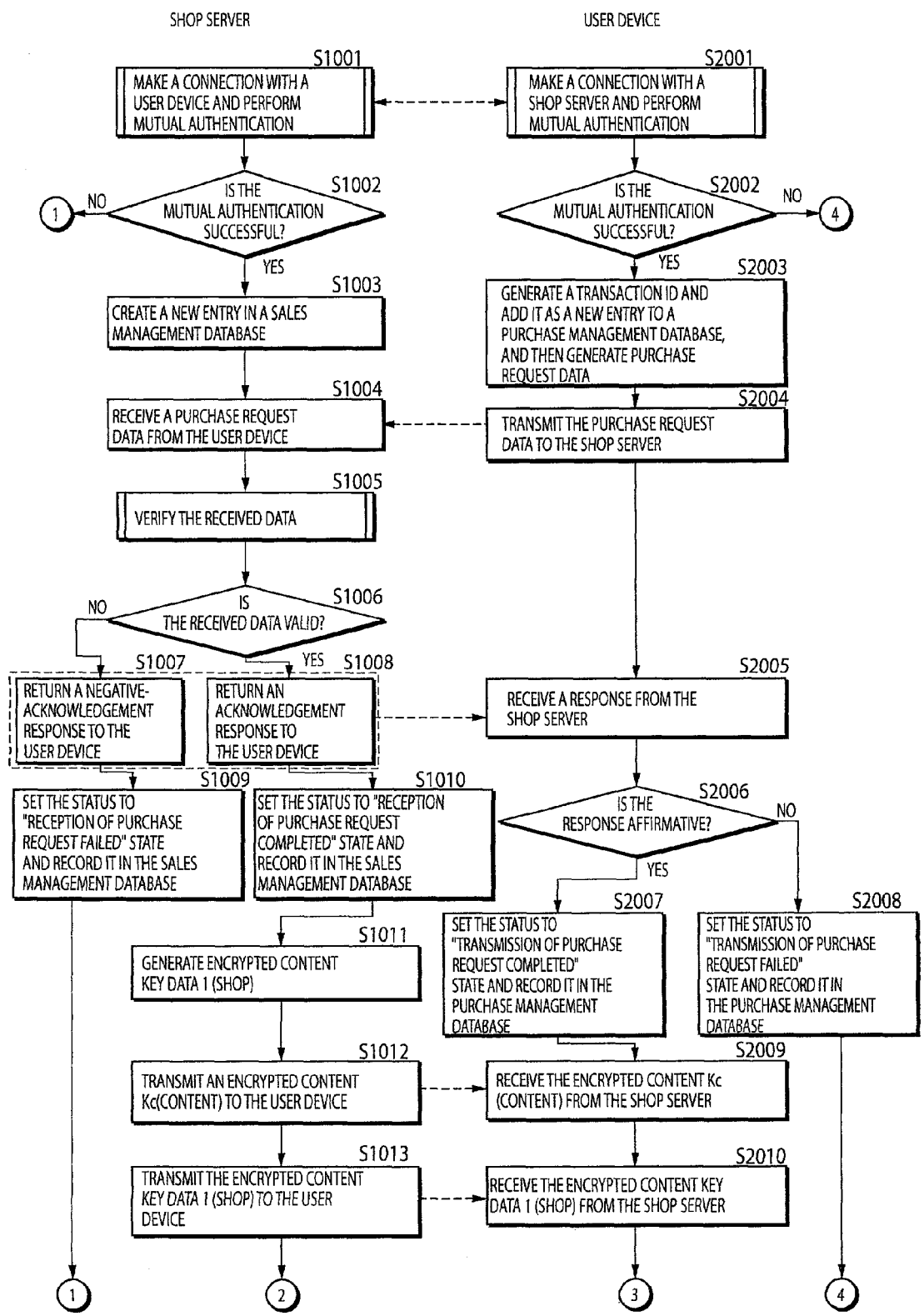
FIG. 23 is a diagram illustrating the process flow (Part 1) between the shop server and the user device in the content delivery system according to the present invention.
Figure 24:
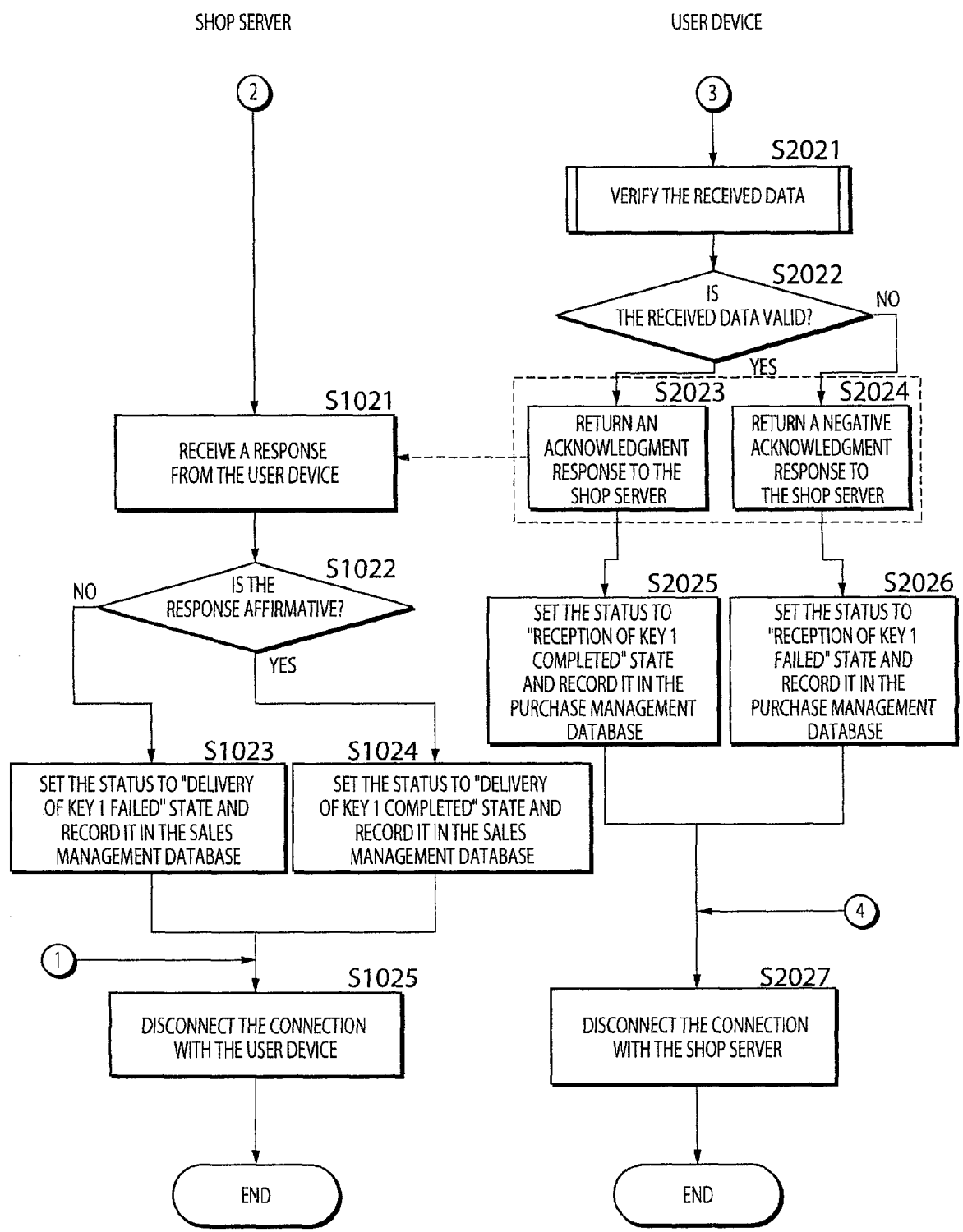
FIG. 24 is a diagram illustrating the process flow (Part 2) between the shop server and the user device in the content delivery system according to the present invention.

In FIGS. 23 and 24, the process performed by the shop server is shown on the left-hand side, and the process performed by the user device is shown on the right-hand side. In the flow charts, steps performed by the shop server are denoted by S10xx, steps performed by the user device are denoted by S20xx, and steps performed by the user device authentication server are denoted by S30xx.

At the beginning of the process, as shown in FIG. 23, mutual authentication is performed between the shop server and the user device (steps S1001 and S2001). The mutual authentication is performed in a similar manner as described above with reference to FIGS. 12 and 13. In the following data transmission, data is transmitted after being encrypted, as required, using a session key generated during the mutual authentication process. If the mutual authentication is successfully passed, the shop server adds a new shop process number as a new process entry to the sales management database (FIG. 3) (step S1003).

Similarly, if the mutual authentication is successfully passed, the user device generates, on the basis of, for example, a random number, a transaction ID applied to the present content transaction, and the user device adds the transaction ID as a new entry to the purchase database (FIG. 8) (step S2003). Thereafter, the user device transmits the purchase request data to the shop server (step S2004). That is, (3) the purchasingrequest data shown in FIG. 14 is transmitted.

If the shop server receives the purchase request data from the user device (step S1004), the shop server verifies the received data (step S1005). The data verification is performed in accordance with the process flow described above with reference to FIG. 11. If the result of the verification of the received data indicates that the data is not tampered with and the data is valid, the shop server transmits to the user device a message indicating that the purchase request data has been successfully received (step S1008), and the shop server sets the status described in the sales management database into a "reception of purchase request completed" state (step S1010). If the result of the verification of the received data indicates that the data has been tampered with and the data is not valid, the shop server transmits to the user device a message indicating that the received data is not valid (step S1007), and the shop server sets the status described in the sales management database so as to indicate that the purchase request has been rejected (step S1009).

Upon receiving the message indicating that the data has been successfully accepted by the shop server (steps S2005 and S2006), the user device sets the status described in the purchase management database so as to indicate that the purchase request has been successfully transmitted. However, in the case where the user device receives from the shop server a message indicating that the purchase request has been rejected (steps S2005 a S2006), the user device sets the status described in the purchase management database so as to indicate that the purchase request has been rejected.

After the shop server has set the status described in the sales management database so as to indicate that the purchasing request has been accepted (step S1010), the shop server generates the encrypted content key data 1 (shop) (FIG. 14) (step S1011) and transmits to the user device the encrypted content Kc(Content) encrypted using the content key Kc (step S1012). Furthermore, the shop server transmits to the user device the encrypted content key data 1 (shop) shown in FIG. 14 (step S1013).

After setting the status described in the purchase management database so as to indicate that the purchase request has been successfully transmitted (step S2007), the user device receives from the shop server the encrypted content Kc(Content) encrypted using the content key Kc (step S2009) and further receives the encrypted content key data 1 (shop) (FIG. 14) (step S2010).

In step S2021, the user device performs verification (FIG. 11) of the data received in steps S2009 and S2010. If the result of the verification of the received data indicates that the data is not tampered with and the data is valid, the user device transmits to the shop server a message indicating that the data has been successfully received (step S2023) and the user device sets the status described in the purchase management database so as to indicate that the key 1 has been successfully received (step S2025). If the result of the verification of the received data indicates that the data has been tampered with and the data is not valid, the user device transmits to the shop server a message indicating that the received data is not valid (step S2024), and the user device sets the status described in the purchase management database so as to indicate that receiving of the key 1 has failed (step S2026). Thereafter, the user device turns off the connection with the shop server (step S2027).

If the shop server receives from the user device the message indicating that the data has been successfully received by the user device (step S1021), the shop server sets the status described in the sales management database so as to indicate that the key 1 has been successfully delivered (step S1024). However, if the message from the user device indicates that the data is not valid, the shop server sets the status described in the sales management database so as to indicate that the delivery of the key 1 has failed (step S1023). Thereafter, the shop server turns of the connection with the user device (step S1025).

In the case where mutual authentication in steps S1002 and S2002 fails, or in the case where the status is set to the "reception of purchase request failed" state in step S1009, or the status is set to the "transmission of purchase request failed" state in step S2008, the process is terminated and the connection for communication is turned off.

Figure 25:
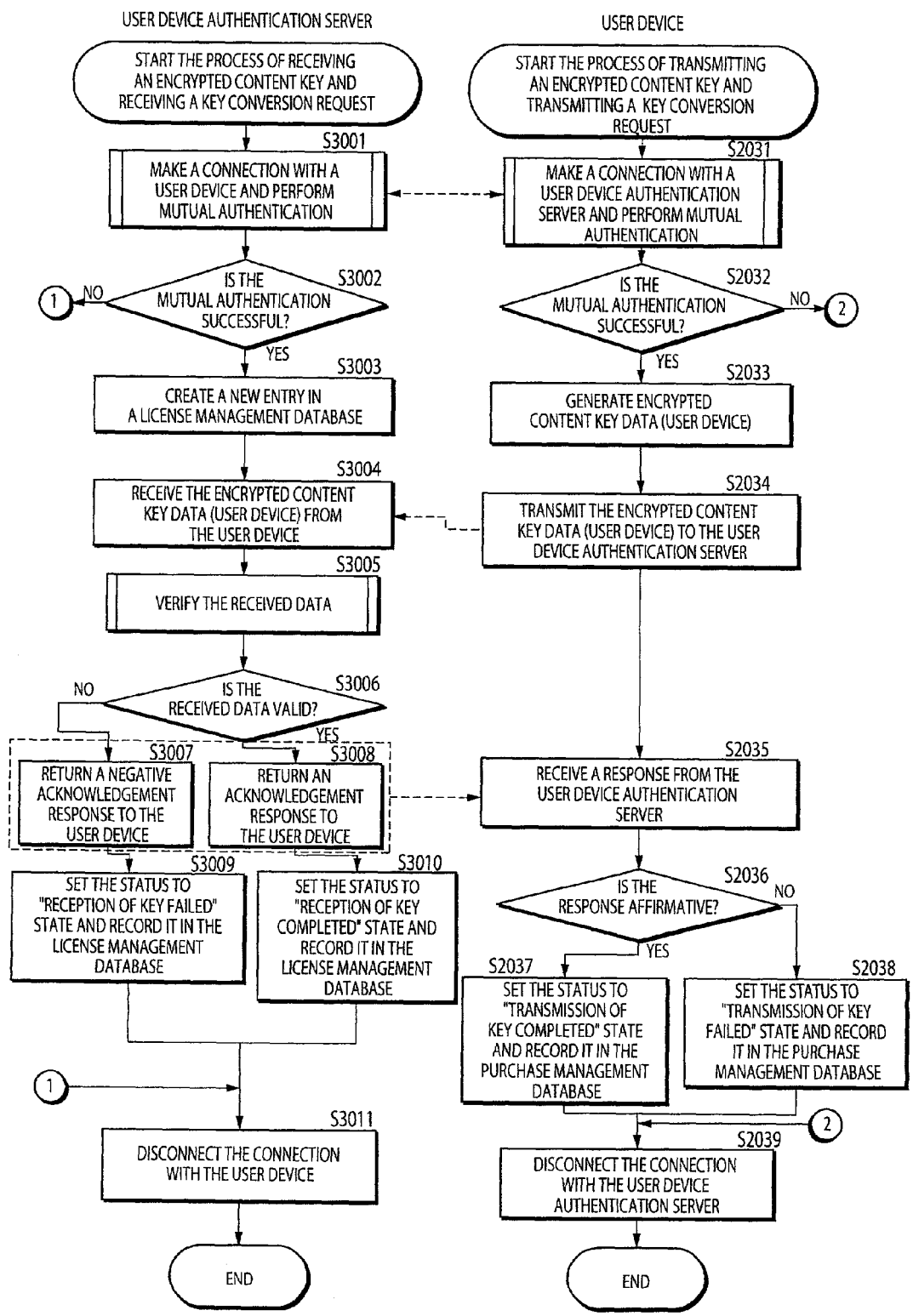
FIG. 25 is a diagram illustrating the process flow between the user device authentication server and the user device in the content delivery system according to the present invention.

Now, the process part B performed between the user device authentication server and the user device (steps (7) to (9) in FIG. 1) is described below with reference to the flow chart shown in FIG. 25.

First, mutual authentication between the user device authentication server and the user device is performed (steps S3001 and S2031). The mutual authentication is performed in a similar manner as described above with reference to FIGS. 12 and 13. In the following data transmission, data is transmitted after being encrypted, as required, using a session key generated during the mutual authentication process. If the mutual authentication is successfully passed, the user device authentication server adds a new DAS process number as a new process entry to the license management database (FIG. 6) (step S3003).

Similarly, if the mutual authentication is successfully passed, the user device generates the encrypted content key data (user device) (FIG. 14C) (step S2033) and transmits it to the user device authentication server (step S2034).

If the user device authentication server receives the encrypted content key data (user device) from the user device (step S3004), the user device authentication server verifies the received data (step S3005). The data verification is performed in accordance with the process flow described above with reference to FIG. 11. If the result of the verification of the received data indicates that the data is not tampered with and the data is valid, the user device authentication server transmits to the user device a message indicating that the encrypted content key data (user device) has been successfully received (step S3008), and the user device authentication server sets the status described in the license management database so as to indicate that the key has been successfully received (step S3010). If the result of the verification of the received data indicates that the data has been tampered with and the data is not valid, the user device authentication server transmits to the user device a message indicating that the received data is not valid (step S3007), and the user device authentication server sets the status described in the license management database so as to indicate that receiving of the key has failed (step S3009). Thereafter, the user device authentication server turns off the connection with the user device (step S3011).

If the user device receives the acknowledgement response from the user device authentication server (steps S2035 and S2036), the user device sets the status described in the sales management database to a "transmission of key completed" state (step S2037). However, in the case where the user device receives the negative acknowledgement response from the user device authentication server (steps S2035 and S2036), the user device sets the status described in the sales management database to a "transmission of key failed" state (step S2038). Thereafter, the connection with the user device authentication server is turned off (step S2039).

In the case where the mutual authentication in steps S3002 and S2032 has failed, the process is terminated and the connection is turned off.

Figure 26:
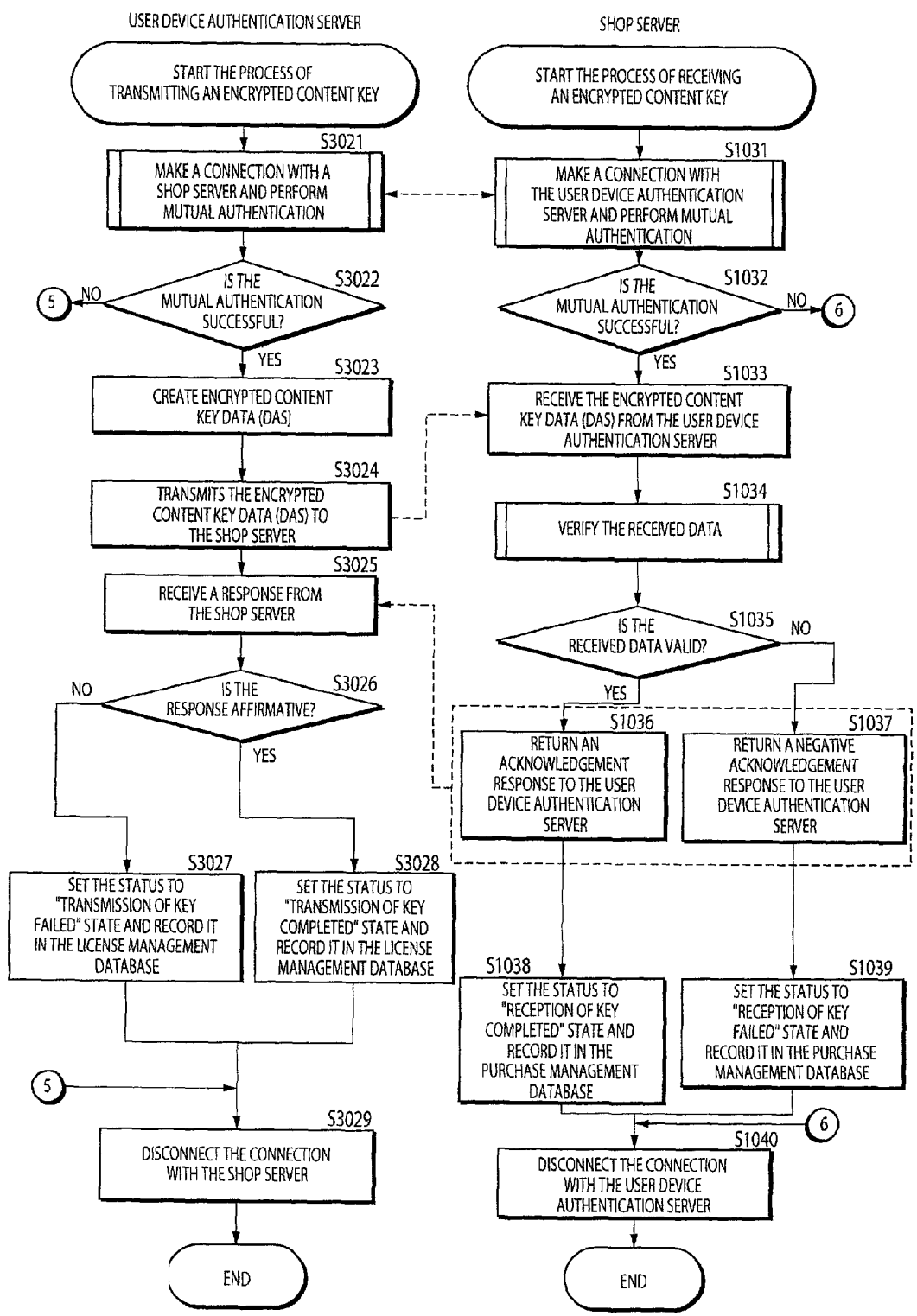
FIG. 26 is a diagram illustrating the process flow between the user device authentication server and the shop server in the content delivery system according to the present invention.

The process part C performed between the user device authentication server and the shop server (steps (11) to (13) in FIG. 1) is described below with reference to the flow chart shown in FIG. 26.

First, mutual authentication between the user device authentication server and the shop server is performed (steps S3021 and S1031). The mutual authentication is performed in a similar manner as described above with reference to FIGS. 12 and 13. In the following data transmission, data is transmitted after being encrypted, as required, using a session key generated during the mutual authentication process. If mutual authentication is successfully passed, the user device authentication server generates the encrypted content key data (DAS) (FIG. 17) (step S3023) and transmits it to the shop server (step S3024).

Similarly, if the mutual authentication is successfully passed, the shop server receives the encrypted content key data (DAS) (FIG. 17) from the user device authentication server (step S1033) and verifies the received data (step S1034). The data verification is performed in accordance with the process flow described above with reference to FIG. 11. If the result of the verification of the received data indicates that the data is not tampered with and the data is valid, the shop server transmits an acknowledgement response to the user device authentication server (step S1036) and sets the status described in the sales management database to a "reception of key completed" state (step S1038). If the result of the verification of the received data indicates that the data has been tampered with and the data is not valid, the shop server transmits a negative acknowledgement response to the user device authentication server (step S1037) and sets the status described in the sales management database to a "reception of key failed" state (step S1039). Thereafter, the connection with the user device authentication server is turned off (step S1040).

If the user device authentication server receives the acknowledgement response from the shop server (steps S3025 and S3026), the user device authentication server sets the status described in the license management database to a "transmission of key completed" state (step S3028). However, in the case where the user device authentication server receives the negative acknowledgement response from the shop server (steps S3025 and S3026), the status described in the license management database is set to a "transmission of key failed" state (step S3027) and the connection with the shop server is turned off (step S3029).

In the case where the mutual authentication in steps S3022 and S1032 fails, the process is terminated and the communication connection is turned off.

Figure 27:
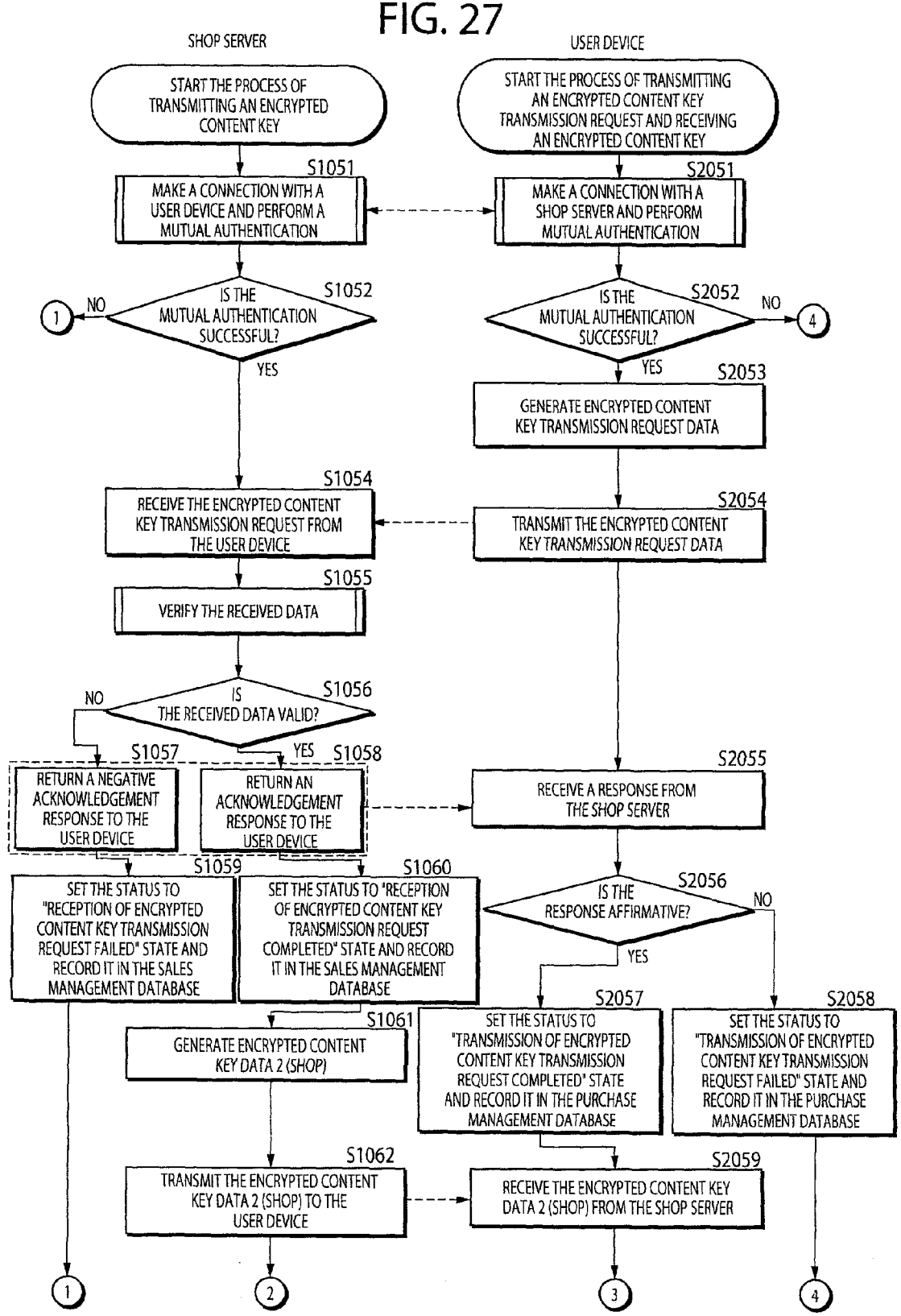
FIG. 27 is a diagram illustrating the process flow (Part 1) between the shop server and the user device in the content delivery system according to the present invention.
Figure 28:
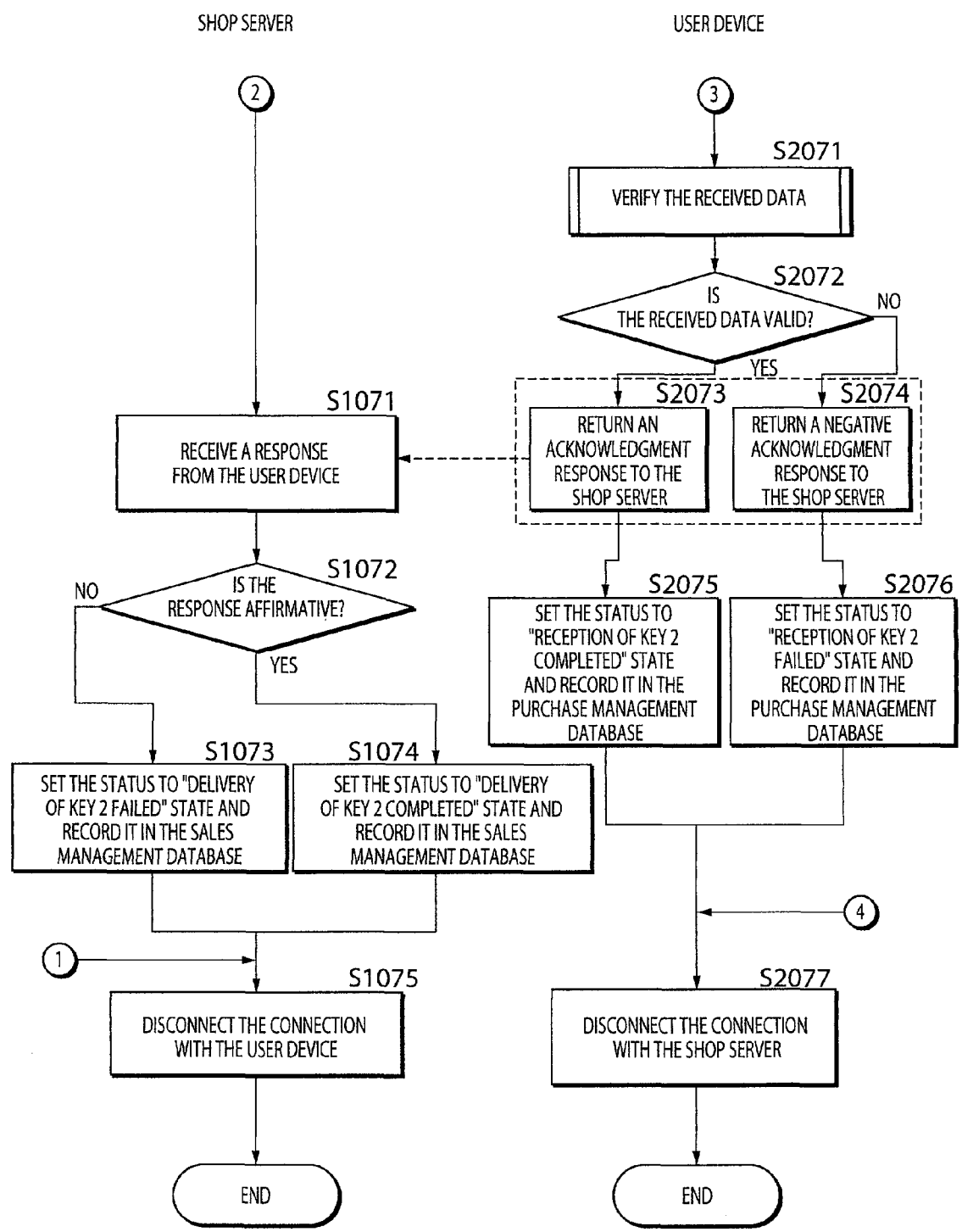
FIG. 28 is a diagram illustrating the process flow (Part 2) between the shop server and the user device in the content delivery system according to the present invention.

Now, the process part D performed between the shop server and the user device (steps (14) to (19) in FIG. 1) is described below with reference to FIGS. 27 and 28.

At the beginning of the process, mutual authentication is performed between the shop server and the user device (steps S1051 and S2051). The mutual authentication is performed in a similar manner as described above with reference to FIGS. 12 and 13. In the following data transmission, data is transmitted after being encrypted, as required, using a session key generated during the mutual authentication process. If mutual authentication is successfully passed, the user device generates the encrypted content key transmission request data (FIG. 17) (step S2053) and transmits it to the shop server (step S2054).

If the shop server receives the encrypted content key transmission request from the user device (step S1054), the shop server verifies the received data (step S1055). The data verification is performed in accordance with the process flow described above with reference to FIG. 11. If the result of the verification of the received data indicates that the data is not tampered with and the data is valid, the shop server transmits to the user device a message indicating that the encrypted content key request data has been successfully received (step S1058), and the shop server sets the status described in the sales management database to a "reception of encrypted content key transmission request completed" state (step S1060). If the result of the verification of the received data indicates that the data has been tampered with and the data is not valid, the shop server transmits to the user device a message indicating that the received data is not valid (step S1057) and sets the status described in the sales management database to a "reception of encrypted content key transmission request failed" state (step S1059).

If the user device receives the acknowledgement response from the shop server (steps S2055 and S2056), the user device sets the status described in the purchase management database to a "transmission of encrypted content key transmission request completed" state (step S2057). However, in the case where the user device receives the negative acknowledgement response from the shop server (steps S2055 and S2056), the user device sets status described in the purchase management database to a "transmission of encrypted content key transmission request failed" state (step S2058).

In the shop server, after setting the status described in the purchase management database to the "reception of encrypted content key transmission request completed" state (step S1060), the shop server generates the encrypted content key data 2 (shop) (FIG. 17) (step S1061) and transmits it to the user device (step 1062).

In the user device, on the other hand, after setting the status described in the purchase management database to the "transmission of encrypted content key transmission request completed" state (step S2057), the user device receives the encrypted content key data 2 (shop) (FIG. 17) from the shop server (step S2059).

In step S2071, the user device performs verification (FIG. 11) of the data received in step S2059. If the result of the verification of the received data indicates that the data is not tampered with and the data is valid, the user device transmits to the shop server a message indicating that the data has been successfully received (step S2073) and the user device sets the status described in the purchase management database so as to indicate that the key 2 has been successfully received (step S2075). If the result of the verification of the received data indicates that the data has been tampered with and the data is not valid, the user device transmits to the shop server a message indicating that the received data is not valid (step S2074), and the user device sets the status described in the purchase management database so as to indicate that receiving of the key 2 has failed (step S2076). Thereafter, the user device turns off the connection with the shop server (step S2077).

If the shop server receives from the user device the message indicating that the data has been successfully received by the user device (step S1071), the shop server sets the status described in the sales management database so as to indicate that the key 2 has been successfully delivered (step S1074). However, if the message from the user device indicates that the data is not valid, the shop server sets the status described in the sales management database so as to indicate that the delivery of the key 2 has failed (step S1073). Thereafter, the shop server turns of the connection with the user device (step S1075).

In the case where the mutual authentication in steps S1052 and S2052 has failed, the process is terminated and the connection is turned off.

Modification of the Basic Content Delivery Model 1

The content purchasing/delivering process based on the basic content delivery model 1 shown in FIG. 1 has been described above. However, the system configuration is not limited to that shown in FIG. 1, but the system may be configured in various manners as long as the content key conversion is performed by the user device authentication server, as described below.

Figure 29:
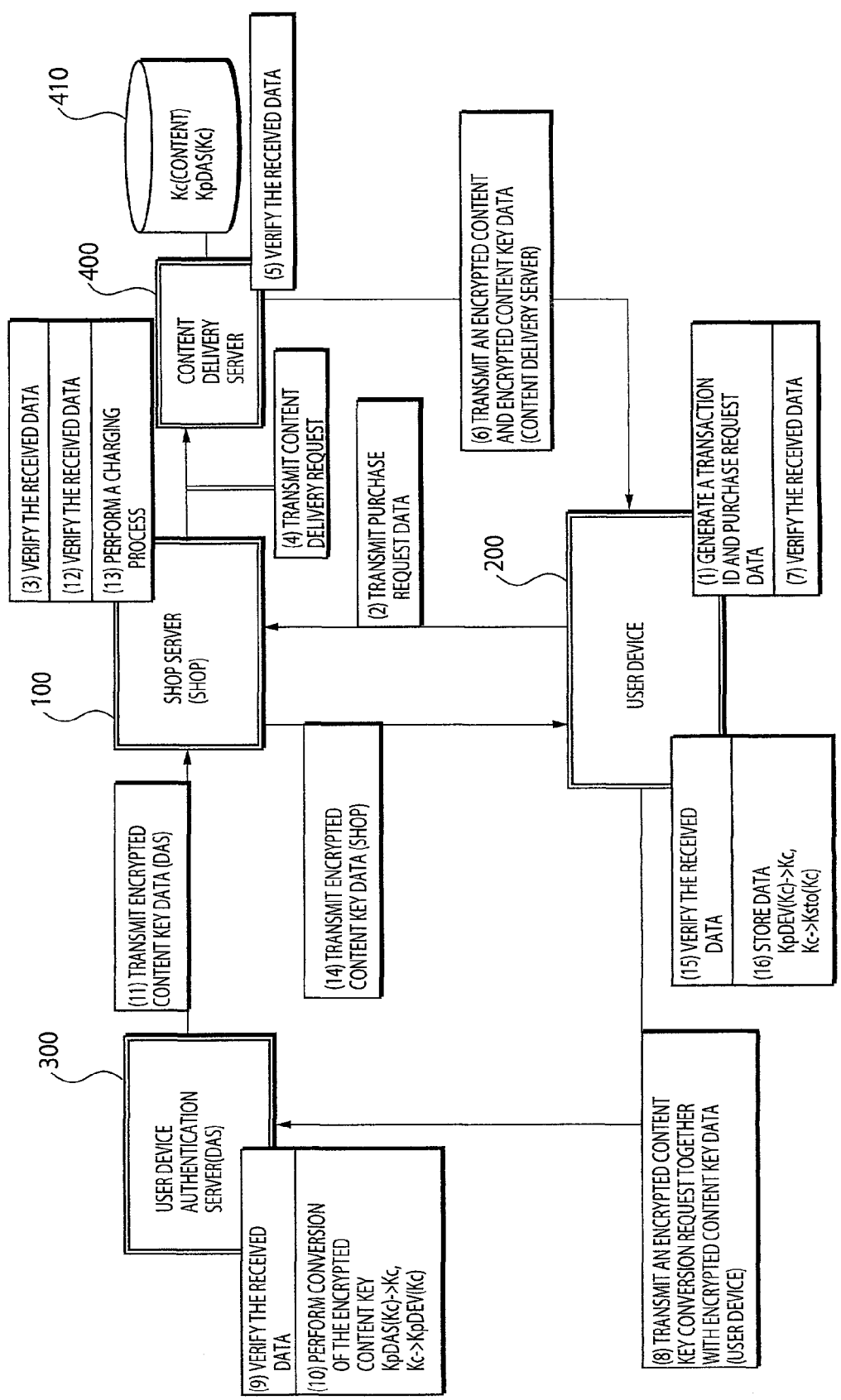
FIG. 29 is a diagram illustrating a content delivery process performed in a modified content delivery system in which a content delivery server is employed according to the present invention.

In an example shown in FIG. 29, the functions of the shop server are separately implemented by a shop server and a content delivery server such that the shop server 100 receives a content-purchasing request from a user device 200 and the content delivery server 400 transmits a content to the user device 200. Although mutual authentication between entities is not performed, mutual authentication may be performed in a similar manner as described above with reference to the basic content distribution model 1.

If the shop server 100 receives purchase request data from the user device 200, the shop server 100 verifies the received data (process step (3) in FIG. 29). If the received data is determined as being valid, the shop server 100 transmits a content delivery request to the content delivery server 400 (process step (4) in FIG. 29). The content delivery server 400 verifies the content delivery request data received from the shop server 100. If the received data is valid, the content delivery server 400 retrieves the encrypted content and the encrypted content key data (content delivery server) from the content database 410 and transmits the retrieved data (process step (6) in FIG. 29). Herein, the encrypted content key data (content delivery server) corresponds to the encrypted content key data 1 (shop) in the embodiment described above, and the encrypted content key data (content delivery server) includes the content key Kc KpDAS(Kc) encrypted using the public key KpDAS of the user device authentication server.

After the user device 200 receives the encrypted content and the encrypted content key data (content delivery server) from the content delivery server 400, the process thereafter is performed in a similar manner to the process performed by the system shown in FIG. 1.

In this modified system, the main functions of the shop server 100 are receiving content request data from the user device, verifying the received request data, receiving a key-converted encrypted content key from the user device authentication server and transferring it to the user device. However, management and delivery of contents are not performed by the shop server 100. Instead, when the shop server receives a content request from a user device, the shop server selects a content delivery server depending upon the requested content from a plurality of content delivery servers such as a music content delivery server or a game content delivery server, and the shop server transfers the content request to the selected content delivery server. In this system, although communication between the user device and the shop server is performed in both directions using the Internet, communication between the content delivery server and the user device is performed only in one direction from the content delivery server and the user device, and thus a satellite communication line may be used to achieve a high transmission speed.

Figure 30:
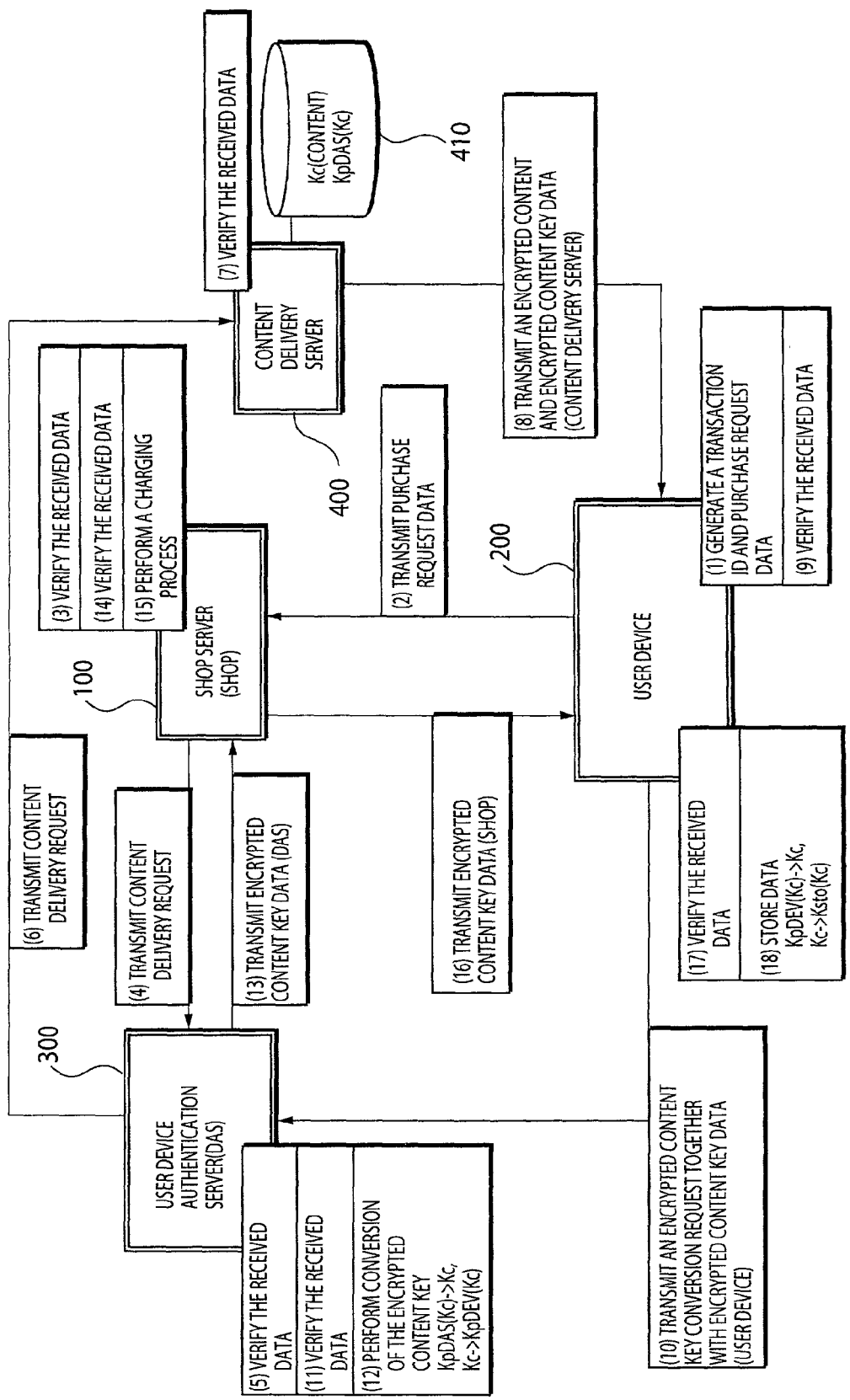
FIG. 30 is a diagram illustrating a content delivery process performed in a modified content delivery system in which a content delivery server is employed according to the present invention.

FIG. 30 illustrates a system configuration in which, as in the system shown in FIG. 29, the functions of the shop server are implemented in a separate fashion by a shop server and a content delivery server such that the shop server 100 receives a content-purchasing request from a user device 200 but content is transmitted from a content delivery server 400 to the user device 200. The difference from the system shown in FIG. 29 is that the shop server 100 does not transmit a content delivery request to the content delivery server 400, but the user device authentication server 300 transmits a content delivery request to the content delivery server 400.

When the shop server 100 receives purchase request data from the user device 200, the shop server 100 verifies the received request data (step (3) in FIG. 30). After the verification of the purchase request data, the shop server 100 transmits a content delivery request to the user device authentication server 300 (step (4) in FIG. 30). Upon receiving the content delivery request, the user device authentication server 300 verifies the received content delivery request (step (5) in FIG. 30). After the verification, the user device authentication server 300 transmits a content delivery request to the content delivery server 400 (step (6) in FIG. 30). The content delivery server 400 verifies the content delivery request received from the user device authentication server 300. If the verification is successfully passed, the content delivery server 400 retrieves an encrypted content and an encrypted content key data (content delivery server) from the content database 410 and transmits them to the user device 200 (step (8) in FIG. 30). Herein, the encrypted content key data (content delivery server) corresponds to the encrypted content key data 1 (shop) in the embodiment described earlier, and it includes a content key Kc encrypted using the public key KpDAS of the user device authentication, that is, it includes KpDAS(Kc).

The process performed after the user device 200 receives the encrypted content and the encrypted content key data (content delivery server) from the content delivery server 400 is similar to that performed in the system shown in FIG. 1 described above.

In this modified system, the user device authentication server 300 can acquire information about the user device 200 when a content-purchasing request is issued to the shop server 100. That is, the user device authentication server 300 can acquire information about the user device 200 before receiving a key conversion request from the user device 200. This allows the user device authentication server 300 to check, at a point of time when the key conversion request is received from the user device 200, whether the key conversion request is issued by the same device as that which has already been registered as the content purchase requesting device.

1.2 Basic Content Delivery Model 2

Figure 31:
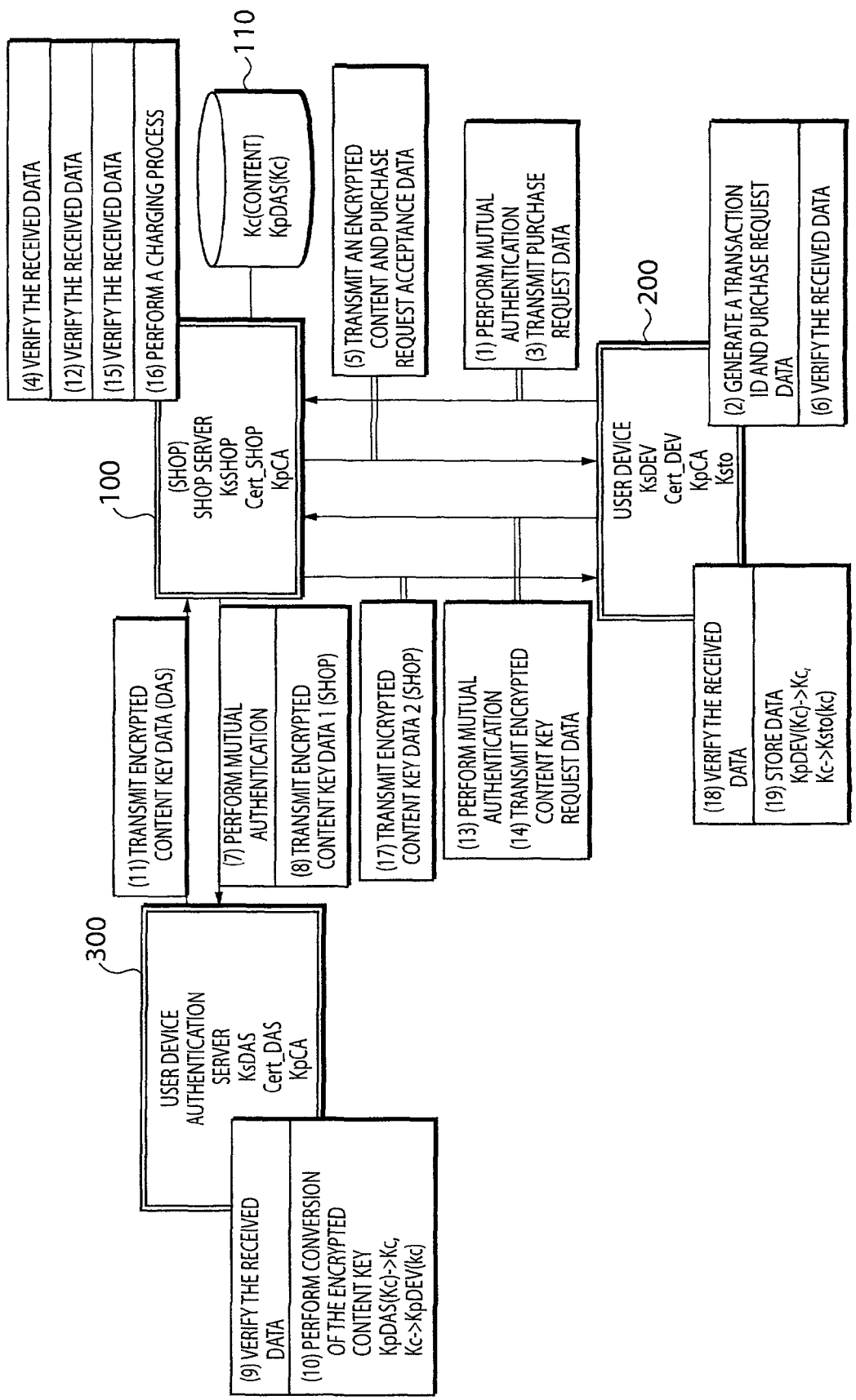
FIG. 31 is a diagram illustrating a content delivery process performed in a modified content delivery system according to the present invention.

Referring to FIG. 31, a basic content delivery model 2 having some differences from the basis content delivery 1 is described below. In this basic content delivery model 2, data transmission between the user device 200 and the user device authentication server 300 is not performed. Of processing steps (1) to (19) shown in FIG. 31, steps different from those in the basic content delivery model 1 are mainly described below. Although in the present embodiment, mutual authentication between entities is performed (steps (1), (7), and (13)), the mutual authentication may be skipped depending upon the situation.

(1) Mutual Authentication

When the user device 200 wants to purchase content from the shop server 100, mutual authentication is first performed between the user device 200 and the shop server 100. The mutual authentication is performed in a similar manner as described above with reference to FIGS. 12 and 13. In the following data transmission, data is transmitted after being encrypted, as required, using a session key generated during the mutual authentication process.

Figure 32:
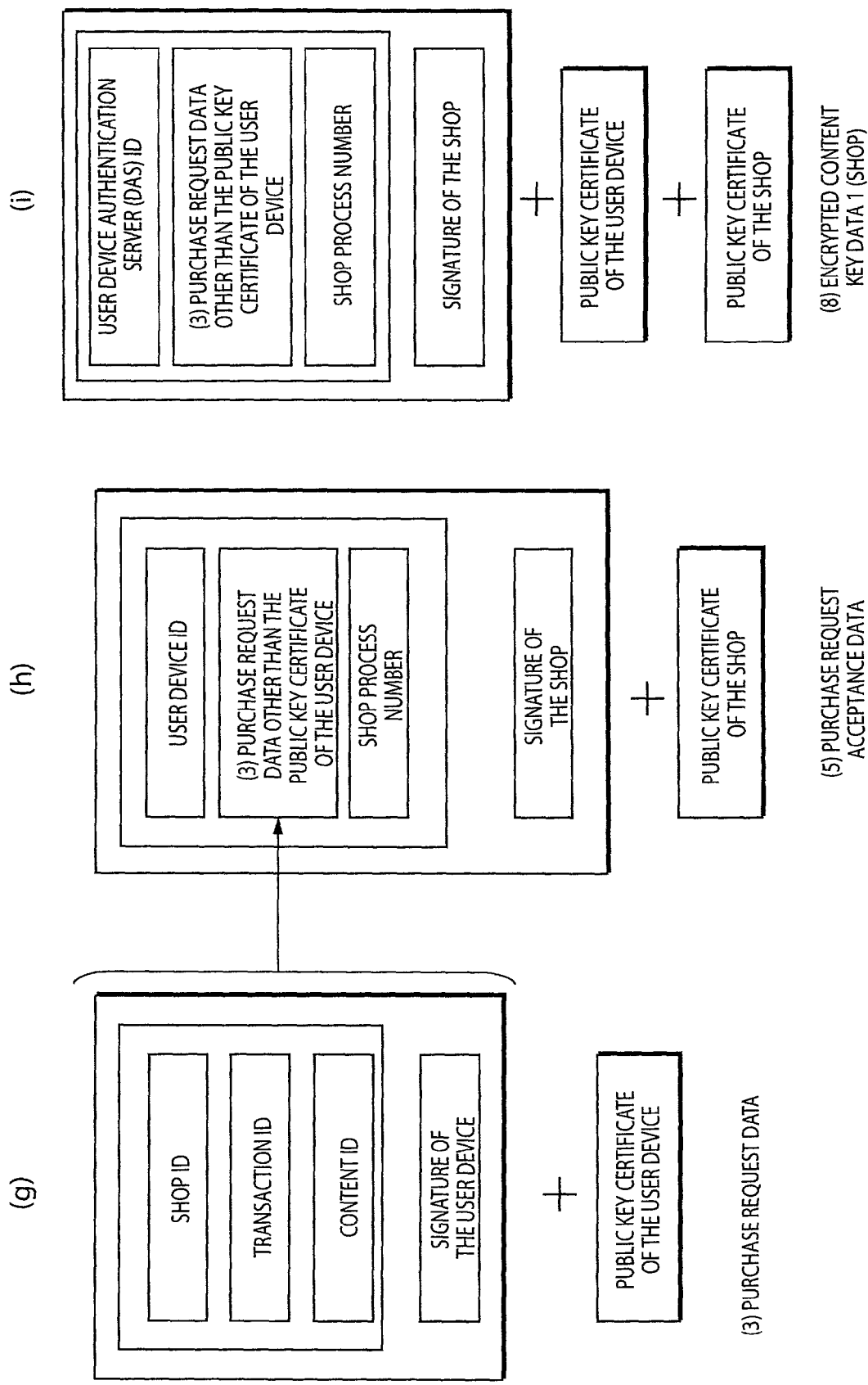
FIG. 32 is a diagram illustrating data structures of data transmitted between entities in the content delivery system according to the present invention.

(2) Generation of Transaction ID and Purchase Request Data, and (3) Transmission of Purchase Request Data If the mutual authentication between the shop server 100 and the user device 200 is successfully passed, the user device 200 generates a purchase request data. FIG. 32 illustrates the data structure of the purchase request data. The purchase request data includes a shop ID identifying a shop server 100 to which the purchase request data is sent, a transaction ID which is generated as an identifier of a content transaction by the encryption means of the user device 200 on the basis of a random number, and a content ID indicating a content the user device desires to purchase. Furthermore, a digital signature of the user device for the above data is added to the purchase request data. The purchase request data is transmitted together with the public key certificate of the user device to the shop server 100. Note that, if the public key certificate has been transmitted to the shop during or before the mutual authentication process, it is not required to re-transmit the public key certificate.

(4) Verification of Received Data

When the shop server 100 receives the purchase request such as that shown in FIG. 32 from the user device 200, the shop server 100 verifies the received data. The verification is performed in a similar manner as described earlier with reference to FIG. 15.

(5) Transmission of Encrypted Content and Purchase Acceptance Data

If the verification performed by the shop server 100 indicates that the purchase request data is valid without being tampered with, the shop server 100 transmits the encrypted content and the purchase acceptance data to the user device. Herein, the data transmitted to the user device includes only the encrypted content data Kc(Content) obtained by encrypting the content using the content key and the purchase acceptance data indicating that the purchase request has been accepted, but the data does not include the encrypted content key data KpDAS(Kc) obtained by encrypting the content key Kc using the public key of the user device authentication server (DAS) 300.

FIG. 32 illustrates the data structure of the purchase request acceptance data. The purchase acceptance data includes a user device ID identifying the user device 200, which has issued the content-purchasing request, purchase request data (the data shown in FIG. 32 other than the public key certificate of the user device), and a shop process number generated by the shop server 100 in response to initiating a content transaction. Furthermore, a digital signature of the shop server 100 for the above data is added to the purchase request acceptance data. The purchase request acceptance data is transmitted together with the public key certificate of the shop server 100 to the user device 200. Note that, if the public key certificate has been transmitted to the user device during or before the mutual authentication process, it is not required to re-transmit the public key certificate.

(6) Verification of Received Data

When the user device 200 receives the encrypted content Kc(Content) and the purchase request acceptance data shown in FIG. 32 1 (shop) from the shop server 100, the user device 200 verifies the purchase request acceptance data. The verification is performed in a similar manner as described above with reference to the processing flow shown in FIG. 15. That is, the user device 200 first verifies the public key certificate of the shop server received from the shop server 100, using the public key KpCA of the certificate authority (CA). Thereafter, the user device 200 verifies the shop signature written in the purchase request acceptance data shown in FIG. 32, using the public key KpSHOP of the shop server extracted from the public key certificate.

(7) Mutual Authentication, and (8) Transmission of Encrypted Content Key Data 1 (Shop)

Thereafter, the shop server 100 gets access to the user device authentication server 300. Upon accessing the user device authentication server 300, mutual authentication is performed between the shop server 100 and the user device authentication server 300. If mutual authentication is successfully passed, the shop server 100 transmits the encrypted content key data 1 (shop) to the user device authentication server 300.

FIG. 32 illustrates the data structure of the encrypted content key data 1 (shop). The encrypted content key data 1 (shop) includes a user device authentication server (DAS) ID identifying the user device authentication server 300 to which the request for conversion of the encrypted content key is sent, the purchase request data received from the user device 200 (data shown in FIG. 32 other than the public key certificate of the user device), and the shop process number. Furthermore, a digital signature of the shop server 100 for the above data is added to the encrypted content key data 1 (shop). The encrypted content key data 1 (shop) is transmitted, together with the public key certificate of the shop server 100 and the public key certificate of the user device 200, to the user device authentication server 300. In the case where the user device authentication server 300 already has the certificate of the public key of the user device and the certificate of the public key of the shop server, it is not required to re-transmit these certificates.

(9) Verification of Received Data

When the user device 300 receives the encrypted content key data 1 (shop) (FIG. 32) from the shop server 100, the user device 300 verifies the encrypted content key data 1 (shop). The verification is performed in a similar manner as described above with reference to the processing flow shown in FIG. 15. That is, the user device authentication server 300 first verifies the public key certificate of the shop server received from the shop server 100, using the public key KpCA of the certificate authority (CA). Thereafter, the user device authentication server 300 verifies the digital signature written in the encrypted content key data 1 (shop) shown in FIG. 32, using the public key KpSHOP of the shop server extracted from the public key certificate. Furthermore, the user device authentication server 300 verifies the public key certificate of the user device, using the public key KpCA of the certificate authority (CA). Thereafter, the user device authentication server 300 verifies the digital signature written, by the user device, in (3) of FIG. 32, using the public key KpDEV of the user device extracted from the public key certificate.

(10) Conversion of Encrypted Content Key

Figure 16:
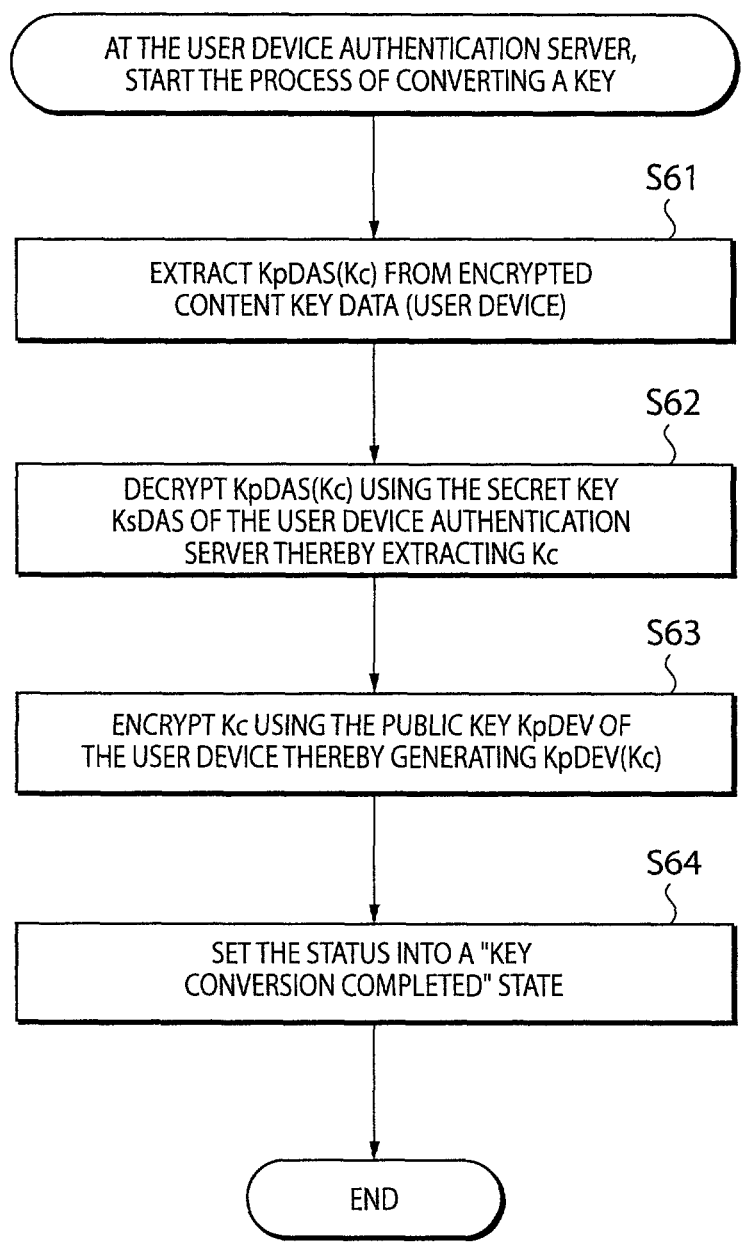
FIG. 16 is a diagram illustrating a key conversion process performed in the content delivery system according to the present invention.

In the verification performed by the user device authentication server 300 concerning the encrypted content key data 1 (shop) received from the shop server 100, if the received data is determined to be valid, the user device authentication server (DAS) 300 decrypts, using the secret key KsDAS of the user device authentication server (DAS) 300, the encrypted content key included in the encrypted content key data (shop), thereby obtaining the content key Kc. Furthermore, the user device authentication server 300 encrypts the obtained content key Kc using the public key KpDEV of the user device thereby generating the encrypted content key KpDEV(Kc). That is, the key is converted such that KpDAS(Kc)→Kc→KpDEV(Kc). This key conversion process is performed in accordance with the process flow described above with reference to FIG. 16.

(11) Transmission of Encrypted Content Data

Thereafter, the user device authentication server 300 transmits the encrypted content key data (DAS) to the shop server 100.

Figure 33:
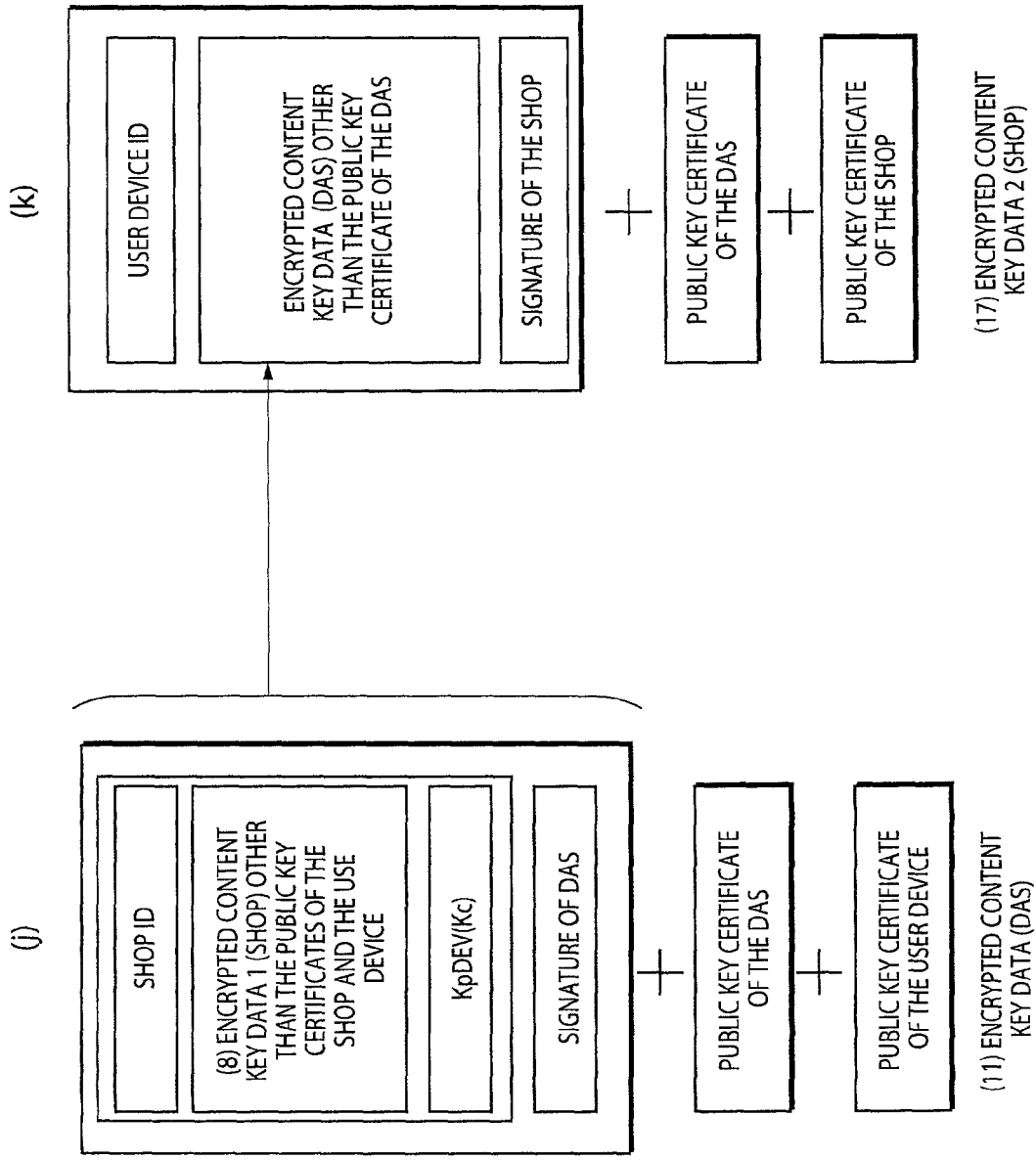
FIG. 33 is a diagram illustrating data structures of data transmitted between entities in the content delivery system according to the present invention.

FIG. 33 illustrates the data structure of the encrypted content key data (DAS). The encrypted content key data (DAS) includes a shop ID identifying a shop server 100 to which the content-purchasing request is sent, the encrypted content key data 1 (shop) (the data shown in FIG. 32 other than the certificate of the public key of the shop and that of the user device), and the encrypted content key data KpDEV(Kc) generated by the user device authentication server 300 via the above-described key conversion process. Furthermore, a digital signature of the user device 300 for the above data is added to the encrypted content key data (DAS). The encrypted content key data (DAS) is transmitted, together with the public key certificate of the user device authentication server 300 and the public key certificate of the user device 200, to the shop server 100. In the case where the shop server already has these certificates, it is not required to re-transmit these certificates.

Figure 34:
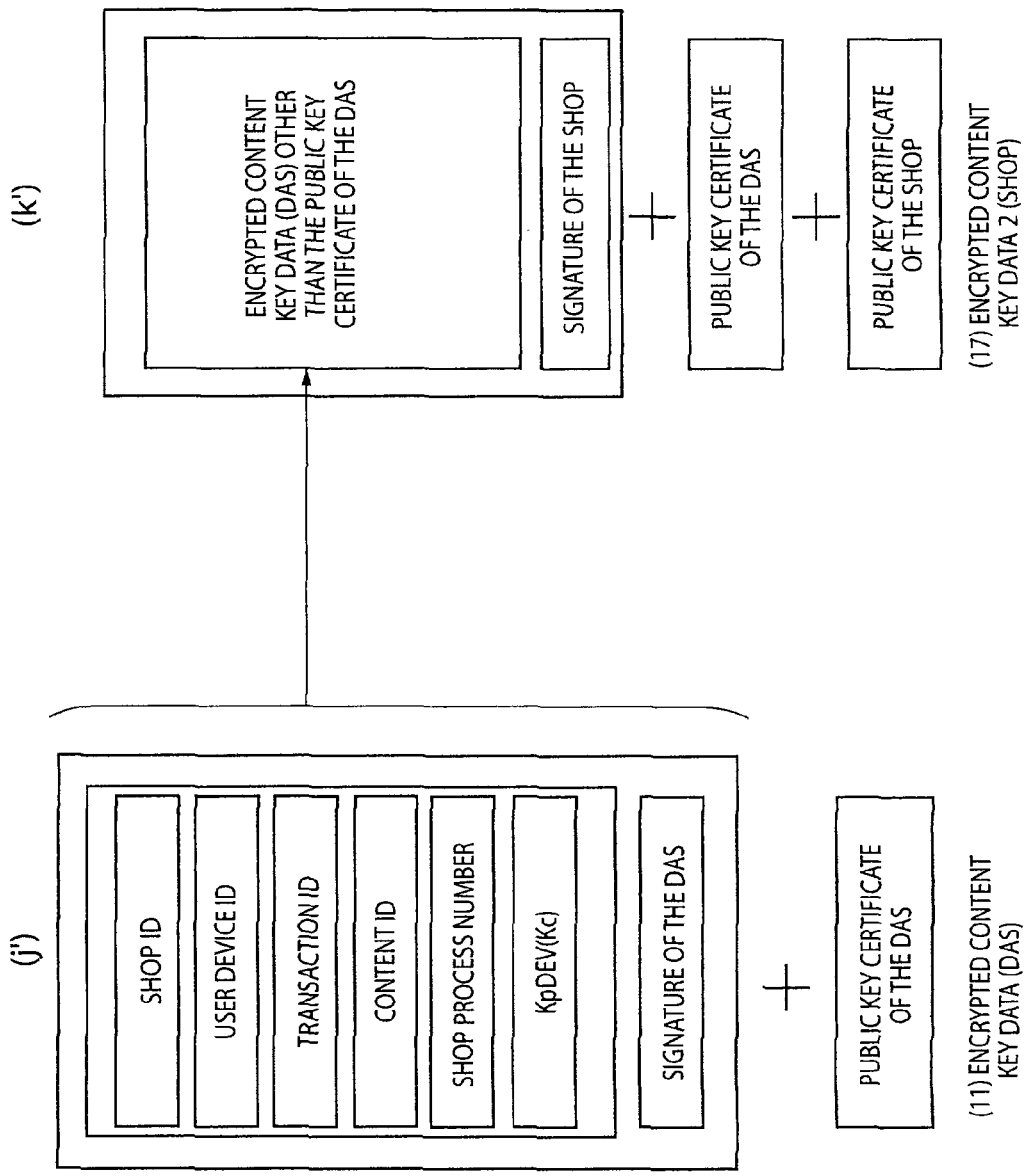
FIG. 34 is a diagram illustrating data structures of data transmitted between entities in the content delivery system according to the present invention.

In the case where the user device authentication server 300 is managed by a highly reliable third party, the encrypted content key data (DAS) may be constructed not in the form shown in FIG. 33, but may be constructed to include, as shown in FIG. 34, the shop ID, the user device ID, the transaction ID, the content ID, the shop process number, the content key KpDEV(Kc) (encrypted using the public key of the user device) plus the digital signature of the user device authentication server 300. In this case, only the public key certificate of the user device authentication server 300 is attached to the encrypted content key data (DAS).

(12) Verification of Received Data

When the shop server 100 receives the encrypted content key data (DAS) (FIG. 33) from the user device authentication server 300, the shop server 100 verifies the encrypted content key data (DAS). The verification is performed in a similar manner as described above with reference to the processing flow shown in FIG. 15. That is, the shop server 100 first verifies the public key certificate of the user device authentication server received from the user device authentication server 300, using the public key KpCA of the certificate authority (CA). Thereafter, the shop server 100 verifies the digital signature written in the encrypted content key data (DAS) shown in FIG. 33, using the public key KpDAS of the user device authentication server 300. In the case where the shop server 100 receives encrypted content key data (DAS) in the simplified form described above with reference to FIG. 34, verification is performed in a similar manner. Furthermore, as required, the encrypted content key 1 (shop) included in the encrypted content data (DAS) shown in FIG. 33 may be verified.

(13) Mutual Authentication, and (14) Transmission of Encrypted Content Key Request Thereafter, the user device 200 transmits the encrypted content key request data to the shop server. In the case where the encrypted content key request data is transmitted in a session different from a session in which a previous request has been transmitted, mutual authentication is again performed, and the encrypted content key request data is transmitted from the user device 200 to the shop server 100 only if the mutual authentication is successfully passed.

(15) Verification, and

(16) Charging Process

When the shop server 100 receives the encrypted content key request data from the user device, the shop server 100 verifies the encrypted content key request data. This verification process is performed in a similar manner as described above with reference to FIG. 15. After completion of the data verification, the shop server 100 performs a charging process associated with the content transaction. This charging process is performed to receive the fee for the content from an account of an user. The received fee for the content is distributed among a copyright holder of the content, the shop, an owner of the user device authentication server, or the like.

As in the basic model 1 described above, to perform the charging process, it is required that the encrypted content key conversion by the user device authentication server 300 already have been performed, and thus the charging process cannot be performed only through a process between the shop server 100 and the user device. The user device 200 cannot decrypt the encrypted content key and thus the user device 200 cannot use the content unless the key conversion has been performed. The history of all content transactions in which the key conversion was performed by the user device authentication server is recorded in the license management database described earlier with reference to FIG. 6, and thus any content transaction which needs a charging process can be monitored and managed. This prevents any shop from performing by itself a content sales transaction and thus from selling a content in an unauthorized manner.

(17) Transmission of Encrypted Content Key Data 2 (Shop)

After completion of the charging process, the shop server 100 transmits the encrypted content key data 2 (shop) to the user device 200.

FIG. 33 illustrates the data structure of the encrypted content key data 2 (shop). The encrypted content key data 2 (shop) includes a user device ID identifying the user device 200 which has issued the encrypted content key request, and the encrypted content key data (DAS) (the data shown in FIG. 33 other than the public key certificate of the user device authentication server) received from the user device authentication server 300. Furthermore, a digital signature of the shop server 100 for the above data is added to the encrypted content key data 2 (shop). The encrypted content key data 2 (shop) is transmitted, together with the public key certificate of the shop server 100 and the public key certificate of the user device authentication server 300, to the user device 200. In the case where the user device 200 already has the certificate of public key of the user device authentication server and the certificate of the public key of the shop server, it is not required to re-transmit these certificates.

In the case where the user device authentication server 300 is managed by a highly reliable third party, and the shop server 100 receives from the user device authentication server 300 the encrypted content key data (DAS) in the simplified form described above with reference to FIG. 34, the shop server 100 transmits the encrypted content key data 2 (shop) in the form shown in FIG. 34 to the user device. That is, the encrypted content key data (DAS) in the simplified form shown in FIG. 34 including the signature of the shop server is transmitted, together with the public key certificate of the shop server 100 and the public key certificate of the user device authentication server 300, to the user device 200.

(18) Verification of Received Data

When the user device 200 receives the encrypted content key data 2 (shop) from the shop, server 100, the user device 200 verifies the encrypted content key data 2 (shop). The verification is performed in a similar manner as described above with reference to the processing flow shown in FIG. 15. That is, the user device 200 first verifies the public key certificate of the shop server received from the shop server 100, using the public key KpCA of the certificate authority (CA).

Thereafter, the user device 200 verifies the digital signature written in the encrypted content key data 2 (shop) shown in FIG. 33K, using the public key KpSHOP of the shop server 100 extracted from the public key certificate. Furthermore, the user device 200 verifies the public key certificate of the user device authentication server 300, using the public key KpCA of the certificate authority (CA). Thereafter, the user device 200 verifies the digital signature written in (11) of FIG. 33 using the public key KpDAS of the user device authentication server 300 extracted from the public key certificate. Furthermore, as required, the encrypted content key 1 (shop) included in the encrypted content data (DAS) shown in FIG. 33 may be verified.

(19) Storage of Data

After the user device 200 has verified the encrypted content key data 2 (shop) received from the shop server 100, the user device 200 decrypts, using the secret key KsDEV of the user device 200, the encrypted content key KpDEV(Kc) which has been encrypted using the public key KpDEV of the user device 200 and included in the encrypted content key data 2 (shop), and then the user device 200 encrypts the content key using the storage key Ksto of the user device thereby generating an encrypted content key Ksto(Kc). The resultant encrypted content key Ksto(Kc) is stored in the storage means of the user device 200. When the content is used, the encrypted content key Ksto(Kc) is decrypted using the storage key Ksto thereby obtaining the content key Kc, and the encrypted content Kc(Content) is decrypted thereby reproducing the content.

In the basic distribution model 2, as described above, data transmission is not performed between the user device 200 and the user device authentication server 300, and the user device 200 performs data transmission only with the shop server 100. This results in a reduction in a process load imposed upon the user device.

1.3 Modification of the Basic Content Delivery Model 2

Examples of modifications of the basic content distribution model 2 shown in FIG. 31 are described below. In an example shown in FIG. 35, the functions of the shop server are separately implemented by a shop server and a content delivery server such that the shop server 100 receives a content-purchasing request from a user device 200 and the content delivery server 400 transmits content to the user device 200. In this modified model, mutual authentication is not performed between entities between which data is transmitted, but each entity verifies a digital signature written in received data. However, mutual authentication may be performed in a similar manner as in the basic content distribution model 2.

Figure 35:
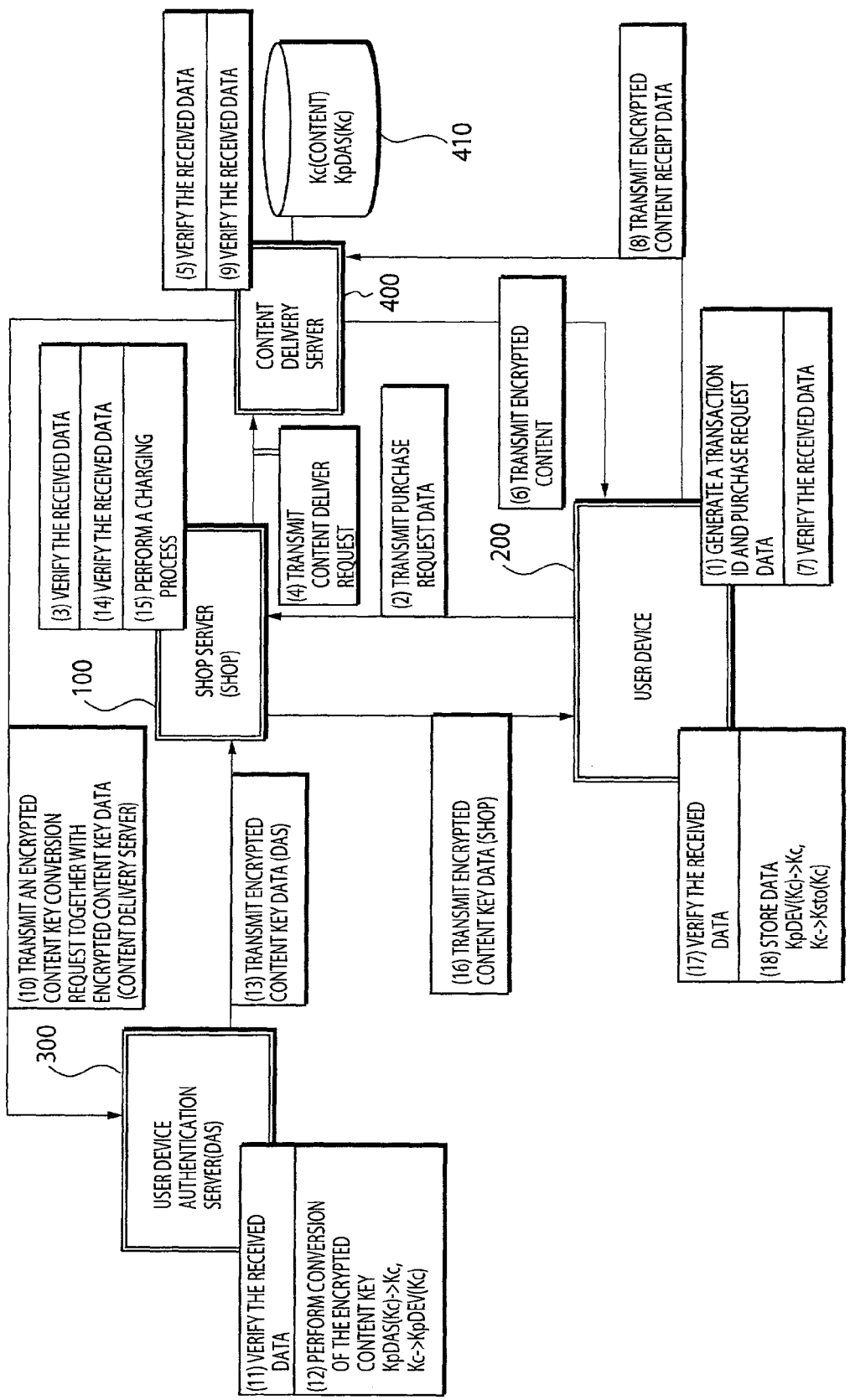
FIG. 35 is a diagram illustrating a content delivery process in which mutual authentication is not performed, according to the present invention.

If the shop server 100 receives purchase request data from the user device 200, the shop server 100 verifies the received data (process step (3) in FIG. 35). If the received data is determined as being valid, the shop server 100 transmits a content delivery request to the content delivery server 400 (process step (4) in FIG. 35). The content delivery server 400 verifies the content delivery request data received from the shop server 100. The content delivery server 400 retrieves the encrypted content from the content database 410 and transmits the retrieved data (process step (6) in FIG. 35).

If the user device 200 receives the encrypted content from the content delivery server 400, the user device 200 verifies the received data. If the received data is valid, the user device 200 transmits to the content delivery server 400 a message indicating that the encrypted content has been successfully received. The content delivery server 400 verifies the received data. If the received data is valid, the content delivery server 400 transmits the encrypted content key data (content delivery server) to the user device authentication server 300 and requests the user device authentication server 300 to perform the encrypted content key conversion process (process step (10) in FIG. 35).

After the user device authentication server 300 has received the encrypted content key data (content delivery server) and the encrypted content key conversion request from the content delivery server 400, the process thereafter is performed in a similar manner to the embodiment described above with reference to FIG. 31 except that mutual authentication is not performed.

In this modified content distribution model, the user device transmits a content-purchasing request to the shop server and receives an encrypted content, without performing mutual authentication. If the shop server 100 receives the content-purchasing request from the user device, the shop server verifies the received content-purchasing request data only by verification of a digital signature written therein. Furthermore, if the shop server 100 receives, from the user device authentication server, an encrypted content key which has been subjected to the key conversion process, the shop server 100 verifies the encrypted content key by means of verification of a digital signature written therein. Similarly, when the content delivery server 400 receives data from the shop server, the content delivery server 400 verifies the received data by means of verification of a digital signature written therein and transmits content if the verification is successfully passed.

The shop server 100 does not manage or transmit contents. Instead, when the shop server receives a content request from a user device, the shop server selects a content delivery server depending upon the requested content from a plurality of content delivery servers such as a music content delivery server or a game content delivery server, and the shop server transmits a content delivery request to the selected content delivery server. In this system, although communication between the user device and the shop server is performed in both directions using the Internet, communication between the content delivery server and the user device is performed only in one direction from the content delivery server and the user device, and thus a satellite communication line may be used to achieve a high transmission speed.

In this embodiment, data is verified only by examining the digital signature without performing mutual authentication, and thus the process efficiency is improved.

Figure 36:
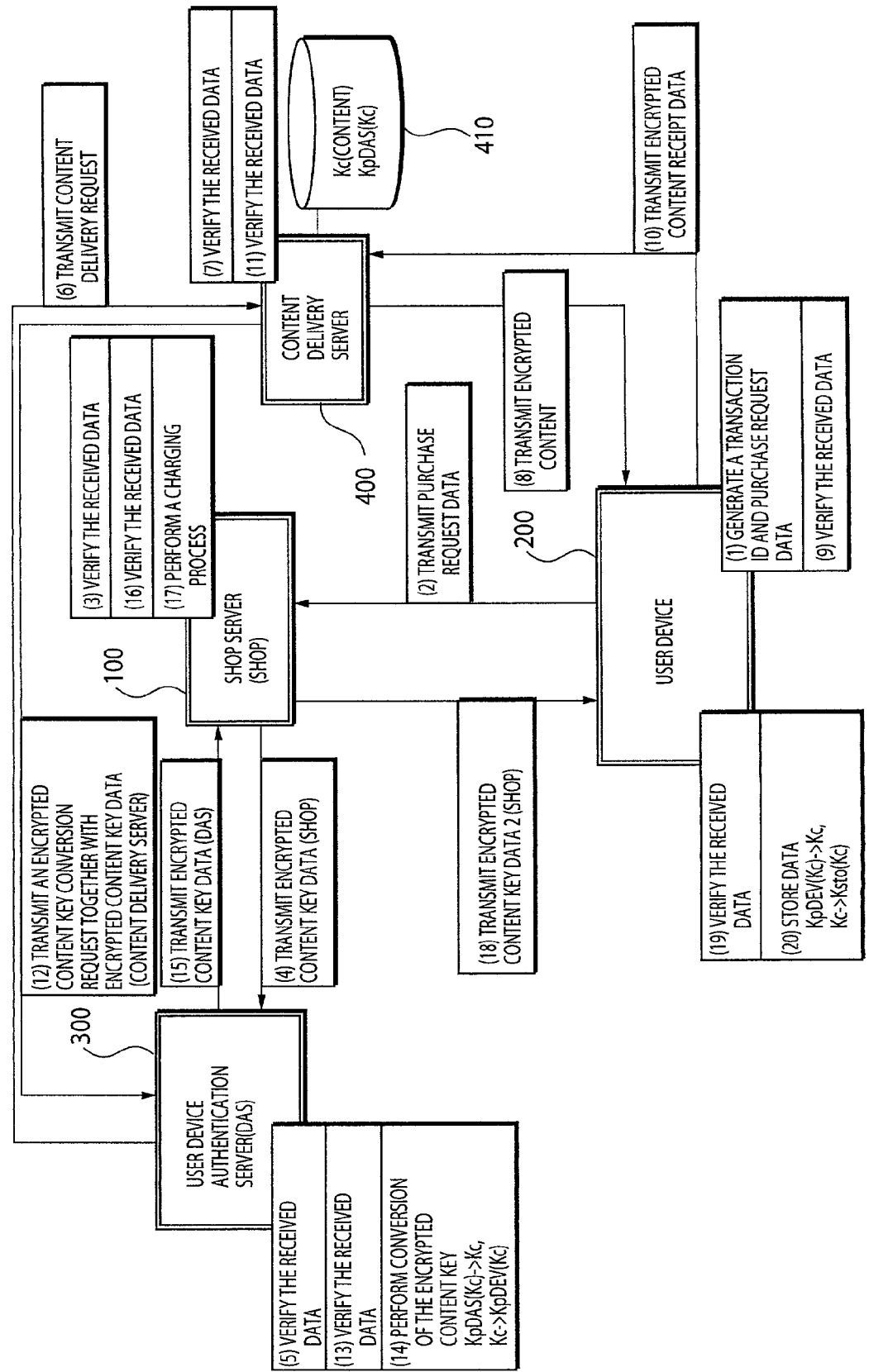
FIG. 36 is a diagram illustrating a modification of the content delivery process in which mutual authentication is not performed, according to the present invention.

FIG. 36 illustrates a system configuration in which, as in the system shown in FIG. 35, the functions of the shop server are implemented in a separate fashion by a shop server and a content delivery server such that the shop server 100 receives a content-purchasing request from a user device 200 and verifies a signature written therein without performing mutual authentication, and content is transmitted from a content delivery server 400 to the user device 200. The difference from the system shown in FIG. 35 is that the shop server 100 does not transmit a content delivery request to the content delivery server 400, but the user device authentication server 300 transmits a content delivery request to the content delivery server 400.

When the shop server 100 receives purchase request data from the user device 200, the shop server 100 verifies the received purchase request data (step (3) in FIG. 36). After the verification of the purchase request data, the shop server 100 transmits the encrypted content key data 1 (shop) to the user device authentication server 300 (step (4) in FIG. 36). Upon receiving the content delivery request, the user device authentication server 300 verifies the received content delivery request (step (5) in FIG. 36). After the verification, the user device authentication server 300 transmits a content delivery request to the content delivery server 400 (step (6) in FIG. 36). The content delivery server 400 verifies the content delivery request data received from the user device authentication server 300. If the verification is successfully passed, the content delivery server 400 retrieves an encrypted content from the content database 410 and transmits it to the user device 200 (step (8) in FIG. 36). The process performed thereafter is similar to that performed in the system shown in FIG. 35 described above.

In this modified system, the user device authentication server 300 can acquire information about the user device when a content-purchasing request is issued to the shop server 100. That is, the user device authentication server 300 can acquire information about the user device before receiving a key conversion request from the content delivery server 400. This allows the user device authentication server 300 to check, at a point of time when the key conversion request is received from the content delivery server 400, whether the key conversion request is issued by the same device as that which has already been registered as the content purchase requesting device. In the case where the DAS can be regarded as being highly reliable, it is not necessarily required that the content delivery server should verify data received from the shop server, and thus the process efficiency is improved.

In this content delivery system according to the invention, as described above, the user device cannot use the content even if the user device has acquired the encrypted content Kc(Content), unless the encrypted content key conversion has already been performed by the user device authentication server. This means that the shop server cannot sell a content to the user device without notifying the user device authentication server of the sales transaction, and thus it is not possible for the user device to use content unless the user device authentication server is informed of the sales transaction. The history of all content transactions in which the key conversion was performed by the user device authentication server is recorded in the license management database (FIG. 6) managed by the user device authentication server so that all content sales transactions performed by a shop are monitored and managed. Thus it becomes possible that money obtained via the charging process performed by a shop is correctly shared among a copyright holder of the content, the shop, the owner of the user device authentication server, or the like. This prevents the content from being used in a fraudulent manner.

2. Content Delivery Model Using an Electronic Ticket

An electronic ticket may be issued that includes information indicating the amount of money that should be shared among a copyright holder of the content, a producer, a license holder, a shop or the like, as described below.

Figure 37:
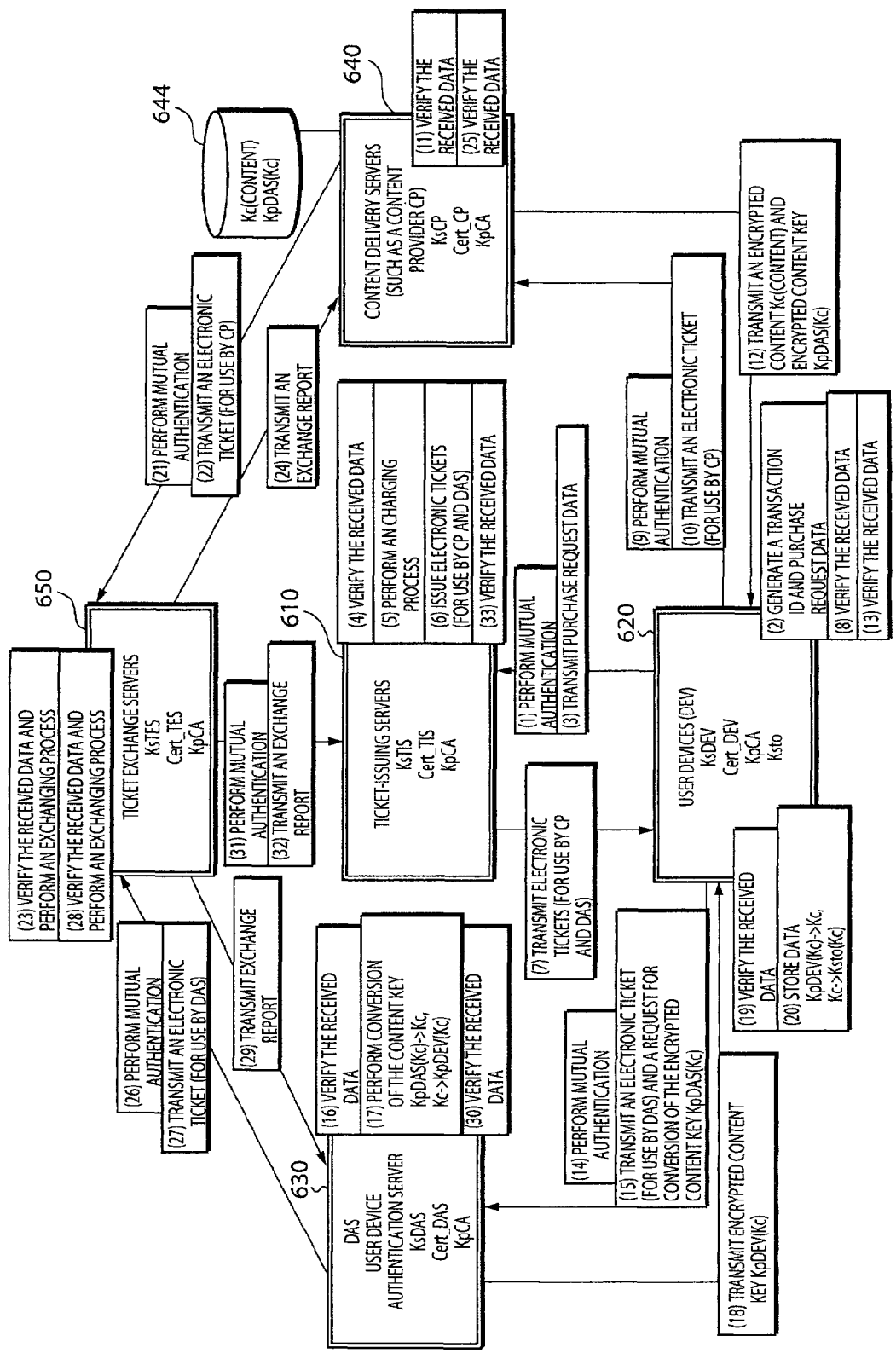
FIG. 37 is a diagram illustrating a content delivery process in which an electronic ticket is used according to the present invention.

FIG. 37 illustrates a system in which money is paid in accordance with information described in an electronic ticket. As shown in FIG. 37, this content delivery system includes a ticket issuing server 610 that receives a content-purchasing request from a user device and issues an electronic ticket in which information about the distribution rates of the content fee is described, a user device (DEV) 620 that issues a content-purchasing request, a user device authentication server (DAS) 630 that performs a key conversion so that a content transaction is properly performed, a content delivery server 640 such as a content provider (CP) that provides content, and a ticket exchange server 650 that performs an exchanging process such as the transferring of a fee in accordance with the information described in an electronic ticket.

Ticket Issuing Server

Figure 38:
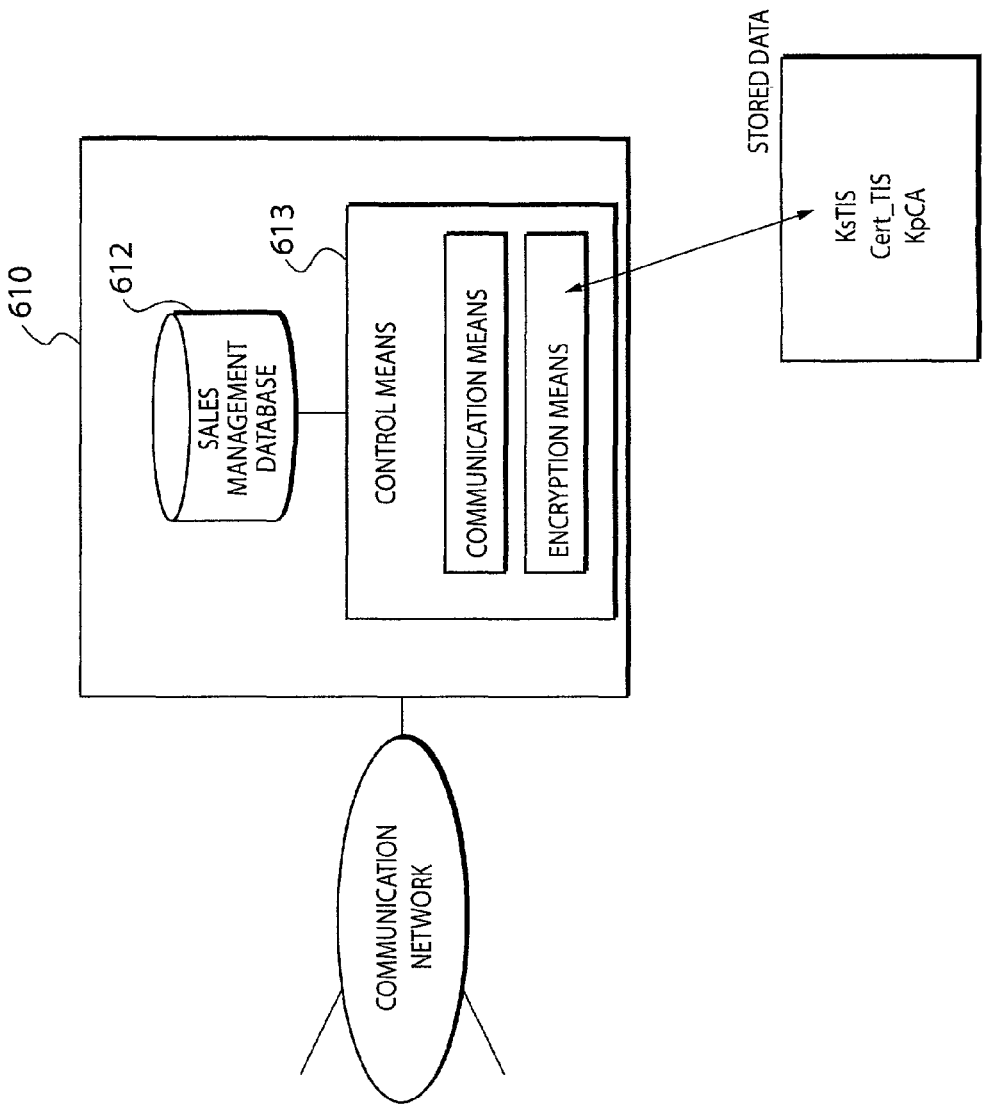
FIG. 38 is a diagram illustrating the construction of a ticket issuing server in the content delivery system according to the present invention.

FIG. 38 illustrates the configuration of the ticket issuing server (TIS) 610 in the content delivery system shown in FIG. 37. If the ticket issuing server 610 receives a purchase request from the user device 620, the ticket issuing server 610 issues an electronic ticket in which information indicating how to share the gains for the requested content is described.

The ticket issuing server (TIS) 610 has a ticket management database 612 in which the history of issuing tickets in response to content transactions is described. More specifically, when a ticket is issued, an identifier of a user device to which content is sold, an identifier of the content, and a content price are recorded in the ticket management database 612 such that these data are related to each other. The ticket issuing server 610 also includes control means 613 for performing verification of a content-purchasing request received from the user device 620, control of the ticket management database, charging for the user device in accordance with the information described in a ticket, communication with the user device, and encryption/decryption of data during communication.

FIG. 39 illustrates the data structure of the ticket management database 612. The ticket management database 612 describes information about a ticket number that is internally generated. This information includes an identifier of a ticket when the ticket is issued by the ticket issuing server in response to a content transaction, a device ID for identifying a user device that has issued a content-purchasing request, a transaction ID that is generated as an identifier of a content transaction by the user device when the content transaction is performed between the user device and the ticket issuing server, a content ID identifying the content subjected to the transaction, ticket user IDs identifying entities such as a copyright holder, a license holder, a manager and a content seller that receive a fee in accordance with information described in the electronic ticket, amounts of money that are paid to the respective entities indicated by the ticket user IDs, an expiration date by which date the ticket should be used, and status information. The status is updated as the content transaction proceeds, as will be described later.

The control means 613 of the ticket issuing server 610 comprises a computer in which an encryption program and a communication program are stored, as shown in FIG. 38, so that the control means 613 also serves as an encryption means and a communication means. Key data or the like used in the encryption process by the encryption means of the control means 613 is stored in a secure manner in storage means in the control means. The data such as encryption keys, stored in the ticket issuing server 610, for use in the encryption process, include a secret key KsTIS of the ticket issuing server 610, a public key certificate Cert_TIS of the ticket issuing server 610, and a public key KpCA of a certificate authority (CA) which issues a public key certificate.

The control means 613 is constructed in a similar manner to the control means described earlier with reference to FIG. 4. That is, the control means 613 includes a CPU (Central Processing Unit), a ROM (Read Only Memory), a RAM (Random Access Memory), a display, an input unit, storage means, and a communication interface.

User Device

The user device (DEV) 620 is constructed in a similar manner to the user device employed in the system shown in FIG. 1. That is, the user device 620 is constructed in a similar manner as described above with reference to FIG. 7. The data such as encryption keys, stored in the user device 620, for use in the encryption process include a secret key KsDEV of the user device, a public key certificate Cert_DEV of the user device, a public key KpCA of a certificate authority (CA), which issues a public key certificate, and a storage key Ksto used as an encryption key for encrypting content when the content is stored in a storage means such as a hard disk of the user device.

The purchase management database of the user device 620 used in the ticket management system shown in FIG. 37 has a capability of managing tickets. FIG. 40 illustrates the data structure of the purchase management database. The purchase management database comprises a transaction ID that is generated by the user device when the content transaction is performed, a content ID identifying the content subjected to the transaction, a ticket issuer ID identifying a ticket issuer that issues the ticket in response to the content transaction, a ticket issuing process number that is assigned by the ticket issuing server 610, a ticket addressee ID identifying an entity to which the ticket has been sent, and status information indicating the status of the user device concerning the content transaction. The status is updated as the content transaction proceeds, as will be described later.

User Device Authentication Server

The user device authentication server (DAS) 630 is constructed in a similar manner to the user device authentication server employed in the system shown in FIG. 1. That is, the user device authentication server 630 is constructed in a similar manner as described above with reference to FIG. 5. The data such as encryption keys, stored in the user device authentication server 630, for use in the encryption process include a secret key KsDAS of the user device authentication server (DAS) 300, a public key certificate Cert_DAS of the user device authentication server (DAS) 300, and a public key KpCA of a certificate authority (CA), which issues a public key certificate.

The license management database of the user device authentication server 630 used in the ticket management system shown in FIG. 37 has a capability of managing tickets. FIG. 41 illustrates the data structure of the license management database. The license management database comprises a DAS process number that is internally generated to identify a process performed by the user device authentication server (DAS) 630 during a content transaction, a device ID for identifying a user device that has issued a content-purchasing request, a transaction ID that is generated by the user device when the content transaction is performed, a content ID identifying the content subjected to the transaction, a ticket issuer ID identifying a ticket issuer that issued the ticket in response to the content transaction, a ticket number that is assigned by the ticket issuing server 610, and status information indicating the status of the user device authentication server (DAS) concerning the content transaction. The status is updated as the content transaction proceeds, as will be described later.

Content Delivery Server

Figure 42:
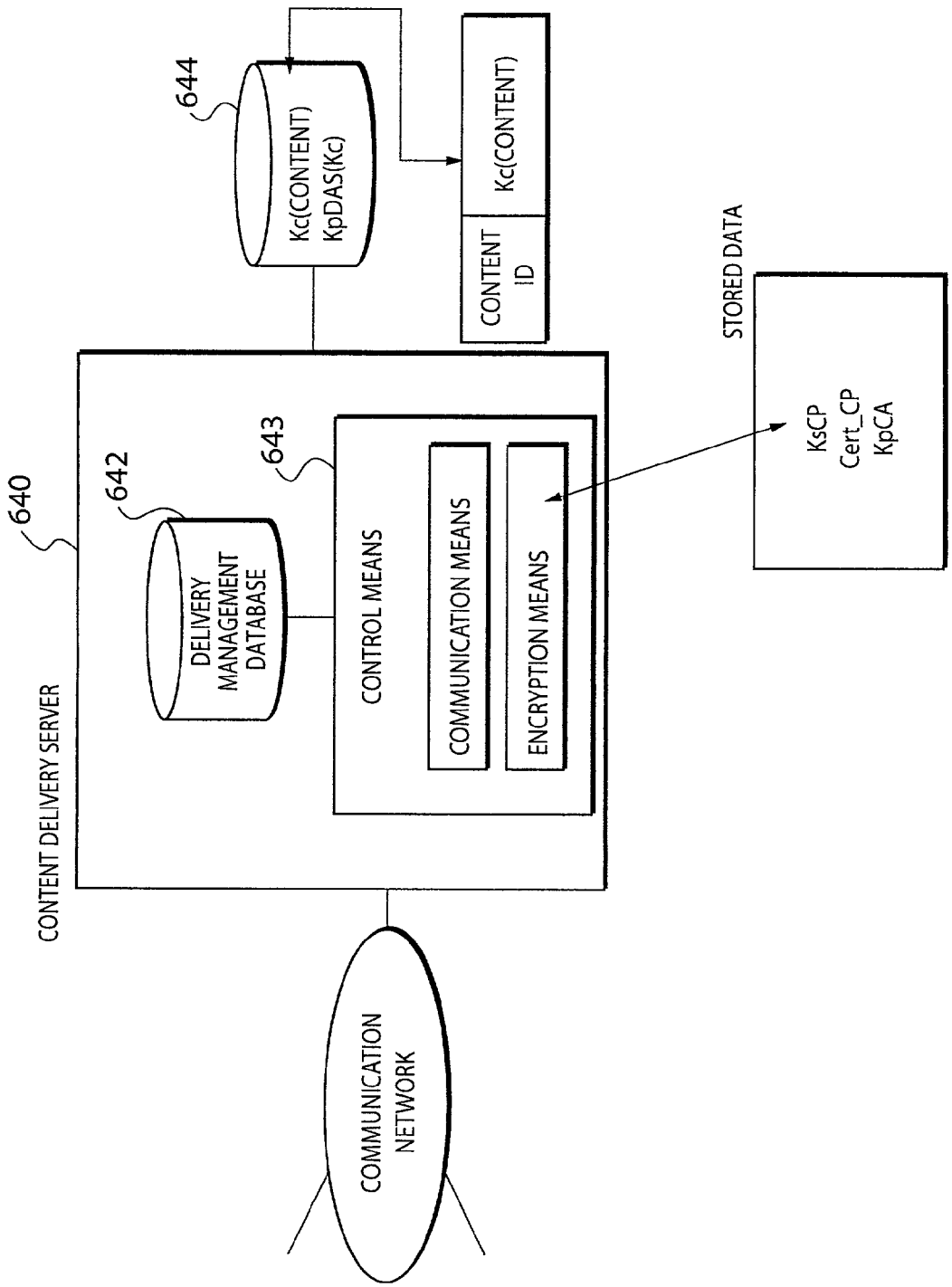
FIG. 42 is a diagram illustrating the construction of a content delivery server in the content delivery system according to the present invention.

FIG. 42 illustrates the construction of the content delivery server 640 in the content delivery system shown in FIG. 37. An example of the content delivery server 640 is a content provider (CP) having a content database 644 including encrypted content data Kc(Content) created by encrypting content to be sold using a content key, and an encrypted content key KpDAS(Kc) obtained by encrypting the content key Kc by the public key KpDAS of the user device authentication server (DAS). As shown in FIG. 42, a content ID is assigned to each encrypted content data Kc(Content) so that each encrypted content can be identified by the content ID.

The content delivery server 640 also includes a content delivery database 642 for storing and managing content delivery data. The content delivery management database 642 has a capability of managing tickets. FIG. 43 illustrates the data structure of the content delivery management database. The content delivery management database 642 comprises a delivery process server number generated by the content delivery server 640 when a content is delivered, a content ID identifying the content subjected to the transaction, a user device ID identifying a user device to which the content is delivered, a ticket issuer ID identifying a ticket issuer that issues the ticket in response to the content transaction, a ticket issuing process number assigned by the ticket issuer, and status information indicating the status of the content delivery server during the content transaction. The status is updated as the content transaction proceeds, as will be described later.

The content delivery server 640 includes control means 643 for performing retrieval of content to be delivered from the content database 644, generation of transaction data described in the content delivery management database 642 in response to a transaction, communication with the user device 620 or the like, and encryption/decryption of data during communication. The control means 643 comprises a computer in which an encryption program and a communication program are stored, as shown in FIG. 42, so that the control means 643 also serves as an encryption means and a communication means. Key data or the like used in the encryption process by the encryption means of the control means 643 is stored in a secure manner in storage means in the control means. The data such as encryption keys, stored in the content delivery server 640, for use in the encryption process, include a secret key KsCP of the content delivery server 640, a public key certificate Cert_CP of the content delivery server 640, and a public key KpCA of a certificate authority (CA) which issues a public key certificate.

The control means 643 is constructed in a similar manner to the control means described earlier with reference to FIG. 4. That is, the control means 643 includes a CPU (Central Processing Unit), a ROM (Read Only Memory), a RAM (Random Access Memory), a display, an input unit, storage means, and a communication interface.

Ticket Exchange Server

FIG. 44 illustrates the construction of the ticket exchange server (TES) 650 in the content delivery system shown in FIG. 37. The ticket exchange server 650 receives electronic tickets from various entities, and, after verifying the received data, performs exchange processes on the basis of information described in the tickets by, for example, transferring money between accounts or changing the remaining amounts of electronic money. More specifically, the ticket exchange server 650 may be a server installed in a bank to manage bank accounts of the respective entities.

The ticket exchange server 650 has a ticket exchange management database 652 for managing data associated with an exchange process on the basis of a ticket issued in response to a content transaction. The ticket exchange server 650 also includes control means 653 for performing verification of a ticket received from an entity, control of the ticket exchange management database, communication with an entity, and encryption/decryption of data during communication.

FIG. 45 illustrates the data structure of the ticket exchange management database 652. The ticket exchange management database 652 comprises a TES process number that is internally generated to identify a ticket exchange process by the ticket exchange server in response to a received ticket, an exchange requester ID identifying an entity requesting an exchange on the basis of the ticket, a ticket issuer ID identifying a ticket issuer that issues the ticket in response to the content transaction, a ticket issuing process number that is assigned by the ticket issuing server 610, an amount of exchange on the basis of the ticket, a user device ID identifying the user device that has purchased the content, a transaction ID that is generated by the user device when the content transaction is performed, and status information indicating the status of the exchange process performed by the ticket exchange server. The status is updated as the content transaction proceeds, as will be described later.

The ticket exchange server 650 includes control means 653 for generating and updating of the data described in the ticket exchange management database 652, verification of a received ticket, communication with an entity, and encryption/decryption of data during communication. The control means 653 comprises a computer in which an encryption program and a communication program are stored, as shown in FIG. 44, so that the control means 653 also serves as encryption means and communication means. Key data or the like used in the encryption process by the encryption means of the control means 653 is stored in a secure manner in storage means in the control means. The data such as encryption keys, stored in the ticket exchange server 650, for use in the encryption process include a secret key KsTES of the ticket exchange server 650, a public key certificate Cert_TES of the ticket exchange server 650, and a public key KpCA of a certificate authority (CA) that issues a public key certificate.

The control means 653 is constructed in a similar manner to the control means described earlier with reference to FIG. 4. That is, the control means 653 includes a CPU (Central Processing Unit), a ROM (Read Only Memory), a RAM (Random Access Memory), a display, an input unit, storage means, and a communication interface.

Content Purchasing Process

Referring again to FIG. 37, the process is described in which the user device issues a content-purchasing request to the ticket-issuing server, the user device acquires content, the user device stores the acquired content in the user device such that the content can be used, and money obtained by selling the content is paid (exchanged) in accordance with information described in a ticket. In FIG. 37, the process proceeds in the order of process steps from (1) to (32) as described below.

(1) Mutual Authentication

When the user device 620 wants to purchase content, mutual authentication is first performed between the user device 620 and the ticket issuing server 610. The mutual authentication is performed in a similar manner as described above with reference to FIGS. 12 and 13. In the following data transmission, data is transmitted after being encrypted, as required, using a session key generated during the mutual authentication process.

(2) Generation of Transaction ID and Purchase Request Data, and (3) Transmission of the Purchase Request Data If the mutual authentication between the ticket issuing server 610 and the user device 620 is successfully passed, the user device 620 generates a purchase request data. FIG. 46 illustrates the data structure of the purchase request data. The purchase request data includes a user device ID identifying the user device 620 that has issued the content-purchasing request, a transaction ID that is generated as an identifier of a content transaction by the encryption means of the user device 620 on the basis of, for example, a random number, and a content ID indicating the content the user device desires to purchase. Furthermore, a digital signature of the user device for the above data is added to the purchase request data. As required, the public key certificate of the user device, for use in verification of the signature, is attached to the purchase request data.

(4) Verification of the Received Data

When the ticket issuing server 610 receives the purchase request such as that shown in FIG. 46 from the user device 620, the ticket issuing server 610 verifies the received data. The verification is performed in a similar manner as described earlier with reference to FIG. 15.

(5) Charging Process, (6) Issuing of Electronic Ticket, and (7) Transmission of Electronic Ticket Thereafter, the ticket issuing server 610 performs a charging process associated with a content transaction and issues an electronic ticket. Herein, the electronic ticket is issued below an upper transaction limit that is set on the basis of a remaining amount in the bank account or in the electronic money account of the user. The issued electronic ticket is transmitted to the user device 620.

FIG. 47 illustrates two examples (A) and (B) of the data structure of an electronic ticket. In the example shown in (A), the electronic ticket includes only one receiving entity to which money is to be paid. This version of the electronic ticket includes a ticket issuer ID, a ticket issuing process number, a ticket user ID indicating an entity to which a charge is given in accordance with information described in the ticket, an amount of money to be paid in accordance with the ticket, a validity period of the electronic ticket during which the receiving entity can perform a money reception process (settlement) on the basis of the electronic ticket, and purchase request data (e.g., FIG. 46 transmitted from the user device to the ticket issuing server). The electronic ticket may further include data indicating the date on which the ticket was issued. Furthermore, a digital signature of the ticket issuing server 610 is added to the data. Also, a public key certificate of the ticket issuing server is attached to the electronic ticket, if necessary, for use in verification of the signature.

The example of an electronic ticket shown in (B) indicates amounts that should be paid to a plurality of receiving entities. This example of the electronic ticket includes a plurality of ticket user IDs (IDs of ticket user 1 to ticket user n), and amounts to be paid thereto. That is, each receiving entity can receive an amount of money corresponding to the ID of the entity.

In the example of the process shown in FIG. 37, the ticket-issuing server 610 issues an electronic ticket for use by the content provider (CP), which operates the content delivery server and also issues an electronic ticket for use by the user device authentication server (DAS). Which entity tickets are issued to depends upon the content sold. In some cases, an electronic ticket is issued to an author of a content or the like. The ticket-issuing server has a table in which entities to which tickets should be issued and amounts which should be paid to respective entities are described for each content ID. When the ticket-issuing server receives a content-purchasing request from a user device, the ticket-issuing server detects the content ID described in the content-purchasing request and determines the entities to which tickets should be issued and the amounts to be paid to the entities from the table. Thereafter, ticket-issuing server issues tickets in accordance with the determination.

(8) Verification of Received Data

When the user device 620 receives a ticket from the ticket issuing server 610, the user device 620 verifies the received ticket. The verification is performed in a similar manner as described above with reference to the processing flow shown in FIG. 15. That is, the user device 620 first verifies the public key certificate of the ticket issuing server, using the public key KpCA of the certificate authority (CA). The user device 620 then extracts the public key KpTIS of the ticket issuing server from the public key certificate and verifies the signature of the ticket using the extracted public key KpTIS.

(9) Mutual Authentication, and

(10) Transmission of Electronic Ticket (for Use by the CP)

Thereafter, the user device 620 gets access to the content delivery server 640, and mutual authentication is performed between them. If the mutual authentication is successfully passed, the user device 620 transmits to the content delivery server 640 an electronic ticket (for use by the CP).

(11) Verification of Received Data, and

(12) Transmission of Encrypted Content and Encrypted Content Key

If, in the verification performed by the content delivery server 640 concerning the electronic ticket (for use by the CP), it is determined that the electronic ticket has not been tampered with and thus the electronic ticket is valid, the content delivery server 640 transmits the encrypted content and the encrypted content key to the user device. That is, the encrypted content Kc(Content) obtained by encrypting the content using the content key and the encrypted content key data KpDAS(Kc) obtained by encrypting the content key Kc using the public key of the user device authentication server (DAS) 630 are transmitted.

(13) Verification of Received Data,

(14) Mutual Authentication, and

(15) Transmission of Electronic Ticket (for Use by the DAS) and Key Conversion Request When the user device 620 receives the encrypted content and the encrypted content key from the content delivery server 640, the user device 620 verifies the received data. After verification, the user device 620 gets access to the user device authentication server 630 and performs mutual authentication with the user device authentication server 630. If mutual authentication is successfully passed, the user device 620 transmits an electronic ticket and a key conversion request to the user device authentication server 630. Herein, the key conversion request is for conversion of the encrypted content key Kc encrypted by the public key of the user device authentication server, wherein the encrypted content key Kc was received from the content delivery server 640. That is, in response to the key conversion request, the user device authentication server 630 converts the encrypted content key KpDAS(Kc) into the encrypted content key KpDEV(Kc) encrypted using the public key KpDEV of the user device, in a similar manner to the key conversion process described earlier with reference to FIG. 1.

(16) Verification of Received Data, and

(17) Conversion of Encrypted Content Key

If the user device authentication server 630 receives from the user device 620 the electronic ticket (for use by the DAS) and the request for conversion of the encrypted content key KpDAS(Kc), the user device authentication server 630 verifies the electronic ticket (for use by the DAS) and the request for conversion of the encrypted content key. If the verification indicates that the electronic ticket is a valid ticket which has not been tampered with and that the key conversion request is valid, the user device authentication server 630 decrypts, using the secret key KsDAS of the user device authentication server 630, the encrypted data KpDAS(Kc) obtained by encrypting the content key Kc using the public key KpDAS of the user device authentication server (DAS) 630, thereby obtaining the content key Kc. Furthermore, the user device authentication server 630 encrypts the obtained content key Kc using the public key KpDEV of the user device thereby generating the encrypted content key KpDEV(Kc). That is, the key is converted such that KpDAS(Kc)→Kc→KpDEV(Kc). This conversion process is performed in a similar manner as described earlier with reference to FIG. 16.

(18) Transmission of Encrypted Content Key,

(19) Verification of Received Data, and

(20) Storage of Data

The user device authentication server 630 transmits the encrypted content key KpDEV(Kc) generated via the key conversion to the user device 620. If the user device 620 receives the encrypted content key KpDEV(Kc) from the user device authentication server 630, the user device 620 verifies the received data. After the verification, the user device 620 decrypts the encrypted content key KpDEV(Kc) using the secret key KsDEV of the user device 620, and then the user device 620 encrypts the content key using the storage key Ksto of the user device 620 thereby generating an encrypted content key Ksto(Kc). The resultant encrypted content key Ksto(Kc) is stored in the storage means of the user device 620. When the content is used, the encrypted content key Ksto(Kc) is decrypted using the storage key Ksto thereby obtaining the content key Kc, and the encrypted content Kc(Content) is decrypted using the obtained content key Kc thereby reproducing the content.

(21) Mutual Authentication, and

(22) Transmission of Electronic Ticket (for Use by the CP)

After transmitting the encrypted content to the user device 620, the content delivery server 640 gets to access to the ticket exchange server 650 and performs mutual authentication with the ticket exchange server 650. If mutual authentication is successfully passed, the content delivery server 640 transmits, to the ticket exchange server 650, the electronic ticket for use by the content delivery server 650.

(23) Verification of Received Data and Exchange Process

If the verification performed by the ticket exchange server 650 indicates that the electronic ticket (for use by the CP) is a valid ticket which has not been tampered with, the ticket exchange server 650 performs an exchange process in accordance with the information described in the received electronic ticket. The exchange process is performed, for example, by transferring an amount of money specified in the electronic ticket from an account of the user device to a bank account or an electronic money account, registered in advance, of the content provider (CP), which manages the content delivery server. Alternatively, the exchange process may be performed by transferring an amount of money specified in the electronic ticket to the account of the content provider (CP) from the amount of money pre-received as deposit by the ticket-issuing server from the user. The above-described exchange process or settlement process is performed only when the verification of the validity period described in the ticket performed by the ticket exchange server 650 indicates that the validity period has not yet expired.

(24) Transmission of Exchange Process Report

After completion of the exchange process on the basis of the electronic ticket, the ticket exchange server 650 transmits to the content delivery server 640 a report indicating the result of the exchange process.

FIG. 46 illustrates an example of the data structure of the exchange process report. The exchange process report includes a ticket exchange process ID identifying a ticket exchange process, a ticket exchange requester ID identifying an entity requesting an exchange on the basis of the ticket, an amount of the exchange on the basis of the ticket, a ticket issuer ID identifying a ticket issuer that issues the ticket in response to the content transaction, a ticket number that is assigned by the ticket issuing server 610, and a date on which the ticket exchange process was performed by the ticket exchange server 650. The electronic signature of the ticket exchange server 650 is added to the exchange process report. Furthermore, the public key certificate of the ticket exchange server is attached to the exchange process report, if necessary, for verification of the signature.

(25) Verification of Received Data

When the content delivery server 640 receives the exchange process report from the ticket exchange server 650, the content delivery server 640 verifies the received exchange process report. If the data verification indicates that the report is valid, it can be concluded that delivery of a particular amount of money assigned to the content provider which manages the content delivery server has been correctly delivered to the content provider.

(26) Mutual Authentication,

(27) Transmission of Electronic Ticket (for Use by the DAS),

(28) Verification of Received Data and Exchange Process,

(29) Transmission of Exchange Process Report, and

(30) Verification of Received Data

A process similar to the above-described process ((21) to (25)) performed between the content delivery server 640 and the ticket exchange server 650 is also performed on the basis of an electronic ticket (for use by the DAS) between the user device authentication server 630 and the ticket exchange server 650.

(31) Mutual Authentication,

(32) Transmission of Exchange Process Report, and

(33) Verification of Received Data

After the ticket exchange server 650 has performed the exchange process on the basis of the electronic tickets received from respective entities, mutual authentication between the ticket exchange server 650 and the ticket-issuing server 610 is performed, and an exchange report (FIG. 46), similar to those transmitted to the respective entities, is transmitted from the ticket exchange server 650 to the ticket-issuing server 610. The ticket-issuing server 610 examines the exchange report received from the ticket exchange server 650 to confirm that the exchange process associated with the issued tickets has been completed.

Transition of Status of Devices

The entities shown in FIG. 37, such as the ticket-issuing server 610, determine the processes to be performed next, depending upon the status/information indicating the process state during the sequence of steps in the content transaction. The status information is managed for each content transaction, using the ticket-issuing management database shown in FIG. 39 and the purchase management database, shown in FIG. 40, of the user device.

Figure 48:
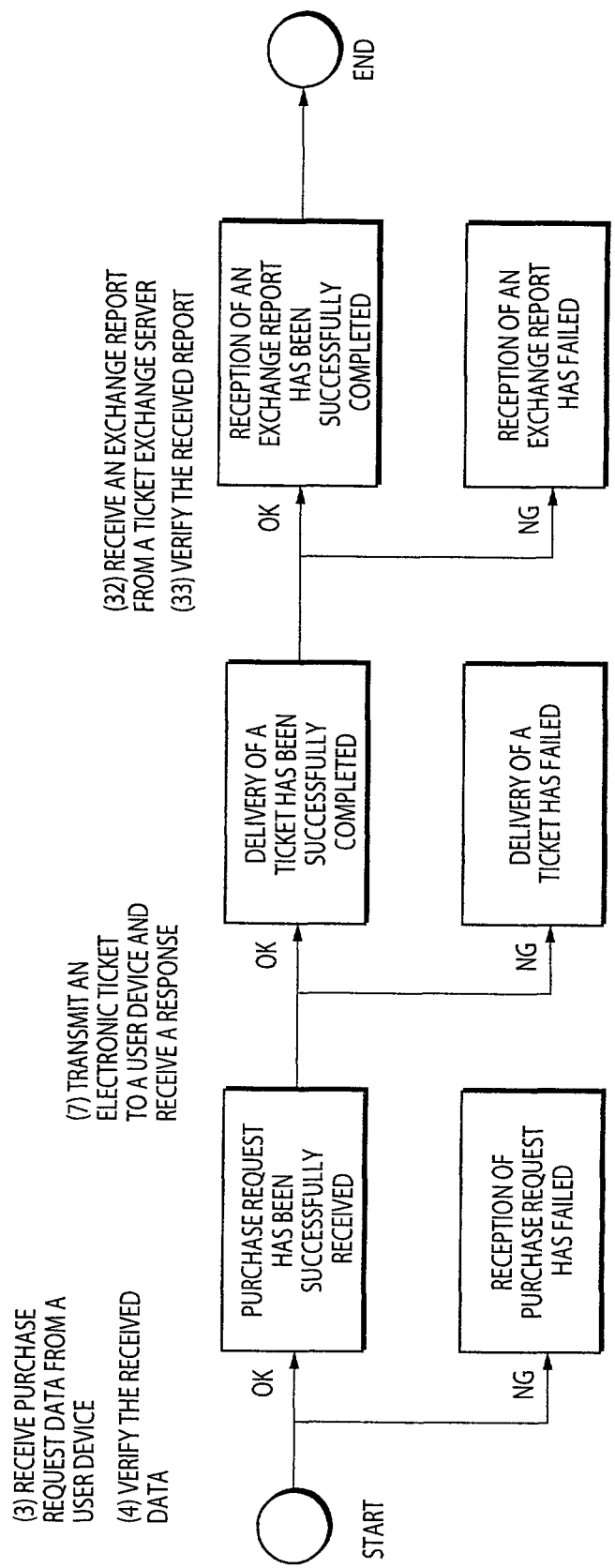
FIG. 48 is a diagram illustrating the status transitions of the ticket issuing server in the content delivery system according to the present invention.

The status transition of the ticket issuing server 610 is described below with reference to FIG. 48. The ticket issuing server 610 initiates a process when the ticket issuing server 610 receives purchase request data from the user device 620 (process (3) in FIG. 37). Upon receiving the data from the user device 620, the ticket issuing server 610 verifies the received data. If the verification is successfully passed, the status is set to a "purchase request accepted" state. However, if the data verification indicates that the purchase request is not valid, the process (purchase request reception process, in this specific example) is terminated immediately or after repeating the process a predetermined number of times, and the status is set to a "purchase request rejected" state. The process proceeds to a next step only when the status is in the "purchase request accepted" state.

If the status is changed into the "purchase request accepted" state, the ticket-issuing server 610 transmits an electronic ticket to the user device 620 (steps (7) in FIG. 37). If the ticket-issuing server 610 receives an acknowledgement response from the user device, the status is set to a "ticket delivery completed" state. However, if the acknowledgement response is not received, the process (transmission of the electronic ticket, in this specific case) is terminated immediately or after repeating the process a predetermined number of times, and the status is set to a "ticket delivery failed" state. The process proceeds to a next step only when the status is in the "ticket delivery completed" state.

If the status is changed into the "ticket delivery completed" state, the ticket issuing server 610 receives an exchange report from the ticket exchange server and verifies the received report (process steps (32) and (33) in FIG. 37). If the verification is successfully passed, the status is changed into a "reception of exchange report completed" state. However, if the verification indicates that the received report is not valid, the process (reception and verification of the report, in this specific case) is terminated immediately or after repeating the process a predetermined number of times, and the status is set to a "reception of exchange report failed" state. In the ticket issuing server 610, the status is changed in the above-described manner for each content transaction.

Figure 49:
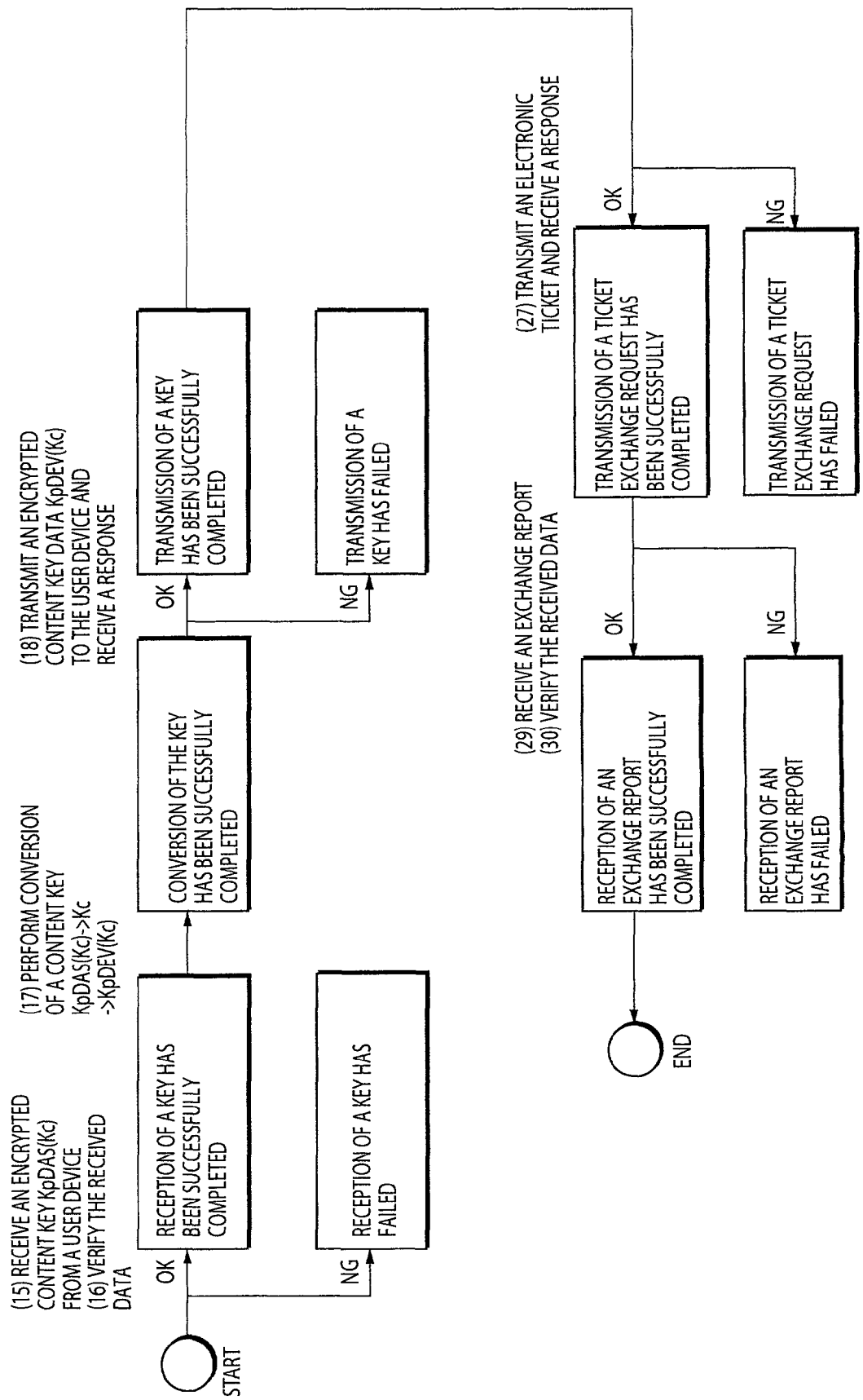
FIG. 49 is a diagram illustrating the status transitions of the user device authentication server in the content delivery system according to the present invention.

The status transition of the user device authentication server 630 is described below with reference to FIG. 49. The user device authentication server 630 initiates a process when the user device authentication server 630 receives an encrypted content key KpDAS(Kc) from the user device 620 (process (15) in FIG. 37). Upon receiving the data including the electronic ticket (DAS) from the user device 620, the user device authentication server 630 verifies the received data. If the verification is successfully passed, the status is set to a "reception of key completed" state. However, if the data verification indicates that the received data is not valid, the process (reception of the encrypted content key data (user device) in this specific case) is terminated immediately or after repeating the process a predetermined number of times, and the status is set to a "reception of key failed" state. The process proceeds to a next step only when the status is in the "reception of key completed" state.

If the status is changed into the "reception of key completed" state, the user device authentication server 630 performs the content key conversion process (process step (17) in FIG. 37). If the content key conversion is successfully completed, the status is set to a "key conversion completed" state. Herein, it is assumed that the key conversion is always completed successfully, and the status is always set to the "key conversion completed" state.

If the status is changed into the "key conversion completed", state the user device authentication server 630 transmits the encrypted content key data (DAS) to the user device 620 (process step (18) in FIG. 37) and waits for a response from the user device 620. If an acknowledgement response is received from the user device 620, the status is changed into a "transmission of key completed" state. However, if the acknowledgement response is not received, the process (transmission of the encrypted content key data (DAS) in this specific case) is terminated immediately or after repeating the process a predetermined number of times, and the status is set to a "transmission of key failed" state.

If the status is changed into the "transmission of key completed" state, the user device authentication server 630 transmits the electronic ticket (for use by the DAS) to the ticket exchange server 650 (process step (27) in FIG. 37) and waits for a response from the ticket exchange server 650. If an acknowledgement response is received from the ticket exchange server 650, the status is set to a "transmission of ticket exchange request completed" state. However, if the acknowledgement response is not received, the process (transmission of the ticket exchange request, in this specific case) is terminated immediately or after repeating the process a predetermined number of times, and the status is set to a "transmission of ticket exchange request failed" state.

If the status is changed into the "transmission of ticket exchange request completed" state, the user device authentication server 630 receives the exchange process report from the ticket exchange server 650 and verifies the received report (process steps (29) and (30) in FIG. 37). If the verification is successfully passed, the status is set to a "reception of exchange process report completed" state, and the process is ended. However, if the data verification indicates that the received report is not valid, the process (reception and verification of the report, in this specific case) is terminated immediately or after repeating the process a predetermined number of times, and the status is set to a "reception of exchange report failed" state. In the user device authentication server 630, the status is changed in the above-described manner for each content transaction.

Figure 50:
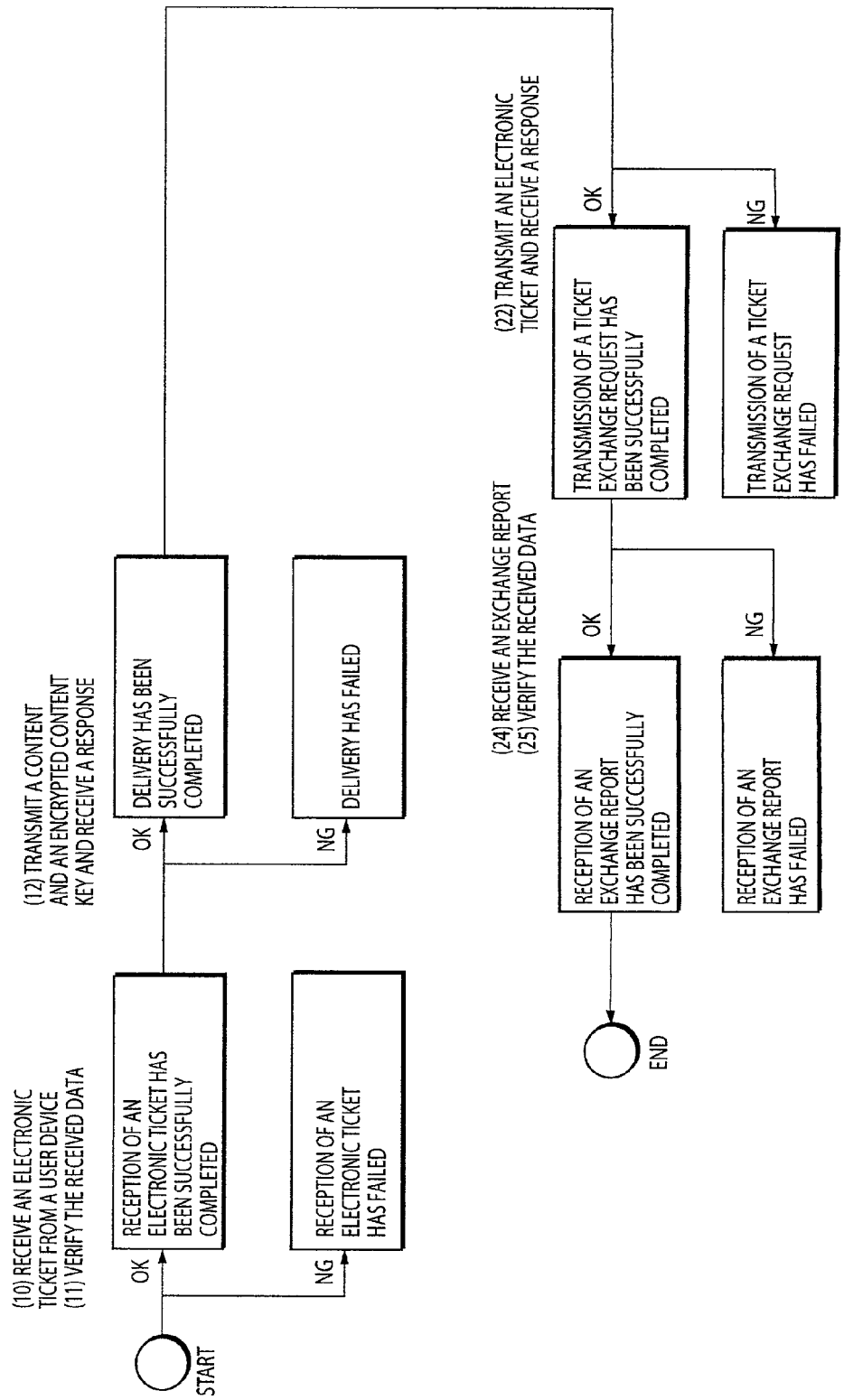
FIG. 50 is a diagram illustrating the status transitions of the content delivery server in the content delivery system according to the present invention.

The status transition of the content delivery server 640 is described below with reference to FIG. 50. The content delivery server 640 initiates a process when the content delivery server 640 receives an electronic ticket (for use by the CP) from the user device 620 (process (10) in FIG. 37). Upon receiving the data from the user device 620, the content delivery server 640 verifies the received data. If the verification is successfully passed, the status is set to a "reception of electronic ticket completed" state. However, if the data verification indicates that the received data is not valid, the process (reception of the ticket, in this specific case) is terminated immediately or after repeating the process a predetermined number of times, and the status is set to a "reception of electronic ticket failed" state. The process proceeds to a next step, only when the status is in the "reception of electronic ticket completed" state.

If the status is changed into the "reception of electronic ticket completed" state, the content delivery server 640 transmits the encrypted content and the encrypted content key data KpDAS(Kc) to the user device 620 (process step (12) in FIG. 37) and waits for a response from the user device 620. If an acknowledgement response is received from the user device 620, the status is set to a "delivery completed" state. However, if the acknowledgement response is not received, the process (transmission of the encrypted content and the encrypted content key data KpDAS(Kc), in this specific case) is terminated immediately or after repeating the process a predetermined number of times, and the status is set to a "delivery failed" state.

If the status is changed into the "delivery completed" state, the content delivery server 640 transmits the electronic ticket (for use by the CP) to the ticket exchange server 650 (process step (22) in FIG. 37) and waits for a response from the ticket exchange server 650. If an acknowledgement response is received from the ticket exchange server 650, the status is set to a "transmission of ticket exchange request completed" state. However, if the acknowledgement response is not received, the process (transmission of the ticket exchange request, in this specific case) is terminated immediately or after repeating the process a predetermined number of times, and the status is set to a "transmission of ticket exchange request failed" state.

If the status is changed into the "transmission of ticket exchange request completed" state, the content delivery server 640 receives the exchange process report from the ticket exchange server 650 and verifies the received report (process steps (24) and (25) in FIG. 37). If the verification is successfully passed, the status is set to a "reception of exchange process report completed" state, and the process is ended. However, if the data verification indicates that the received report is not valid, the process (reception and verification of the report, in this specific case) is terminated immediately or after repeating the process a predetermined number of times, and the status is set to a "reception of exchange report failed" state. In the content delivery server 640, the status is changed in the above-described manner for each content transaction.

Figure 51:
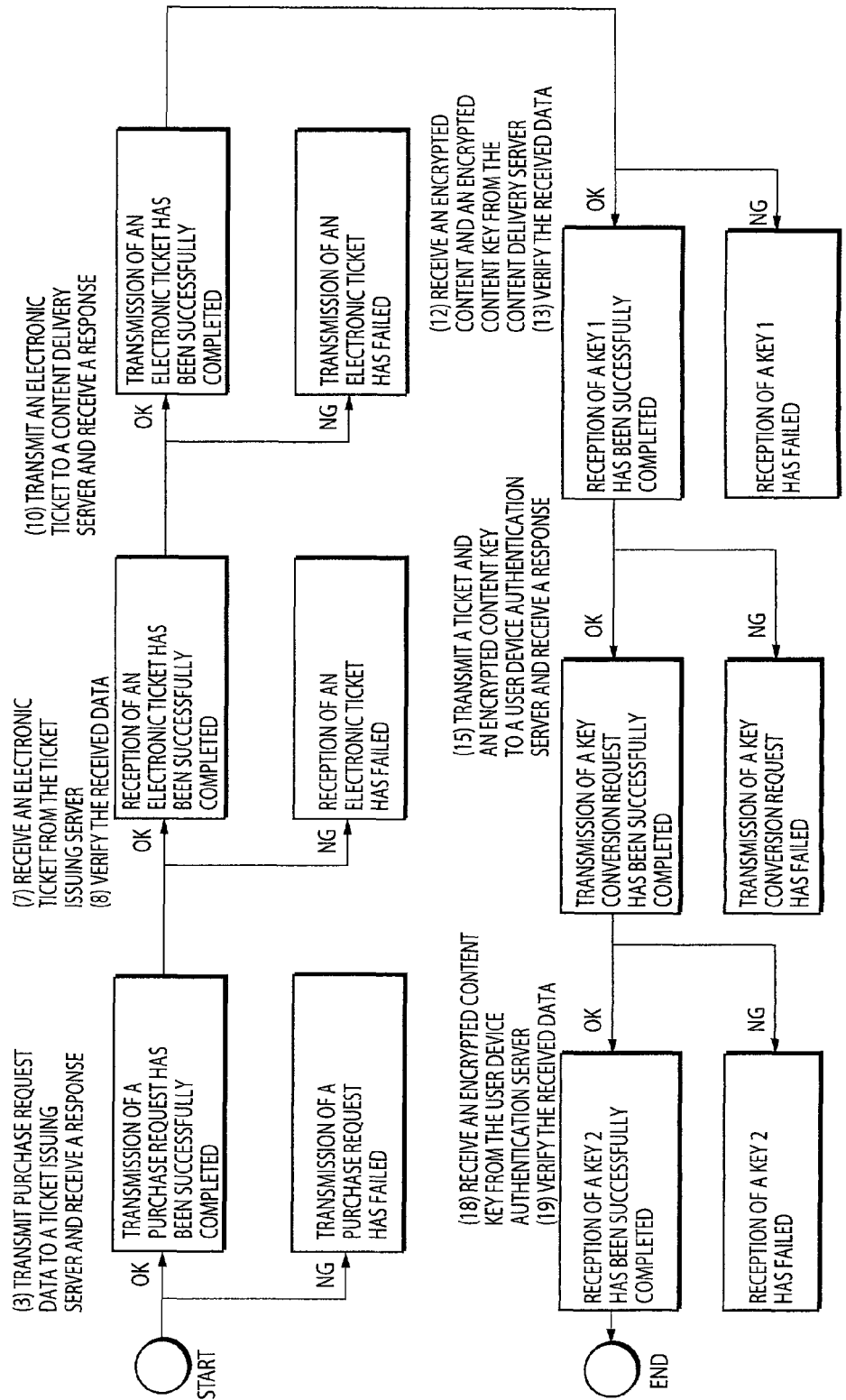
FIG. 51 is a diagram illustrating the status transitions of the user device in the content delivery system according to the present invention.

The status transition of the user device 620 is described below with reference to FIG. 51. The user device 620 initiates a process by transmitting purchase request data to the ticket issuing server 610 (process (3) in FIG. 37). If the user device 620 receives, from the ticket-issuing server 610, a response indicating that the purchase request data has been successfully received by the ticket-issuing server 610, the status is set to a "purchase request transmission completed" state. However, if the response indicating that the purchase request data has been successfully received by the issuing-issuing server 610 is not received, the process (transmission of the purchase request, in this specific case) is terminated immediately or after repeating the process a predetermined number of times, and the status is set to a "purchase request transmission failed" state. The process proceeds to a next step only when the status in the "purchase request transmission completed" state.

If the status is changed into the "purchase request transmission completed" state, the user device 620 receives the electronic ticket from the ticket issuing server 610 (process steps (7) and (8) in FIG. 37) and verifies the received data. If the ticket received from the ticket issuing server 610 is determined as being valid, the status is set to a "reception of electronic ticket completed" state. However, if the data verification indicates that the received ticket is not valid, the process (reception of the ticket, in this specific case) is terminated immediately or after repeating the process a predetermined number of times, and the status is set to a "reception of electronic ticket failed" state. The process proceeds to a next step, only when the status is in the "reception of electronic ticket completed" state.

If the status is changed into the "reception of electronic ticket completed" state, the user device 620 transmits the electronic ticket to the content delivery server 640 (process step (10) in FIG. 37) and waits for a response from the content delivery server 640. If an acknowledgement response is received from the content delivery server 640, the status is changed into the "transmission of electronic ticket completed" state. However, if the acknowledgement response is not received, the process (transmission of the ticket, in this specific case) is terminated immediately or after repeating the process a predetermined number of times, and the status is set to a "transmission of electronic ticket failed" state. The process proceeds to a next step, only when the status is in the "transmission of electronic ticket completed" state.

If the status is changed into the "transmission of electronic ticket completed" state, the user device 620 receives the encrypted content and the encrypted content key KpDAS(Kc) from the content delivery server 640 and verifies the received data (process steps (12) and (13) in FIG. 37). If the data verification is successfully passed, the status is set to a "reception of key 1 completed" state. However, if the data verification is not passed, the process (reception of the key data, in this specific case) is terminated immediately or after repeating the process a predetermined number of times, and the status is set to a "delivery of key 1 failed" state.

If the status is changed into the "reception of key 1 completed" state, the user device 620 transmits the electronic ticket (for use by the DAS) and the encrypted content key KpDAS(Kc) to the user device authentication server 630

(process step (15) in FIG. 37, and waits for a response from the user device authentication server 630. If an acknowledgement response is received from the user device authentication server 630, the status is set to a "transmission of key conversion request completed" state. However, if the acknowledgement response is not received, the process (transmission of the electronic ticket (for use by the DAS) and the encrypted content key KpDAS(Kc), in this specific case) is terminated immediately or after repeating the process a predetermined number of times, and the status is set to a "transmission of key conversion request failed" state. The process proceeds to a next step only when the status is in the "transmission of key conversion request completed" state.

If the status is changed into the "transmission of key conversion request completed" state, the user device 620 receives the encrypted content key KpDEV(Kc) from the user device authentication server 630, and verifies the received data (process steps (18) and (19) in FIG. 37). If the data verification is successfully passed, the status is set to a "reception of key 2 completed" state, and the process is ended. However, if the data verification is not passed, the process (reception of the key data, in this specific case) is terminated immediately or after repeating the process a predetermined number of times, and the status is set to a "reception of key 2 failed" state.

Figure 52:
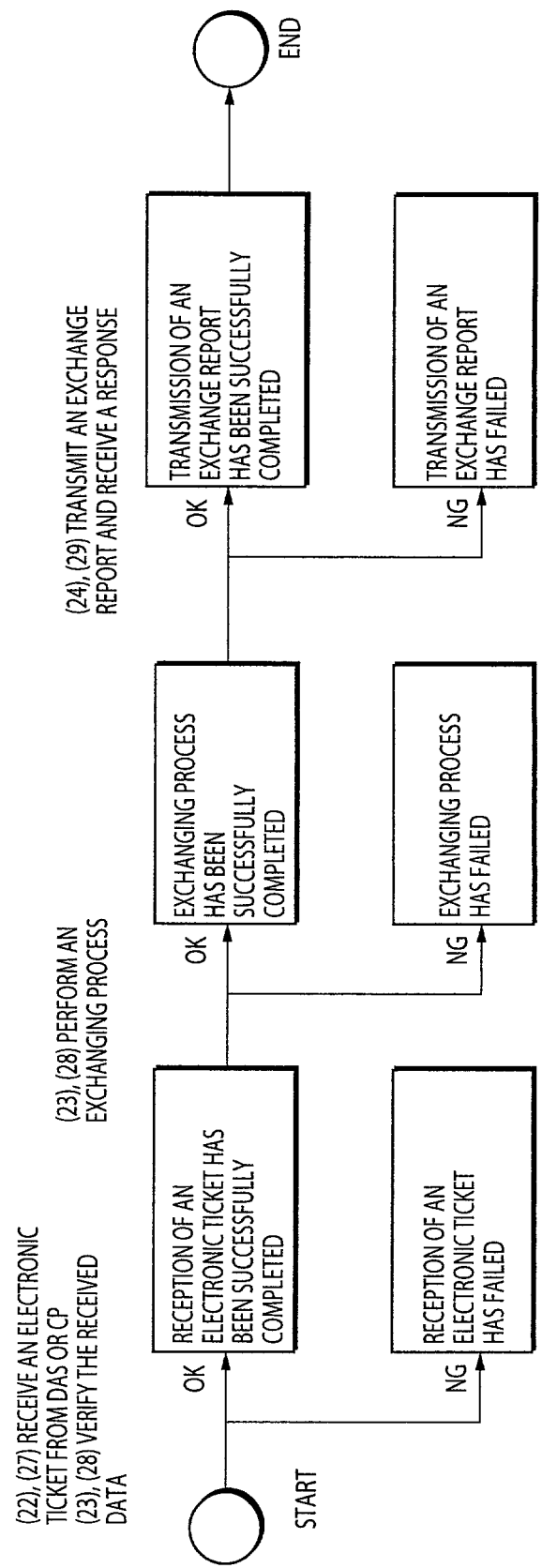
FIG. 52 is a diagram illustrating the status transitions of the ticket exchange server in the content delivery system according to the present invention.

The status transition of the ticket exchange server 650 is described below with reference to FIG. 52. The ticket exchange server 650 starts the process in response to receiving an electronic ticket from an entity having the right to receive a part of sales money on the basis of the electronic ticket (steps (22) and (27) in FIG. 37). The ticket exchange server 650 verifies the received ticket. If the verification is successfully passed, the status is set to a "reception of electronic ticket completed" state. However, if the data verification indicates that the received data is not valid, the process (reception of the ticket, in this specific case) is terminated immediately or after repeating the process a predetermined number of times, and the status is set to a "reception of electronic ticket failed" state. The process proceeds to a next step, only when the status is in the "reception of electronic ticket completed" state.

If the status is changed into the "reception of electronic ticket completed" state, the ticket exchange server 650 performs the exchange process on the basis of the electronic ticket. The exchange process is performed, for example, by transferring an amount of money specified in the electronic ticket (for use by the CP) from an account of the user device to a bank account or an electronic money account, registered in advance, of the content provider (CP), which manages the content delivery server. Alternatively, the exchange process may be performed by transferring an amount of money specified in the electronic ticket to the account of the content provider (CP) from the amount of money pre-received as deposit by the ticket-issuing server from the user. After completion of the exchange process, the status is changed into a "exchange process completed" state. However, if the exchange process fails, the status is changed into a "exchange process failed" state.

If the status is changed into the "exchange process completed" state, the ticket exchange server 650 transmits an exchange report to each entity which has transmitted the tickets (steps (24) and (29) in FIG. 37), and waits from responses from the respective entities. If an acknowledgement response is received from each entity, the status is set to a "transmission of exchange process report completed" state, and the process is ended. However, if the acknowledgement response is not received, the process (transmission of the exchange process report, in this specific case) is terminated immediately or after repeating the process a predetermined number of times, and the status is set to a "transmission of exchange process report failed" state. In the ticket exchange server 650, the status is changed in the above-described manner for each content transaction.

Figure 53:
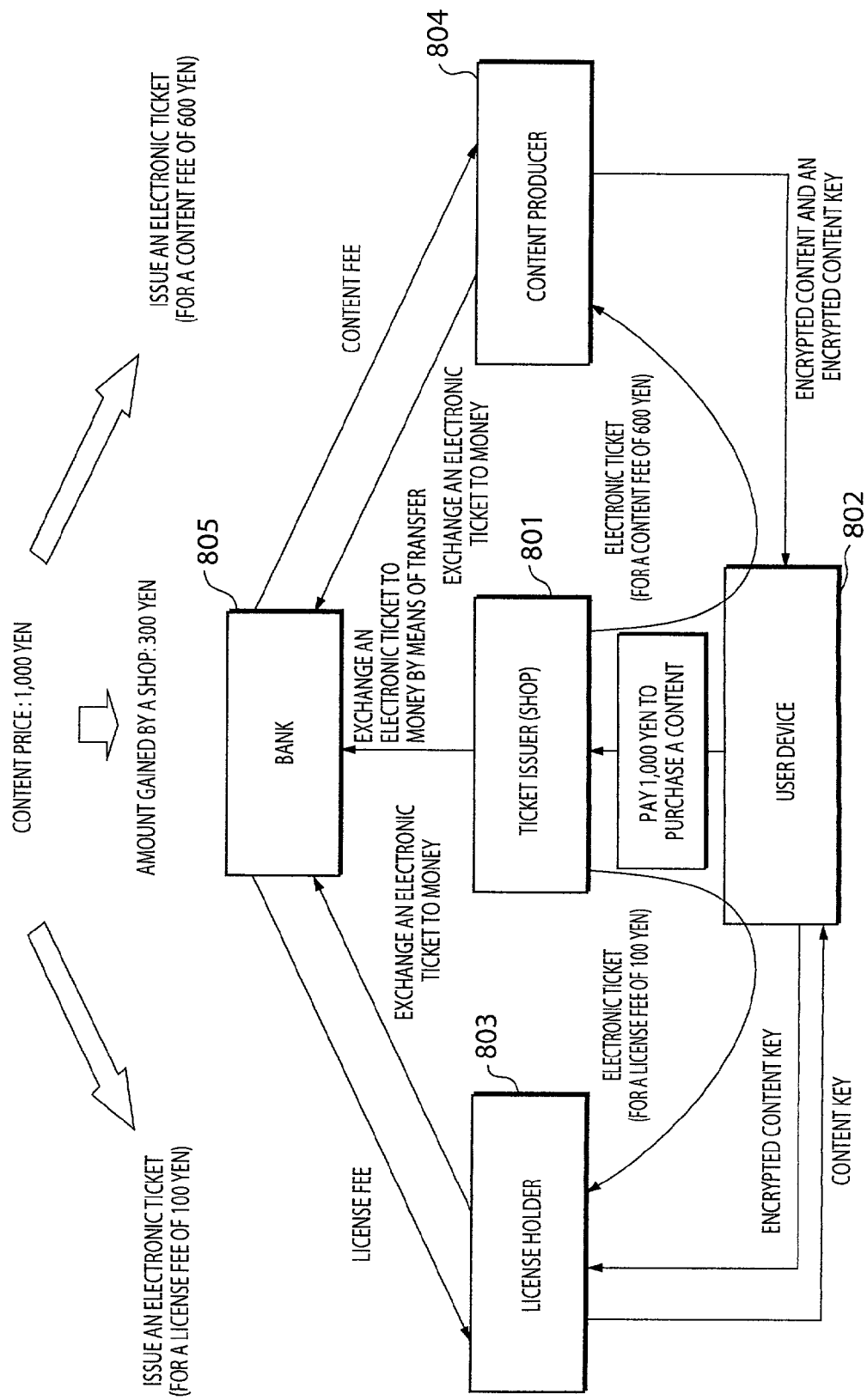
FIG. 53 is a diagram illustrating a specific example of a content delivery process in which an electronic ticket is used according to the present invention.

FIG. 53 illustrates a specific example of a system in which tickets are issued by a ticket issuer and charges for contents are settled using the tickets. If the ticket issuer 801 receives a content-purchasing request from a user device 802, the ticket issuer performs a charging process associated with a content transaction and issues an electronic ticket. Herein, the electronic ticket is issued within an upper transaction limit that is set on the basis of the remaining amount of the bank account or the electronic money account of the user. In the example shown in FIG. 53, an electronic ticket for charging a content fee of 1,000 Japanese yen in total is issued by the ticket issuer to the user device.

In the example shown in FIG. 53, the total amount of 1,000 Japanese yen is to be shared such that 300 Japanese yen is paid as a sales fee to the shop which is the issuer of the ticket, 100 Japanese yen as a license fee to a license holder (user device authentication server) 803 that operates the content delivery system, and 600 Japanese yen as a content fee to a content producer (content delivery server).

If the ticket issuer 801 receives a purchase request from the user device, the ticket issuer 801 determines content-fee sharing rates depending upon the content ID and issues as many electronic tickets as there are entities that will share amounts of the content fee. In the example shown in FIG. 53, the ticket issuer 801 issues an electronic ticket for paying a license fee of 100 Japanese yen to the license holder 803 and an electronic ticket for paying a content fee of 600 Japanese yen to the user content producer, and delivers these electronic tickets to the user device 802. Note that each electronic ticket delivered includes a signature written by the ticket issuer.

The user device 802 transmits the electronic tickets to the license holder 803 and the content producer 804, respectively. The license holder 803 and the content producer 804 verify the received electronic tickets. After confirming that the electronic tickets are valid, the license holder 803 and the content producer 804 transmit the tickets to a bank (ticket exchange server) 805. The ticket exchange server 805 verifies the digital signatures to confirm that the tickets are valid. After the confirmation, the ticket exchange server 805 transfers the specified amounts of money. In the above process, the verification of tickets by the bank (ticket exchange server) is performed on the signatures written on the electronic tickets by the ticket issuer. Verification of the signatures written by the user device in the purchase request data in the tickets is also performed.

The content producer and the license holder who transmit the tickets may write their signature on the data including the electronic tickets, and the bank (ticket exchange server) may verify these signatures.

In the system shown in FIG. 53, the ticket issuer (shop) 801 itself transmits an electronic ticket to the bank (ticket exchange server) 805 in order to receive the shared amount of the content fee, that is, 300 Japanese yen in this example.

The above-described exchange process using electronic tickets ensures that the shared amounts of the content fee are correctly paid to the respective entities. If the content producer 804 receives the electronic ticket from the user device 802, the content producer 804 verifies the received electronic ticket. After the verification, the content producer 804 transmits an encrypted content encrypted using a content key Kc and an encrypted content key KpDAS(Kc) encrypted using a public key KpDAS of the license holder (user device authentication server) to the user device 802.

The user device 802 transmits the encrypted content key KpDAS(Kc) received from the content producer 804 together with the electronic ticket (DAS) to the license holder 803. The license holder verifies the received electronic ticket. After the verification, the license holder performs the key conversion process upon the encrypted content key KpDAS(Kc). That is, an encrypted content key KpDEV(Kc) is produced by encrypting the content key using the public key KpDEV of the user device. The resultant encrypted content key KpDEV is transmitted to the user device 802. The user device 802 decrypts the encrypted content key KpDEV(Kc) using the secret key KsDEV of the user device 802 to obtain the content key Kc. The content key Kc may be stored in the user device 802. In this case, the content key Kc is stored after being encrypted using a storage key Ksto of the user device.

In this system, as described above, if the content delivery server (such as the content producer) receives a ticket issued by the ticket issuer, the content delivery server verifies the received ticket. If the verification indicates that the received ticket is valid, the content delivery server transmits an encrypted content and an encrypted content key to the user device. On the other hand, if the license holder (user device authentication server) receives an electronic ticket, the license holder verifies the received ticket. If the verification indicates that the received ticket is valid, the license holder performs an encrypted key conversion and transmits the resultant key-converted encrypted key to the user device. Thus, it is ensured that the shared amounts of content fee are correctly paid to the respective payees and it becomes possible for the user device to use the content.

3. Management of Content Delivery by Log Recording Server

Now, a content delivery system is described in which history data concerning the purchase made by a user device is accumulated as log data in the user device, and the log data is collected by a system managing device thereby making it possible to monitor the actual status of content distribution.

Figure 54:
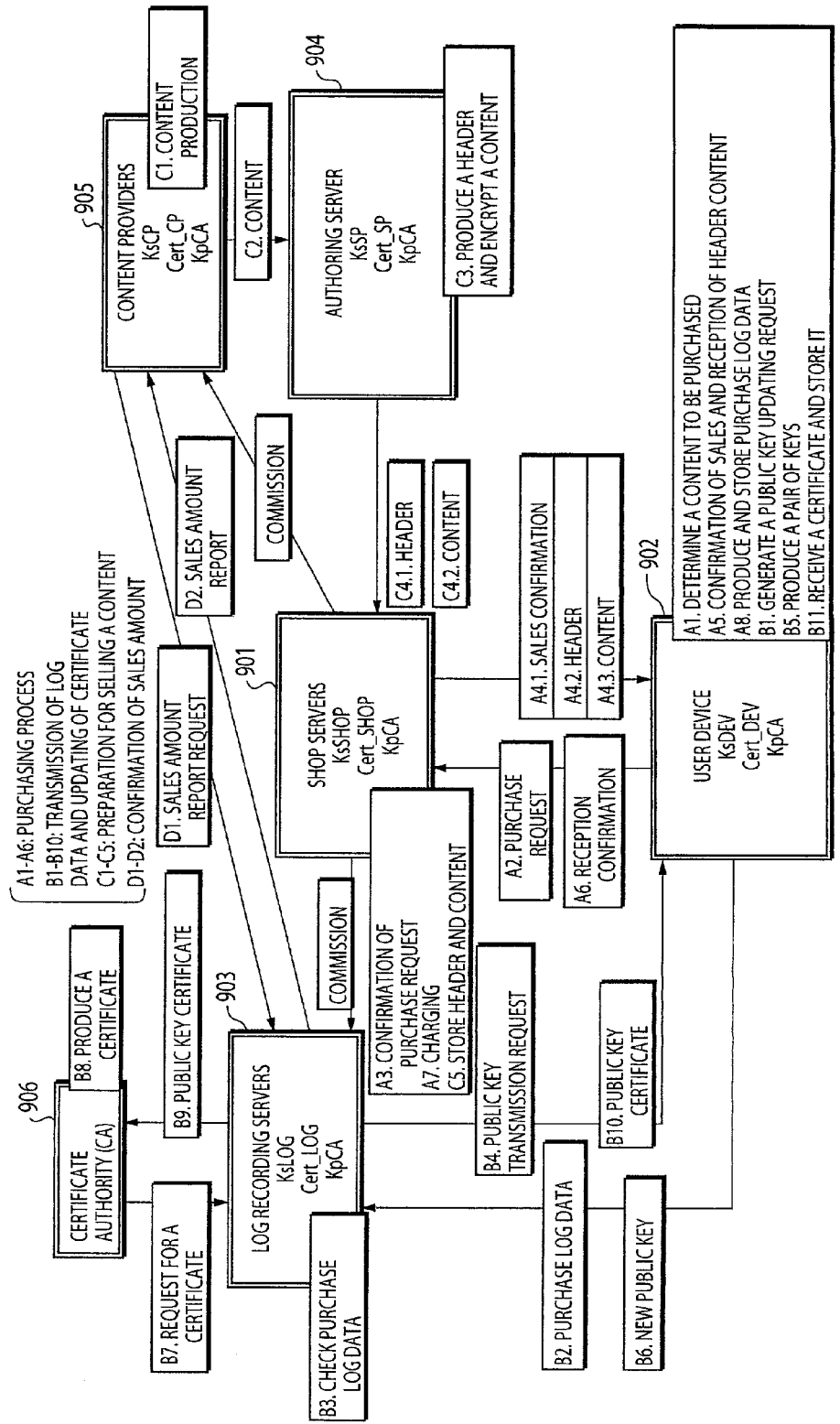
FIG. 54 is a diagram illustrating a content delivery process in which a log recording server is used according to the present invention.

FIG. 54 illustrates a content delivery system including a log recording system. As shown in FIG. 54, this content delivery system consists mainly of a shop server (SHOP) 901 for providing a content to a user device, a user device (DEVICE) 902 which receives the content from the shop server 901, and a log recording server 903 which records a log associated with a content transaction thereby managing the content transaction. The content delivery system further includes a content provider 905 which provides content, an authoring server 904 which generates various kinds of information such as use restriction information associated with a content received from the content provider 905, adds the generated information as a header to the content, and provides the resultant data to the shop server 901, and A certificate authority (CA) which issues a public key certificate (Cert_xxx) for an entity.

In the system shown in FIG. 54, the content provider 905 and the authoring server 904 are examples of entities which provide content, to be distributed, to the shop server 901. Note that the manner of providing content to the shop server is not limited to that shown in FIG. 54, but may be provided to the shop server in various manners. For example, content may be provided by a content provider directly to a shop server. Alternatively, content may be provided by an author having a copyright thereof to a shop server via a plurality of service providers.

In the system shown in FIG. 54, for simplicity and ease of understanding, one content provider 905 is employed as a typical example of an entity having the right to receive a part of content sales money. In the system shown in FIG. 54, it is assured that the content provider 905 can receive a correct amount of money assigned to the content provider 905 in accordance with the content sales data managed on the basis of the log data recorded by the log recording server 903. In the case where the system shown in FIG. 54 includes another entity which also has the right to receive a part of the content sales money, that entity can also receive an amount of money assigned to it in accordance with the log data recorded by the log recording server 903.

In the system shown in FIG. 54, the shop server 901 is constructed in a similar manner to the shop server employed in the system shown in FIG. 1. That is, the shop server 901 includes a control unit capable of performing an encryption/decryption process and a communication process, whereby the shop server 901 performs a content transaction sequence with various devices and manages the status during the content transaction. The content provider 905 and the authoring server 904 also each include a control unit capable of performing an encryption/decryption process and a communication process, thereby performing a content transaction sequence with various devices and managing the status during the content transaction.

User Device

The user device 902 is similar in structure to that described above with reference to FIG. 7 and includes control means 230 (FIG. 7) capable of performing an encryption/decryption process and a communication process. However, the control means 230 of the present embodiment is different in that the control means 230 generates log data each time a content purchasing process is performed and stores the generated log data into the purchase management database 220.

Figure 55:
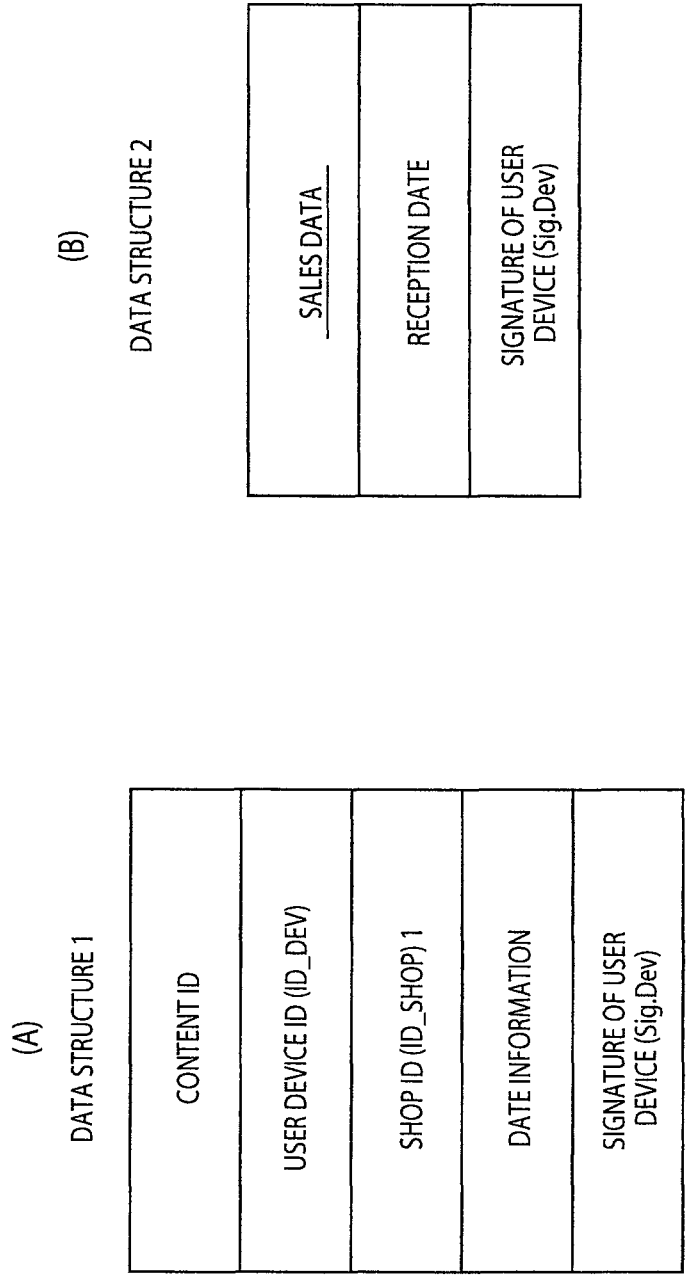
FIG. 55 is a diagram illustrating an example of the data structure of a purchase log in the content delivery system according to the present invention.

FIG. 55 illustrates two examples (A) and (B) of data structures of the log data generated by the user device 902 and stored therein. In the example shown in (A), the log data includes a content ID identifying content that the user device 902 has acquired from shop server 901 via a content transaction, a user device ID (ID_DEV) identifying the user device, a shop ID (ID_SHOP) identifying a shop with which the content transaction has been performed, and date information indicating a date on which the content transaction was performed. Furthermore, the log data includes a signature (Sig_Dev) written by the user device. When the log recording server receives a purchasing log from the user device, the log recording server verifies the digital signature written therein. In the example shown in (B) of FIG. 55, the log data includes sales data, reception date data indicating a date on which the content was received, and a signature (Sig_Dev) written by the user device. The sales data is generated by the shop server 901 in response to a content-purchasing request issued by the user device 902 so as to indicate that content has been sold. The sales data will be described in further detail later.

In the content purchasing process, the user device 902 generates log data such as that shown in FIG. 55 and stores it in the user device 902. The log data is also transmitted to the log recording server 903. More specifically, when the user device updates the public key certificate of the user device, the user device transmits the log data which has been stored by that time to the log recording server 903. The sequence of the above process will be described in further detail later.

Log Recording Server

Figure 56:
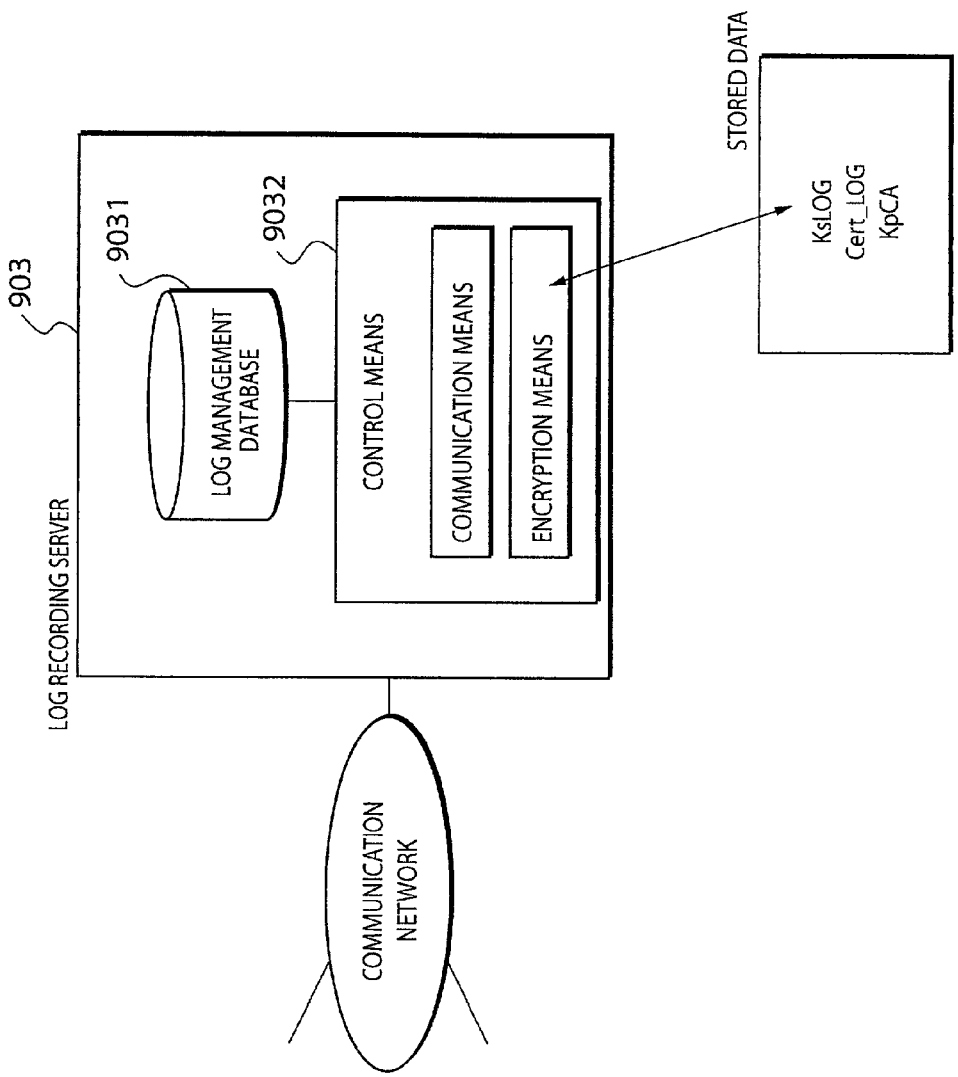
FIG. 56 is a diagram illustrating the construction of a log recording server in the content delivery system according to the present invention.

FIG. 56 illustrates the construction of the log recording server 903. As shown in FIG. 56, the log recording server 903 includes a log management database 9031. The log management database 9031 stores log data (FIG. 55) received from various user devices.

The log recording server 903 includes control means 9032 for communicating with a device such as the user device 902 or the shop server 901 and performing encryption/decryption during the communication. As with the control means of the shop server described above, the control means 9032 also serves as encryption/decryption means and communication means. The control means 9032 is constructed in a similar manner as described earlier with the reference to FIG. 4. Key data or the like used in the encryption process by the encryption means of the control means 9032 is stored in a secure manner in storage means in the control means. The data such as encryption keys, stored in the log recording server 903, for use in the encryption process include a secret key KsLOG of the log recording server 903, a public key certificate Cert_LOG of the log recording server 903, and a public key KpCA of a certificate authority (CA) which issues a public key certificate.

In response to receiving log data from the user device 902, the log recording server 903 performs a public key certificate issuing process. More specifically, when the log recording server 903 receives a public key to be used as an updated public key from the user device 902, the log recording server 903 transfers the received public key to the certificate authority 906 and requests the certificate authority 906 to issue a public key certificate. If the log recording server 903 receives the public key certificate issued by the certificate authority 906, the log recording server 903 transfers it to the user device 902. The sequence of this process will be descried in further detail later.

Content Purchasing Process

In the present embodiment, the process includes four parts as listed below and as also shown at the top of FIG. 54.

A. Content Purchasing Process
B. Transmission of Log and Updating of Public Key Certificate
C. Preparation for Content Sales
D. Checking of Sales Amount Each of these parts of the process is described below.

A. Content Purchasing Process

Figure 57:
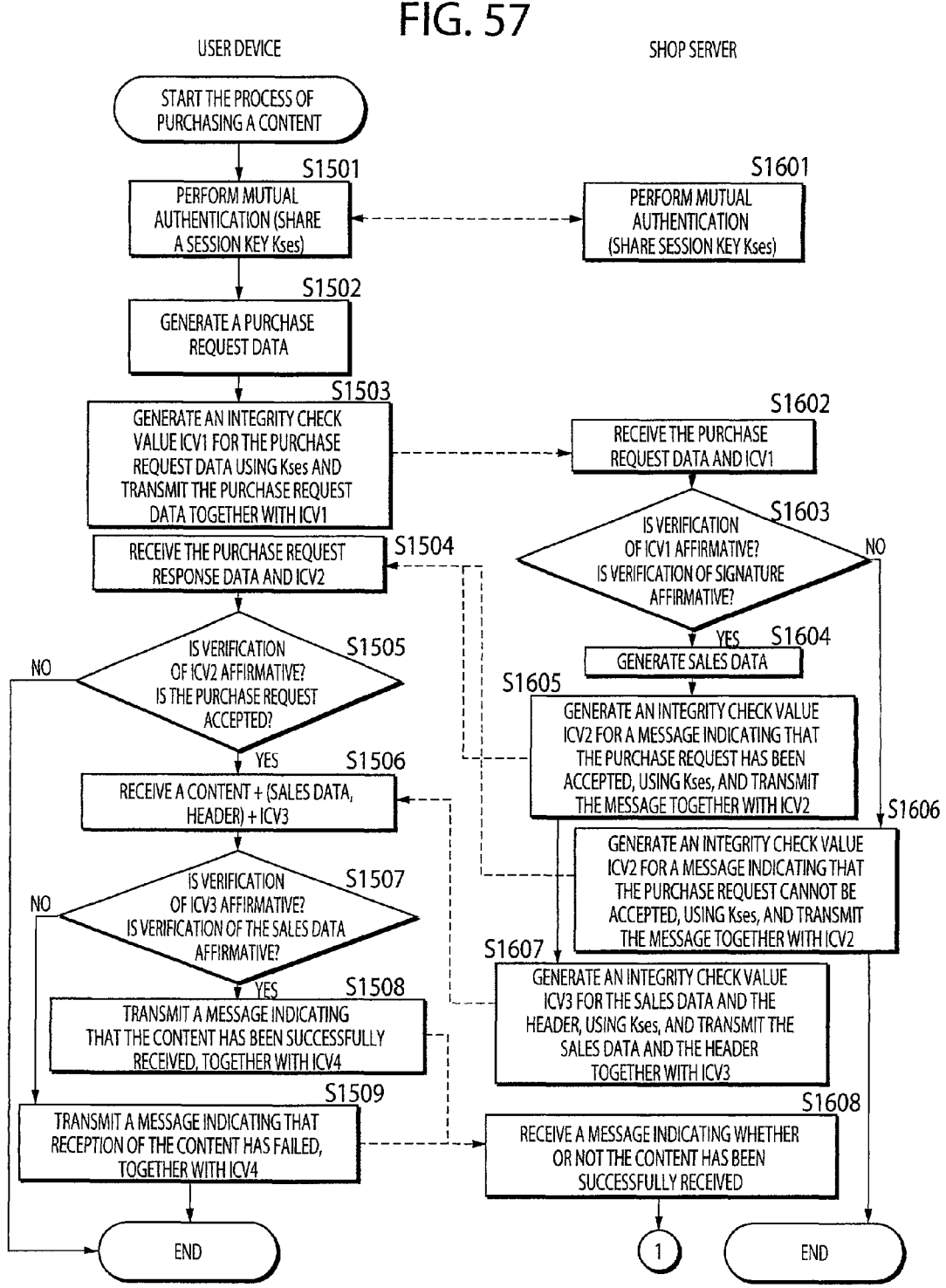
FIG. 57 is a diagram illustrating the process flow (Part 1) between the user device and the shop server in the content delivery system according to the present invention.
Figure 58:
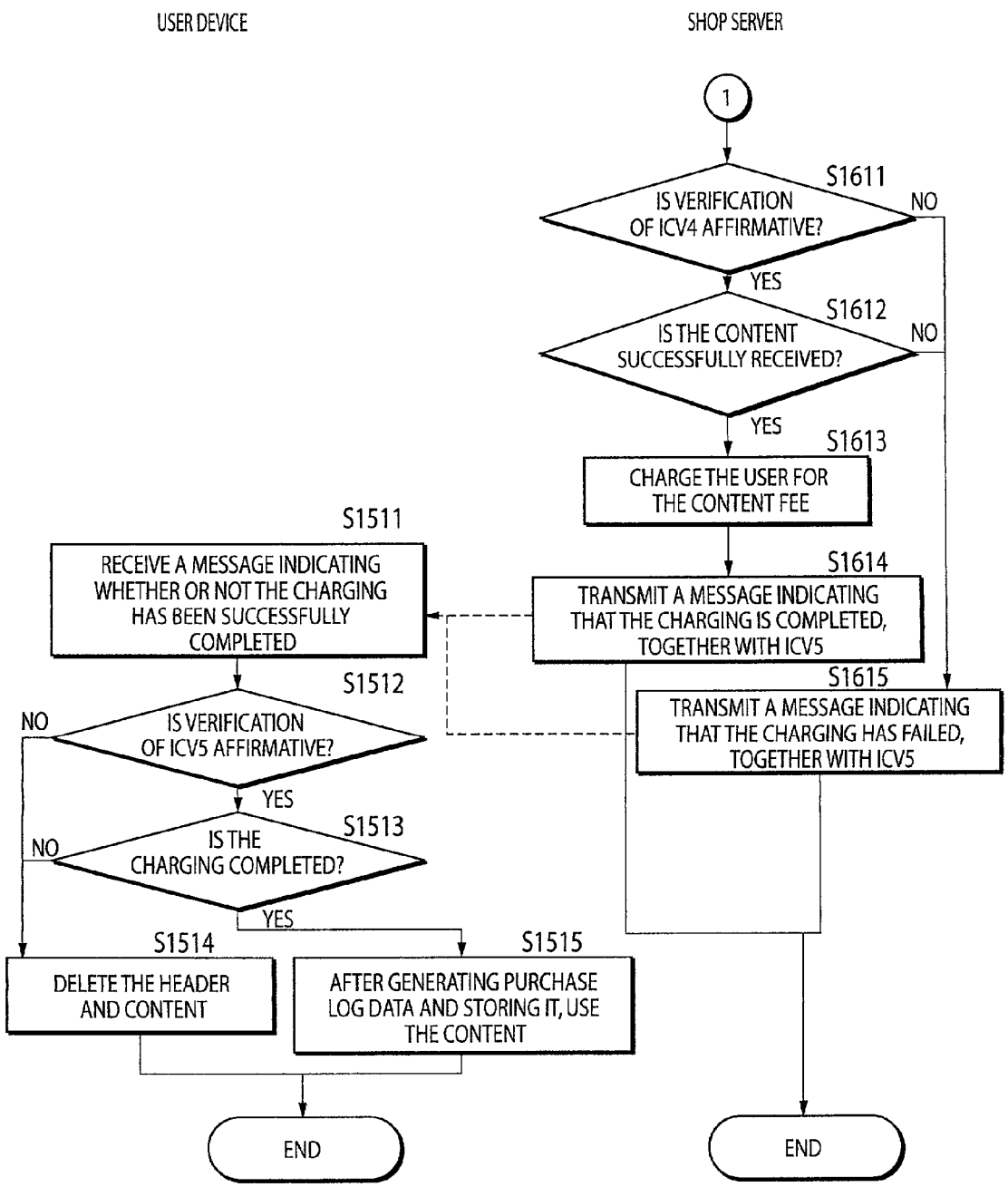
FIG. 58 is a diagram illustrating the process flow (Part 2) between the user device and the shop server in the content delivery system according to the present invention.

The content purchasing process is performed as is described below with reference to the flow charts shown in FIGS. 57 and 58. In FIGS. 57 and 58, the process performed by the user device is shown on the left-hand side, and the process performed by the shop server is shown on the right-hand side. At the beginning of the process, as shown in FIG. 57, mutual authentication is performed between the shop server and the user device (steps S1501 and S1601).

The mutual authentication is performed using a public key in a similar manner as described above with reference to FIG. 13. More specifically, the mutual authentication is performed using a public key certificate issued by the certificate authority (CA) 906 and having a validity period assigned thereto. To pass the mutual authentication, the user device is required to have a public key certificate whose validity period has not yet expired. As will be described later, to update the public key certificate, it is required to transmit a log to the log recording server 903.

A session key Kses generated in the mutual authentication process is used, as required, to encrypt data in communication performed after the mutual authentication or to generate an ICV (Integrity Check Value). The generation of the ICV will be described in further detail later.

If mutual authentication is successfully passed, the user device generates, on the basis of, for example, a random number, a transaction ID applied to the present content transaction and generates a purchase request data (step S1502). FIG. 59 illustrates an example of a format of purchase request data.

The purchase request data includes the transaction ID (TID_DEV) described above, a content ID identifying a content, a user device ID (ID_DEV) identifying the user device, a content price, a date/time at which the purchase request was issued, and a signature (Sig.Dev) of the user device.

Furthermore, the user device generates an integrity check value (ICV1) of the purchase request data and transmits it to the shop server (step 1503). In the above process, the integrity check value (ICV) is determined by applying a hash function to the data to be checked in terms of integrity, such as ICV=hash(Kicv, C1, C2, . . . ), wherein Kicv is an ICV generation key, C1 and C2 are formation of the data to be checked in terms of integrity, and message authentication codes (MAC) of important information of the data to be checked are employed as C1 and C2.

Figure 60:
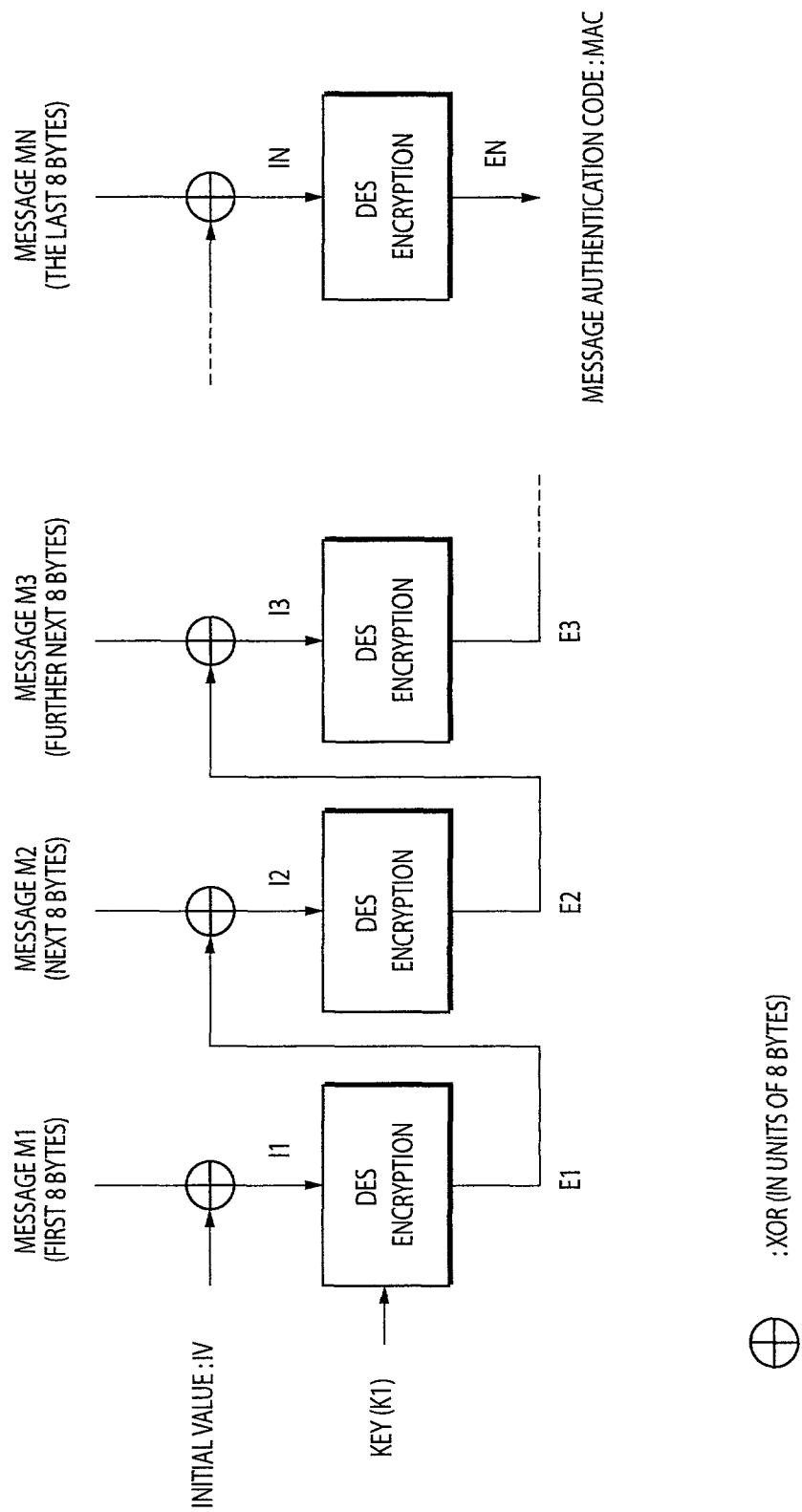
FIG. 60 is a diagram illustrating a process of generating an integrity check value (ICV) employable in the content delivery system according to the present invention.

FIG. 60 illustrates an example of a manner in which MAC values are generated using a DES encryption process. As shown in FIG. 60, a message of interest is divided into parts each consisting of 8 bytes (hereinafter, divided parts of the message are denoted by M1, M2, . . . , MN). First, the exclusive OR between an initial value (IV) and M1 is calculated (wherein the result is represented by I1). Thereafter, I1 is applied to a DES encryption unit to encrypt I1 using a key (K1) (wherein the encrypted output is denoted by E1). The exclusive OR between E1 and M2 is then calculated, and the result I2 is applied to the DES encryption unit to encrypt it using a key K1 (wherein the resultant output is denoted by E2). Thereafter, the above process is repeated until the all parts of the message are encrypted. The final output EN is employed as a message authentication code (MAC). In the above process, a part of the data to be checked is employed as the message.

The integrity check value (ICV) of the data is given by a MAC value generated using an ICV generation key Kicv. At the receiving device, the ICV is generated for the received data and compared with the ICV generated for the data guaranteed to be valid, such as the data generated by the transmitting device for the original data. If the comparison result indicates that the ICVs are equal, then it is determined that the data has not been tampered with. But if the ICVs are different, it is determined that the data has been tampered with.

Herein, the session key Kses generated in the mutual authentication process is employed as the ICV generation key. The user device generates the integrity check value (ICV1) for the purchase request data (FIG. 59) by using the session key Kses and transmits the purchase request data together with ICV1 to the shop server.

The shop server generates the integrity check value ICV1' by applying the session key Kses to the received data and compares it with ICV1 received from the user device to determine whether ICV1=ICV1'. If ICV1=ICV1', it is determined that the data has not been tampered with. Furthermore, the shop server verifies the digital signature written in the purchase request data (step S1603). The verification of the digital signature is performed using the public key of the user device. The public key is extracted from the public key certificate Cert_DEV of the user device. Herein, it is required that the validity period of the public key certificate has not expired. If the validity period of the public key certificate has expired, the shop server does not use the public key certificate in the verification of the signature, and the purchase request is rejected. If the check of the ICV and the verification of the signature are both passed successfully, the shop server generates sales data (step S1604).

The sales data has a data structure such as that shown in FIG. 59. The sales data includes a transaction ID (TID_SHOP) generated by the shop server, a shop ID (ID_SHOP)

the shop, a sales date/time, and management fee information indicating the amount of fee for the sold content to be paid to the manager. Herein, the manager refers to a managing entity (system holder) of the content sales system. In the example shown in FIG. 54, the manager is an entity which manages the log recording server 903.

The sales data also includes the amount to be paid to the content provider. The sales data also includes the purchase request data (FIG. 59), and a signature (Sig.SHOP) of the shop is written in the sales data.

In the data format of the sales data shown in FIG. 59, the gains sharing information described in the sales data includes only information indicating the amounts to be paid to two entities, that is, the system holder (SH) who operates the system and the content provider (CP). However, if there are further entities who receive amounts to be paid, such entities are also described.

If the sales data is generated after passing the check of the ICV and the verification of the signature (step S1604), the shop server generates purchase request acceptance data including a message indicating that the purchase request has been accepted, and generates the integrity check value (ICV2) for the purchase request acceptant data, using the session key Kses. The purchase request acceptance data and the associated integrity check value (ICV2) are transmitted to the user device (step S1605). In the case where either the check of the ICV or the verification of the signature fails, the shop server generates purchase request rejection data including a message indicating that the purchase request has been rejected, and generates the integrity check value (ICV2) for the purchase request rejection data, using the session key Kses. The purchase request rejection data is transmitted together with the integrity check value ICV2 to the user device (step S1606).

In the case where the shop server has transmitted the purchase request acceptance data to the user device, the shop server also transmits, to the user device, the sales data (FIG. 59), the header (information associated with the content, including information indicating the manner of using the content) with the integrity check value (ICV3) generated using the session key Kses, and the content (step S1607).

If the user device receives the content, the purchase request response (acceptance or rejection) data, and the integrity check value ICV2 (step S1504), the user device verifies ICV2 and checks the purchase request response (step S1505). If the check of ICV2 indicates that the data has not been tampered with, and if the purchase request has been accepted, the user device receives the sales data (FIG. 59) and the header (information associated with the content, including information indicating the manner of using the content) with the integrity check value (ICV3) (step S1506). The user device checks ICV3 and verifies the signature written in the sales data. If ICV3 and the signature are both valid, the user device transmits, to the shop sever, a content reception acknowledgement response together with an associated integrity check value ICV4.

However, if the answer of decision step S1507 is no, the process jumps to step S1509 in which the user device transmits, to the shop server, a content reception failure response together with an associated integrity check value ICV4.

If the shop server receives the content reception response (acknowledgement or negative-acknowledgment) and the associated integrity check value ICV4 (step S1608), the shop server checks ICV4 (step S1611). In the case where the response from the user device indicates that the content has been successfully received by the user device, the shop server charges the user device for the sold content (step S1613). The charging process is performed, as in the previous embodiment, by receiving a specified amount from an account of the user device or a credit card account. After the charging process, the shop server transmits a charging completion message together with an associated integrity check value ICV5 to the user device (step S1614). In the case the answer is no either in step S1611 or S1612, the process jump to step S1615. In step S1615, the shop server transmits a charging-failure message together with an associated integrity check value ICV5 to the user device.

If the user device receives the charging completion (or charging-failure) message and the associated integrity check value ICV5, the user device checks ICV5 and determines whether the charging has been successfully completed. If it is determined that the charging has been successfully completed, the user device generates a purchase log(FIG. 55) and stores it into a memory of the user device. Thereafter, the user device uses the content. In the case the answer is no, either in step S1512 or S1513, the process jumps to step S1514. In step S1514, the user device deletes the header and the content received from the shop server.

Figure 61:
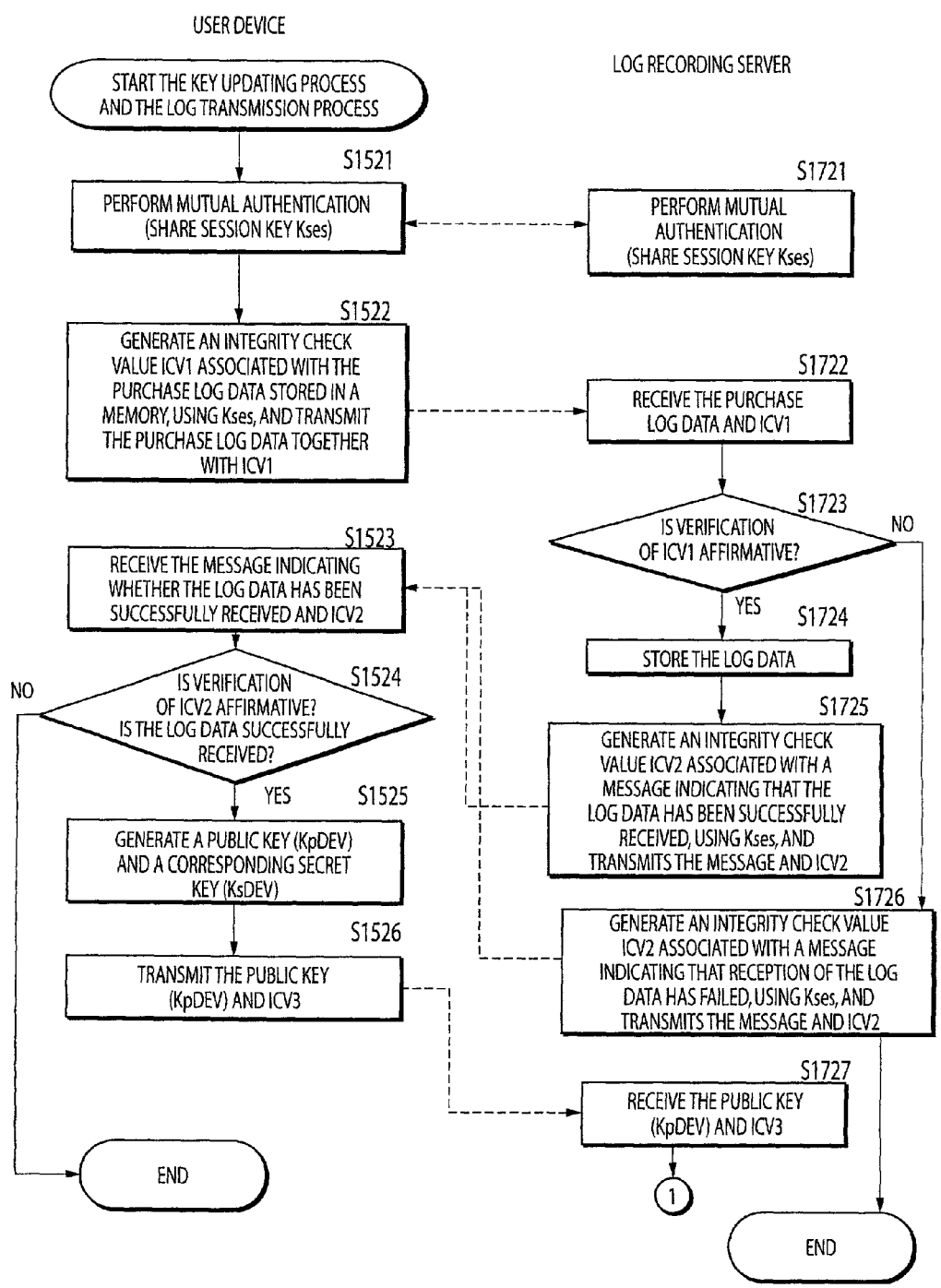
FIG. 61 is a diagram illustrating the process flow (Part 1) between the user device and the log recording server in the content delivery system according to the present invention.
Figure 62:
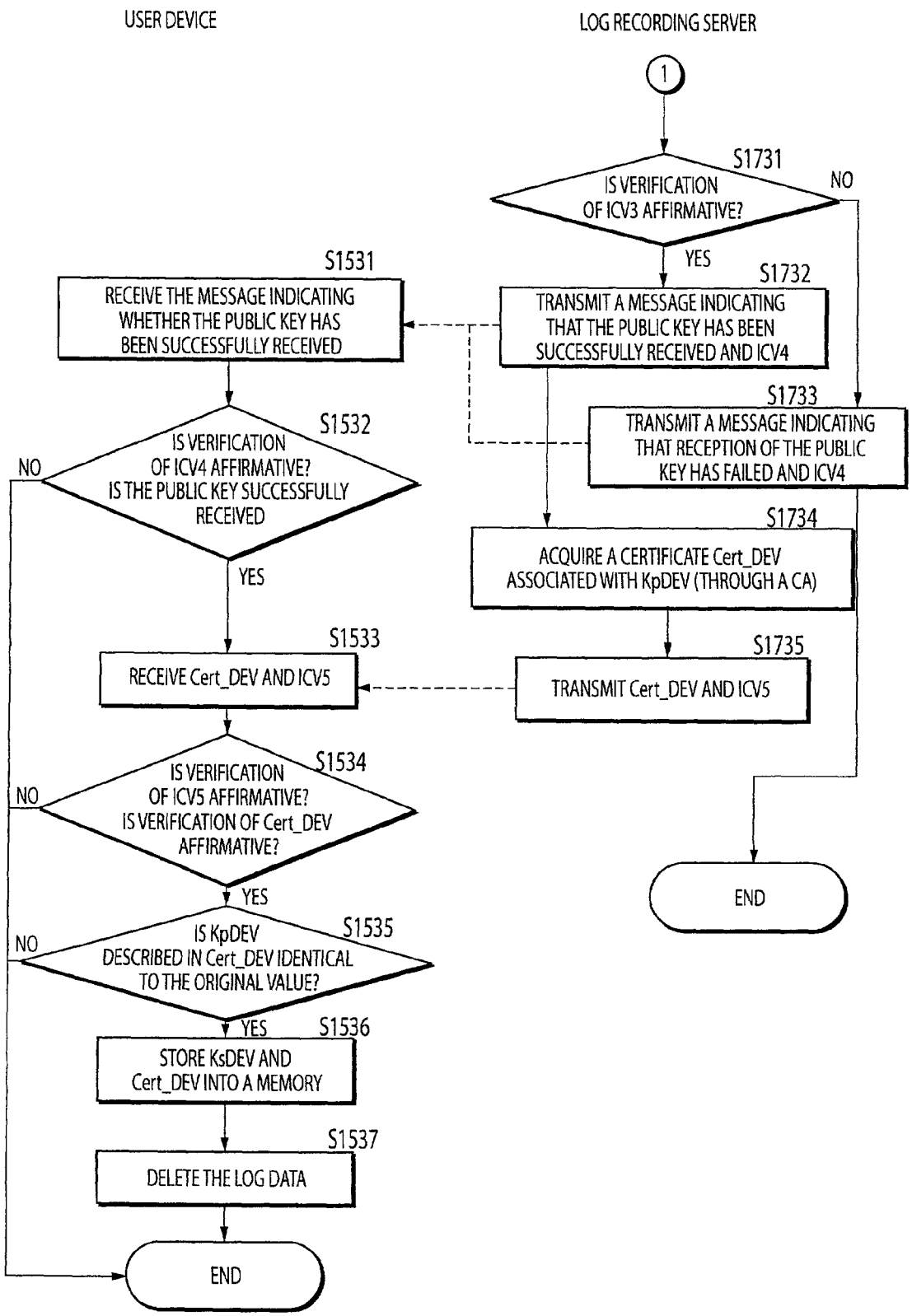
FIG. 62 is a diagram illustrating the process flow (Part 2) between the user device and the log recording server in the content delivery system according to the present invention.

Referring to FIGS. 61 and 62, the key updating process and the log transmission process performed between the user device and the log recording server are described. In FIGS. 61 and 62, the process performed by the user device is shown on the left-hand side, and the process performed by the log recording server is shown on the right-hand side. These processes are performed when the user device, which wants to purchase content from the shop server, updates the public key certificate of the user device stored in the user device. The public key certificate of the user device is valid only during a specified validity period, and thus it is required to update the public key certificate at particular intervals. First, the process shown in FIG. 61 is described.

First, mutual authentication is performed between the user device and the log recording server (steps S1521 and S1721) and a session key is generated. If the mutual authentication is successfully passed, the user device reads the purchase log from the memory of the user device and transmits the purchase log together with an associated integrity check value (ICV1) generated using the session key Kses to the log recording server (step S1522).

If the log recording server receives the purchase log and the associated integrity check value ICV1 (step S1722), the log recording server checks ICV1 (step S1723). If the ICV1 is valid, the log recording server stores the received purchase log into the database (step S1724). The log recording server may further verify the digital signature written by the user device in the purchase log to confirm that the purchase data has not been tampered with. The log recording server then transmits log reception acknowledgement data together with an associated integrity check value ICV2 generated using the session key Kses to the user device (step S1725). However, if the verification of ICV1 in step S1723 fails, the log recording server transmits a log acceptance failure message together with an associated integrity check value ICV2 generated using the session key Kses to the user device (step S1726).

If the user device receives the log reception message and the associated integrity check value ICV2 (step S1523), the user device verifies the integrity check value ICV2. If ICV2 is valid and if the log reception message indicates that the log data has been successfully received by the log recording server (step S1524), the user device generates a public key (KpDEV) to be employed as an updated public key and a corresponding secret key (KsDEV) (step S1525) and transmits the generated public key (KpDEV) together with an associated integrity check value (ICV3) to the log recording server (step S1526).

If the log recording server receives the public key (KpDEV) and the associated integrity check value ICV3 from the user device (step S1727), the log recording server verifies the integrity check value ICV3 (step S1731). If the verification is successfully passed, the log recording server transmits a public key reception acknowledgement message together with an associated integrity check value ICV4 to the user device (step S1732). However, if the verification indicates that the integrity check value ICV3 is invalid, the log recording server transmits a public key reception failure message together with an associated integrity check value ICV4 to the user device (step S1733).

In the case where the log recording server has transmitted the public key reception acknowledgment message together with the associate integrity check value ICV4 to the user device (step S1732), the log recording server transmits the received public key to the certificate authority (CA) and requests the certificate authority to issue a public key certificate. If the log recording server receives the updated public key certificate (Cert_DEV) of the user device (step S1734), the log recording server transmits the updated public key certificate (Cert_DEV) together with an associated integrity check value ICV5 to the user device (step S1735).

If the user device receives the public key reception acknowledgement/failure message and the associated integrity check value ICV4, the user device verifies the integrity check value ICV4. If the integrity check value ICV4 is valid, and if the public key has been successfully received by the log recording server (step S1532), the user device receives updated public key certificate together with the associated integrity check value ICV5 (step S1533) and verifies the integrity check value ICV5 and the received public key certificate (step S1534). If the verification for both the integrity check value ICV5 and the public key certificate is successfully passed, the user device extracts the public key from the public key certificate and compares it with the original public key that the user device transmitted (step S1535). If the received public key is the same as the original public key, the user device stores the secret key corresponding to the updated public key and the received public key certificate into the memory of the user device (step S1536). The user device then deletes the log (which has been transmitted to the log recording server) (step S1537).

In the case where the answer is no in one of decision steps S1532, S1534 and S1535, the public key certificate is not updated and the process is terminated.

Figure 63:
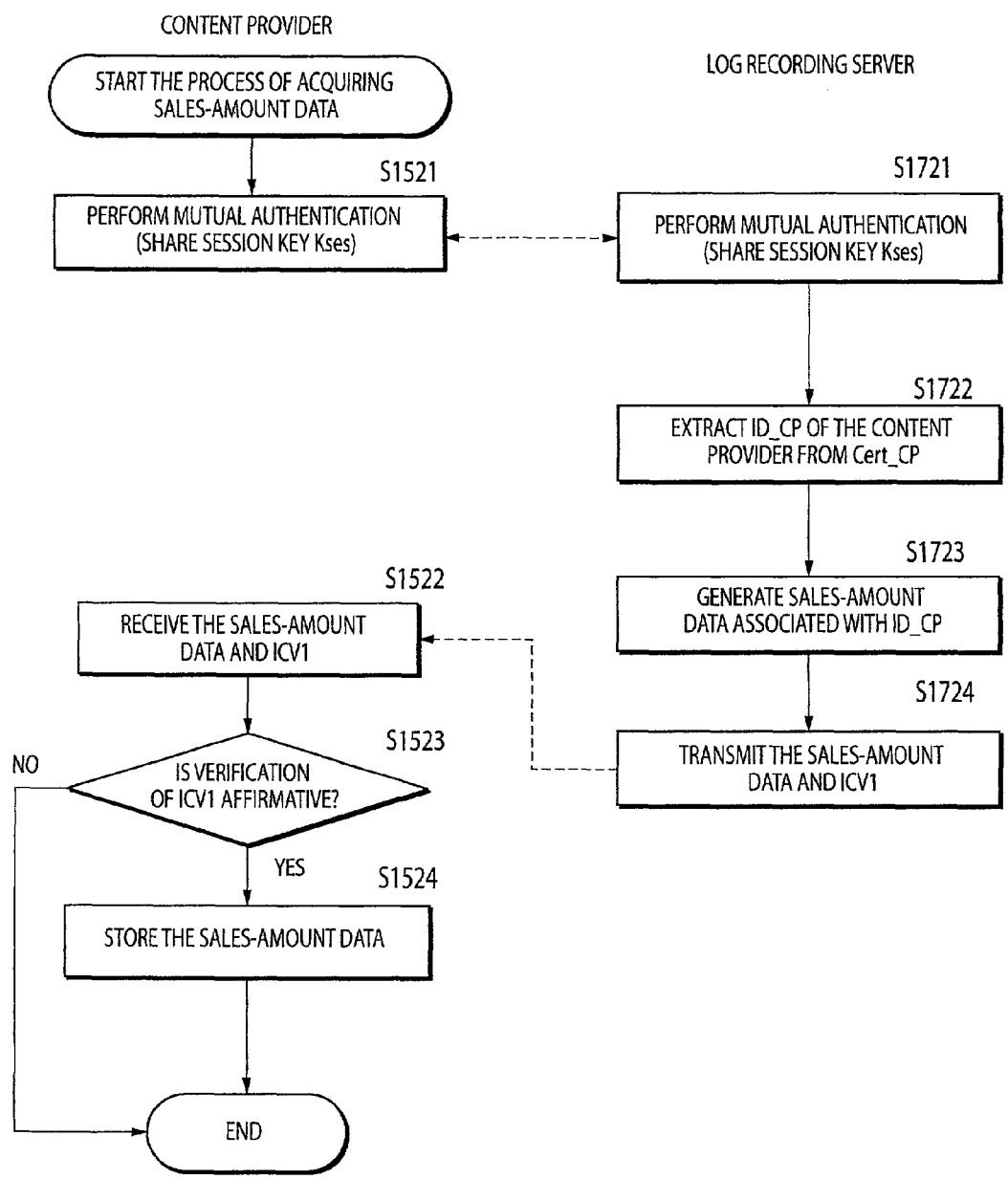
FIG. 63 is a diagram illustrating the process flow between the content provider and the log recording server in the content delivery system according to the present invention.

Now, a process performed between the content provider and the log recording server to check the sales amount is described below with reference to the flow chart shown in FIG. 63. The log recording server stores sales money sharing information indicating the manner in which money received as the fee for the content is to be given to one entity or shared among a plurality of entities in accordance with the purchase log received from the user device. In response to receiving a sales-amount notification request, the log recording server transmits a response message in accordance with the sales money sharing information. The log recording server can calculate the amount of money to be paid to the respective entities for the sold content on the basis of the content ID described in the purchase log and on the basis of the sharing information. In the case where the log data received by the log recording server includes the sales data as shown in FIG. 55, the log recording server can calculate the amounts of money to be paid to the respective entities on the basis of the information described in the sales data.

First, mutual authentication is performed between the content provider and the log recording server (steps S1521 and S1721) and a session key Kses is generated. If the mutual authentication is successfully passed, the log recording server extracts the identifier ID_CP of the content provider from the public key certificate Cert_CP of the content provider (CP) (step S1722) and generates sales-amount data indicating the amount of money to be paid to the content provider indicated by ID_CP, on the basis of the log information stored in the database (step S1723). As described above, the acquired log data includes data indicating the amounts of money to be paid to the content providers, and the amounts of money to be paid to the respective content providers are determined according therewith. The log recording server transmits the sales-amount data together with an associated integrity check value ICV1 to the content provider (CP) (step S1724).

If the content provider (CP) receives the sales-amount data and the associated integrity check value ICV1 from the log recording server (step S1522), the content provider (CP) checks the integrity check value ICV1 to confirm that the data has not been tampered with (step S1523) and stores the sales-amount data into the memory (step S1524). If the verification of the integrity check value ICV1 indicates that the data has been tampered with, the data is not stored into the memory and the process is terminated. In this case, the content provider (CP) re-transmits a sales-amount data request to the log recording server.

Figure 64:
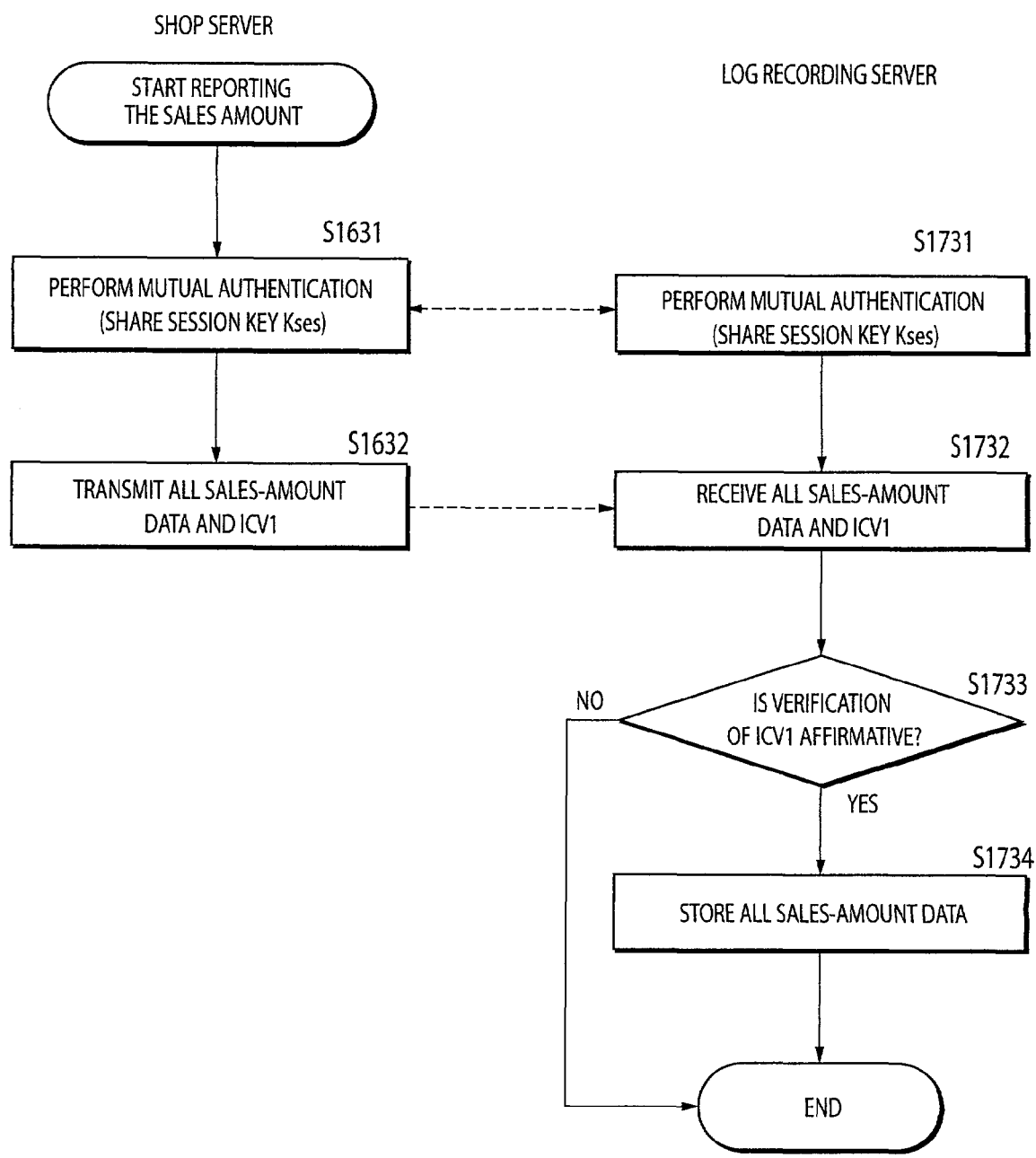
FIG. 64 is a diagram illustrating the process flow between the shop server and the log recording server in the content delivery system according to the present invention.

Now, referring to the flow charts shown in FIGS. 64 and 65, the sales amount reporting process performed among the shop server, the log recording server and the content provider is described below. The shop server stores and manages data indicating the content sales amounts. The shop server transmits all data indicating sales amounts for a particular period or transmits data indicating the sales amount for each entity. FIG. 64 illustrates the process in which all data indicating the content sales transactions performed by the shop server are transmitted to the log recording server. FIG. 65 illustrates the process in which data indicating the sales amount of content provided by a particular content provider is selectively transmitted to the content provider.

The process shown in FIG. 64 is first described. First, mutual authentication is performed between the shop server and the log recording server (steps S1631 and S1731), and a session key Kses is generated. If the mutual authentication is successfully passed, the shop server reads all sales-amount data for a particular period and transmits them together with an associated integrity check value ICV1 to the log recording server (step S1632).

If the log recording server receives all sales-amount data and the associated integrity check value ICV1 from the shop server (step S1732), the log recording server verifies the integrity check value ICV1 to confirm that the data have not been tampered with (step S1733). After the confirmation, the log recording server stores the all sales-amount data in the memory (step S1734). However, if the verification of the integrity check value ICV1 indicates that the data is invalid, the process is terminated without storing the data in the memory. In this case, the log recording server re-requests the shop server to transmit the sales-amount data.

Referring now to FIG. 65, the process of transmitting sales-amount data for a particular content provider is described. First, mutual authentication is performed between the shop server and the content provider (steps S1641 and S1741), and a session key Kses is generated. If the mutual authentication is successfully passed, the shop server reads the identifier ID_CP of the content provider from the public key certificate Cert_CP, obtained through the mutual authentication process, of the content provider (step S1642). The shop server retrieves the sales-amount data on the basis of the extracted identifier ID_CP to obtain the sales-amount data of the contents provided by that specific content provider (step S1643). The shop server then transmits the sales-amount data together with an associated integrity check value ICV1 to the log recording server (S1644).

If the log recording server receives the sales-amount data and the associated integrity check value ICV1 from the shop server (step S1742), the log recording server verifies the integrity check value ICV1 to confirm that the data has not been tampered with (step S1743). After the confirmation, the log recording server stores the sales-amount data into the memory (step S1744). However, if the verification of the integrity check value ICV1 indicates that the data has been tampered with, the process is terminated without storing the data into the memory. In this case, the log recording server re-requests the shop server to transmit the sales-amount data.

In this system, it is possible to acquire content purchase log data in response to updating of a public key certificate of a user device, and thus it is ensured that a system holder who manages the log recording server can know the actual status concerning the content sales. The public key certificate of the user device is needed in the mutual authentication with the shop server, wherein, in order to purchase content, it is required that the validity period of the public key certificate has not expired. Furthermore, because verification of a signature written on purchase request data or the like issued by the user device is performed using a public key extracted from the public key certificate, it is also required that the user device should have a public key certificate which has not yet expired. That is, in order to purchase content, the user device needs to transmit log data to the log recording server, and the user device needs to update the public key certificate before the expiration of the validity period of the public key certificate. The validity period of the public key certificate may be set to, for example, one month or three months, so that the system holder who manages the log recording server can accumulate log data during the specified validity period.

Thus, it is ensured that the system holder of the log recording server can acquire the log data from the user device and thus it becomes possible to monitor and manage the status of the content sales. Furthermore, it is possible to correctly pay the shared amounts of money to the respective payees such as a content provider in accordance with the gains sharing information described in the log data.

Furthermore, in the present embodiment, an integrity check value (ICV) for data to be transmitted between entities is generated using, as a generation key, a session key Kses generated in the mutual authentication, and the data is transmitted together with the generated integrity check value (ICV) thereby achieving high security in the data transmission.

Although in the embodiment described above, the mutual authentication between the user device and the shop server, the generation of the signature, and the verification of the signature are all performed, only one of these processes may be performed. For example, either the mutual authentication, the generation of the signature, or the verification of the signature may be performed. In this case, the public key certificate which has not yet expired is needed when one of the processes is performed.

4. Use of an Attribute Certificate or a Public Key Certificate Including Attribute Data A manner of using an attribute certificate of a public key certificate including attribute data is described below. In a content delivery system configured in one of the manners described above, there is a possibility that a shop holder fraudulently behaves as a user device and performs a fraudulent content transaction. There is also a possibility that a fraudulent content transaction is performed between a content provider and a shop. Furthermore, when a user device initiates communication with some server with the intention of performing an authorized transaction, if the server fraudulently behaves as if it were an authorized shop server, then there is a possibility that when the user device transmits data indicating the credit account number of the user device to the fraudulent server for the purpose of purchasing content, the server fraudulently acquires the credit account number of the user device. There is also a possibility that a user device behaves as if it were a shop to fraudulently sell content to another user device. Such fraudulent behavior makes it difficult for the system to know the actual status of content distribution.

An attribute certificate or a public key certificate including attribute data can be used to prevent such a fraudulent transaction, as is described below.

The attribute data refers to data indicating the type of an entity which is a member of a content delivery system, such as a user device (DEVICE), a shop (SHOP), a content provider (CP), a system holder (SH), or a certificate authority, which issues an authorized public key certificate or attribute certificate.

FIG. 66 is a table illustrating some examples of data described in attribute data. As shown in FIG. 66, different codes are assigned to respective entities. For example, "0000" is assigned to a certificate authority, which receives a request for issuing a public key certificate or an attribute certificate from a user device of a shop and examines the request. The code "0001" is assigned as an attribute code, for example, to a service provider or a system holder who receives a license fee for content distributed over a content delivery system. In the examples described earlier, the service provider is an entity that operates a user device authentication server, that performs a key conversion process or an entity which operates a log information recording server, which acquires and records log information.

Similarly, "0002" is assigned to a shop which sells content to a user device, "0003" to a content provider, that is, an entity that operates a content delivery server, to deliver content to a user in response to a request issued by a shop (content seller), and "0004" to a user device that purchases content and uses it. In addition, different codes are assigned to other entities associated with content delivery, depending upon the types of entities. It is not necessarily required that only one code be assigned to shops. If there are shops that are different in role or function, different codes may be assigned depending upon the role or function so as to distinguish them. Similarly, different attribute codes may be assigned to user devices depending upon some category.

Figure 67:
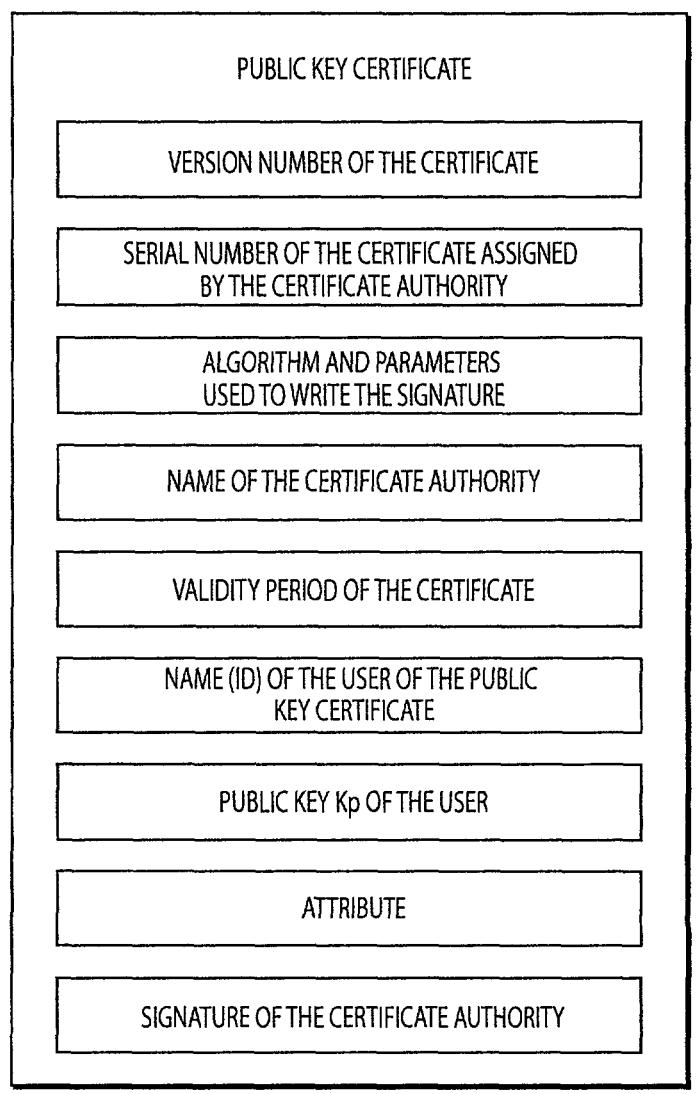
FIG. 67 is a diagram illustrating a public key certificate including attribute information, employable in the content delivery system according to the present invention.

Attribute information may be described in a public key certificate. Alternatively, attribute information may be described in an attribute certificate which is issued separately from a public key certificate. FIG. 67 illustrates an example of a format of a public key certificate including attribute information.

In the example shown in FIG. 67, the public key certificate includes a version number of the certificate, a serial number of the certificate assigned to a user of the certificate by a public key certificate authority (CA), an algorithm and parameters used to write a digital signature, the name of the certificate authority, a validity period of the certificate, a name (such as a user device ID) of the user of the certificate, a public key of the user of the certificate, attribute information described above such as "0000", "0001", . . . , "nnnn", and a digital signature. The serial number of the certificate may be represented, for example, by a total of 16 bytes including 4 bytes indicating the year, 2 bytes indicating the month, 2 bytes indicating the day on which the certificate is issued, plus 8 bytes of serial number. The name of the user may be a name given by the certificate authority or may be given by a random number or a serial number. Alternatively, the name of the user may be represented by high-order bytes indicating a category plus low-order bytes indicating a serial number.

The digital signature is data which is generated by applying a hash function to the whole data including the version number of the certificate, the serial number of the certificate assigned to the user of the certificate by the public key certificate authority (CA), the algorithm and the parameters used to write the digital signature, the name of the certificate authority, the validity period of the certificate, the name of the user of the certificate, the public key of the user of the certificate, and the attribute data, and then encrypting the resultant hash value using the secret key of the certificate authority.

The public key certificate authority (CA) issues a public key certificate such as that shown in FIG. 67, updates a public key certificate when the validity period thereof has expired, and generates, manages and distributes a list of users who have made fraud to expel them (this process is called revocation).

When a user uses a public key certificate, the user verifies the digital signal written on the public key certificate, using the public key KpCA, held by the user, of the certificate authority. If the verification is successfully passed, the user extracts the public key from the public key certificate and uses the extracted public key. Therefore, it is required that any user who wants to use a public key certificate have the common public key of the public key certificate authority.

Figure 68:
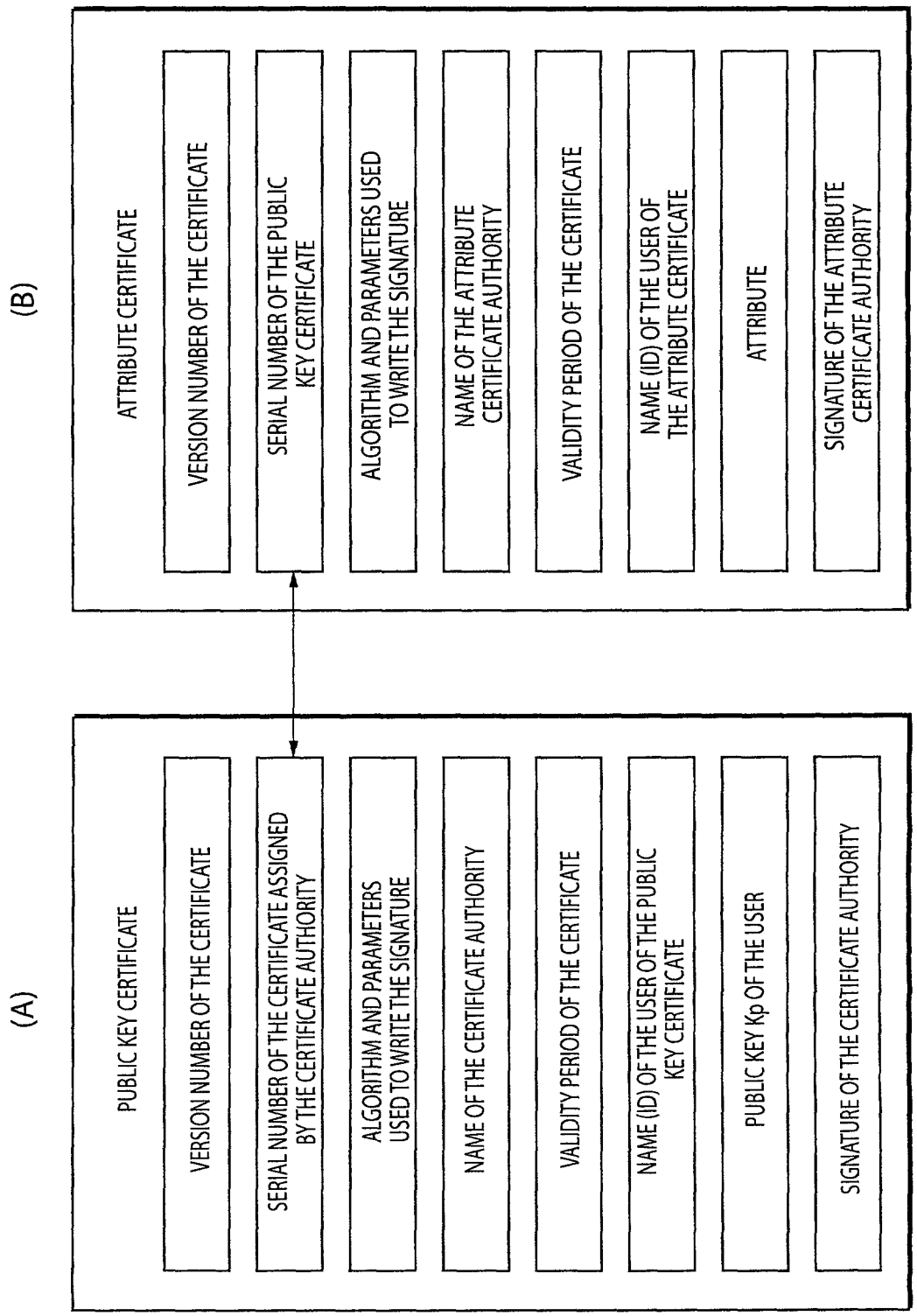
FIG. 68 is a diagram illustrating a public key certificate and an attribute certificate, employable in the content delivery system according to the present invention.

FIG. 68 illustrates a data format of a public key certificate including no attribute information, and illustrates a data format of an attribute certificate. As shown in FIG. 68, the public key certificate having no attribute information consists of data included in the public key certificate shown in FIG. 67 other than attribute information. This type of public key certificate is also issued by a public key certificate authority. On the other hand, the attribute certificate is issued by an attribute certificate authority (AA).

The attribute certificate shown in FIG. 68 includes a version number of the certificate and a serial number of a public key certificate corresponding to the attribute certificate issued by the attribute certificate authority (AA). The serial number is the same as the serial number of the corresponding public key certificate so that the serial number serves as a link to link both certificates to each other. When an entity wants to use an attribute certificate to check the attribute of another entity with which communication is being performed, the entity first confirms that the attribute certificate is one linked to the public key certificate by checking that the attribute certificate has the same serial number as that of the public key certificate, and then the entity reads the attribute information from the attribute certificate. The serial number of the certificate may be represented, for example, by a total of 16 bytes including 4 bytes indicating the year, 2 bytes indicating the month, 2 bytes indicating the day on which the certificate is issued, plus 8 bytes of serial number. The attribute certificate further includes an algorithm and a parameter used to write a digital signature, a name of the attribute certificate authority, a validity period of the certificate, and a name (such as a user device ID) of the user of the certificate. The name of the user of the certificate is the same as that of the public key certificate, wherein the name is determined in a distinguishable form by the certificate authority. The name of the user of the certificate may also be given by a random number or a serial number. Alternatively, the name of the user of the certificate may be represented by high-order bytes indicating a category plus low-order bytes indicating a serial number. The attribute certificate further includes attribute information such as "0000", "0001", . . . , "nnnn" and a digital signature of the attribute certificate authority (AA).

The digital signature is generated by applying a hash function to the whole data including the version number of the certificate, the serial number of the public key certificate, the algorithm and the parameter used to write the digital signature, the name of the certificate authority, the validity period of the certificate, the name of the user of the certificate, and the attribute data, thereby generating a hash value and then encrypting the resultant hash value using the secret key of the attribute certificate authority.

The attribute certificate authority (AA) issues an attribute certificate such as that shown in FIG. 68, updates an attribute certificate when the validity period thereof has expired, and generates, manages and distributes a list of users who have made fraud to expel them (this process is called revocation).

Figure 69:
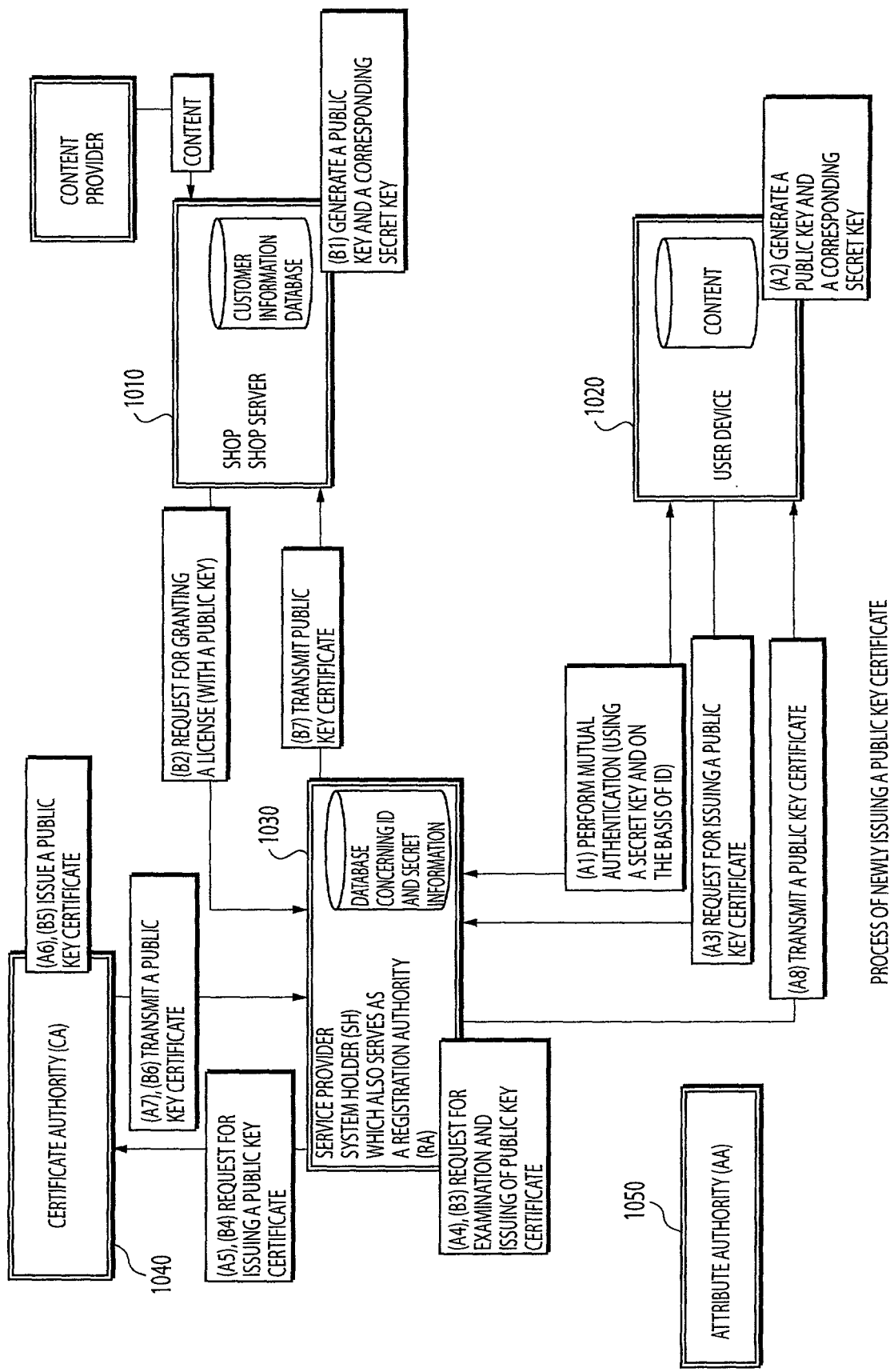
FIG. 69 is a diagram illustrating a process of newly issuing a public key certificate, performed in the content delivery system according to the present invention.

FIG. 69 illustrates a process of newly issuing public key certificates used by a new user device and a new shop server which participate in a content transaction. Herein, a shop server 1010 and a user device 1020 are assumed to have similar constructions to those described earlier with reference to FIG. 1. A service provider or a system holder (SH) 1030 manages the whole content delivery process. In particular, the service provider performs the content key conversion process described above and acquires log information, which is generated by a user device when the user device purchases content, thereby monitoring the status of content distribution. In this example shown in FIG. 69, the service provider also serves as a registration authority (RA), which receives and examines a request for issuing a public key certificate or an attribute certificate from a shop server 1010 or a user device 1020. Although in the present system shown in FIG. 69, the service provider 1030 functions as a system holder (SH) and as a registration authority (RA), these functions may be implemented separately by different entities.

In FIG. 69, the procedure associated with the issuing of a new public key certificate to the user device 1020 includes steps (A1) to (A8), and the procedure associated with the issuing of a new public key certificate to the shop server 1010 includes steps (B1) to (B7). First, the procedure of newly issuing a public key certificate to the user device 1020 is described.

(A1) Mutual Authentication

First, mutual authentication is performed between the user device 1020 and the service provider 1030. However, at this point of time, the user device 1020 does not yet have a public key certificate, and thus the user device 1020 cannot use a public key certificate in the mutual authentication. For this reason, mutual authentication is performed on the basis of the symmetric key cryptography described earlier with reference to FIG. 12. That is, the mutual authentication is performed using a common secret key and identifiers (ID) (see FIG. 12 for details of the process).

A. (A2) Generation of a Public Key and a Corresponding Secret Key, (A3) Request for Issuing a Public Key Certificate, (A4) Examination of Request and Request for Issuing a Public Key Certificate, and (A5) Request for Issuing a Public Key Certificate After the mutual authentication, the user device 1020 generates a public key to be registered and a corresponding secret key, using an encryption unit of the user device 1020, and transmits a certificate-issuing request together with the generated public key to the server provider 1030. Upon receiving the request for issuing the public key certificate, the service provider 1030 examines the request. If it is determined that the user device 1020 satisfies conditions which should be satisfied by an entity which wants to obtain a public key certificate, the service provider 1030 transmits a certificate-issuing request to a public key certificate authority (CA) 1040. In the above process, if the public key certificate to be issued should include attribute information as shown in FIG. 68, the service provider 1030 determines the entity that has issued the certificate-issuing request, on the basis of the ID thereof.

A user device which participates in content delivery has a user device identifier (ID) and a secret key (secret information) that have been stored in advance, wherein the user device ID and the secret key are managed by the service provider 1030. The service provider 1030 examines the secret information database on the basis of the ID received from the user device to confirm that the user device ID has already been registered. After the confirmation, the service provider 1030 extracts the secret key and performs mutual authentication with the user device using the extracted secret key in the manner shown in FIG. 12. The service provider 1030 determines that the user device is an authorized device and allowed to participate in the content delivery only when the mutual authentication is successfully passed.

(A6) Issuing of Public Key Certificate, (A7) Transmission of Public Key Certificate, and (A8) Transmission of Public Key Certificate If the public key certificate authority 1040 receives the request for issuing a public key certificate from the service provider 1030, the public key certificate authority 1040 issues a public key certificate (in the form shown in FIG. 67 or FIG. 68) including a public key of the user device and a digital signature of the public key certificate authority 1040. The resultant public key certificate is transmitted to the service provider 1030. The service provider 1030 transfers the public key certificate received from the public key certificate authority 1040 to the user device 1020. The user device 1020 stores the received public key certificate and the secret key generated in step (A2) into the user device 1020 so that the public key certificate can be used in mutual authentication, data encryption, data decryption, or the like.

The process of issuing a public key certificate to the shop server 1010 is basically similar to the process of issuing a public key certificate to the user device, except that the shop server 1010 is needed to be authorized as a content-selling entity by the service provider 1030. To this end, the shop server 1010 needs to transmits the public key of the shop server 1010 to the service provider 1030 and requests the service provider 1030 to give a license (B2 in FIG. 69). The license is given only if the shop server 1010 agrees to obey the content sales policy established by the service provider 1030. If the service provider 1030 determines that the shop server 1010 has the capability of selling content in accordance with the policy established by the service provider 1030 and if the shop server 1010 agrees to obey the policy, the service provider 1030 performs a process necessary to issue a public key certificate to the shop server 1010. The following process for issuing the public key certificate is similar to the above-described process for issuing a public key certificate to the user device.

The process of updating a public key certificate is described below with reference to FIG. 70. As shown in FIG. 67 or FIG. 68, a public key certificate is valid only during a specified period. If the validity period of a public key certificate has expired, an entity cannot use that public key certificate. Therefore, it is required to perform an updating process before expiration of the current public key certificate to obtain a public key certificate having an updated validity period.

Figure 70:
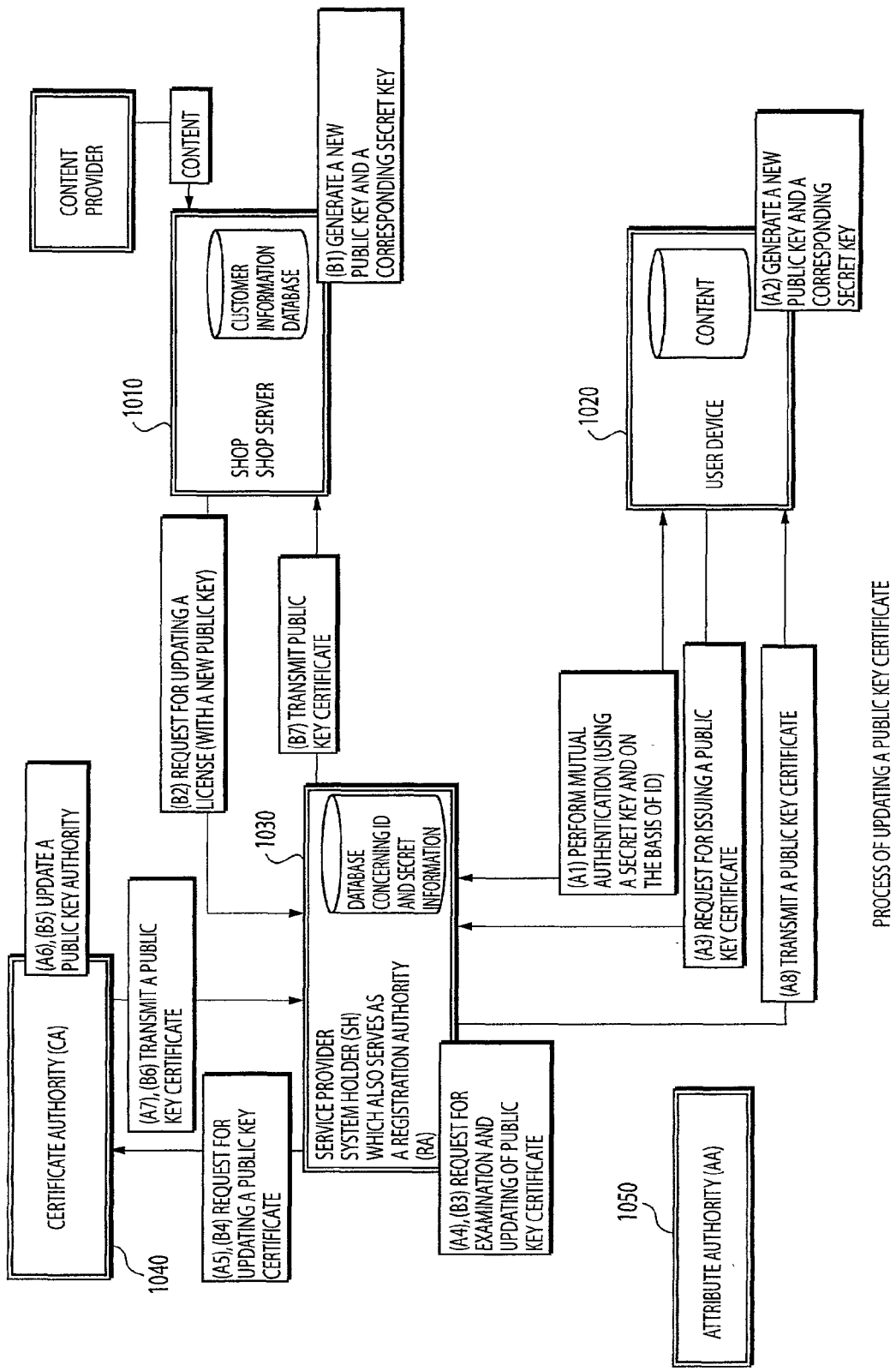
FIG. 70 is a diagram illustrating a process of updating a public key certificate, performed in the content delivery system according to the present invention.

In FIG. 70, the procedure for updating the public key certificate of the user device 1020 includes steps (A1) to (A8), and the procedure for updating the public key certificate of the shop server 1010 includes steps (B1) to (B7). First, the procedure of updating the public key certificate of the user device 1020 is described.

(A1) Mutual Authentication

First, mutual authentication is performed between the user device 1020 and the service provider 1030. At this time, the user device 1020 already has a currently-valid public key certificate, and thus the mutual authentication is performed using the public key certificate in a similar manner as described earlier with reference to FIG. 13. However, if the public key certificate of the user device 1020 has expired, the mutual authentication may be performed using the common secret key on the basis of identifiers (ID) in a similar manner to the mutual authentication performed in the process of issuing a new public key certificate as described above with reference to FIG. 12.

(A2) Generation of New Public Key and Corresponding Secret Key, (A3) Request for Updating the Public Key Certificate, (A4) Examination of Request and Request for Updating the Public Key Certificate, and (A5) Request for Updating Public Key Certificate After the successful mutual authentication, the user device 1020 generates a public key to be employed in an updated certificate and a corresponding secret key, using an encryption unit of the user device 1020, and transmits a certificate-updating request together with the generated public key to the server provider 1030. Upon receiving the request for updating the public key certificate, the service provider 1030 examines the received updating request. If necessary requirements are satisfied, the service provider 1030 transmits a certificate-updating request to the public key certificate authority (CA) 1040. In the above process, if the public key certificate to be issued should include attribute information as shown in FIG. 68, the service provider 1030 determines the entity, which has issued the certificate-issuing request, on the basis of the ID thereof.

(A6) Updating of the Public Key Certificate, (A7) Transmission of the Public Key Certificate, and (A8) Transmission of the Public Key Certificate If the public key certificate authority 1040 receives the request for updating the public key certificate from the service provider 1030, the public key certificate authority 1040 issues a public key certificate (in the form shown in FIG. 67 or FIG. 68) including the new public key of the user device and a digital signature of the public key certificate authority 1040. The resultant public key certificate is transmitted to the service provider 1030. The service provider 1030 transfers the public key certificate received from the public key certificate authority 1040 to the user device 1020. The user device 1020 stores the received public key certificate and the secret key generated in step (A2) into the user device 1020 so that the public key certificate can be used in mutual authentication, data encryption, data decryption, or the like.

The process performed to update the public key certificate of the shop server 1010 is basically similar to the process for the public key certificate of the user device, except that updating of the license is necessary ((B2) in FIG. 70). If the service provider 1030 determines that the updating of the license to the shop server 1010 will be allowed, the service provider 1030 performs the following process necessary to update the public key certificate of the shop server 1010. The following process performed to update the public key certificate is similar to the above-described process for the user device.

Figure 71:
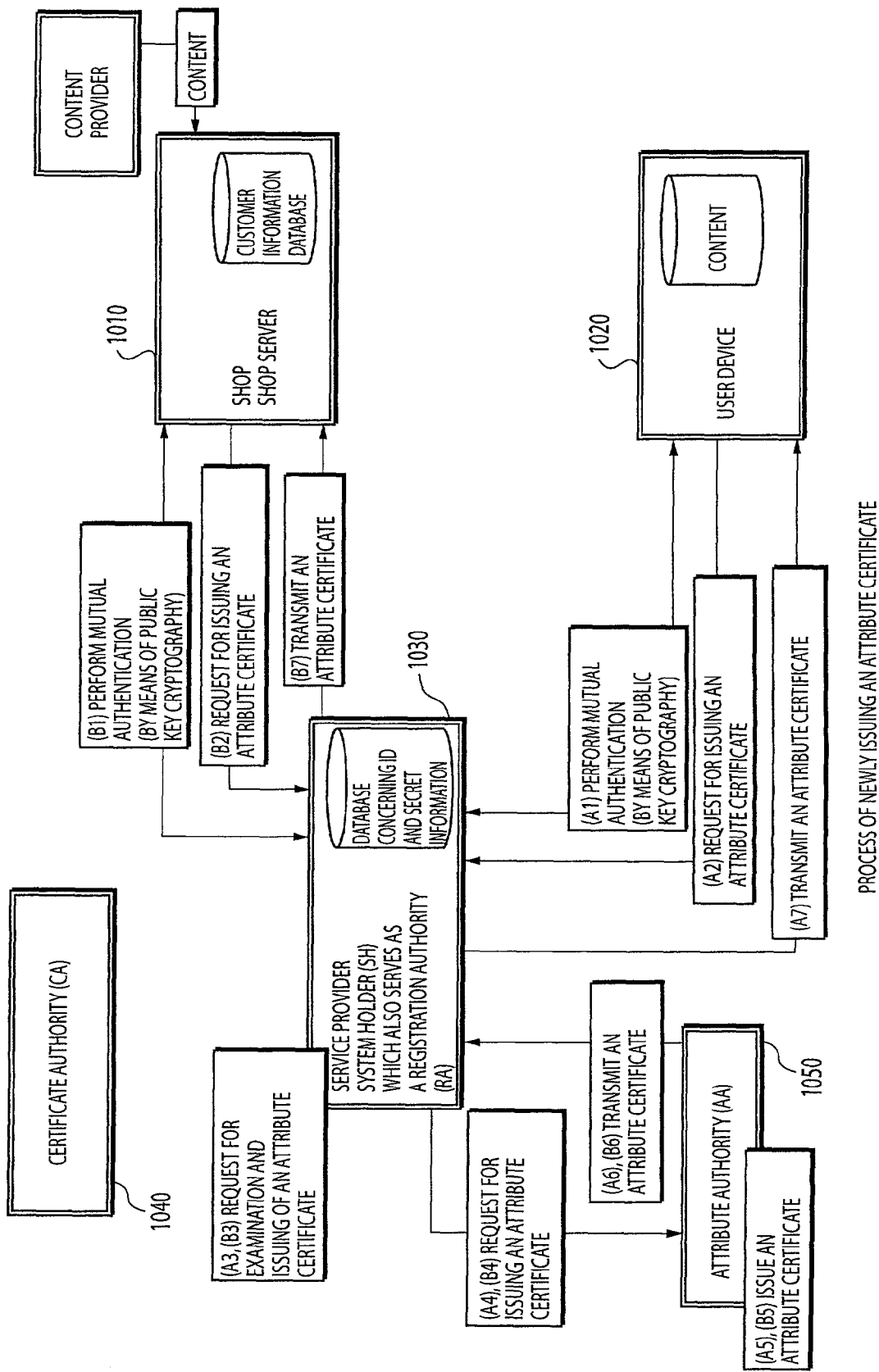
FIG. 71 is a diagram illustrating a process of newly issuing an attribute certificate, performed in the content delivery system according to the present invention.

Referring to FIG. 71, the process of newly issuing an attribute certificate is described. Herein, the attribute certificate is assumed to have the form shown in FIG. 68. This attribute certificate is issued after issuing a public key certificate in the form shown in FIG. 68. In FIG. 71, the procedure associated with issuing of a new attribute certificate to the user device 1020 includes steps (A1) to (A7), and the procedure associated with issuing of a new attribute certificate to the shop server 1010 includes steps (B1) to (B7). First, the procedure of newly issuing an attribute certificate to the user device 1020 is described.

(A1) Mutual Authentication

First, mutual authentication is performed between the user device 1020 and the service provider 1030. At this point of time, the user device 1020 already has a public key certificate issued by the public key certificate authority, and thus the mutual authentication is performed using the public key certificate.

(A2) Request for Issuing Attribute Certificate, (A3) Examination of Request and Request for Issuing Public Key Certificate, and (A4) Request for Issuing Attribute Certificate If mutual authentication is successfully passed, the user device 1020 transmits a request for issuing an attribute certificate to the service provider 1030. In response to receiving the request for issuing the attribute certificate, the service provider 1030 checks the received request. If the received request is determined to satisfy the requirements which should be satisfied by the entity, the service provider 1030 transmits a certificate-issuing request to the attribute certificate authority (AA) 1050. In the above checking process, the service provider 1030 checks the attribute of the entity that has transmitted the certificate-issuing request, on the basis of the ID of the entity. As described earlier, any user device which participates in content delivery has its own user device identifier (ID) that has been stored in advance, wherein the user device ID is managed by the service provider 1030. The service provider 1030 compares the user device ID received from the user device with the user device ID registered in the service provider 1030 to check whether the user device is an authorized device, which is allowed to participate in the content delivery.

(A5) Issuing of Attribute Certificate, (A6) Transmission of Attribute Certificate, and (A7) Transmission of Attribute Certificate Upon receiving the request for issuing the attribute certificate from the service provider 1030, the attribute certificate authority 1050 issues an attribute certificate (FIG. 68B) including attribute information of the user device and a digital signature of the attribute certificate authority 1050 and transmits it to the service provider 1030. The service provider 1030 transmits the attribute certificate received from the attribute certificate authority 1050 to the user device 1020. The user device stores the received attribute certificate into the user device so that the attribute certificate can be used in an attribute verification process during a content transaction.

The process ((B1) to (B7)) performed to issue an attribute certificate to the shop server 1010 is basically similar to the process performed to a public key certificate to the user device, Furthermore, updating of the attribute certificate of the server 1010 is performed in a similar manner to the process for issuing a new attribute certificate.

The process of performing a content transaction, including the checking of an attribute using an attribute certificate or using a public key certificate including attribute information, is described below.

Figure 72:
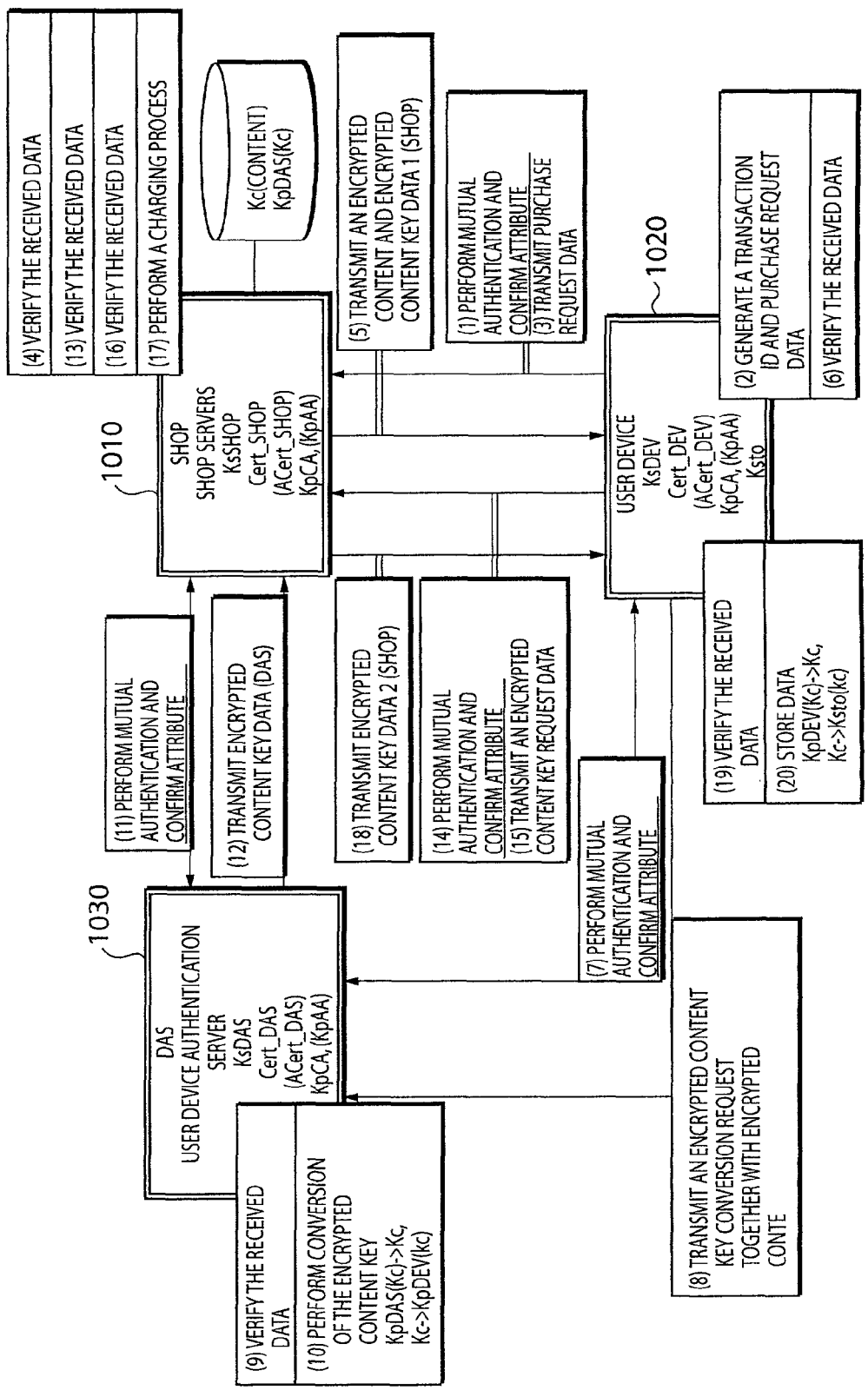
FIG. 72 is a diagram illustrating a content delivery process including a step of checking an attribute, performed in the content delivery system according to the present invention.

FIG. 72 illustrates the process in which attribute verification is performed when mutual authentication is performed. The system configuration shown in FIG. 72 is similar to that shown in FIG. 1. That is, the system shown in FIG. 72 includes a shop server 1010 which sells content, a user device 1020 that purchases the content, and a user device authentication server 1030 that operates under the control of the service provider described above. In FIG. 72, the process proceeds in the order of process steps from (1) to (20), as will be described below.

(1) Mutual Authentication and Attribute Verification

When the user device 1020 wants to purchase content from the shop server 1010, mutual authentication is first performed between the user device 1020 and the shop server 1010. In the mutual authentication, it is determined whether the two devices, between which data is to be transmitted, are correct devices. If the mutual authentication is successfully passed, data transmission is started. Preferably, a session key is generated during the mutual authentication, and data is encrypted using the session key as a common key during the following data transmission process. The mutual authentication on the basis of a public key is performed such that the signature of the certificate authority of the public key certificate is first verified, then the public key of the entity at the opposite end is extracted, and the authentication is performed using the extracted public key, as described in detail earlier with reference to FIG. 13.

Thereafter, in the present embodiment, attribute verification is performed. In the case where attribute data is included in a public key certificate of a device the shop server 1010 is communicating with, the shop server 1010 confirms that the attribute information indicates that the device the shop server 1010 is communicating with is a user device. In the case where no attribute data is included in the public key certificate, the shop server 1010 checks the attribute using the attribute certificate. The attribute certificate includes a digital signature written by the attribute certificate authority using the secret key thereof. The shop server 1010 verifies the digital signature written in the attribute certificate, using the public key KpAA of the attribute certificate authority to confirm that the certificate is valid. After confirming that the serial number and/or the user ID described in the attribute certificate are the same as the serial number and/or the user ID described in the public key certificate, the shop server 1010 examines the attribute information described in the certificate.

On the other hand, in the user device 1010, if attribute data is included in a public key certificate of a device the user device 1020 is communicating with, the user device 1020 confirms that the attribute information indicates that the device the user device 1020 is communicating with is a shop server. In the case where attribute data is not described in the public key certificate, an attribute certificate is used to check the attribute. In this case, the user device 1020 verifies a digital signature written in the attribute certificate, using the public key KpAA of the attribute certificate authority to confirm that the certificate is valid. Furthermore, the user devices 1020 confirms that the serial number and/or the user ID described in the attribute certificate are the same as the serial number and/or the user ID described in the public key certificate. Thereafter, the user device 1020 examines the attribute information described in the certificate.

If the shop server 1010 confirms that the entity which has issued the content-purchasing request is a user device by checking the attribute information described in the public key certificate or the attribute certificate of that entity, and if the user device 1020 confirms that the entity to which the content-purchasing request has been transmitted is a shop by checking the attribute information described in the public key certificate or the attribute certificate of that entity, in the above-described manner, then the process can proceed to the next step.

Figure 73:
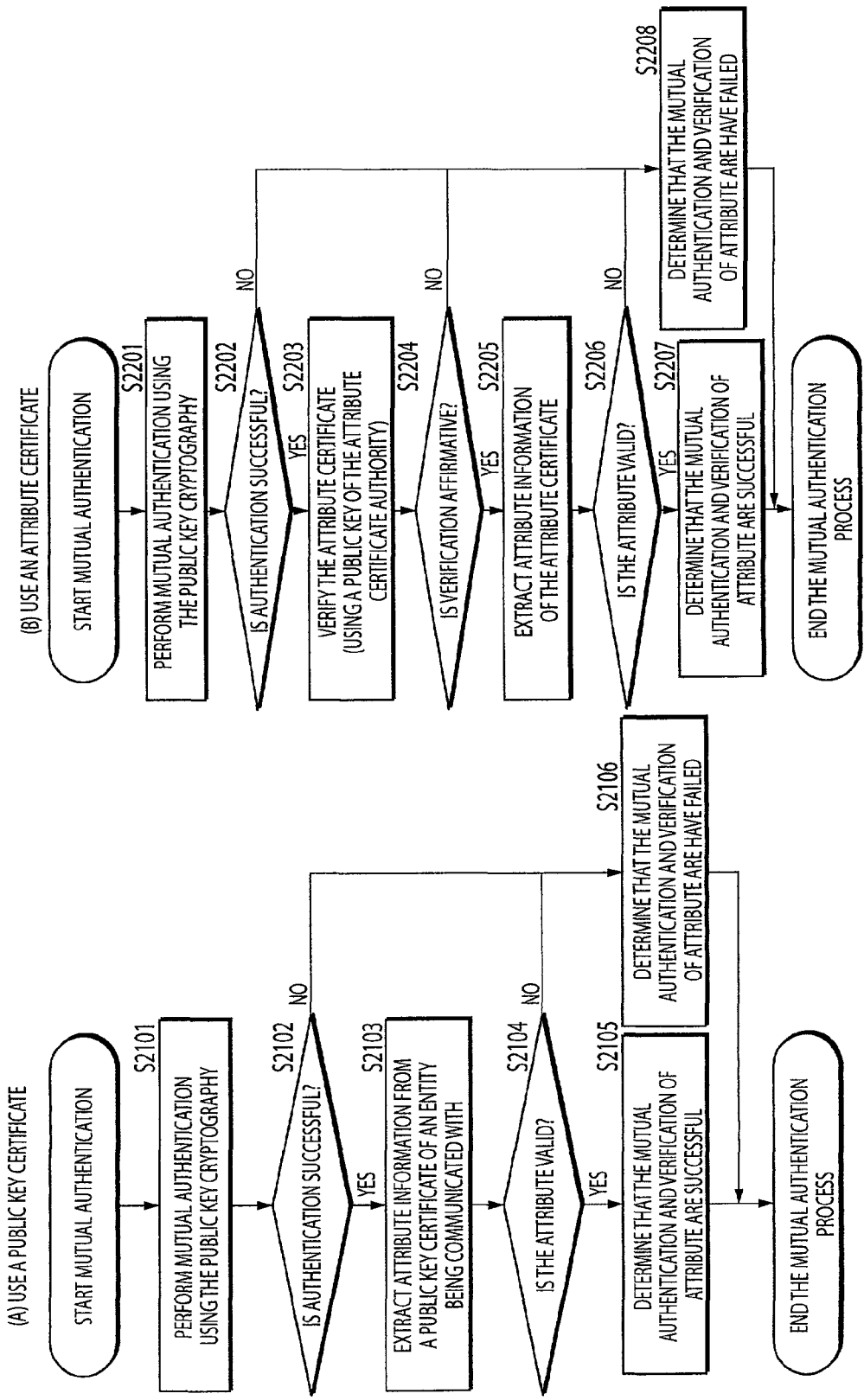
FIG. 73 is a diagram illustrating a mutual authentication process including a step of checking an attribute, performed in the content delivery system according to the present invention.

FIG. 73 shows flow charts illustrating an attribute-checking process using a public key certificate including attribute data, and an attribute-checking process using an attribute certificate.

First, the attribute-checking process using a public key certificate is described. First, in step S2101, mutual authentication is performed (FIG. 13) using a public key certificate. If the mutual authentication is successfully passed (if the answer in step S2102 is yes), attribute information is extracted from the public key certificate of the device with which communication is being performed. If the attribute information is valid (if the answer in step S2104 is yes), it is determined that the mutual authentication and the attribute verification have been successfully passed (step S2105), and the process proceeds to a next step. Herein, for example, in the case where a user device gets access to a shop server to purchase a content, the attribute is regarded as being valid if the attribute is "shop", but the attribute is regarded as being invalid if the attribute has an attribute code other than that of the "shop". More specifically, in the case where a content-purchase request is issued to a shop server, the step of comparing attribute codes is included in the content-purchasing requesting sequence (processing program). In the attribute code comparison step, code "0002" assigned to "shop" is compared with the attribute code described in the public key certificate or the attribute certificate of the entity with which communication is being performed. If the codes match with each other, the attribute is regarded as being valid, but the attribute is regarded as being invalid if they do not match with each other. Alternatively, the attribute code extracted from the public key certificate or the attribute certificate of the entity with which communication is being performed is displayed on a display device so that the human user can determine whether the displayed attribute code is identical to the one the entity should have. If the answer of decision step S2102 or S2104 is no, it is determined that the mutual authentication or the attribute verification has failed (step S2106), and the process is terminated.

On the other hand, when the key conversion request sequence (program) is executed by a user device with a user device authentication server, the attribute code extracted from the public key certificate or the attribute certificate of the entity with which communication is being performed is examined for whether it matches with "0001", which is a code assigned to "user device authentication server". Similarly, when a process sequence (program) is executed in a communication between entities assumed to be of particular types, such as between a shop and a user device authentication server, the attribute code extracted from the public key certificate or the attribute certificate of an entity with which communication is being performed is examined to determine whether it matches with an expected code.

Now, the process of using an attribute certificate is described below with reference to FIG. 73. First, in step S2201, mutual authentication is performed (FIG. 13) using a public key certificate. If the mutual authentication is successfully passed (if the answer in step S2202 is yes), the attribute certificate of the entity with which communication is being performed is verified using the public key of the attribute certificate authority (step S2203). If the verification is successfully passed, it is further confirmed that the attribute certificate is linked to the public key certificate, by checking that the attribute certificate has the same serial number as that of the public key certificate. If the confirmation is successfully made (if the answer in decision step S2204 is yes), attribute information is extracted from the attribute certificate having the same serial number as that of the public key certificate (step S2205). If the attribute information is valid (if the answer in decision step S2206 is yes), it is determined that the mutual authentication and the attribute verification have been successfully passed (step S2207), and the process proceeds to a next step. If the answer of any of decision steps S2202, S2204, and S2206 is no, it is determined that the mutual authentication or the attribute verification has failed (step S2208), and the process is terminated.

(2) Generation of Transaction ID and Purchase Request Data, and (3) Transmission of Purchase Request Data If the mutual authentication and the attribute verification between the shop server 1010 and the user device 1020 have been successfully passed, the user device 1020 generates purchase request data. The data structure of the purchase request data is similar to that shown in FIG. 14 described earlier. In particular, a shop ID identifying a shop server 1010 to that the content-purchasing request is sent, a transaction ID which is generated as an identifier of a content transaction by the encryption means of the user device 1020 on the basis of a random number, and a content ID indicating the content the user device desires to purchase. Furthermore, a digital signature of the user device for the above data is added to the purchase request data.

(4) Verification of Received Data

When the shop server receives the purchase request such as that shown in FIG. 14 from the user device 1020, the shop server verifies the received data. The verification is performed, as described earlier with reference to FIG. 15, by first verifying the public key certificate Cert_DEV of the user device, then extracting the public key KpDEV of the user device from the public key certificate, and finally verifying the signature of the user device written in the purchase request data, using the public key KpDEV of the user device.

If the verification is successfully passed, that is, if it is determined that the purchase request data has not been tampered with, it is determined that the received data is valid. However, if the verification is not passed, it is determined that the purchase request data has been tampered with, and the process associated with the purchase request data is terminated.

(5) Transmission of Encrypted Content and Encrypted Content Key Data 1 (Shop)

If verification performed by the shop server 1010 indicates that the purchase request data is valid data that has not been tampered with, the shop server 1010 transmits the encrypted content and the encrypted content key data 1 (shop) to the user device. In the above process, both the encrypted content data and the encrypted content key data 1 (shop) are obtained from the content database, wherein the encrypted content is data Kc(Content) stored in the content database after being generated by encrypting the content using the content key, and the encrypted content key is data KpDAS(Kc) stored in the content database after being generated by encrypting the content key Kc using the public key of the user device authentication server (DAS) 1030.

Herein, the encrypted content key data 1 (shop) has a data structure similar to that shown in FIG. 14. That is, the encrypted content key data 1 (shop) includes a user device ID identifying the user device 1020 that has issued the content-purchasing request, purchasing request data (the data shown in FIG. 14 other than the public key certificate of the user device), a shop process number generated by the shop server 1010 in response to the content transaction, and an encrypted content key data KpDAS(Kc). Furthermore, a digital signature of the shop server 1010 for the above data is attached with the encrypted content key data 1 (shop). The encrypted content key data 1 (shop) is transmitted together with the public key certificate of the shop server 1010 to the user device 1020. Note that, if the public key certificate has been transmitted to the user device during or before the mutual authentication process, it is not required to re-transmit the public key certificate.

(6) Verification of Received Data

When the user device 1020 receives the encrypted content Kc(Content) and the encrypted content key data 1 (shop) shown in FIG. 14 from the shop server 1010, the user device 1020 verifies the encrypted content key data 1 (shop). The verification is performed in a similar manner as described above with reference to the processing flow shown in FIG. 15. That is, the user device 1020 first verifies the public key certificate of the shop server received from the shop server 1010, using the public key KpCA of the certificate authority (CA). Thereafter, the user device 1020 verifies the shop signature written in the encrypted content key data 1 shown in FIG. 14, using the public key KpSHOP of the shop server extracted from the public key certificate.

(7) Mutual Authentication and Attribute Verification

If the user device 1020 has completed the verification of the encrypted content key data 1 (shop) after receiving the encrypted content Kc(Content and the encrypted content key data 1 (shop) from the shop server 1010, the user device 1020 gets access to the user device authentication server 1030, and mutual authentication and attribute verification are performed between the user device 1020 and the user device authentication server 1030. This process is performed in a similar manner to the mutual authentication and the attribute verification between the shop server 1010 and the user device 1020.

(8) Transmission of Encrypted Key Data (User Device) and Encrypted Content Key Conversion Request If the mutual authentication between the user device 1020 and the user device authentication server 1030 is successfully passed, the user device 1020 transmits the encrypted content key KpDAS(Kc) received from the shop server 1010 to the user device authentication server 1030, and the user device 1020 requests the user device authentication server 1030 to perform conversion of the encrypted content key. Herein, the encrypted content key data (user device) has a data structure similar to that shown in FIG. 14. In particular, a user device authentication server ID identifying the user device authentication server 1030 to which the request for conversion of the encrypted content key is sent, and the encrypted content key data (the data shown in FIG. 14 other than the shop public key certificate) received from the shop server 1010. Furthermore, a digital signature of the user device 1020 for the above data is added to the encrypted content key data (user device). The encrypted content key data (user device) is transmitted, together with the public key certificate of the shop server 1010 and the public key certificate of the user device 1020, to user device authentication server 1030. In the case where the user device authentication server 1030 already has the certificate of the public key of the user device and the certificate of the public key of the shop server, it is not required to re-transmit these certificates.

(9) Verification of Received Data

When the user device authentication server 1030 receives the encrypted content key data (user device) and the encrypted content key conversion request (FIG. 14) from the user device 1020, the user device authentication server 1030 verifies the encrypted content key conversion request. The verification is performed in a similar manner as described above with reference to the processing flow shown in FIG. 15. That is, the user device 1030 first verifies the public key certificate of the user device received from the user device 1020, using the public key KpCA of the certificate authority (CA). Thereafter, the user device 1030 verifies the digital signature written in the encrypted content key data (user device) shown in FIG. 14, using the public key KpDEV of the user device. Furthermore, the user device 1030 verifies the public key certificate of the shop server, using the public key KpCA of the certificate authority (CA). Thereafter, the user device 1030 verifies the shop signature written in (5) the encrypted content key data 1 included in the encrypted content key data (user device) shown in FIG. 14, using the public key KpSHOP of the shop server extracted from the public key certificate. In the case where a message transmitted from the user device is included in the format shown in FIG. 14, the message is verified as required.

(10) Conversion of Encrypted Content Key

In the verification performed by the user device authentication server 1030 concerning the encrypted content key data (user device) and the encrypted content key conversion request received from the user device 1020, if it is determined that the key conversion request is valid, the user device authentication server 1030 decrypts, using the secret key KsDAS of the user device authentication server 1030, the encrypted content key included in the encrypted content key data (user device) thereby obtaining the content key Kc. Furthermore, the user device authentication server 1030 encrypts the obtained content key Kc using the public key KpDEV of the user device thereby generating the encrypted content key KpDEV(Kc). That is, the key is converted such that KpDAS (Kc)→Kc→KpDEV(Kc).

Thereafter, as described earlier with reference to FIG. 16, the content key data KpDAS(Kc) encrypted using the public key KpDAS of the user device authentication server (DAS) 1030 is extracted from the encrypted content key data (user device) and decrypted using the secret key KsDAS of the user device authentication server 1030 thereby acquiring the content key Kc. The acquired content key Kc is then re-encrypted using the public key KpDEV of the user device thereby generating the encrypted content key KpDEV(Kc).

(11) Mutual Authentication and Attribute Verification

If the user device authentication server 1030 has completed the encrypted content key conversion, the user device authentication server 1030 gets access to the shop server 1010, and mutual authentication and attribute verification are performed between the user device authentication server 1030 and the shop server 1010. This process is performed in a similar manner to the mutual authentication and the attribute verification between the shop server 1010 and the user device 1020.

(12) Transmission of Encrypted Content Data

If the mutual authentication and the attribute verification between the user device authentication server 1030 and the shop server 1010 are successfully passed, the user device authentication server 1030 transmits the encrypted content key data (DAS) to the shop server 1010. Herein, the encrypted content key data (DAS) has a data structure similar to that shown in FIG. 17. In particular, a shop ID identifying a shop server 1010 to which the content-purchasing request is sent, the encrypted content key data (user device) (the data shown in FIG. 14 other than the certificate of the public key of the shop and that of the user device), and the encrypted content key data KpDEV(Kc) generated by the user device authentication server 1030 via the above-described key conversion process. Furthermore, a digital signature of the user device 1030 for the above data is added to the encrypted content key data (DAS). The encrypted content key data (DAS) is transmitted, together with the public key certificate of the user device authentication server 1030 and the public key certificate of the user device 1020, to the shop server 1010. In the case where the shop server already has these certificates, it is not required to re-transmit these certificates.

Figure 17:
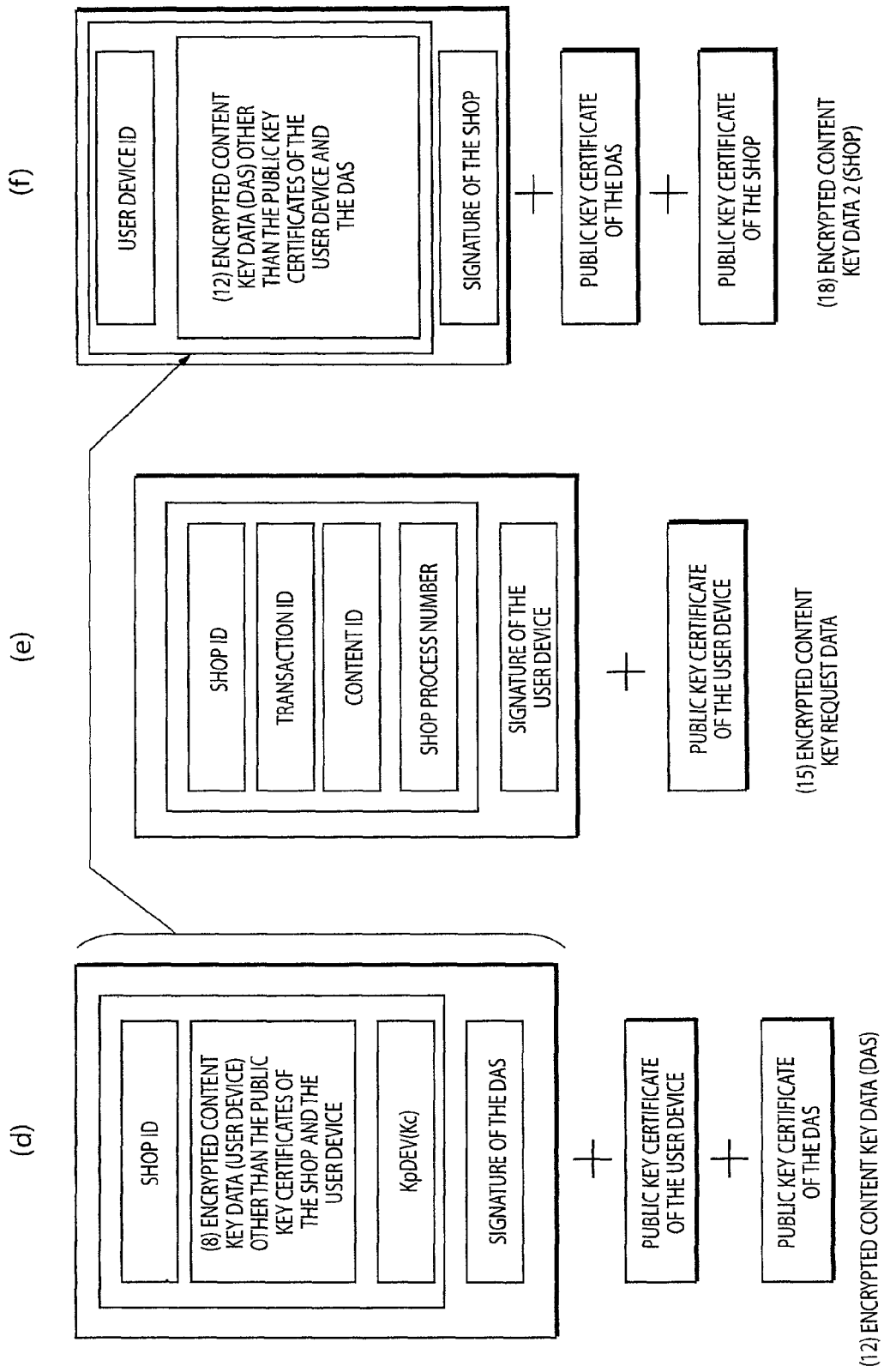
FIG. 17 is a diagram illustrating data structures of data transmitted between entities in the content delivery system according to the present invention.
Figure 18:
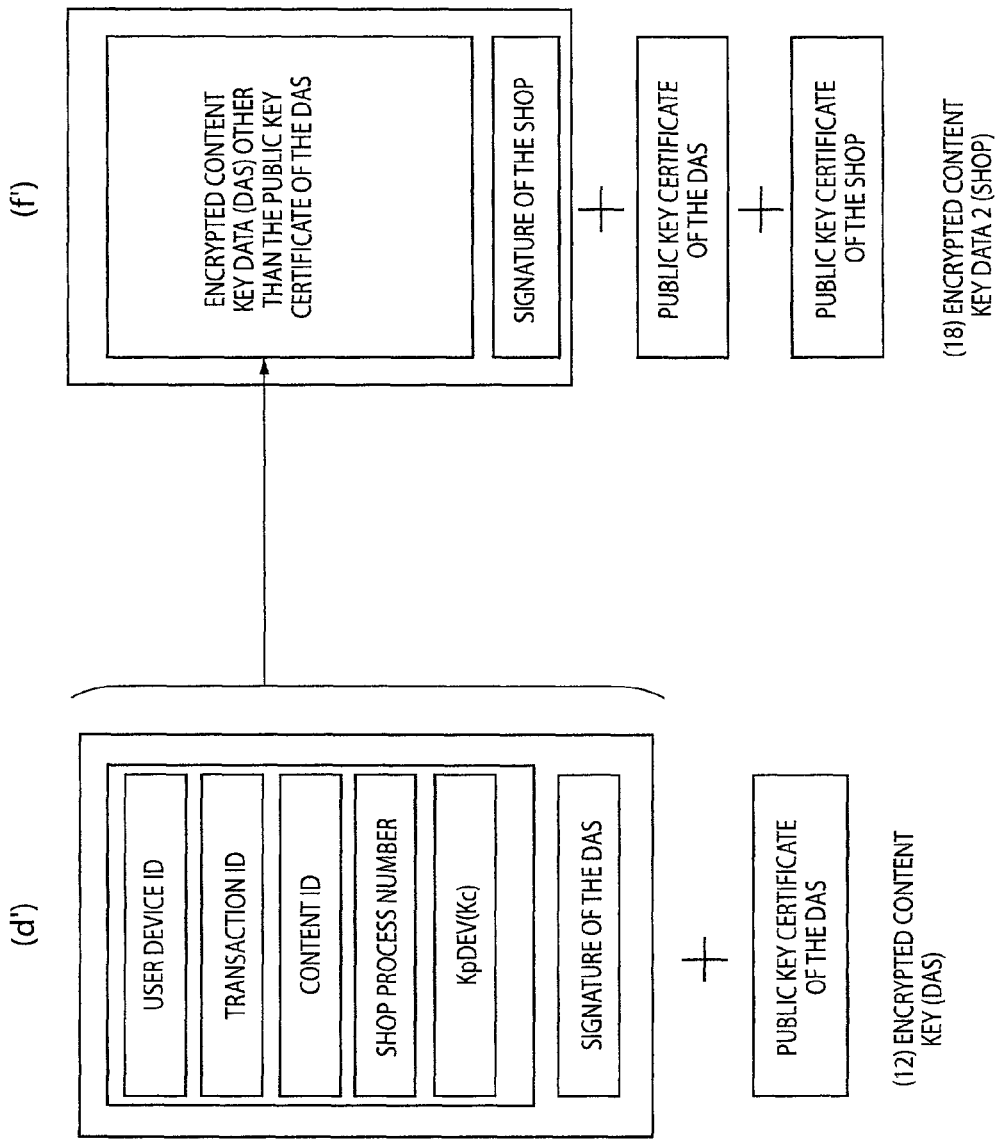
FIG. 18 is a diagram illustrating data structures of data transmitted between entities in the content delivery system according to the present invention.
Figure 19:
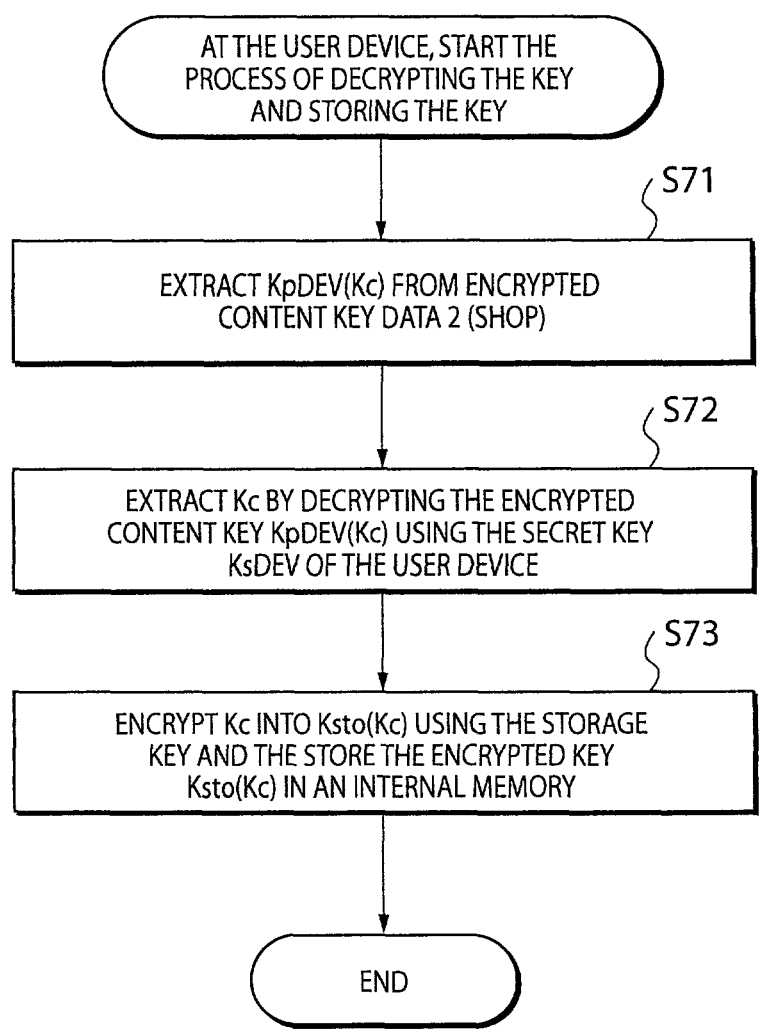
FIG. 19 is a diagram illustrating a content key storage process performed in the content delivery system according to the present invention.
Figure 20:
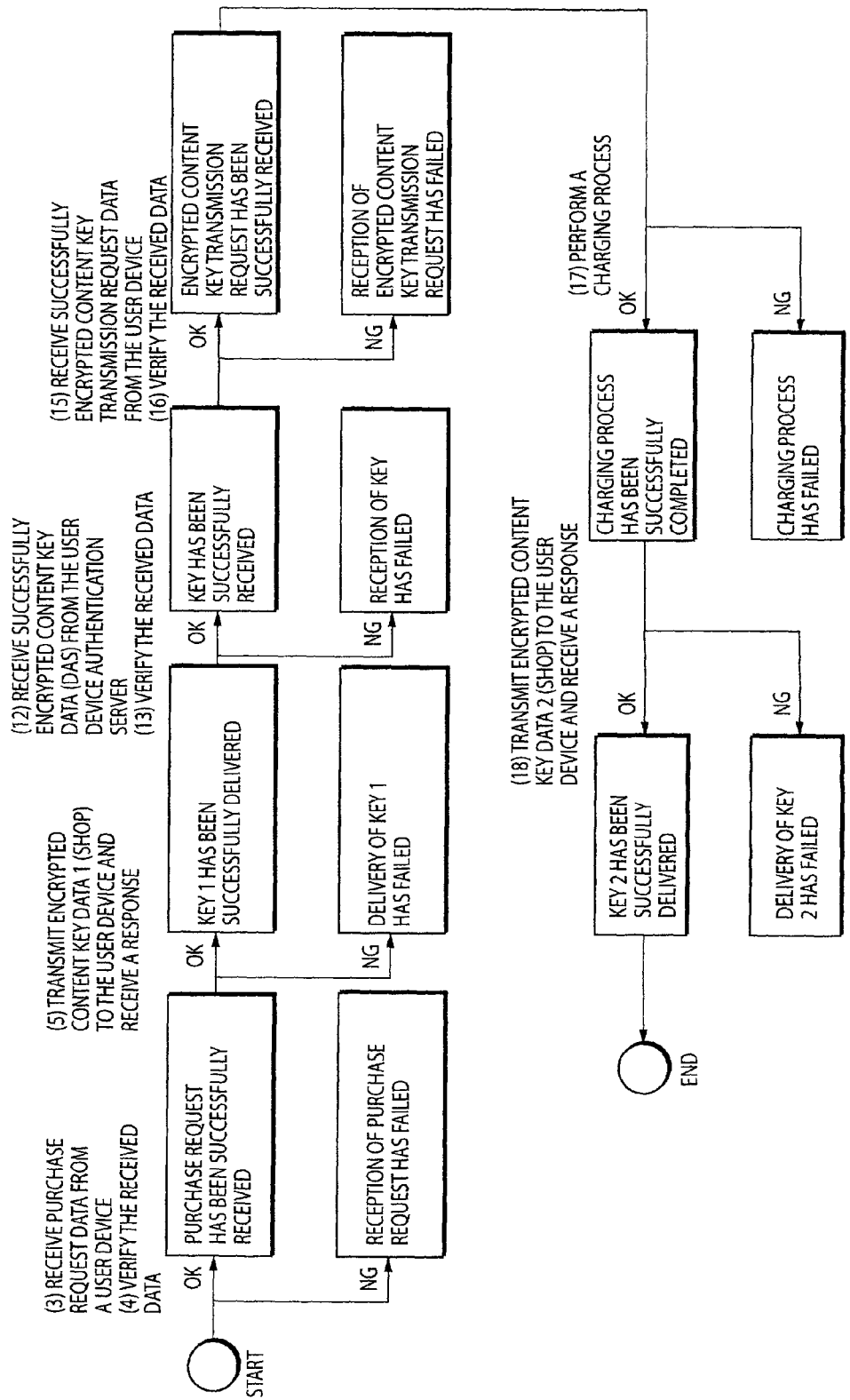
FIG. 20 is a diagram illustrating the status transitions of the shop server in the content delivery system according to the present invention.
Figure 21:
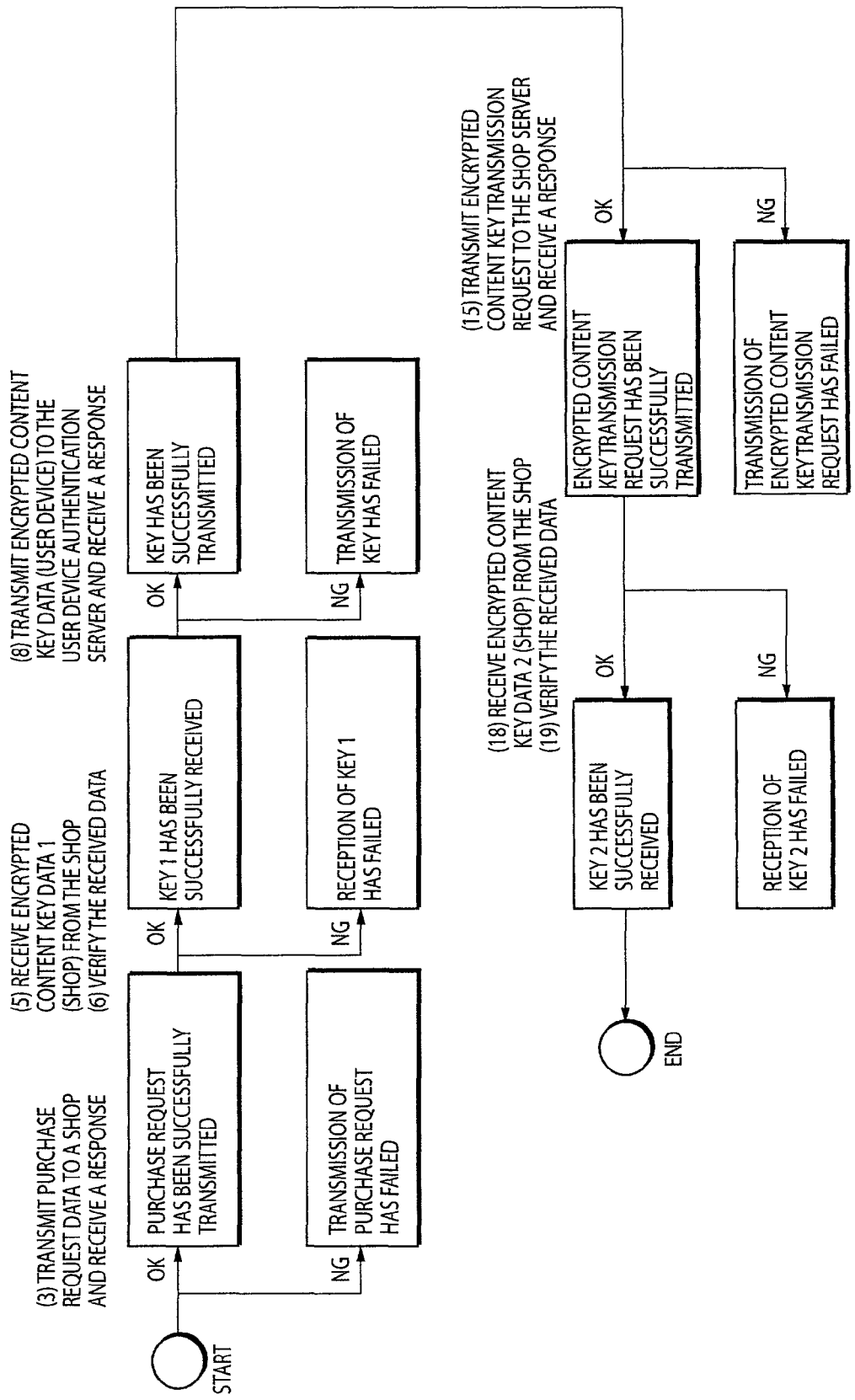
FIG. 21 is a diagram illustrating the status transitions of the user device in the content delivery system according to the present invention.
Figure 22:
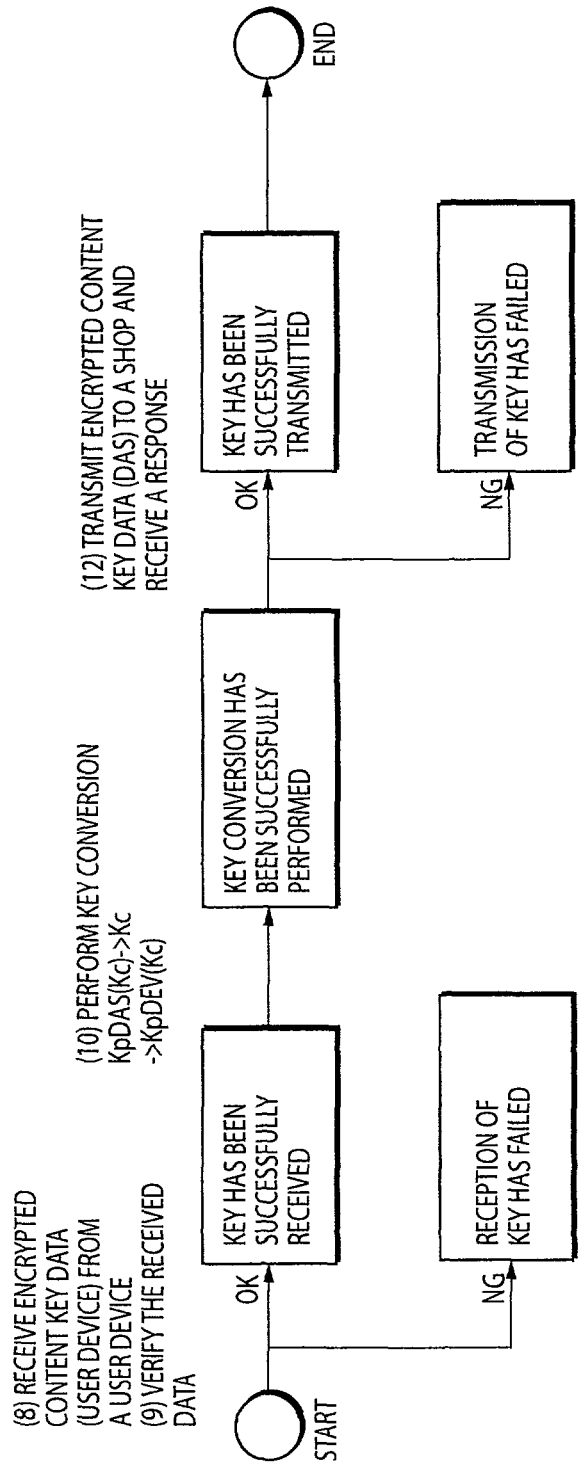
FIG. 22 is a diagram illustrating the status transitions of the user device authentication server in the content delivery system according to the present invention.

In the case where the user device authentication server 1030 is managed by a highly reliable third party, the encrypted content key data (DAS) may be constructed not in the form shown in FIG. 17 but may be constructed such as shown in FIG. 18. In this case, it becomes unnecessary to verify the encrypted content key data (user device) (denoted by (8) in FIG. 17), and thus it is necessary to attach only the public key certificate of the user device authentication server 1030 to the encrypted content key data (DAS).

(13) Verification of Received Data

When the shop server 1010 receives the encrypted content key data (DAS) (FIG. 17) from the user device authentication server 1030, the shop server 1010 verifies the encrypted content key data (DAS). The verification is performed in a similar manner as described above with reference to the processing flow shown in FIG. 15. That is, the shop server 1010 first verifies the public key certificate of the user device authentication server received from the user device authentication server 1030, using the public key KpCA of the certificate authority (CA). Thereafter, the shop server 1010 verifies the digital signature written in the encrypted content key data (DAS) shown in FIG. 17, using the public key KpDAS of the user device authentication server 1030. Furthermore, the shop server 1010 verifies the public key certificate of the user device, using the public key KpCA of the certificate authority (CA). Thereafter, the shop server 1010 verifies the digital signature written, by the user device, in (8) shown in FIG. 17, using the public key KpDEV of the user device extracted from the public key certificate. In the case where a message transmitted from the user device is included in the format shown in FIG. 14, the message is verified as required.

In the case where the shop server 1010 receives encrypted content key data (DAS) in the simplified form described above with reference to FIG. 18, the shop server 1010 verifies the public key certificate of the user device authentication server, using the public key KpCA of the certificate authority (CA), and then the shop server 100 verifies the digital signature of the encrypted content key data (DAS) shown in FIG. 18, using the public key KpDAS of the user device authentication server 1030.

(14) Mutual Authentication and Attribute Verification, and

(15) Transmission of Encrypted Content Key Request

Thereafter, the user device 1020 transmits the encrypted content key request data to the shop server. In the case where the encrypted content key request data is transmitted in a session different from a session in which a previous request has been transmitted, mutual authentication is again performed, and the encrypted content key request data is transmitted from the user device 1020 to the shop server 1010 only if the mutual authentication is successfully passed. In the case where a message transmitted from the user device is included in the format shown in FIG. 14, the message is verified as required.

FIG. 17 illustrates the data structure of the encrypted content key request data. That is, the encrypted content key request data includes a shop ID identifying a shop server 1010 to which the content-purchasing request is sent, a transaction ID that is generated as an identifier of a content transaction by the encryption means of the user device 1020 on the basis of a random number, a content ID indicating a content the user device desires to purchase, and a shop process number included in the data (FIG. 14), which has been generated by the shop and transmitted as the content key data 1 (shop) to the user device 1020. Furthermore, a digital signature of the user device for the above data is added to the encrypted content key request data. The encrypted content key request data is transmitted together with the public key certificate of the user device to the shop server 1010. In the case where the shop server already has the certificate, it is not required to re-transmit the certificate.

(16) Verification, and

(17) Charging Process

When the shop server 1010 receives the encrypted content key request data from the user device, the shop server 1010 verifies the encrypted content key request data. This verification process is performed in a similar manner as described above with reference to FIG. 15. After completion of the data verification, the shop server 1010 performs a charging process associated with the content transaction. This charging process is performed to receive the fee for the content from an account of an user. The received fee for the content is distributed among a copyright holder of the content, the shop, an owner of the user device authentication server, or the like.

Note that it is required to perform the encrypted content key conversion by the user device authentication server 1030 before the charging process, and thus the charging process cannot be performed only through a process between the shop server 1010 and the user device. The user device 1020 cannot decrypt the encrypted content key and thus the user device 1020 cannot use the content unless the key conversion has been performed. The history of all content transactions in which the key conversion was performed by the user device authentication server is recorded in the license management database described earlier with reference to FIG. 6, and thus any content transaction that needs a charging process can be monitored and managed. This prevents any shop from performing by itself a content sales transaction and thus from selling content in an unauthorized manner.

(18) Transmission of Encrypted Content Key Data 2 (Shop)

If the shop server 1010 has completed the charging process, the shop server 1010 transmits the encrypted content key data 2 (shop) to the user device 1020.

Herein, the encrypted content key data 2 (shop) has a data structure similar to that shown in FIG. 17, that is, a user device ID identifying the user device 1020 that has issued the encrypted content key request, and the encrypted content key data (DAS) (the data shown in FIG. 17 other than public key certificates of the user device and the user device authentication server) received from the user device authentication server 1030. Furthermore, a digital signature of the shop server 1010 for the above data is added to the encrypted content key data 2 (shop). The encrypted content key data 2 (shop) is transmitted, together with the public key certificate of the shop server 1010 and the public key certificate of the user device authentication server 1030, to the user device

1020. In the case where the user device 1020 already has the certificate of the public key of the user device authentication server and the certificate of the public key of the shop server, it is not required to re-transmit these certificates.

In the case where the user device authentication server 1030 is managed by a highly reliable third party, and the shop server 1010 receives from the user device authentication server 1030 the encrypted content key data (DAS) in the simplified form described above with reference to FIG. 18, the shop server 1010 transmits the encrypted content key data 2 (shop) in the form shown in FIG. 18 to the user device. That is, the encrypted content key data (DAS) in the simplified form shown in FIG. 18 including the signature of the shop server is transmitted, together with the public key certificate of the shop server 1010 and the public key certificate of the user device authentication server 1030, to the user device 1020.

(19) Verification of Received Data

When the user device 1020 receives the encrypted content key data 2 (shop) from the shop server 1010, the user device 1020 verifies the encrypted content key data 2 (shop). The verification is performed in a similar manner as described above with reference to the processing flow shown in FIG. 15. That is, the user device 1020 first verifies the public key certificate of the shop server received from the shop server 1010, using the public key KpCA of the certificate authority (CA). Thereafter, the user device 1020 verifies the digital signature written in the encrypted content key data 2 (shop) shown in FIG. 17, using the public key KpSHOP of the shop server 1010 extracted from the public key certificate. Furthermore, the user device 1020 verifies the public key certificate of the user device authentication server 1030, using the public key KpCA of the certificate authority (CA). Thereafter, the user device 1020 verifies the digital signature written in (12) of FIG. 17 using the public key KpDAS of the user device authentication server 1030 extracted from the public key certificate. In the case where some message is included in the format shown in FIG. 17, the message is verified as required.

(20) Storage of Data

After the user device 1020 has verified the encrypted content key data 2 (shop) received from the shop server 1010, the user device 1020 decrypts, using the secret key KsDEV of the user device 200, the encrypted content key KpDEV(Kc) which has been encrypted using the public key KpDEV of the user device 1020 and included in the encrypted content key data 2 (shop), and then the user device 1020 encrypts the content key using the storage key Ksto of the user device thereby generating an encrypted content key Ksto(Kc). The resultant encrypted content key Ksto(Kc) is stored in the storage means of the user device 1020. When the content is used, the encrypted content key Ksto(Kc) is decrypted using the storage key Ksto thereby obtaining the content key Kc, and the encrypted content Kc(Content) is decrypted using the obtained content key Kc thereby reproducing the content.

In the present embodiment, as described above, before starting a process associated with content delivery via communication between two entities, the attribute of an entity at the opposite communication end is examined, and the process is executed if the attribute of the entity at the opposite communication end is of an expected type, such as a user device. This prevents a fraudulent content sales transaction. For example, it is possible to prevent a shop from fraudulently behaving as if it were a user device to perform a fraudulent content transaction. It is also possible to prevent a server from fraudulently behaving as if it were an authorized shop server to fraudulently acquire the credit account number of a user device.

For example, once a user device determines, on the basis of attribute check, that an entity the user device is communicating with is a shop, it is assured that the user device can issue a content-purchasing request to the shop without risk. Similarly, if an attribute check indicates that an entity a user device is communicating with is a user device authentication server, it is assured that the user device can issue a request such as a key conversion request to the user device authentication server without risk. In this system, according to the present embodiment, the attribute check makes it possible to know the type of an entity at an opposite communication end. Thus, it is assured that a process can be adequately performed depending upon the type of the entity at the opposite communication end. Furthermore, it becomes possible to prevent secret data from being transmitted to an incorrect entity, and thus it is possible to prevent data from leaking.

Figure 74:
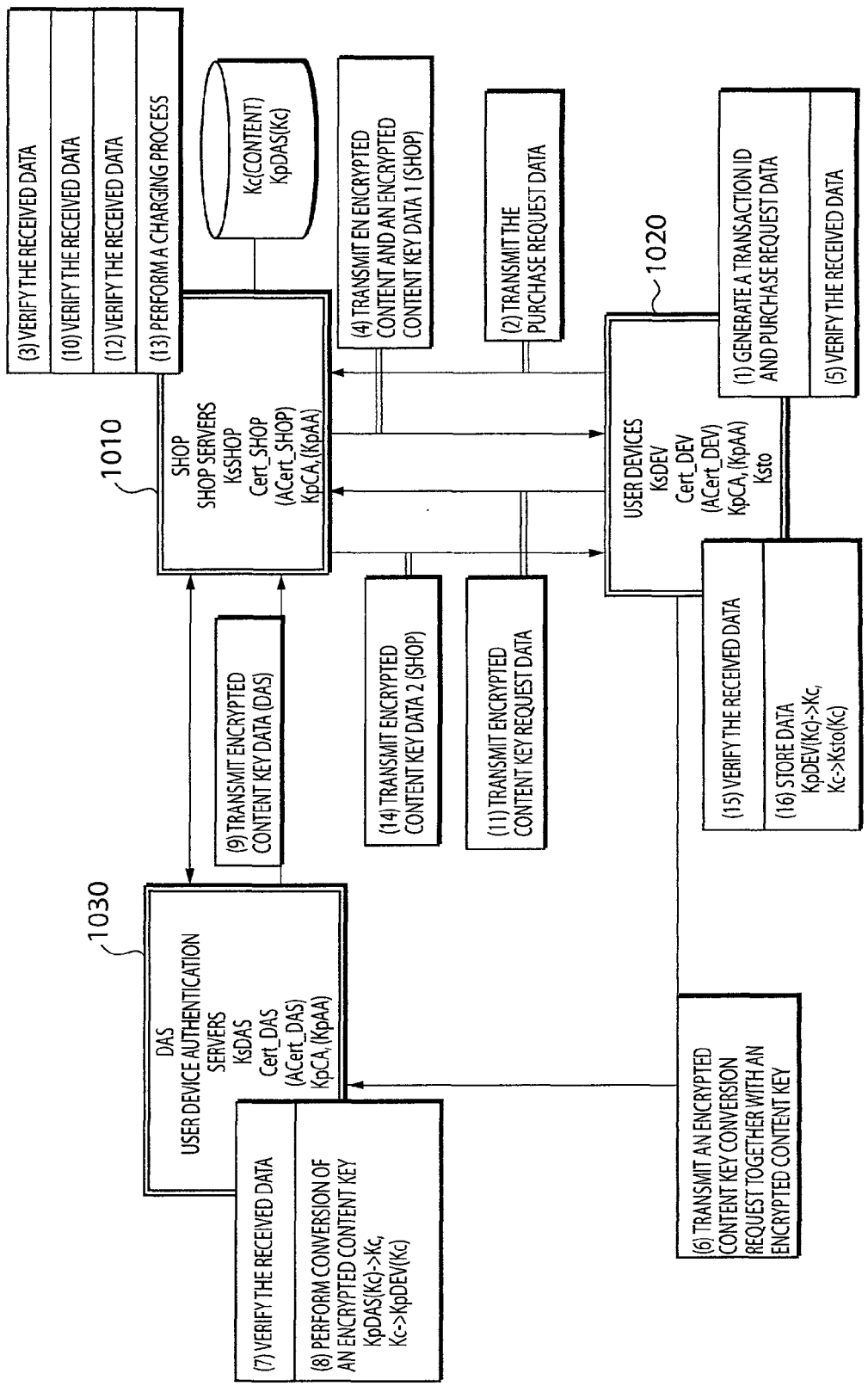
FIG. 74 is a diagram illustrating a content delivery process including a step of checking an attribute, performed in the content delivery system according to the present invention.

Referring now to FIG. 74, a process is described below in which a content transaction is performed after verification of a signature written in received data and checking of the attribute information, without performing mutual authentication.

The process shown in FIG. 74 is similar to that shown in FIG. 72 except that the mutual authentication is not performed. In FIG. 74, the process proceeds in the order of process steps from (1) to (16), as will be described below.

(1) Generation of Transaction ID and Purchase Request Data, and (2) Transmission of Purchase Request Data First, the user device 1020 generates purchase request data and transmits it to the shop server 1010. Herein, the purchase request data (user device) has a data structure similar to that shown in FIG. 14.

(3) Verification of Received Data

When the shop server receives the purchase request such as that shown in FIG. 14 from the user device 200, the shop server 100 verifies the received data. In the present embodiment, in addition to the verification to check whether integrity of the purchase request data is maintained, checking of the attribute information is performed.

Figure 75:
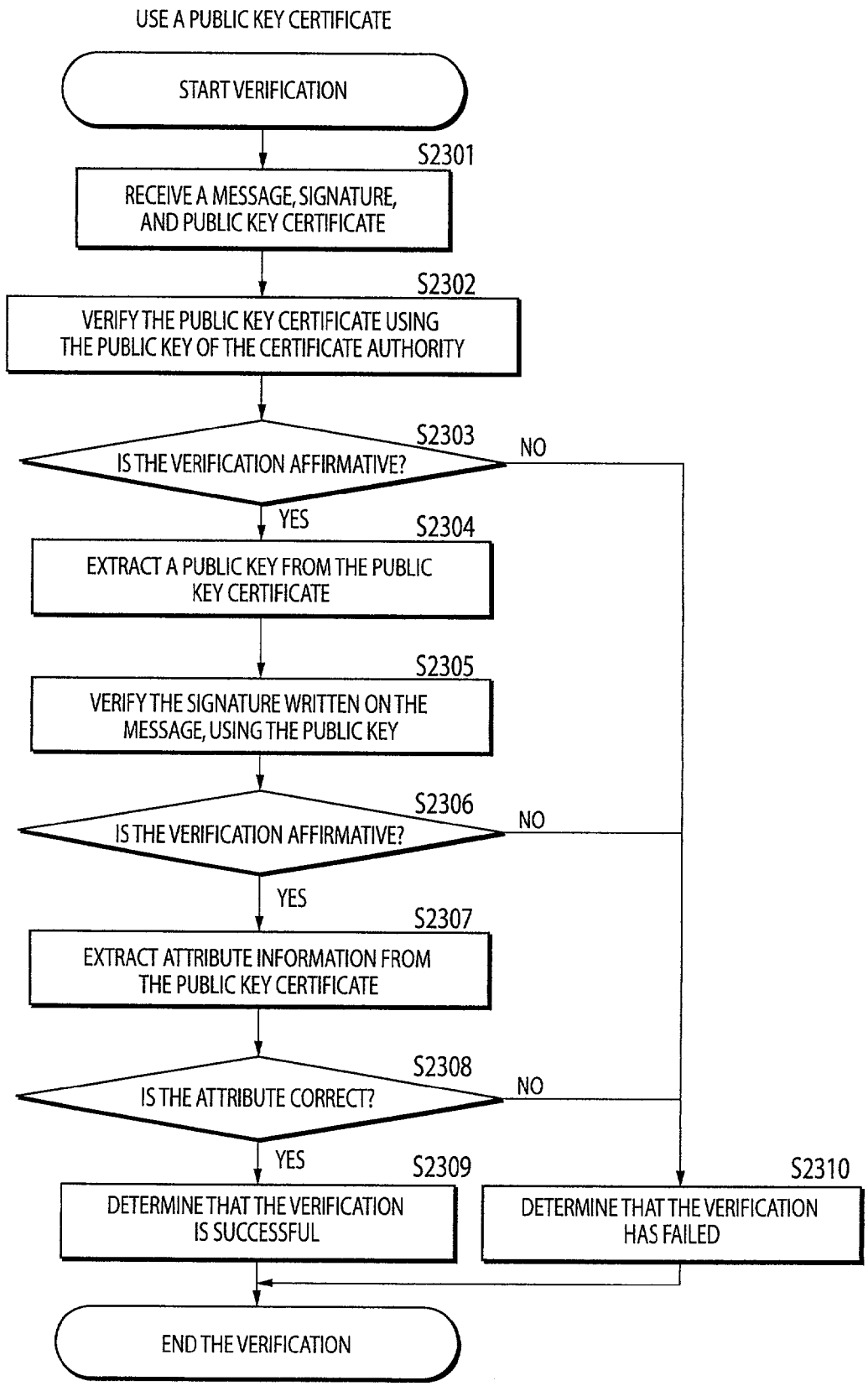
FIG. 75 is a diagram illustrating a data verification process including a step of checking an attribute, performed in the content delivery system according to the present invention.

FIG. 75 illustrates the flow of verifying the received data, for the case where the public key certificate includes attribute information. If the shop server 1010 receives the message, including the signature (purchase request data) and the public key certificate of the user device (step S2301), the shop server 1010 verifies the public key certificate of the user device, using the public key KpCA of the public key certificate authority (step S2302). If the verification is successfully passed (if the answer in step S2303 is yes), the public key KpDEV of the user device is extracted from the public key certificate (step S2304), and the signature of the user device written in the purchase request data is verified using the public key Kp_DEV of the user device (step S2305). If the verification is successfully passed (if the answer in step S2306 is yes), the attribute information is extracted from the public key certificate (step S2307), and it is determined whether the attribute is valid (in this specific case, it is determined whether the attribute information indicates that the device is a user device) (step S2308). If the attribute is valid, that is, if the verification is successfully passed (step S2309), the process proceeds to a next step. If the answer of any of decision steps S2303, S2306, and S2308 is no, it is determined that the verification has failed (step S2310), and the process is terminated.

Referring now to the flow chart shown in FIG. 76, the process of verifying received data, using a public key certificate and an attribute certificate is described below. First, a shop server 1010 receives a message, a signature (purchase request data), and a public key certificate and an attribute certificate of a user device (step S2401). The shop server 1010 verifies the public key certificate of the user device, using a public key KpCA of the public key certificate authority (step S2402). If the verification is successfully passed (if the answer in step S2403 is yes), the public key KpDEV of the user device is extracted from the public key certificate (step S2404), and the signature of the user device written in the purchase request data is verified using the public key KpDEV of the user device (step S2405). If the verification is successfully passed (if the answer in step S2406 is yes), the attribute certificate is then verified using the public key KpAA of the attribute certificate authority (step S2407). If the verification is successfully passed (if the answer in step S2408 is yes), the attribute information is extracted from the attribute certificate (step S2409), and it is determined whether the attribute is valid (in this specific case, it is determined whether the attribute information indicates that the device is a user device) (step S2410). If the attribute is valid, that is, if the verification is successfully passed (step S2411), the process proceeds to a next step. If the answer of any of decision steps S2403, S2406, S2408, and S2410 is no, it is determined that the verification has failed (step S2412), and the process is terminated.

(4) Transmission of Encrypted Content and Encrypted Content Key Data 1 (Shop)

If verification performed by the shop server 1010 indicates that the purchase request data is valid data which has not been tampered with, and if the attribute is confirmed, the shop server 1010 transmits the encrypted content and the encrypted content key data 1 (shop) (FIG. 14) to the user device.

(5) Verification of Received Data

When the user device 1020 receives the encrypted content Kc(Content) and the encrypted content key data 1 (shop) shown in FIG. 14 from the shop server 1010, the user device 1020 verifies the encrypted content key data 1 (shop) and further verifies the attribute. The verification is performed in a similar manner as described above with reference to the processing flow shown in FIG. 75 or 76. If the attribute described in the public key certificate or in the attribute certificate is not "shop", the process is terminated.

(6) Transmission of Encrypted Key Data (User Device) and Encrypted Content Key Conversion Request Thereafter, the user device 1020 transmits the encrypted content key KpDAS(Kc) received from the shop server 1010 to the user device authentication server 1030, and the user device 1020 requests the user device authentication server 1030 to perform conversion of the encrypted content key (FIG. 14).

(7) Verification of Received Data

When the user device authentication server 1030 receives the encrypted content key data (user device) and the encrypted content key conversion request (FIG. 14) from the user device 1020, the user device authentication server 1030 verifies the encrypted content key conversion request. The verification is performed in a similar manner as described above with reference to the processing flow shown in FIG. 75 or 76, wherein the attribute verification is also performed. If the attribute described in the public key certificate or in the attribute certificate is not "user device", the process is terminated.

(8) Conversion of Encrypted Content Key

Thereafter, the key is converted by the user device authentication server 1030 such that KpDAS(Kc)→Kc→KpDEV (Kc).

(9) Transmission of Encrypted Content Data

Thereafter, the user device authentication server 1030 transmits the encrypted content key data (DAS) to the shop server 1010. Herein, the encrypted content key data (DAS) has a data structure similar to that shown in FIG. 17.

(10) Verification of Received Data

When the shop server 1010 receives the encrypted content key data (DAS) (FIG. 17) from the user device authentication server 1030, the shop server 1010 verifies the encrypted content key data (DAS). The verification is performed in a similar manner as described above with reference to the processing flow shown in FIG. 75 or 76, wherein the attribute verification is also performed. If the attribute described in the public key certificate or the attribute certificate is not of the user device authentication server (service provider), the process is terminated.

(11) Transmission of Encrypted Content Key Request

Thereafter, the user device 1020 transmits the encrypted content key request data to the shop server. The encrypted content key request data has a data structure such as that shown in FIG. 17.

(12) Verification, and
(13) Charging Process

When the shop server 1010 receives the encrypted content key request data from the user device, the shop server 1010 verifies the encrypted content key request data. The verification is performed in a similar manner as described above with reference to the process flow shown in FIGS. 75 and 76, wherein attribute check is also performed. If the attribute described in the public key certificate or in the attribute certificate is not of the user device, the process is terminated. After completion of the data verification, the shop server 1010 performs a charging process associated with the content transaction.

(14) Transmission of Encrypted Content Key Data 2 (Shop)

If the shop server 1010 has completed the charging process, the shop server 1010 transmits the encrypted content key data 2 (shop) to the user device 1020. Herein, the encrypted content key data 2 (shop) has a data structure similar to that shown in FIG. 17.

(15) Verification of Received Data, and
(16) Storage of Data

When the user device 1020 receives the encrypted content key data 2 (shop) from the shop server 1010, the user device 1020 verifies the encrypted content key data 2 (shop). The verification is performed in a similar manner as described above with reference to the processing flow shown in FIG. 75 or 76, wherein the attribute verification is also performed. If the attribute described in the public key certificate or in the attribute certificate is not "shop", the process is terminated. After verifying the data, the user device 1020 performs a storage process. That is, the user device 1020 decrypts, using the secret key KsDEV of the user device 200, the encrypted content key KpDEV(Kc) which has been encrypted using the public key KpDEV of the user device 1020, and then the user device 1020 encrypts the content key using the storage key Ksto of the user device 1020 thereby generating an encrypted content key Ksto(Kc). The resultant encrypted content key Ksto(Kc) is stored in the storage means of the user device 1020.

In the process shown in FIG. 74, as described above, checking of attribute information is performed not when the mutual authentication is performed but when the signature of the received data is verified, and thus the process is simplified, and the content transaction can be performed in a more efficient fashion.

In the above-described embodiment using attribute data to check the attribute of an entity, the key conversion is performed by a service provider. However, checking of attribute data may also be employed in a system in which a log recording server is used. Furthermore, in a general system in which data is transmitted among entities, the attributes of the respective entities may be defined depending upon the specific functions of the entities, and the defined attribute of each entity may be described in its public key certificate or attribute certificate thereby making it possible for any entity to know the attribute of another entity being communicated with and thus achieving high security in data communication. The attribute checking process may be performed in addition with the mutual authentication and/or the signature verification performed in the conventional technique. For example, only the signature verification or only the mutual authentication may be performed in general data communication, and the attribute checking process may be performed only when it is necessary. That is, depending upon the desired degree of security, one of, or a combination of, the signature verification, the mutual authentication, and the attribute check may be performed.

The present invention has been described in detail above with reference to particular embodiments. It will be apparent to those skilled in the art that various modifications and substitution to those embodiments may be made in the embodiment chosen for illustration without departing from the spirit and scope of the invention. That is, the embodiments have been described above by way of example and not limitation. The scope of the invention is to be determined solely by the appended claims.

In conclusion, it can be seen that the present invention provides a content delivery system and a content delivery method, in which when a user device has issued a content-purchasing request to a shop server, if a charging process associated with the content-purchasing request has been successfully completed, the shop server transmits to the user device an encrypted content key in a form which can be decrypted by a key stored in the user device, thereby assuring that the charging process can be performed in a highly reliable fashion.

The present invention also provides a content delivery system and a content delivery method, in which in response to a content-purchasing request issued by a user device, a user device authentication server, which manages delivering of contents, converts a content key KpDAS(Kc) encrypted using a public key of a user device authentication server (DAS) into a content key KpDEV(Kc) encrypted using a public key of the user device, thereby ensuring that the user device authentication server can monitor the actual status of the content sales transaction between a shop and the user device.

The present invention also provides a content delivery system and a content delivery method, in which when data communication is performed among a user device, a shop, and a user device authentication server, at least one of mutual authentication and signature generation/verification is performed, thereby ensuring high security in the data communication and making it possible to check whether integrity of data is maintained.

The invention claimed is:

1. A shop server, comprising:
a control unit, responsive to a request from a user device for content, for providing an encrypted content key that is not usable by the user device; and
a network interface for (a) transmitting the unusable encrypted content key to a user authentication device having a license management database, (b) subsequently receiving a usable form of the encrypted content key from the user authentication device and (c) transmitting the usable form of the encrypted content key to the user device,
wherein the encrypted content key received by the user device is usable by the user device for decrypting an encrypted form of the content associated with the request, and
wherein the shop server is configured to perform a process for charging a fee associated with the content only after completion of recording conversion of the encrypted content key from the unusable form to the usable form on the license management database.

2. The shop server according to claim 1, further comprising a content delivery server for delivering the encrypted content.

3. A tangible non-transitory computer-readable medium having computer executable instructions stored thereon for performing a content key delivery process, the instructions, when executed by a computer, cause the computer to perform the process comprising:
providing an encrypted content key that is not usable by a user device to an authentication server having a license management database;
receiving, in a shop server, a converted encrypted content key that is usable by the user device from the authentication server;
performing a charging process in the shop server on the basis of a content-purchasing request issued by the user device after receiving the converted encrypted content key so that the charging process is prevented from being performed by the shop server until completion of recording conversion of the encrypted content key from the unusable form to the usable form on the license management database; and
if the charging process has been successfully completed, transmitting the converted encrypted content key from the shop server to the user device, wherein the content key is for decrypting encrypted content associated with the content-purchasing request.

4. A server for use in a content delivery system, the server comprising:
a network interface for use in communicating with a user device and an authentication server having a license management database; and
a processor configure to perform a process, on a request for content received from the user device via the network interface, to provide an encrypted content key that is not usable by the user device for decrypting an encrypted form of the requested content to the authentication server, and to provide a converted form of the encrypted content key to the user device via the network interface, wherein the converted form of the encrypted content key is received from the authentication server via the network interface, the processor is prevented from performing a charging process until completion of recording conversion of the encrypted content key from the unusable form to the converted form on the license management database, and the converted form of the encrypted content key is usable by the user device for decrypting the encrypted content.

5. The computer-readable medium of claim 3, wherein the authentication server includes a database, the process further comprising storing in the database at least one transaction associated with the conversion of an encrypted content key.

6. The computer-readable medium of claim 5, wherein the storing step includes storing the at least one transaction in the database before the usable form of the encrypted content key is transmitted to the user.

7. The computer-readable medium of claim 5, the process further comprising managing the charging process based on the stored at least one transaction.

8. The computer-readable medium of claim 5, the process further comprising preventing the shop server from selling content to one or more unauthorized users based on the stored at least one transaction.

* * * * *

UNITED STATES PATENT AND TRADEMARK OFFICE
CERTIFICATE OF CORRECTION

PATENT NO.         : 8,538,887 B2
APPLICATION NO.    : 09/999456
DATED              : September 17, 2013
INVENTOR(S)        : Yoshino Page 1 of 1

It is certified that error appears in the above-identified patent and that said Letters Patent is hereby corrected as shown below:

On the title page Item [73]: "Sony Computer Entertainment Inc." should read -- Sony Computer Entertainment Inc. and Sony Corporation --.

Signed and Sealed this
Thirteenth Day of May, 2014

Michelle K. Lee
*Deputy Director of the United States Patent and Trademark Office*